United States Patent [19]
Guissin

[11] Patent Number: 5,799,111
[45] Date of Patent: *Aug. 25, 1998

[54] APPARATUS AND METHODS FOR SMOOTHING IMAGES

[75] Inventor: Rami Guissin, Vitkin, Israel

[73] Assignee: D.V.P. Technologies, Ltd., Bitkin, Israel

[*] Notice: The term of this patent shall not extend beyond the expiration date of Pat. No. 5,442,462.

[21] Appl. No.: 454,239

[22] PCT Filed: Dec. 10, 1993

[86] PCT No.: PCT/US93/12072

§ 371 Date: Sep. 6, 1995

§ 102(e) Date: Sep. 6, 1995

[87] PCT Pub. No.: WO94/14138

PCT Pub. Date: Jun. 23, 1994

Related U.S. Application Data

[63] Continuation-in-part of Ser. No. 896,682, Jun. 10, 1992, Pat. No. 5,442,462.

[30] Foreign Application Priority Data

Dec. 13, 1992 [IL] Israel ........................ 104076

[51] Int. Cl.$^6$ .................... G06K 9/44; G06T 5/00; H04N 1/409
[52] U.S. Cl. .................... 382/254; 382/263; 382/266; 382/275; 358/447; 358/463
[58] Field of Search .................... 382/254, 263, 382/264, 266, 275, 300; 358/447, 463, 448

[56] References Cited

U.S. PATENT DOCUMENTS

| 4,055,756 | 10/1977 | Jolivet et al. |
| 4,167,749 | 9/1979 | Burrus |
| 4,179,709 | 12/1979 | Workman |
| 4,222,077 | 9/1980 | Yamada |
| 4,237,481 | 12/1980 | Aughton |

(List continued on next page.)

FOREIGN PATENT DOCUMENTS

| 2151104 | 7/1985 | United Kingdom |
| 2243061 | 10/1991 | United Kingdom |

OTHER PUBLICATIONS

Mahesh, B., et al., Adaptive estimations for filtering noisy images, *Optical Engineering*, 29(5), pp. 488–494, 1990.

Gelb, A. (ed.), *Applied optimal estimation*, Technical Staff Analytical sciences corporation, MIT Press, Cambridge, MA, USA, 1989, pp. 102–111.

(List continued on next page.)

*Primary Examiner*—Scott Rogers
*Attorney, Agent, or Firm*—Ladas & Parry

[57] ABSTRACT

Improved spatial, temporal, and spatio-temporal noise reduction apparatus (10) and also apparatus for noise reduction in conjunction with one or several of the following functions: edge enhancement, spatial interpolation, magnification adjustment by spatial interpolation, and dynamic range compression (DRC). An embodiment of apparatus (10) comprises an image preprocessing unit (12), an estimation gain parameter computation unit (14) and a two-directional processor (16).

20 Claims, 37 Drawing Sheets

U.S. PATENT DOCUMENTS

| | | |
|---|---|---|
| 4,242,705 | 12/1980 | Ebihara . |
| 4,246,610 | 1/1981 | Takahashi . |
| 4,270,141 | 5/1981 | Sakamoto . |
| 4,317,179 | 2/1982 | Kato et al. . |
| 4,319,260 | 3/1982 | Tasch, Jr. et al. . |
| 4,330,833 | 5/1982 | Pratt et al. . |
| 4,335,398 | 6/1982 | Yamada . |
| 4,335,407 | 6/1982 | Atoji et al. . |
| 4,365,304 | 12/1982 | Ruhman et al. . |
| 4,441,121 | 4/1984 | Harwood et al. . |
| 4,442,454 | 4/1984 | Powell . |
| 4,549,212 | 10/1985 | Bayer . |
| 4,553,165 | 11/1985 | Bayer . |
| 4,590,608 | 5/1986 | Chen et al. . |
| 4,648,120 | 3/1987 | Chittineni . |
| 4,654,863 | 3/1987 | Belfield et al. . |
| 4,672,437 | 6/1987 | Casper . |
| 4,710,822 | 12/1987 | Matsunawa . |
| 4,751,585 | 6/1988 | Shibazaki . |
| 4,764,971 | 8/1988 | Sullivan . |
| 4,774,682 | 9/1988 | White . |
| 4,792,854 | 12/1988 | Glenn . |
| 4,817,180 | 3/1989 | Cho et al. . |
| 4,918,633 | 4/1990 | Sullivan . |
| 4,945,502 | 7/1990 | Kwon et al. . |
| 4,992,961 | 2/1991 | Petersen . |
| 5,031,227 | 7/1991 | Raasch et al. . |
| 5,131,057 | 7/1992 | Walowit et al. . |
| 5,134,495 | 7/1992 | Frazier et al. . |
| 5,142,537 | 8/1992 | Kutner et al. . |
| 5,157,491 | 10/1992 | Kassatly . |
| 5,201,013 | 4/1993 | Kumagai . |
| 5,270,728 | 12/1993 | Lund et al. . |
| 5,293,579 | 3/1994 | Stockholm . |
| 5,301,038 | 4/1994 | Todd . |
| 5,337,159 | 8/1994 | Iida et al. . |
| 5,442,462 | 8/1995 | Guissin . |

OTHER PUBLICATIONS

Chin, R.T., et al., Quantitative evaluation of some edge preserving noise-smoothing techniques, *Computer vision, graphics and image processing*, 23, pp. 67–91, 1983.

Rabiner, L.R., et al., *Theory and application of digital signal processing*, Prentice–Hall, Englewood Cliffs, NJ, USA, pp. 204–209.

Guissin, R., Adaptive dynamic range compression for FLIR imagery, *SPIE—6th meeting in Israel on optical engineering*, vol. 1038, pp. 299–306, 1988.

Pal, S.K., et al., *Fuzzy mathematical approach to pattern recognition*, Halsted Press, John Wiley & Sons, NY, USA, 1986.

Papoulis, A., *Probability, random variables and stochastic processes*, McGraw–Hill, Kogakusha Ltd., 1965, pp. 418–425.

Nahi, N.E., Role of recursive estimation in image enhancement, *Proceedings of the IEEE*, Jul. 1972, pp. 872–877.

Digital Compression and Coding of Continuous Tone Still Images, ISO/IEC International Standard 10918, pp. 336–343.

Draft Revised Recommendation H.261—Video Codec for Audio–Visual Services at p×64 kbit/s, submitted to the Xth CCITT Plenary Assembly, COM XV–R 95–E, May, 1992.

Fujiwara, H., et al., An All ASIC Implementation of a Low Bit Rate Video Codec, *IEEE trans. On Circuits and Systems for Video Technology*, vol. 2, No. 2, pp. 123–124.

Nagao, M., et al., Edge preserving smoothing, *Computer Graphics and Image Processing*, 1974, v. 9, pp. 394–407.

Kurono, T., et al., Image processing on photon–counting imaging, *SPIE*, 1985, vol. 575, pp. 225–231.

Hanaizumi, H., et al., A nonlinear and adaptive algorithm for noise reduction in scanner signals, *Proceedings of the 1984 International Symposium on Noise and Clutter Rejection in.*

Astola, J., et al., Transaction Briefs: Linear median hybrid filters, *IEEE Transactions on Circuits and Systems*, vol. 36, No. 11, Nov. 1989, pp. 1430–1438.

Habibi, A., Two–dimensional bayesian estimate of images, *Proceedings of the IEEE*, vol. 60, No. 7, Jul. 1972, pp. 878–883.

Lloyd, R.O., et al., Image transform modeled on visual processing mechanisms of the brain, *IEEE Conf. on Electronic Image Processing*, 1982.

Lubin, J., Adaptive coring techniques for spatio–temporal signals, *IEEE Workshop on Visual Motion*, IEEE Computer Society Press, Princeton, N.J., pp. 333–339.

Nahi, N.E., Decision–directed recursive image enhancement, *IEEE Transactions on Circuits and Systems*, vol. CAS–22, No. 3, Mar. 1975, pp. 286–293.

Powell, P.G., et al., A method for the digital enhancement of unsharp, grainy photographic images, *IEEE*, 1982, pp. 179–183.

Saint–Marc, P., et al., Adaptive smoothing: A general tool for early vision, *IEEE Computer Vision and Pattern Recognition*, 1989, pp. 618–624.

Spence, C.D., et al., Artificial neural networks as TV signal processors, *SPIE Proceedings*, vol. 1469, 1991.

Quantex Corporation, Real time video image processing, Application Note 12.

APPARATUS AND METHODS FOR SMOOTHING IMAGES

This is a continuation-in-part of U.S. application Ser. No. 07/896,682 filed Jun. 10, 1992 (now U.S. Pat. No. 5,442, 462).

FIELD OF THE INVENTION

The present invention relates to apparatus and methods for smoothing images, reducing noise and enhancing images.

BACKGROUND OF THE INVENTION

A known problem is digital image noise reduction in the face of (a) randomly distributed noise, which is often additive, (b) fixed pattern noise due to imaging detector response non-uniformities, (c) analog recording noise of video signals due to video standard bandwidth limitations and luminance/chrominance signal formats, and (d) compression noise such as block noise and edge noise or mosquito noise created by block transform coding.

The need for image restoration in the face of noise exists in a wide range of applications such as electronic imaging and scanning, video recording equipment and analog and digital TV displays. Imaging sensors such as CCD-TV continuous and still cameras and medical imaging systems often face low light level situations, in which the image quality deteriorates due to reduced signal to noise ratios. Significant amplification of such video signals amplifies the various noise effects to the point where they are visible and disturbing to the observer.

Electronic noise in still-video images is usually perceived as high frequency noise. In image sequences, electronic noise fluctuates randomly due to its random statistical nature, and can therefore be reduced by temporal integration. Photo response non-uniformities of imaging detectors, such as CCD imagers, CCD image scanners and image facsimile machines, result in fixed-pattern noise. Its spatial structure depends on the internal design characteristics of the detector. CCD scanner detectors, for example, suffer from fixed-pattern noise caused by nonuniformities in the detector element responsivities. These are only partially correctable using digital calibrated processing schemes, the residual fixed-pattern noise remaining visible.

Fixed-pattern noise is particularly disturbing in still imagery. These effects are usually masked and not visually perceived in high contrast textured images. However, in low light level imaging situations where extensive signal amplification is required in order to perceive low contrasts, the fixed pattern noise effects are clearly visible and disturbing to the observer.

Image noise also appears in medical imaging applications, for example in ultrasound, and in photon-counting imaging systems. Image scanning applications also often require noise reduction, depending on the lighting conditions, and on the type of scanned data (imagery and text on paper or film).

Existing digital image-noise reduction techniques can generally be categorized into three classes:

(a) Spatial smoothing operators which utilize only spatial image information for reducing image noise, (b) temporal image integration operators which prolong the effective exposure time of an image changing over time hence reducing temporal random fluctuations of image noise, and (c) combinations of the techniques (a) and (b).

Linear spatial smoothing operators, such as low pass filters, usually result in subjectively unacceptable blurring of essential high frequency image detail such as edges, lines and contours. More advanced filtering techniques such as Wiener filters adapt to local estimates of signal and noise according to statistical models of the signal noise processes, which are often difficult to define a-priori. This type of technique is discussed in Mahesh, B. et al, "Adaptive estimators for filtering noisy images", *Optical engineering*, 29(5), pp. 488–494; 1990.

A Wiener filter is an example of a more general class of filters known as Kalman filters, described in Gelb, A. (ed.) *Applied optimal estimation*, Technical staff, Analytic sciences corporation, MIT Press, Cambridge, Mass., USA, 1974.

Kalman filters require more intensive computation for local estimation of second order statistical parameters in the image. Kalman filtering techniques also rely on signal and noise models which are generally not appropriate for all images.

Other operators, such as median filters, do not require any a-priori knowledge of signal and noise models, and are designed to preserve high frequency edge signals while at the same time reducing the noise in smooth image regions. However, such operators introduce unwanted image noise effects due to the statistical nature of their pixel replication. This type of operator is discussed in Chin, R. T. and Yeh, C. L., "Quantitative evaluation of some edge preserving noise-smoothing techniques", *Computer vision, graphics and image processing*, 23, pp. 67–91, 1983. Chin and Yeh also compare the operator to other edge preserving operators.

Temporal image noise is often reduced by image integration techniques, for example by use of recursive running-average filtering techniques, which are discussed in the above-referenced publication by Gelb and in Rabiner, L. R. & Gold, B. *Theory and application of digital signal processing*, Prentice-Hall, Englewood Cliffs, N.J., USA, particularly pp. 205–209, 1975. However, in situations where motion occurs in the image, due to camera motion and/or motion of an object in the scene, high frequency image detail is usually compensated and blurred due to the prolonged effective exposure time. Therefore, such methods are unsuitable for many applications.

Two-directional low pass filtering techniques are discussed in the context of dynamic range compression of images, in Guissin, R. "Adaptive dynamic range compression for FLIR imagery", *SPIE—6th meeting in Israel on optical engineering*, Vol. 1038, pp. 299–306, 1988.

A theoretical and more general treatment of two-directional filtering of images is provided in the above-referenced Rabiner and Gold publication. However, the described techniques do not provide visually pleasing results.

Heuristic techniques using fuzzy logic formulations have been applied to noise reduction problems with limited success, as explained in Pal, S. K. and Majumder, D. K. D. *Fuzzy mathematical approach to pattern recognition*, Halsted Press, John Wiley & Sons, NY, USA, 1986.

A general text providing background to the technology shown and described herein is Papoulis, A. *Probability, random variables and stochastic processes*, McGraw-Hill, Kogakusha Ltd., 1965.

The disclosures of all the above references are incorporated herein by reference, as well as the following publications:

R. J. Clarke, "Transform Coding of Images", Academic Press Inc., London, 1985.

"Digital Compression and Coding of Continuous Tone Still Images", ISO/IEC International Standard 10918.

"Draft Revised Recommendation H.261—Video Codec for Audio-Visual Services at p×64 kbit/s, submitted to the Xth CCITT Plenary Assembly", COM XV-R 95-E, May, 1992.

Fujiwara, H., Liou M. L., Sun M. T., Yang K. M., Maruyama M., Shomura K., Oyama K., "An All ASIC Implementation of a Low Bit Rate Video Codec", IEEE trans. On Circuits and Systems for Video Technology, June 1992, Vol. 2, Number 2, pp. 123–124.

SUMMARY OF THE INVENTION

The present invention seeks to provide improved spatial, temporal, and spatio-temporal noise reduction apparatus and also apparatus for noise reduction in conjunction with one or several of the following functions: edge enhancement, spatial interpolation, magnification adjustment by spatial interpolation, and dynamic range compression (DRC).

The present invention also seeks to provide apparatus for image noise reduction which employs an adaptive, acuity-preserving, multi-directional and multi dimensional smoothing method. The method and apparatus of the present invention are applicable, inter alia, for (a) adaptive spatial noise reduction in still images, (b) adaptive temporal noise reduction in time changing image sequences, and (c) adaptive spatio-temporal noise reduction by combining the first two approaches (a) and (b).

The image noise effects which may be reduced using the apparatus of the present invention include random photon and electronic noise, fixed pattern noise, and analog recording noise from a source such as video equipment, and image compression noise of block encoding schemes. In spatial smoothing applications, the present invention utilizes one-directional, two-directional and multi-dimensional filtering schemes, which employ adaptive weighting of noisy measurements determined by easily computed pixel-based signal to noise measures, and preferably also utilizes precomputed steady state Kalman filter estimation gain parameters.

The signal to noise measures employed by the present invention are designed to discriminate, in the presence of noise-induced uncertainties, between occurrences of (a) edge signals, (b) line and contour signals, and (c) smooth brightness signals. In smooth image regions, also termed small uncertainties, extensive smoothing results in a dramatic reduction in image noise. In other locations where edge and line occurrences are hypothesized (high uncertainties), smoothing is minimized so as to avoid blurring of sharp image features.

The spatial smoothing schemes of the present invention combine one-directional and two-directional adaptive filtering methods in a variety of one- and two- and multi-dimensional processing configurations. The configurations shown and described herein allow iterated computations in the presence of excessive noise, and may be implemented in various real-time imaging and scanning applications using an efficient pipeline architecture. When temporally smoothing image sequences, the same adaptive weighting schemes may be applied in the time domain, resulting in adaptive, running-average image integration configurations. The spatial and temporal noise reduction schemes may also be combined in spatio-temporal smoothing configurations by combining, for example, two-directional current image estimates and accumulated estimates of previous images.

The image noise reduction method provided by the current invention provides effective noise reduction solutions both spatially and temporally. The present invention seeks to provide a general method of adaptive image smoothing, which can be adapted with a high degree of flexibility and on a pixel-by-pixel basis, according to simply computed local signal and noise measures, and other image derived information, such as intensity, color, motion, signal shape and statistics, and applications.

In accordance with the present invention, extensive smoothing is applied to certain image regions without degrading image quality as perceived by the human visual system. Appropriate adaptation of the smoothing mechanism is provided in transition areas between differently characterized image regions, so that abrupt brightness changes or edges are preserved without introducing unwanted visible noisy edge effects.

The proposed method utilizes adaptive one-directional and two-directional processing to extract, on a pixel-by-pixel basis, a criterion which determines a smoothing procedure suitable for the pixel signal and noise behavior. The intermediate results of the one-directional and two-directional processing may then be combined in any of various one-, two- and multi-dimensional spatial processing configurations, and multi-dimensional spatio-temporal processing configurations disclosed herein.

A preferred embodiment of the present invention employs Kalman filter theory to provide an estimation gain parameter, as explained in detail below. Kalman filter theory is discussed in the above-referenced publication by Gelb. Alternatively, heuristic approaches may be employed to provide the estimation gain parameter, such as fuzzy logic theory, discussed in the above-referenced publication by Pal and Majumder.

The present invention seeks to provide an effective method for adaptive noise reduction in electronic images. The method incorporates an adaptive smoothing technique which determines, at each pixel in the image, the most suitable weighting of the current pixel measurement and its recursively computed estimates of neighboring pixels. The recursively computed estimates of neighboring pixels are determined by one-directional and two-directional estimation filtering processes along at least one spatial or temporal dimension. Neighboring pixels are each estimated on the basis of a different set of pixels. The sets are respectively arranged along different directions relative to the current pixel.

Recursive estimates of adjoining pixels in the one- and two-directional methods may be computed adaptively by means of simply computed image intensity signal to noise measures. A locally computed edge signal measure normalized by an estimated image noise measure such as a standard deviation estimate provides an indication of pixel signal to noise ratio. The per-pixel computed signal to noise ratio is preferably employed to select a smooth weighting function which is suitable for each of the following: (a) edge signals, (b) lines and contours, and (c) smooth surfaces.

An adaptive weighting function is computed recursively a-priori for a range of signal-to-noise ratio values, preferably employing a simplified, steady state, Kalman filter estimation gain parameter formulation. The result of the operation of the Kalman filter may be stored in look-up tables for rapid, easy access. If fuzzy logic methods are used instead of Kalman filters, the adaptive weights stored in the look-up tables may be termed "membership functions", as discussed in the above-referenced publication by Pal and Majumder.

The one-directional and two-directional estimation techniques shown and described herein may be extended to multi-directional processing. Also, the embodiments shown and described herein may be extended to operate in two and three spatial dimensions, where previously smoothed pixels in adjoining image pixels and lines are incorporated in the smoothing process. Two-, three- and multi-dimensional, spatio-temporal noise reduction processing methods are also disclosed which combine previously smoothed images, such as video sequences with a spatially smoothed current image in order to provide a good quality estimate of the current image in the presence of uncertainties due to noise and motion.

The method of the present invention is applicable to a variety of image processing applications, including image enhancement, dynamic range compression, coding and compression, interpolation and electronic zoom applications.

A particular feature of the image smoothing devices shown and described herein is that the output therefrom is generally nonlinear relative to the input thereto.

There it thus provided, in accordance with a preferred embodiment of the present invention, a method for acuity-preserving image smoothing including proceeding along at least a portion of a first dimension of received image pixels in a first direction and computing a first sequence of estimated pixel values from the received image pixels defined along the first direction, proceeding along at least a portion of the first dimension of received image pixels in a second direction and computing a second sequence of estimated pixel values from the received image pixels defined along the second direction and, for each individual pixel along the first dimension, computing an improved estimated pixel value for the individual pixel based on a data dependent combination of at least estimated pixel values in the first and second sequences.

Preferably, at least one of the computing steps takes into account image derived information other than the pixel value of the pixel to be estimated.

The above method is useful stand-alone and in combination with image enhancement, image interpolation, dynamic range compresssion. Each of the above may be employed either in one or more spatial dimensions or in the temporal dimension or in spatial and temporal dimensions. Applications of the above method include still and moving video cameras, image scanners, image fax machines, video recorders, image displays such as CRTs, image transmitting systems, image encoding and decoding systems, image processing systems, entertainment systems such as Karaoke recording systems, CD-I systems, video conferencing systems and video telephone systems.

In the present specification and claims, the terms "image smoothing" and "noise reduction" are for the most part used interchangeably.

SUMMARY

There it thus provided, in accordance with a preferred embodiment of the present invention, a method for acuity-preserving image smoothing including proceeding along at least a portion of a first dimension of received image pixels in a first direction and computing a first sequence of estimated pixel values from the received image pixels defined along the first direction, proceeding along at least a portion of the first dimension of received image pixels in a second direction and computing a second sequence of estimated pixel values from the received image pixels defined along the second direction and, for each individual pixel along the first dimension, computing an improved estimated pixel value for the individual pixel based on a data dependent combination of at least estimated pixel values in the first and second sequences.

Preferably, at least one of the computing steps takes into account image derived information other than the pixel value of the pixel to be estimated.

The above method is useful stand-alone and in combination with image enhancement, image interpolation, dynamic range compresssion. Each of the above may be employed either in one or more spatial dimensions or in the temporal dimension or in spatial and temporal dimensions. Applications of the above method include still and moving video cameras, image scanners, image fax machines, video recorders, image displays such as CRTs, image transmitting systems, image encoding and decoding systems, image processing systems, entertainment systems such as Karaoke recording systems, CD-I systems, video conferencing systems and video telephone systems.

BRIEF DESCRIPTION OF THE DRAWINGS

The present invention will be understood and appreciated from the following detailed description, taken in conjunction with the drawings in which.

Appendices I-II, appended hereto, are software listings of two software implementations of two respective embodiments of the present invention.

Appendix III is a software listing of a procedure for creating LUTs in accordance with a preferred embodiment of the present invention, which LUTs are accessed by the procedures of Appendices I and II.

DETAILED DESCRIPTION OF PREFERRED EMBODIMENTS

Figure 1:
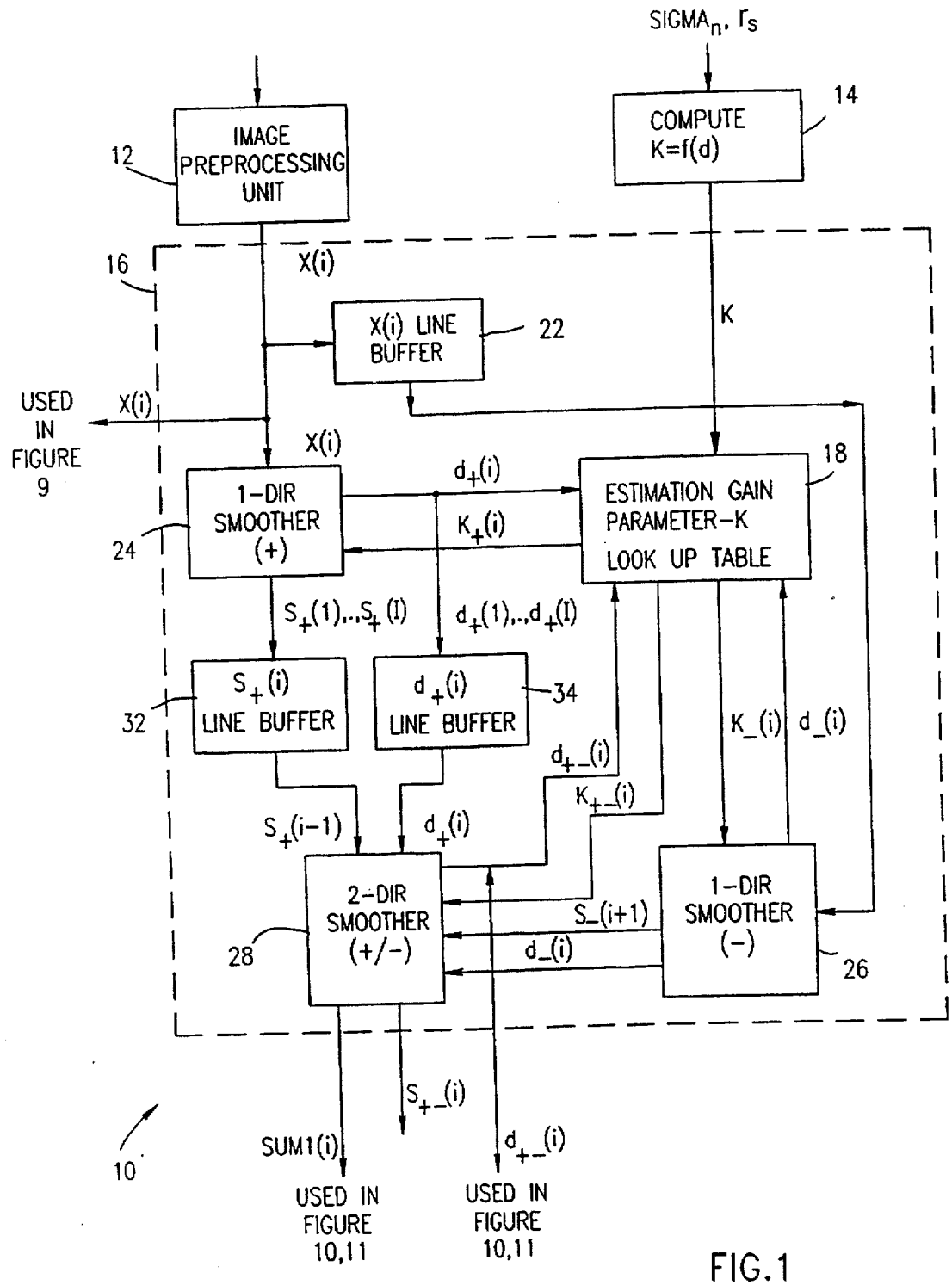
FIG. 1 is a simplified block diagram of one-dimensional two-directional image smoothing apparatus constructed and operative in accordance with a preferred embodiment of the present invention.

Reference is now made to FIG. 1 which is a simplified block diagram of one-dimensional two-directional image smoothing apparatus, referenced generally 10, which is constructed and operative in accordance with a first preferred embodiment of the present invention.

The image smoothing apparatus 10 includes an image preprocessing unit 12, an estimation gain parameter computation unit 14 and a two-directional processor 16 which receives image input from the image pre-processing unit 12 and which includes an estimation gain parameter LUT 18 which is loaded by estimation gain parameter computation unit 14.

Image preprocessing unit 12 is operative to receive analog image data from a suitable device such as a video camera or video recorder and perform an analog to digital conversion of the analog image data. The resulting digital image data may be stored in a frame buffer if suitable, for example if it is necessary to accommodate a data input rate which differs from the processing rate of the apparatus of FIG. 1. The output of the image preprocessing unit 12, also termed herein "raw image data", is provided, line by line, to a raw data line buffer 22 in two-directional processor 16.

The term "line", as employed in the present specification, refers to a one-dimensional unit of an image, such as an image row, image column, or diagonal one-dimensional array of pixels within the image. Selection of a dimension of the image along which to process preferably takes into account characteristics of the image such as image edges arranged along a particular dimension and characteristics of the noise such as a high probability that noise of a particular statistical character will occur along a particular dimension.

The index "i" is used herein as an index of the pixels within a line (for each line, i=1, ..., I). "X(i)" as used herein denotes the raw data image value for pixel i and includes a signal portion and a noise portion as defined in Equations 1A and 1B which are set forth at the end of the Detailed Description section. The minimum mean square estimate, $S(i)$, of the signal portion $S^*(i)$ of the raw data image is defined by Equation 2 which is set forth at the end of the Detailed Description section, as discussed in the above-referenced publication by Papoulis.

It is appreciated that a one-dimensional line may be processed in either of two opposite directions. For example, an image row may be processed from right to left or from left to right. An image column may be processed from top to bottom or from bottom to top.

The two-directional processor 16 includes, apart from LUT 18 and raw data line buffer 22, a pair of one-directional smoothing units 24 and 26 and a two-directional smoothing unit 28. Units 24 and 26 smooth the raw image data in raw image line buffer 22, proceeding in first and second opposite directions respectively. Two-directional smoothing unit 28 receives delayed output data from one-directional smoothing unit 24 and 26. Two-directional smoother 28 combines image data which has undergone one-directional smoothing in both the first and second one-directional smoothers by performing a two-directional smoothing process thereupon.

One-directional smoothers 24 and 26 receive raw image data X(i) from image preprocessing unit 12 and from raw data line buffer 22 respectively, and further receive an estimation gain parameter K(i) from a suitable source such as LUT 18. One-directional smoothers 24 and 26 each compute a respective approximation, termed herein $S_+(i)$ and $S_-(i)$ respectively and defined in Equations 3A and 3B respectively which are set forth at the end of the Detailed Description section, to the minimum mean square error estimate S(i), defined in Equation 2 which is set forth at the end of the Detailed Description section.

It is a particular feature of the present invention that each one-directional smoother, when computing an estimate $S_+(i)$ or $S_-(i)$, respectively, of the signal portion of the raw image value X(i) of pixel i, employs only information regarding pixel i and pixels preceding i in the direction of smoothing.

Another particular feature of the embodiment of FIG. 1 as well as of the other embodiments shown and described herein with reference to foregoing figures is that the outputs of the image smoothing devices shown and described herein are normally nonlinear relative to the inputs thereto.

For example, for the purposes of simplification, line buffer 22 will be assumed to store image rows, one-directional smoother 24 will be assumed to smooth from left to right and one-directional smoother 26 will be assumed to smooth from right to left. It is appreciated that the above example is not intended to be limiting. In this example, left-to-right smoother 24, when computing an estimate of the signal portion $S^*(i)$ of pixel i, employs only the raw image values of pixel i and pixels to the left of pixel i. Left-to-right smoother 24 does not employ raw image values of pixels to the right of pixel i to estimate the signal portion of pixel i. In contrast, right-to-left smoother 26, when computing an estimate of the signal portion of pixel i, employs only the raw image values of pixel i and pixels to the right of pixel i. Right-to-left smoother 26 does not employ raw image values of pixels to the left of pixel i to estimate the signal portion of pixel i.

A particular advantage of the above characteristics of one-directional smoothers 24 and 26 is that for each pixel i, the signal estimates $S_+(i)$ and $S_-(i)$ generated by smoothers 24 and 26 respectively are substantially independent of one another. Also, in the present example, $S_+(i)$, the signal estimate of one-directional smoother 24 for pixel i, may be assumed to be "uncontaminated" by image effects occurring to the right of pixel i. Similarly, the signal estimate $S_-(i)$ of one-directional smoother 26 for pixel i may be assumed to be "uncontaminated" by image effects occurring to the left of pixel i.

Equation 3A, which is set forth at the end of the Detailed Description section, is a preferred recursive equation which may be employed by one-directional smoother 24 for computing a signal estimate in a first direction for pixel i, $S_+(i)$, using the signal estimate $S_+(i-1)$ of the (i-1)th pixel. The (i-1)th pixel is the pixel which precedes the current pixel i in the (+) direction of smoothing. Equation 3B, which is set forth at the end of the Detailed Description section, is a preferred recursive equation which may be employed by one-directional smoother 26 for computing the signal estimate for pixel i, $S_-(i)$, using the signal estimate $S_-(i+1)$ of the (i+1)th pixel. The (i+1)th pixel precedes the current pixel i in the (−) direction of smoothing.

In Equations 3A and 3B, set forth at the end of the Detailed Description section, $K_+(i)$ and $K_-(i)$ refer respectively to estimation gain parameters provided to one-directional smoothers 24 and 26 respectively by LUT 18. As shown in FIG. 1, smoothers 24 and 26 address LUT 18 by means of the magnitudes of parameters $d_+(i)$ and $d_-(i)$, respectively. These parameters are both generated from the raw image data and each comprise a respective directional estimate of signal strength of an edge at pixel i. $d_+(i)$ and $d_-(i)$ are defined with reference to Equations 3A and 3B, set forth at the end of the Detailed Description section.

Preferably, as explained above, estimation gain parameter K(i) is stored in LUT 18 which is constructed by estimation gain parameter computation unit 14. Unit 14 preferably receives two external values, sigma$_n$ and $r_s$. $r_s$ is the correlation coefficient of the signal and is theoretically defined by Equation 2 which is set forth at the end of the Detailed Description section. Sigma$_n$, the standard deviation, is defined by Equation 1A, set forth at the end of the Detailed Description section, in the present example, however, it is appreciated that the applicability of the present method extends to a wide variety of noise distributions and is not limited to Gaussian noise distributions. Unit 14 may include means for accepting manual input from a user, in which case sigma$_n$ and $r_s$ ay be input by hand.

Any suitable initial value for $r_s$ may be selected by the user, such as a value within the range 0.6–0.8. Any suitable initial value for sigma$_n$ may be selected by the user, such as a value between 0 and 32 gray levels. Once initial values for r$_s$ and sigma$_n$ have been determined, the apparatus of FIG. 1 may be employed as explained herein in order to obtain an output image. Upon viewing the output image, if the user finds the output image to be too smooth or blurry, he may decrease the value of r$_s$ and/or decrease the value of sigma$_n$. If the user views the output image and finds it to be too noisy or choppy, he may increase the value of r$_s$ and/or increase the value of sigma$_n$.

Estimation gain parameter computation unit 14 computes K parameters as a function of d parameters and stores pairs of K and d parameters in estimation gain parameter LUT 18. Estimation gain parameter LUT 18 is addressed by the magnitudes of d$_+$ and d$_-$ values arriving from one-directional smoothers 24 and 26 respectively and computes K$_+$ and K$_-$ parameters which are supplied back to one-directional smoothers 24 and 26 respectively. Estimation gain parameter LUT 18 also provides K$_{+,-}$ values to two-directional smoother 28, which are addressed in accordance with the magnitudes of d$_{+,-}$ values provided by unit 28, as described in detail below.

Gain estimation parameter computation unit 14 may be implemented in accordance with Equations 4 and 5, set forth at the end of the Detailed Description section, of which equation 4 is a recursive formula and equation 5 is an initial formula with which the recursive process may be initiated. In the sample embodiment described herein, K is a monotonically increasing function between 0 and 1 which sharply rises for snr values between 0 and 4 and rises increasingly slowly once snr reaches 5. When snr is approximately 8, k reaches 1.

Therefore, K values are typically stored at at least 32 increments for an snr of up to 8 and may be non-uniformly distributed such that the K function is more finely sampled at low snr's.

Preferably, K is computed for each of a plurality of d values, corresponding to a plurality of snr values, such as all snr values in a range of 0–8, at a resolution of at least 0.4. LUT 18 comprises, therefore, a table of at least 32 pairs of d and K values. Since, for each value of d, K reaches a steady state after a relatively small number of recursions, only a single K value need be stored for each d value. A suitable number of iterations of Equation 4 may be performed for each d value, such as 25–50 iterations, and the single steady state K value which results may be stored in association with the corresponding d value.

It is appreciated that LUT 18 need not be constructed in accordance with Equations 4 and 5. Alternatively, for example, good approximations to the values obtained by using Equations 4 and 5 may be generated by linearization and Taylor series expansion. Also, the values obtained by employing Equations 4 and 5 or by any other method may be thresholded or otherwise modified in order to avoid computational error due to limited accuracy.

It is believed that the computation of Equations 4 and 5 may be replaced by heuristic methods of generating K such as fuzzy logic methods, in which case the functions stored in LUT 18 would be more appropriately termed "fuzzy membership functions". Fuzzy logic methods are described in the above-referenced publication by Pal and Majumder.

In accordance with a preferred embodiment of the present invention, a second LUT may be provided which, instead of storing pairs of K and d values in LUT 18, stores approximately 1000–4000 pairs of K×d and d values, thereby eliminating the need to multiply the K output of the LUT by d when employing Equations 3A and 3B pertaining to smoothers 24 and 26 respectively. The original LUT 18 is preferably retained to subserve smoother 28 which does not employ the product K×d, as shown by Equation 7, set forth at the end of the Detailed Description section.

One-directional smoother 24 stores the signal estimate S$_+$(i) for all pixels i in a signal estimate line buffer 32 which interfaces with two-directional smoother 28. One-directional smoother 24 also stores the d$_+$(i) values computed for each pixel i in a d$_+$(i) line buffer 34 which also interfaces with two-directional smoother 28.

Two-directional smoother 28 is operative to receive one-directional signal estimate values S$_+$(i−1) and one-directional d$_+$(i) values from one-directional smoother 24, via line buffers 32 and 34 respectively, and also to receive the corresponding one-directional values S$_-$(i+1) and d$_-$(i) directly from one-directional smoother 26, which proceeds in the opposite direction relative to one-directional smoother 24. Two-directional smoother 28 computes a two-directional d value, d$_{+,-}$(i), using Equation 6, set forth at the end of the Detailed Description section, which value is used to address LUT 18. The resulting K$_{+,-}$(i) value is employed by two-directional smoother 28 to compute a two-directional signal estimate value, S$_{+,-}$(i), for each pixel i, which is the output of the two-directional processor 16. Equation 7, set forth at the end of the Detailed Description section, is a preferred formula for the computation of S$_{+,-}$.

Preferably, the output of two-directional smoother 28 also includes the two-directional difference value, d$_{+,-}$(i), as well as a value Sum1(i), defined by Equation 8, set forth at the end of the Detailed Description section, which are useful in certain applications, as described in detail below with reference to FIGS. 10 and 11.

Figure 2:
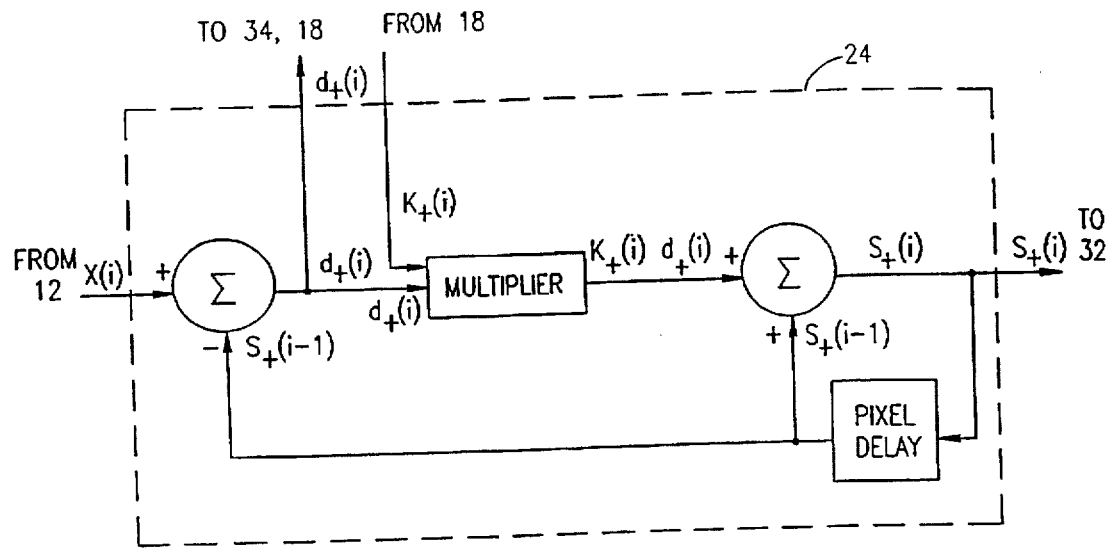
FIG. 2 is a simplified block diagram of one-directional smoothing unit 24 of FIG. 1.

Reference is made briefly to FIG. 2 which is a simplified block diagram of a one-directional smoother, such as one-directional smoother 24 of FIG. 1, constructed and operative in accordance with a preferred embodiment of the present invention. It is appreciated that the apparatus of FIG. 2 is suitable for implementing recursive Equation 3A which is set forth at the end of the Detailed Description section. One-directional smoother 26 of FIG. 1 may be identical to one-directional smoother 24 of FIG. 2 except that one-directional smoother 26 proceeds in the − direction rather than the + direction such that the pixel preceding pixel i is pixel (i+1) rather than pixel (i−1).

A particular advantage of the apparatus of FIG. 2 is that large signal discontinuities occurring along the dimension of processing are preserved. Disadvantages of the apparatus of FIG. 2 are that high amplitude noise fluctuation and spikes may be preserved and that phase delays may be introduced due to the directional and recursive nature of the apparatus of FIG. 2.

Figure 3:
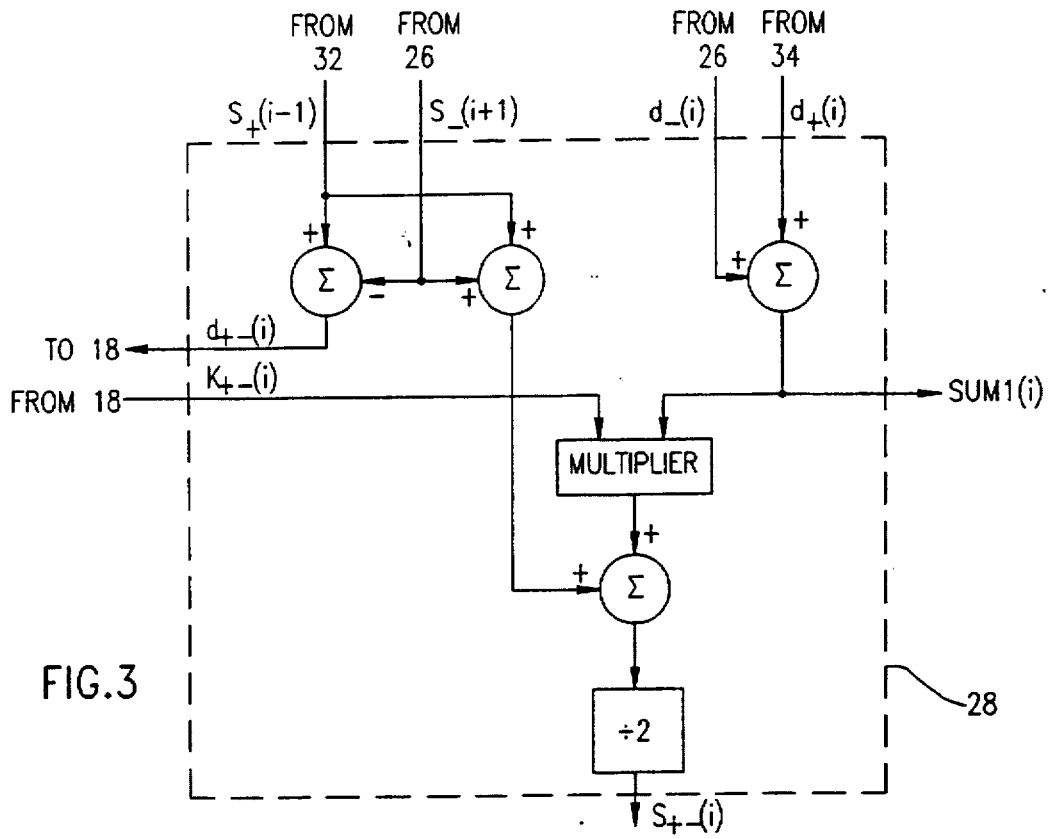
FIG. 3 is a simplified block diagram of two-directional smoothing unit 28 of FIG. 1, constructed and operative in accordance with a first embodiment of the present invention.

Reference is made to FIG. 3 which is a simplified block diagram of two-directional smoother 28 of FIG. 1, constructed and operative in accordance with one embodiment of the present invention. It is appreciated that the apparatus of FIG. 3 is suitable for implementing Equations 6 and 7 which are set forth at the end of the Detailed Description section. A particular advantage of the apparatus of FIG. 3 is that one-directional smoothed results from neighbors symmetrically disposed on both sides of the current pixel are employed to estimate the strength of the edge signal at the current pixel, and also to effectively smooth noise spikes.

Figure 4:
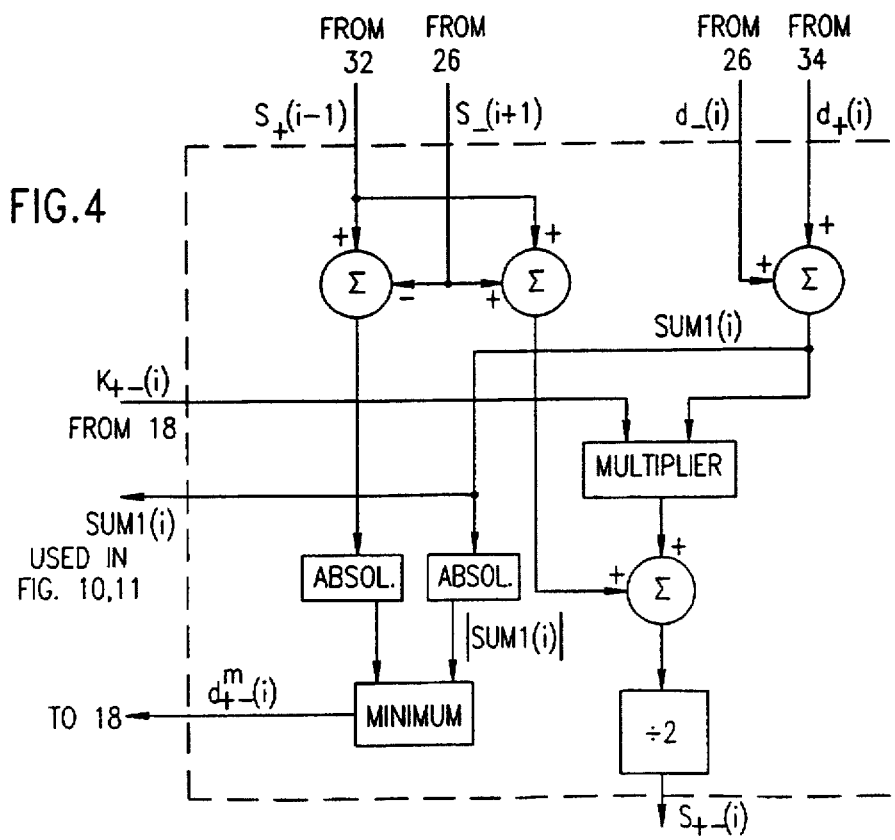
FIG. 4 is a simplified block diagram of smoothing unit 28 of FIG. 1, constructed and operative in accordance with a second embodiment of the present invention.

Reference is made to FIG. 4 which is a simplified block diagram of two-directional smoother 28 of FIG. 1, constructed and operative in accordance with another embodiment of the present invention. The apparatus of FIG. 4 is similar to the apparatus of FIG. 3 except that a different value addresses LUT 18. In FIG. 3, $d_{+-}(i)$ addresses LUT 18 and this address is generated in accordance with Equation 6. In FIG. 4, $d^m_{+-}(i)$ addresses LUT 18 and this address is generated in accordance with Equation 9, set forth at the end of the Detailed Description section.

A particular advantage of the apparatus of FIG. 4, relative to the apparatus of FIG. 3, is that two separate instances are identified and differently handled. In the first instance, the current input image value, X(i), falls outside of the intensity range delimited by $S_+(i-1)$ and $S_-(i+1)$. In the second instance, the current input image value, X(i), falls between $S_+(i-1)$ and $S_-(i+1)$. In the first instance, the outputs generated by the apparatus of FIGS. 3 and 4 are the same, because both apparatus "hypothesize" the occurrence of a spike coinciding with an image edge. In the second instance, however, the outputs generated by the apparatus of FIGS. 3 and 4 are not the same, because the apparatus of FIG. 4 hypothesizes a surface and consequently, increases the degree of smoothing.

Figure 6:
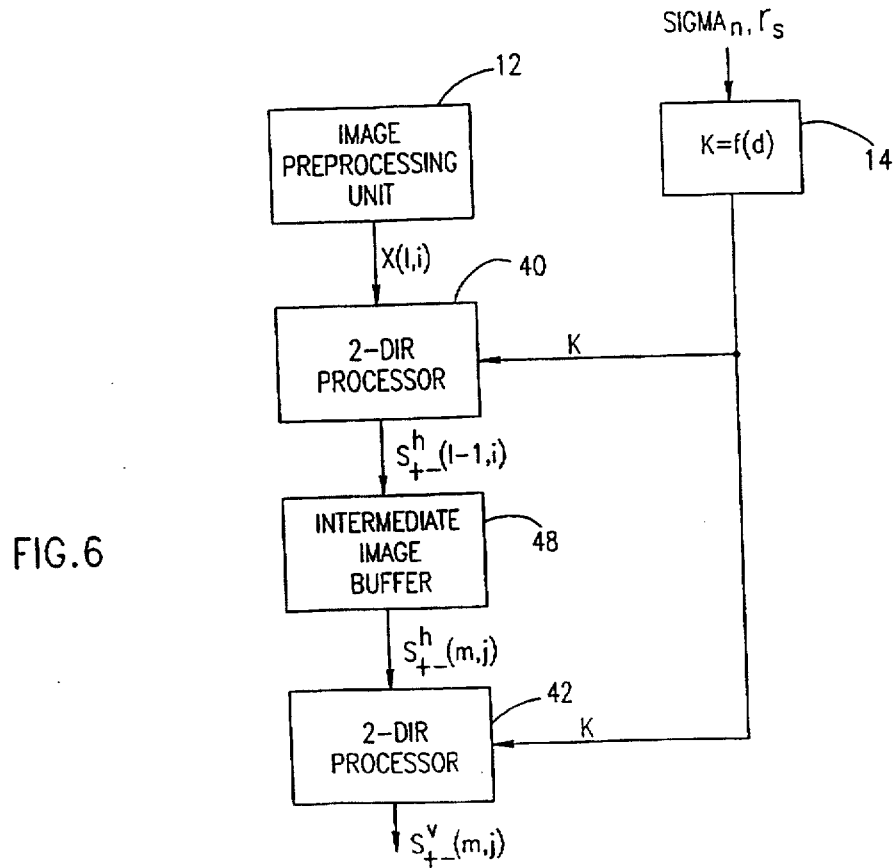
FIG. 6 is a simplified block diagram of image smoothing apparatus constructed and operative in accordance with a preferred embodiment of the present invention which is a second modification of the apparatus of FIG. 1.
Figure 5:
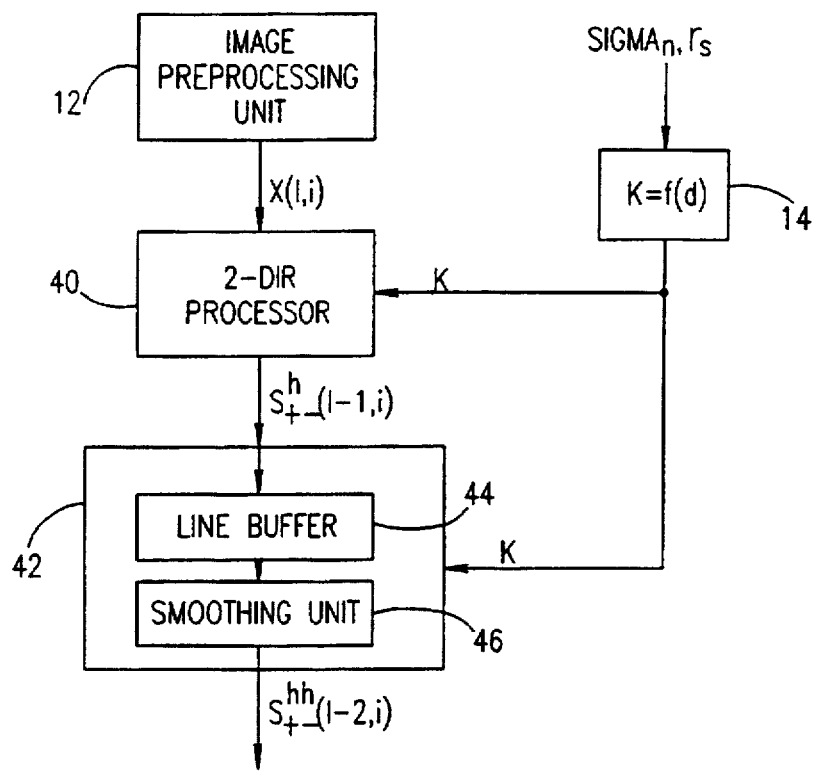
FIG. 5 is a simplified block diagram of image smoothing apparatus constructed and operative in accordance with a preferred embodiment of the present invention which is a first modification of the apparatus of FIG. 1.
Figure 7:
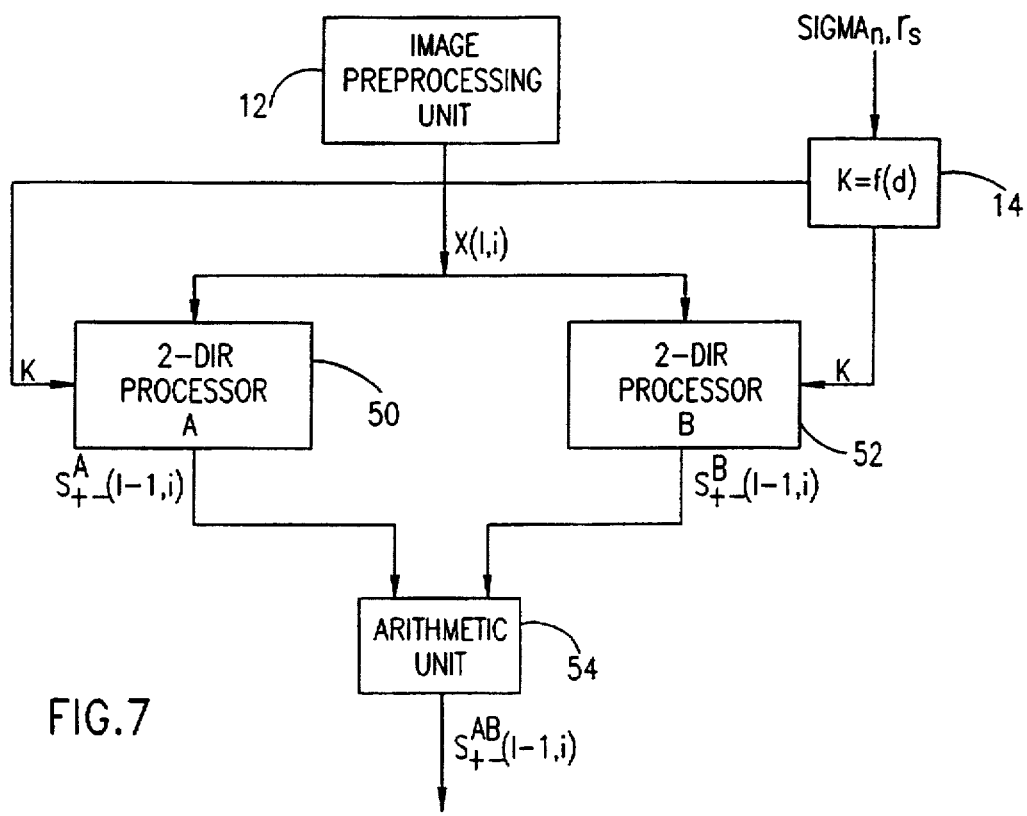
FIG. 7 is a simplified block diagram of image smoothing apparatus constructed and operative in accordance with a preferred embodiment of the present invention which is a third modification of the apparatus of FIG. 1.

In accordance with a preferred embodiment of the present invention, two-directional processor 16 of FIG. 1 may be augmented with one or more additional two-directional processors, each being substantially identical to two-directional processor 16. FIGS. 5, 6 and 7 are simplified block diagrams of smoothing apparatus constructed and operative in accordance with three alternative embodiments of the present invention, respectively, each of which comprise 2 two-directional processors.

Reference is now made specifically to FIG. 5, which is a simplified block diagram of image smoothing apparatus constructed and operative in accordance with a preferred embodiment of the present invention. The apparatus of FIG. 5 is similar to the apparatus of FIG. 1 except that it includes 2 two-directional processors 40 and 42, each of which may be substantially identical to the single two-directional processor 16 of FIG. 1. Two-directional processor 40 receives raw data X(l,i) line by line and generates a two-directional signal estimate, $S^h_{+-}(l-1,i)$, with a one line delay.

The signal estimates generated by two-directional processor 40 is stored in a line buffer 44 of two-directional processor 42, which may be substantially identical to raw data line buffer 22 of FIG. 1. The data in line buffer 44 is received by a smoothing unit 46 in two-directional processor 42, which comprises units which may be substantially identical to units 18, 24, 26, 28, 32 and 34. A particular advantage of the apparatus of FIG. 5 is that no intermediate memory buffer need be provided between two-directional processors 40 and 42.

Processors 40 and 42 operate along the same dimension, which may be any dimension such as the horizontal dimension. In FIG. 5, the output of two-directional processor 40 is termed $S^h_{+-}$ to indicate that, in the present example, processor 40 proceeds along the horizontal dimension, and the output of two-directional processor 42 is termed $S^{hh}_{+-}$, to indicate that processor 42 provides output which has twice been processed along the same dimension as employed by processor 40.

In FIG. 5 and in subsequent figures, l is an index for image lines (rows, columns, diagonal one-dimensional units, or other types of one-dimensional arrays).

The raw data input to the apparatus of FIG. 5 is designated X(l,i) whereas the output is designated $S^{hh}_{+-}(l-2,i)$ to indicate that the apparatus of FIG. 5 operates substantially in real-time, with a delay of only two lines.

Reference is now made to FIG. 6 which illustrates image smoothing apparatus constructed and operative in accordance with a preferred embodiment of the present invention. The apparatus of FIG. 6 is similar to the apparatus of FIG. 5 except that an intermediate image memory buffer 48 is provided between two-directional processors 40 and 42 which stores $S^h_{+-}$ values for all image pixels. A particular advantage of the apparatus of FIG. 6 is that, due to the provision of image buffer 48, two-directional processors 40 and 42 need not process along the same dimension of image data.

For example, as shown in FIG. 6, two-directional processor 40 may process the image horizontally, row by row, as indicated by the superscript "h" of the output of processor 40. Two-directional processor 42 may process the image vertically column by column, as indicated by the superscript "v" of the output of processor 42. The indices of the output of processor 40 are indicated as l and i in FIG. 6, whereas the indices of the input of processor 42 are indicated as m and j, because the two inputs may be read in along different dimensions and therefore are assigned different indices.

Reference is now made to FIG. 7, which is a simplified block diagram of image smoothing apparatus constructed and operative in accordance with a preferred embodiment of the present invention. The apparatus of FIG. 7 may be similar to the apparatus of FIG. 1 except that it includes two two-directional processors 50 and 52, each of which may be substantially identical to two-directional processor 16 of FIG. 1. Unlike in FIGS. 5 and 6, both two-directional processors 50 and 52 in FIG. 7 are arranged in parallel and therefore both operate on raw data X(l,i).

It is appreciated that two-directional processors 50 and 52 of FIG. 7 may process the image along the same dimension but using different input parameters $sigma_n$ and $r_r$. For example, two-directional processor 50 may process the image using K values suitable for excessive smoothing whereas two-directional processor 52 may process the image using K values suitable for providing a choppy image. It is also appreciated that units 50 and 52 of FIG. 7 can operate along the same dimension but in opposite scanning directions.

The apparatus of FIG. 7 also includes an arithmetic unit 54 which is operative to combine the estimated signals $s^A_{+-}(l-1,i)$ and $S^B_{+-}(l-1,i)$, generated by two-directional processors 50 and 52 respectively, into an enhanced estimated signal $S^{AB}_{+-}(l-1,i)$. For example, the outputs of units 50 and 52 may be suitably weighted and then added by unit 54 in order to obtain an indication of a high frequency enhancement. Alternatively, the combination operation of unit 54 may comprise a weighted subtraction resulting in a bandpass frequency filter.

In FIG. 7, the raw data input to the apparatus of FIG. 7 is designated X(l,i) whereas the output is designated $S^{AB}_{+-}(l-1,i)$ to indicate that the apparatus of FIG. 7 operates substantially in real-time, with a delay of only one line.

Figure 8:
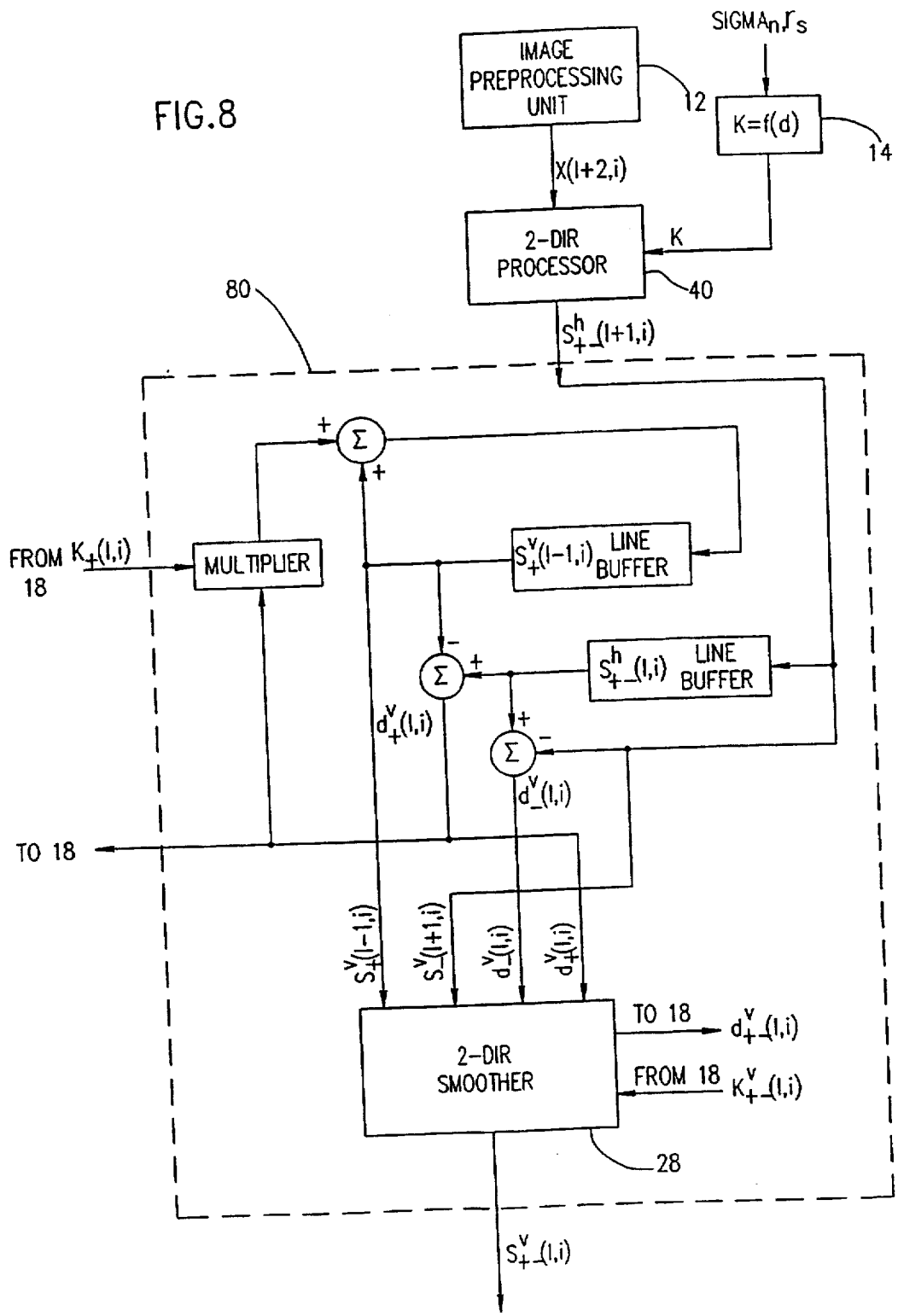
FIG. 8 is a simplified block diagram of image smoothing apparatus constructed and operative in accordance with a preferred embodiment of the present invention which is a fourth modification of the apparatus of FIG. 1.

Reference is now made to FIG. 8 which is a simplified block diagram of image smoothing apparatus constructed and operative in accordance with another embodiment of the present invention. The apparatus of FIG. 8 is similar to the apparatus of FIG. 6 except that the apparatus of FIG. 8 may operate in real time and in order to allow real time operation, the processing of the second dimension is not two-directional in the same sense as in FIG. 6.

As shown, two-directional processor 42 of FIG. 6 is replaced by a "pseudo two-directional smoother" 80. Pseudo two-directional smoother 80 receives $S^h_{+-}(l+1,i)$ output values from two-directional processor 40. These values are two-directional, as indicated by the subscript "+−", and were processed along a first dimension such as the horizontal dimension, as indicated by the superscript h. It is appreciated that the first dimension need not be the horizontal dimension and in fact may be the vertical dimension or a diagonal dimension oriented at some degree to the horizontal such as but not limited to 45 degrees, or a time dimension. More generally, in all the embodiments illustrated herein, identification of a particular dimension with a particular orientation is not intended to be limiting.

Pseudo two-directional smoother 80 smoothes the output values of two-directional smoother 40 along a second dimension in accordance with Equations 10–15 which are set forth at the end of the Detailed Description section. Two-dimensional smoother 80 is termed herein "pseudo two-directional" because of the difference between the first direction or top-to-bottom recursive estimation employed by smoother 80, defined by Equation 10, and the second direction or bottom-to-top recursive estimation employed by smoother 80, as defined by Equation 12. The top-to-bottom estimation of Equation 10 employs the second dimensional one-directional estimation of the previous row (one above the current row).

In Equation 10, $K^v_+(l-1,i)$ is the steady state estimation gain parameter as defined in Equation 4, set forth at the end of the Detailed Description section, for given $r_s$ and snr for:

$$snr=(d^v_+(l-1,i)/sigma_n)^2$$

where $d^v_+(l-1,i)$ is as defined in Equation 11, set forth at the end of the Detailed Description section.

In contrast, the bottom-to-top estimation of Equation 12 does not employ a second dimensional one-directional estimation of the previous row (one below the current row) since this procedure would necessitate storing of substantially the entire image and would introduce considerable delay. Instead, the bottom-to-top second dimensional estimation of Equation 12 is based upon the first dimensional two-directional or horizontally smoothed estimation of the row below the current row. In other words, the second directional estimate for a current row is based only upon a single row preceding the current row rather than being based upon all rows preceding the current row. The advantage of using Equation 12 is that the delay introduced is only a one line delay.

Figure 9:
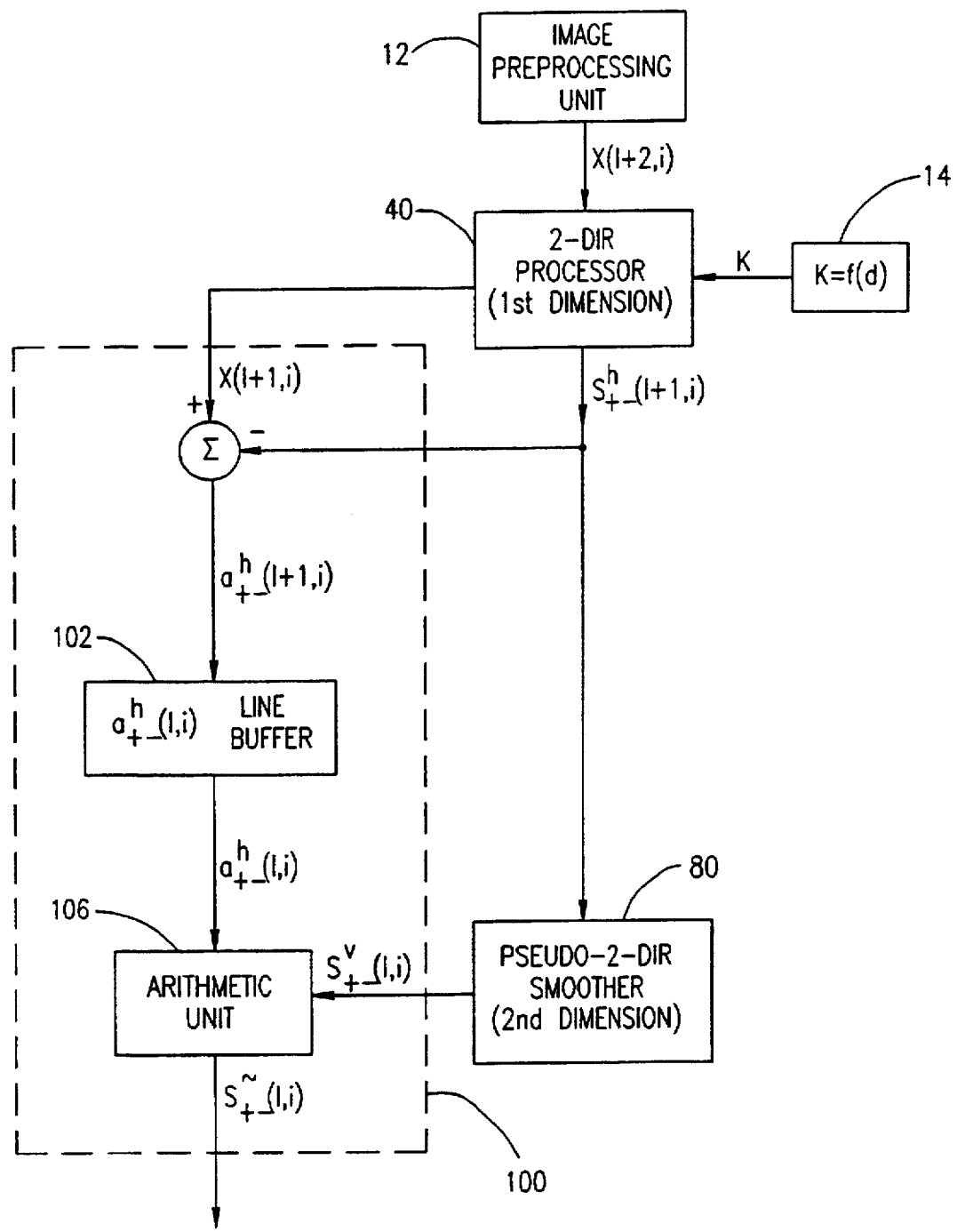
FIG. 9 is a simplified block diagram of image smoothing apparatus constructed and operative in accordance with a preferred embodiment of the present invention which is a fifth modification of the apparatus of FIG. 1.

Reference is now made to FIG. 9 which is a simplified block diagram of image smoothing apparatus constructed and operative in accordance with another embodiment of the present invention which is particularly useful in applications in which it is desired to preserve high frequency detail along a first dimension such as a horizontal dimension and to prevent the high frequency detail from being smoothed in the course of a second dimensional smoothing process such as a smoothing process along a vertical dimension.

The apparatus of FIG. 9 includes units 12, 14, 40 and 80 of FIG. 8. In addition, the apparatus of FIG. 9 includes a high frequency detail signal preserving unit 100. High frequency detail preserving unit 100 receives the signal outputs $S^h_{+-}(l+1,i)$ of two-directional processor 40 and subtracts it from the corresponding original input image values $X(l+1,i)$ in order to obtain values $a^h_{+-}(l+1,i)$ for the horizontal high frequency fluctuations. These fluctuations, in certain applications, are not considered undesired noise but rather indicate high frequency detail along the horizontal or first dimension which should be preserved. A mathematical definition of the $a^h_{+-}(l,i)$ values is provided in Equation 16 which is set forth at the end of the Detailed Description section.

As shown, the high frequency detail values, $a^h_{+-}(l,i)$, are preserved by storing in a line buffer 102 and do not enter the second dimensional smoothing process carried out by pseudo two-directional smoother 80. An arithmetic unit 106 is provided which combines the high frequency detail values of the first dimension with the two-dimensionally smoothed values of smoother 80. A preferred equation according to which arithmetic unit 106 may be implemented is Equation 17 which is set forth at the end of the Detailed Description section.

In equation 17, $g(l,i)$ is a high frequency gain factor which may be a constant or, alternatively, may vary over individual pixels. g determines the weight assigned to the $a^h_{+-}(l,i)$ values, relative to the two-dimensionally smoothed output values of unit 80. If g is too large, the high frequency detail will appear over-emphasized in the output image, relative to the vertical smoothed information. If g is too small, the high frequency detail will appear to be insufficiently emphasized. Therefore, g may be initially set to a predetermined value such as 1 and may subsequently be changed to a different constant value which may be selected by visual inspection of the output image.

Alternatively, g may be computed as a function of individual pixels using a suitable method such as Wiener filters. Wiener filters are described in the above referenced publication by Mahesh et al.

The apparatus of FIGS. 8 and 9 are useful in a wide variety of applications. Two sample applications are described herein which are exemplary of possible applications.

EXAMPLE 1

Linear scanning detectors, such as CCD image scanners have response non-uniformities. Often, the detectors are calibrated and a large portion of the non-uniformities are corrected by appropriate circuitry. However, such corrective measures are limited in accuracy, and residual non-uniformities on the order of 0.1% to 5% usually remain in the image. Such non-uniformities are perceived as disturbing intensity differences or stripes between adjoining lines along the image scanning dimension.

In accordance with a preferred embodiment of the present invention, such an image may be scanned vertically by a horizontally oriented CCD vector detector, thereby digitizing pixels along the horizontal dimension and intermediately storing the digitized pixels in preprocessing unit 12. In the embodiment of FIG. 9, the stored image is first smoothed two-directionally along the horizontal dimension. The high frequency detail signal $a^h_{+-}(l,i)$ is computed by differencing the incoming signal from the smoothed result and is stored in line buffer unit 102. The high frequency signal $a^h_{+-}(l,i)$ is uncorrupted by overshoots and ripples which usually occur in linear filtering in the vicinity of abrupt signal transitions, since the low pass filter used is an edge preserving two-directional smoother.

The two-directional horizontally smoothed signal is then vertically smoothed by unit 80, and the result $S^v_+(l,i)$ is added to the high frequency preserved signal $a^h_{+-}(l,i)$ by arithmetic unit 106. In this example, the noise to be effectively reduced is mainly in the vertical direction due to line to line non-uniformities of scanning detector elements. The vertical non-uniformities appear as spikes as the apparatus of FIG. 9 proceeds along the vertical dimension of processing and consequently are significantly reduced.

EXAMPLE 2

A known problem is analog recording noise which appears in pre-recorded video images as horizontal stripes and streaks which are normally perceived as being colored. The streaks appear due to the PAL and NTSC video standards and prerecorded playback limitations. The streaking effects are often perceived as stripes due to brightness and color differences between adjacent video lines in various locations along the video lines, and detract from the quality of video and still video imagery.

The edge preserving two-directional smoother unit 40 of FIG. 9 may operate as a high frequency extractor to line buffer 102. Unit 40 also provides an edge-preserved low frequency horizontal signal comprising all vertical non-uniformities which are to be reduced by pseudo two-directional smoother unit 80. If the image is a color image, such as an RGB image, the above described process may be applied to each of the three color images separately to achieve the final RGB image result.

Figure 10:
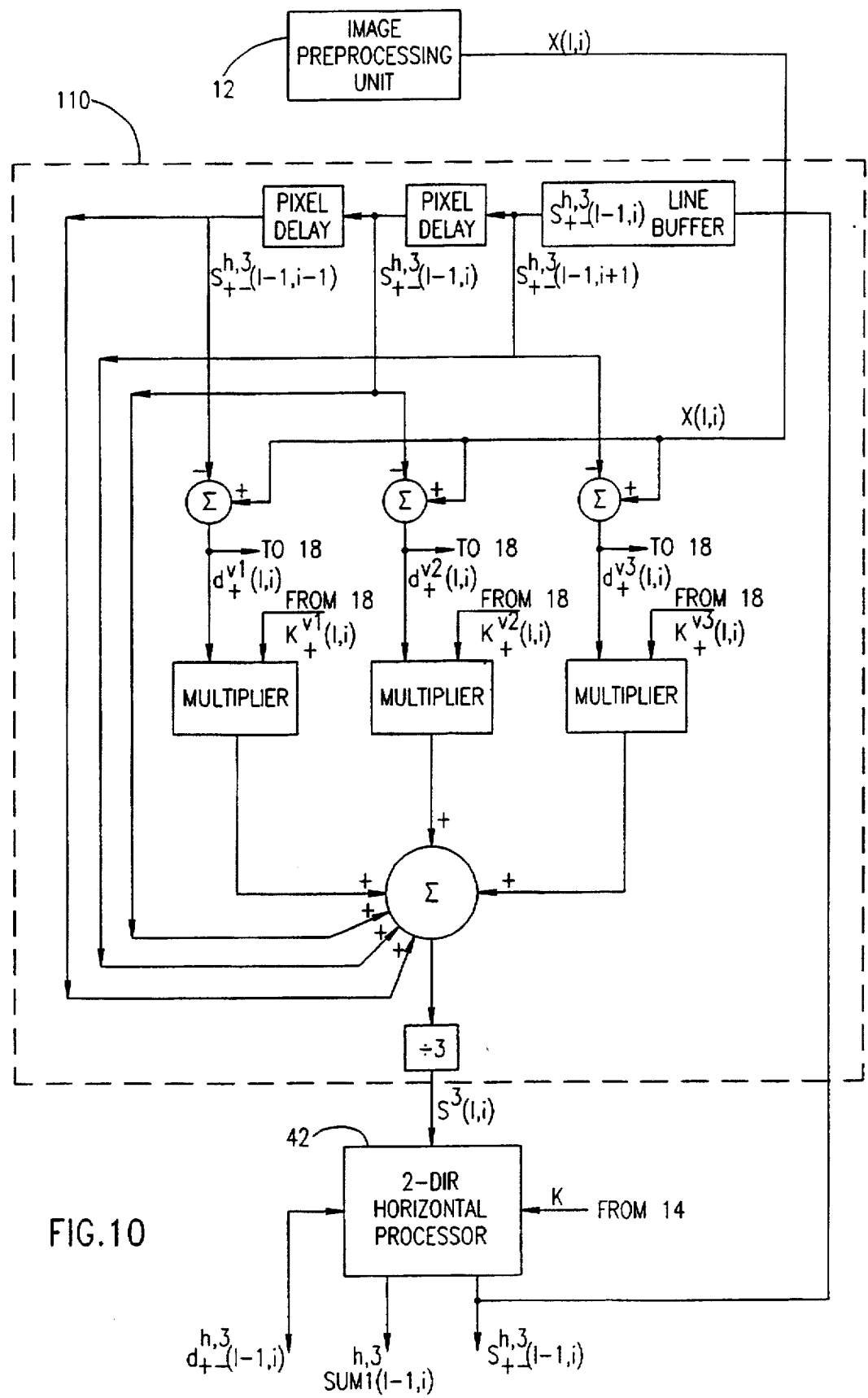
FIG. 10 is a simplified block diagram of image smoothing apparatus constructed and operative in accordance with a preferred embodiment of the present invention which is a sixth modification of the apparatus of FIG. 1.

Reference is now made to FIG. 10 which is a simplified block diagram of image smoothing apparatus constructed and operative in accordance with a further preferred embodiment of the present invention. The apparatus of FIG. 10 is similar to the apparatus of FIG. 5 in which one two-directional processor 42 processes the output of another two-directional processor 40 except that two-directional processor 40 is replaced by a three-dimensional processor 110.

Three-dimensional processor 110 provides $S^3(l,i)$ output for a current line to two-directional processor 42, which may operate in a suitable dimension such as the horizontal. The $S^3(l,i)$ output for a current line 1 which is generated by three-dimensional processor 110 is a function of $S^{h,3}_{+-}(l-1,i)$ output, for at least one pixel of a previous line, which is provided by two-directional processor 42. Preferably, the S output provided to processor 110 by processor 42 pertains to the vertical neighbor and the two diagonal neighbors of the current pixel, all three of which are located in the previous row.

In the above example, processor 110 is three-dimensional, the three dimensions being the vertical and both 45-degree diagonals. Alternatively, processor 110 may be one- or two-dimensional. The processing carried out by processor 110 along each of the dimensions is one-directional, such as top-to-bottom in the present example.

A particular advantage of the above-described embodiment is that the reliability of the pre-estimated value of the estimated signal is enhanced by using previous estimates of neighbors of a current pixel as well as input regarding the current pixel.

Preferably, information regarding neighbors of the current pixel which have not yet been processed is employed so as to avoid asymmetry of processing. For example, the raw pixel values of the not-yet-processed neighbors of the current pixel along each of the three dimensions may be combined, preferably two-directionally, with the previous estimates of the processed neighbors of the current pixel along each of the three dimensions respectively.

Suitable equations for implementing units 110 and 42 of FIG. 10 are Equations 18–22, set forth at the end of the Detailed Description section.

Preferably, the output of unit 42 in FIG. 10 includes two values, $Sum1^{h,3}(l-1,i)$ and $d^{h,3}_{+-}(l-1,i)$, as defined above with reference to FIG. 1. These values are useful in certain applications, as explained below with reference to FIG. 11.

Figure 11:
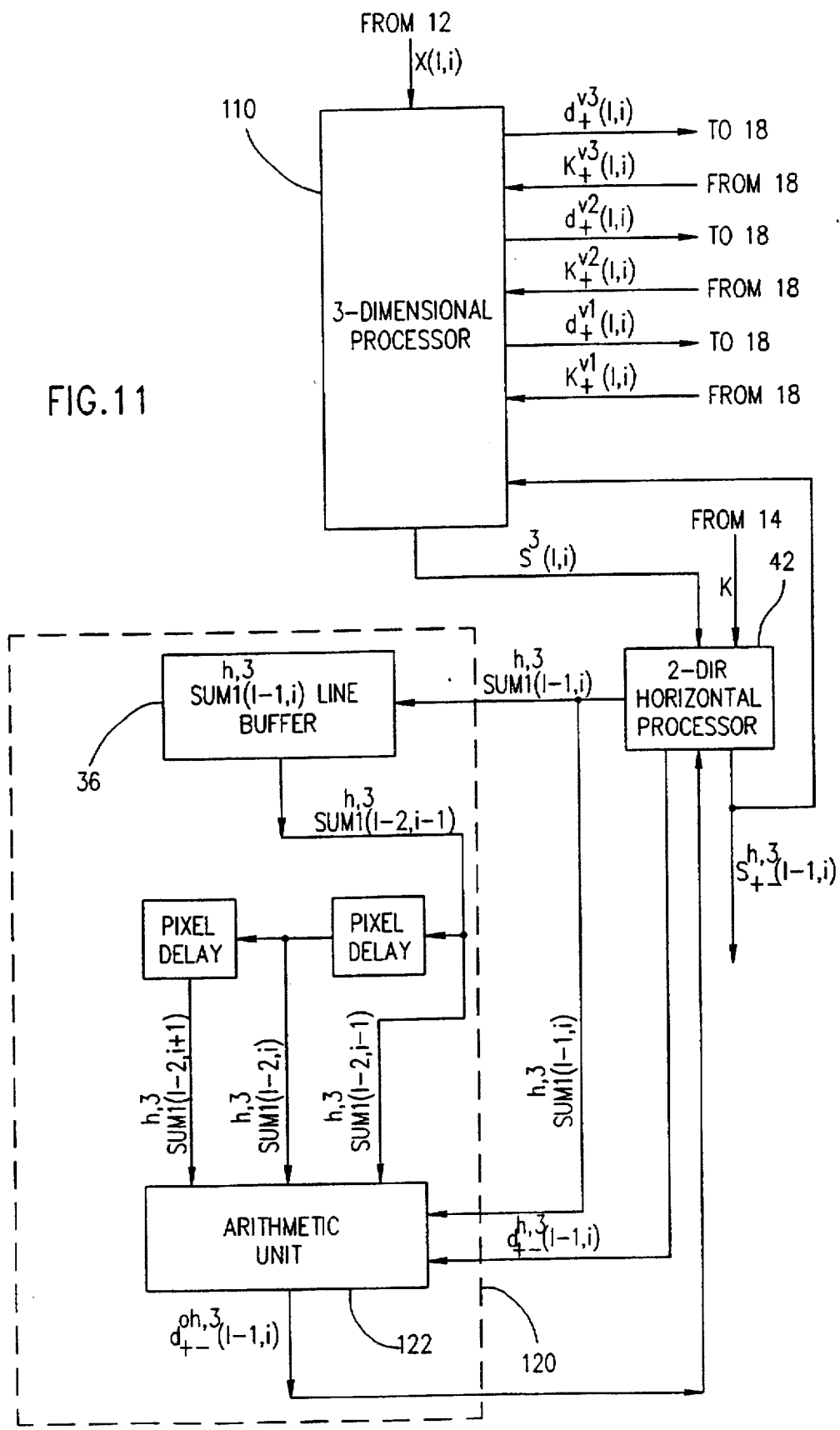
FIG. 11 is a simplified block diagram of image smoothing apparatus constructed and operative in accordance with a preferred embodiment of the present invention which is a seventh modification of the apparatus of FIG. 1.

Reference is now made to FIG. 11 which is a simplified block diagram of image smoothing apparatus constructed and operative in accordance with another embodiment of the present invention which is particularly suitable for applications in which it is desired to preserve thin lines, such as lines whose width is only one pixel, rather than treating the thin lines as noise and smoothing them out.

The apparatus of FIG. 11 is similar to the apparatus of FIG. 10 except that a thin line preserving unit 120 is provided which interfaces with two-directional unit 42. Thin line preserving unit 120 includes an arithmetic unit 122 which receives at least one $Sum1^{h,3}_{+-}$ value of the current line, from unit 42. Preferably arithmetic unit 122 receives three $Sum1^{h,3}_{+-}$ values from the previous line for each current pixel, corresponding to the vertical neighbor and two diagonal neighbors of the current pixel in the previous line. Arithmetic unit 122 provides an address for LUT 18 in unit 42.

The $Sum1^{h,3}_{+-}$ input of arithmetic unit 122, as defined with reference to Equation 23, set forth at the end of the Detailed Description section, is the sum of the two one-directional differences for a particular pixel and therefore is an indication of the presence of a high frequency detail signal in that pixel. A logical equation suitable for implementing arithmetic unit 122 of FIG. 11 is Equation 23. Equation 23 is operative to generate an output suitable for addressing LUT 18 by incrementing the LUT address $d_{+-}$ if a thin line is found to extend from a current pixel i in row l–1 to at least one of pixels i-1, i and i+1 in row l–2. The LUT address is incremented when a thin line is encountered because increasing the value of a LUT address has the effect of decreasing the amount of smoothing and a low level of smoothing is desirable when a thin line is encountered.

Figure 12:
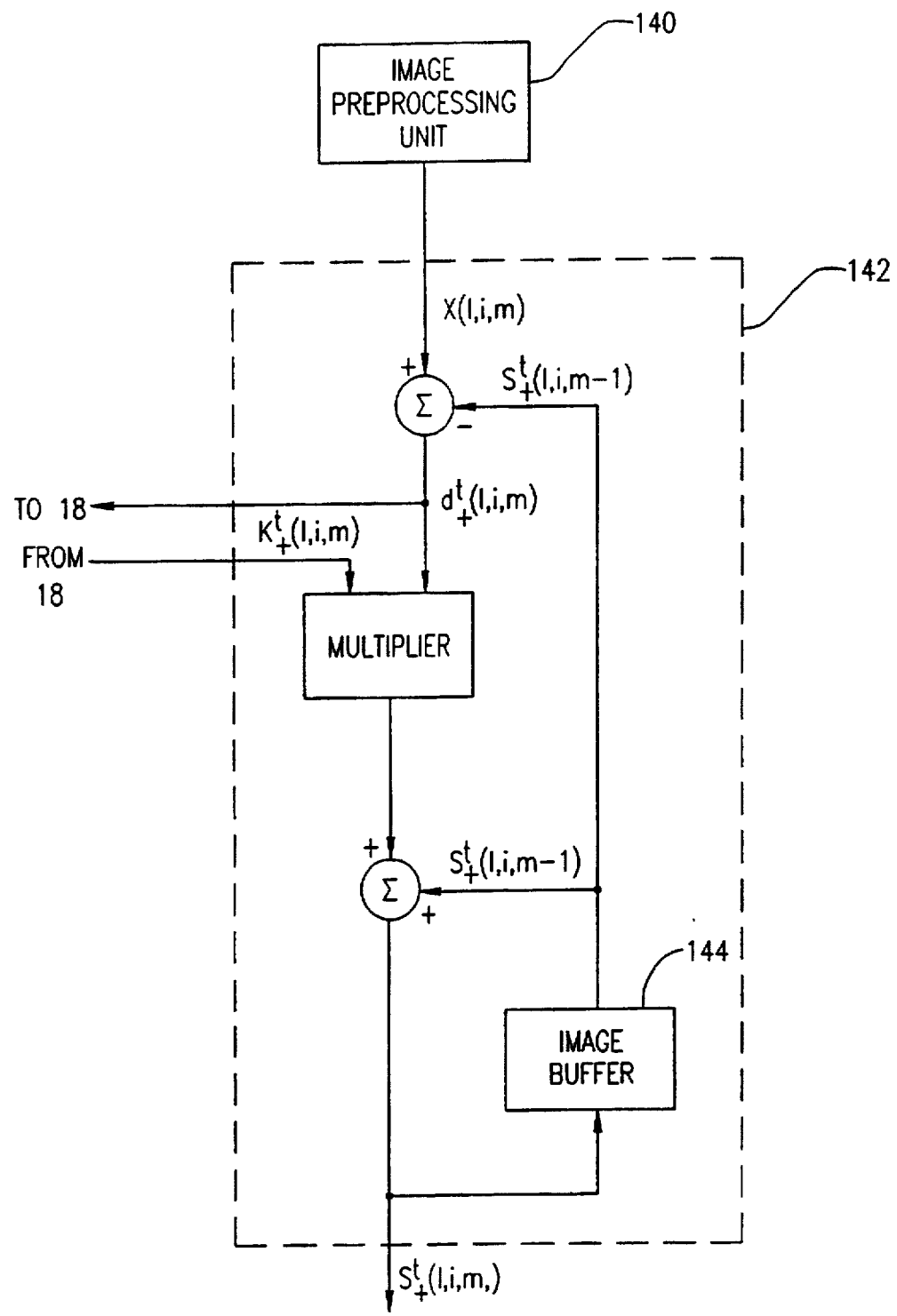
FIG. 12 is a simplified block diagram of smoothing apparatus for smoothing a sequence of images.

Reference is now made to FIG. 12 which is a simplified block diagram of image smoothing apparatus constructed and operative in accordance with a further embodiment of the present invention. The apparatus of FIG. 12 includes an image preprocessing unit 140 which may be identical to image preprocessing unit 12 of FIG. 1. The preprocessed output of preprocessor 140 is provided to a one-directional time domain smoothing unit 142. Unit 142 computes a one-directional time domain estimate $d'_+(l,i,m)$ of the difference between the raw value of a pixel (l,i) in image m and between a temporally smoothed value of the corresponding pixel in image m−1. The temporally smoothed pixels of image m−1 are stored in a suitable memory unit such as image buffer 144.

The difference estimate $d'_+(l,i,m)$ is used to address LUT 18 which provides a value $K'_+(l,i,m)$ which is employed as a weight as defined in Equation 24, set forth at the end of the Detailed Description section.

Figure 13:
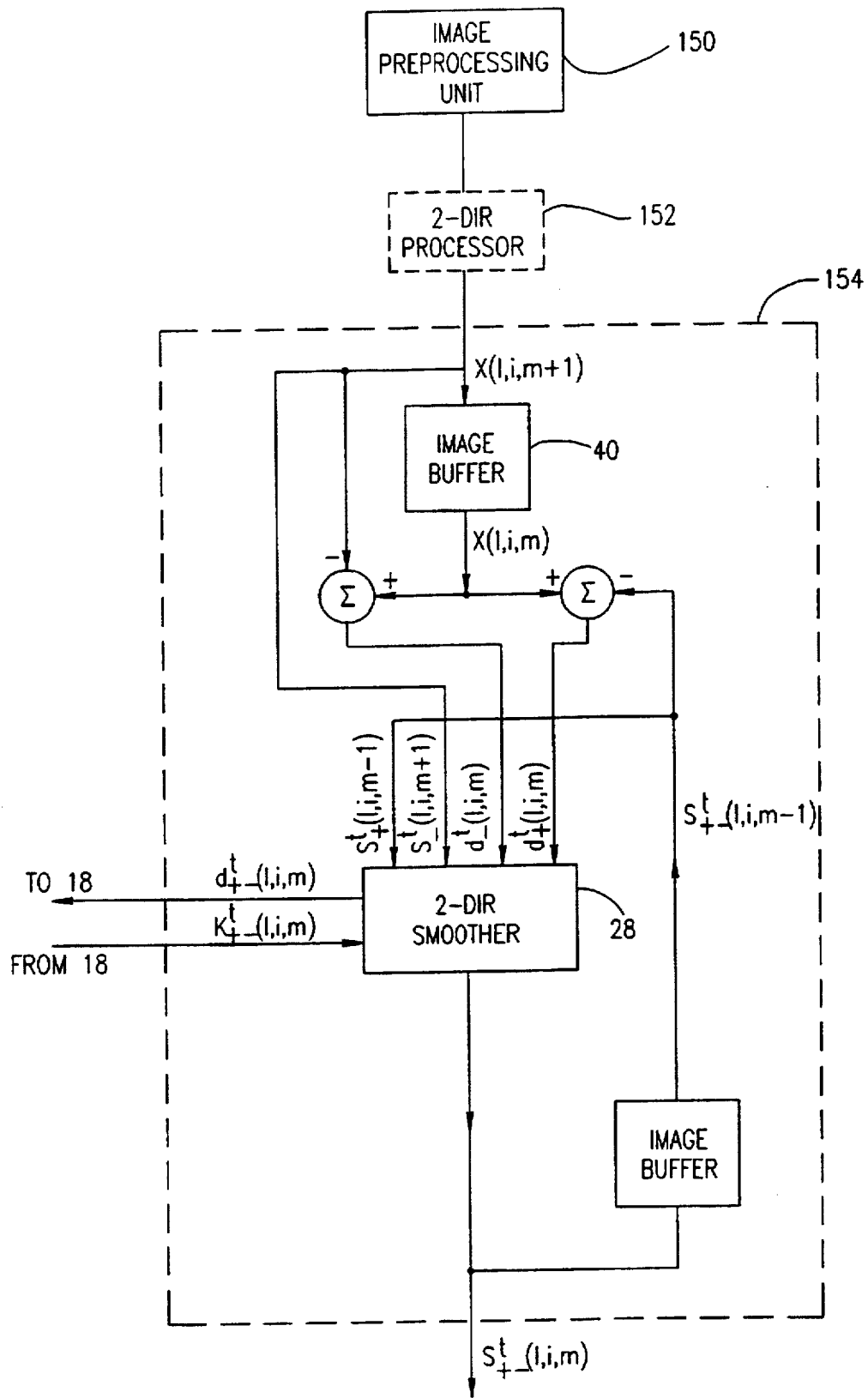
FIG. 13 is a simplified block diagram of image smoothing apparatus constructed and operative in accordance with a preferred embodiment of the present invention which is a modification of the apparatus of FIG. 12.

Reference is now made to FIG. 13 which is a simplified block diagram of two-directional time domain image smoothing apparatus for smoothing a sequence of images which is constructed and operative in accordance with a further embodiment of the present invention. The apparatus of FIG. 13 includes a preprocessing unit 150 which may be identical to preprocessing unit 12 of FIG. 1.

Preferably, a one-dimensional two-directional processor 152 receives the sequence of preprocessed images from preprocessing unit 150 and performs a spatial smoothing operation along lines of each image, which lines may comprise rows of each image.

The preprocessed spatially smoothed output of 2-directional processor 152, or the cascading of the 3-dimensional processor and 2-dimensional processor illustrated in FIG. 10, or the preprocessed output of preprocessor 150 is received by a "pseudo-two directional" time domain smoothing unit 154.

Preferred equations for implementing time domain smoothing unit 154 are Equations 25–30 which are set forth at the end of the Detailed Description section. Equations 25–30 assume that the input of time domain smoothing unit 154 arrives directly from preprocessor 150. If a unit 152 is provided and the input of unit 154 arrives from unit 152 then the value x(1,i,m+1) is replaced by $S^h_{+-}(1,i,m+1)$ or alternatively by $S^{h,3}_{+-}(1,i,m+1)$.

Time domain smoothing unit 154 computes an estimated signal value $S^r_{+-}(1,i,m)$ for pixel (1,i) of current image m using the estimated signal value $S^r_{+-}(1,i,m-1)$ for pixel (1,i) of preceding image m−1 and a raw value or two-directionally spatially smoothed value for pixel (1,i) of the current image m and for the same pixel of proceeding image m+1. Unit 154 is termed herein "pseudo 2-directional" because the estimated signal values for image m are recursive functions of:

(a) the estimated signal values for preceding images, given by $S^r_{+-}(1,i,m-1)$ in accordance with Equation 25, and corresponding to a first direction of processing; and of (b) a less high-quality indication of the signal values for the proceeding image, given by $S^r_{-}(1,i,m+1)$ in accordance with Equation 27, and corresponding to a second "pseudo-direction" of processing.

Conventional approaches to temporal noise reduction such as running average algorithms, discussed in the above-referenced publications by Gelb and by Rabiner and Gold have the disadvantage of blurring images of moving objects and of non-stationary images. The embodiments of FIGS. 12 and 13 are operative to adapt the integration parameter on a pixel-by-pixel basis. Adaptation is in accordance with the measured difference between the current pixel and the smoothed result of the corresponding pixel in the previous image, as may be appreciated with reference to Equations 24–30.

It is believed that the applicability of the apparatus and methods shown and described herein are not restricted to smoothing of visual images and may also be useful in smoothing other types of data such as but not limited to audio signals and ultrasound signals. Also, the particular delay structure shown and described herein are merely exemplary of possible delay structures. Any suitable conventional delay structure may be employed to implement each of the embodiments shown and described herein.

Figure 14:
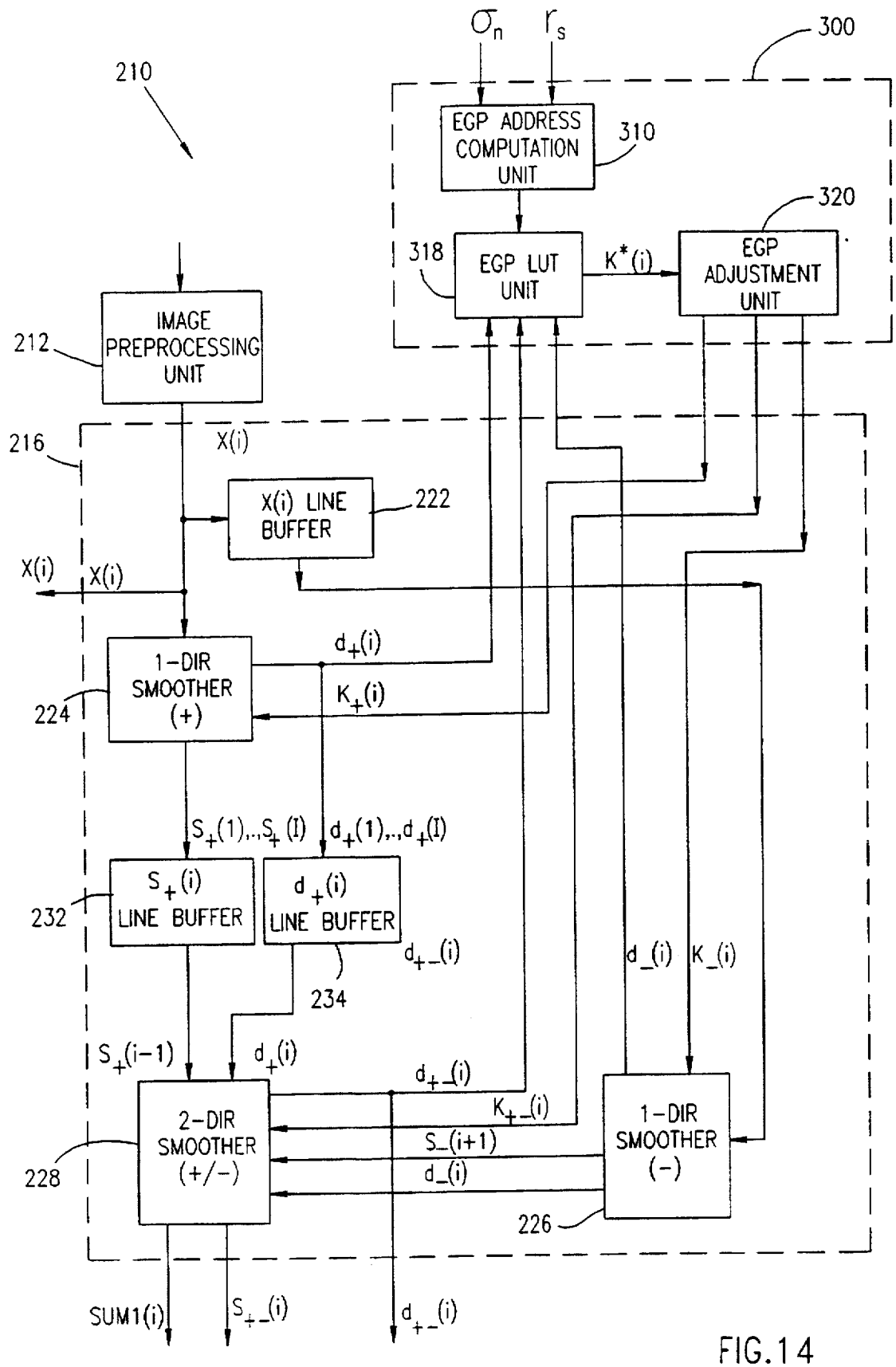
FIG. 14 is a simplified block diagram of one-dimensional two-directional image smoothing apparatus which is a modification of the apparatus of FIG. 1 in that computation of the estimation gain parameter (EGP) is carried out externally of the two-directional processor 16.

FIG. 14 illustrates one-dimensional two-directional image smoothing apparatus which is a modification of the apparatus of FIG. 1 in that computation of the estimation gain parameter (EGP) is carried out externally of the two-directional processor 16 and in that a more sophisticated unit is employed to compute the EGP. It will be appreciated by persons skilled in the art that these features may be provided separately or, as illustrated, in combination and that one or both of these features may be provided as modifications of the previously described embodiments, wherever suitable.

Units 212, 222, 224, 226, 228, 232 and 234 of FIG. 14 are respectively similar to units 12, 22, 24, 26, 28, 32 and 34 of FIG. 1. However, units 14 and 18 of FIG. 1, which are operative to provide an estimation gain parameter (EGP), referenced herein K, are replaced by an EGP computation unit 300 which is external to two-directional processor 216.

EGP computation unit 300 comprises an EGP address computation unit 310 which is similar to unit 14 of FIG. 1 and an EGP LUT 318 which is similar to unit 18 of FIG. 1 and which is operative to provide an EGP value as a function of local signal-to-noise ratio characteristics, which, in the illustrated embodiments, are operationalized as a function of incoming signal pixel values and previously processed pixel values, as well as $sigma_n$ and $r_s$.

It is appreciated that the LUTs shown and described in the present application, such as LUTs 18 and 318, may be replaced by any other suitable computational units.

Preferably, the EGP unit 300 also provides per-pixel adjustment of the EGP by means of a cascaded per-pixel adjustment unit 320 which receives EGP output from the EGP LUT 318 and adjusts the EGP output in accordance with the geometric location of the current pixel within the image. This is particularly useful in applications where different image regions are known to require different degrees of smoothing. In these applications, the locations of these regions may be defined by a user. For example, in prepress and publishing applications, during retouching procedures such as cut-and-paste and blending, a user may identify regions which require strong smoothing and regions which require weak smoothing.

Typically, adjacent differently smoothed image regions need to blend smoothly into one another so as to avoid visually disturbing image discontinuity artifacts. Therefore, the geometric function which alters K as a function of image location must be smooth. For example, an adjusted K can be computed from an initial K value, K*, received from a K LUT such as LUT 318, using Equation 31 which is set forth at the end of the Detailed Description section. K* is adjusted to take into account the distance between the processed pixel coordinate i, and the designated point at which the desired noise reduction or smoothing process is to operate. As the processed image point departs from the designated point, g(a,d,i) of Equation 31 approaches unity, and the EGP K(i) approaches unity. From Equations 3A, 3B and 7 set forth at the end of the Detailed Description section, it is apparent that as K(i) approaches unity, the smoothing operation becomes transparent. In other words, it does not affect the processed image, hence achieving a smooth transition between adjoining image regions.

More generally, EGP adjustment unit 320 may be utilized to adapt the EGP in accordance with any type of feature of the image and/or in accordance with any other empirical or heuristic, application-specific or other information which may be available. Suitable image-derived control information which may be received and utilized by EGP adjustment unit 320 may be obtained by performing additional local and global computations on the incoming image signal X. Control information may also be user-determined. For example, in the case of block encoded images, the EGP adaptation may be controlled by the pixel geometric location, and motion derived information in the case of motion compensated image encoding systems, as described in more detail below.

In the illustrated embodiment, EGP unit 300 receives three difference inputs (d inputs) from smoothers 224, 226 and 228, respectively, and provides three EGP's to the same three smoothers respectively. Alternatively, however, unit 300 mayprocess a sin to process a single incoming d input by sequentially multiplexing the three d signals into unit 300. The respective results may then be output in the same order.

Figure 15:
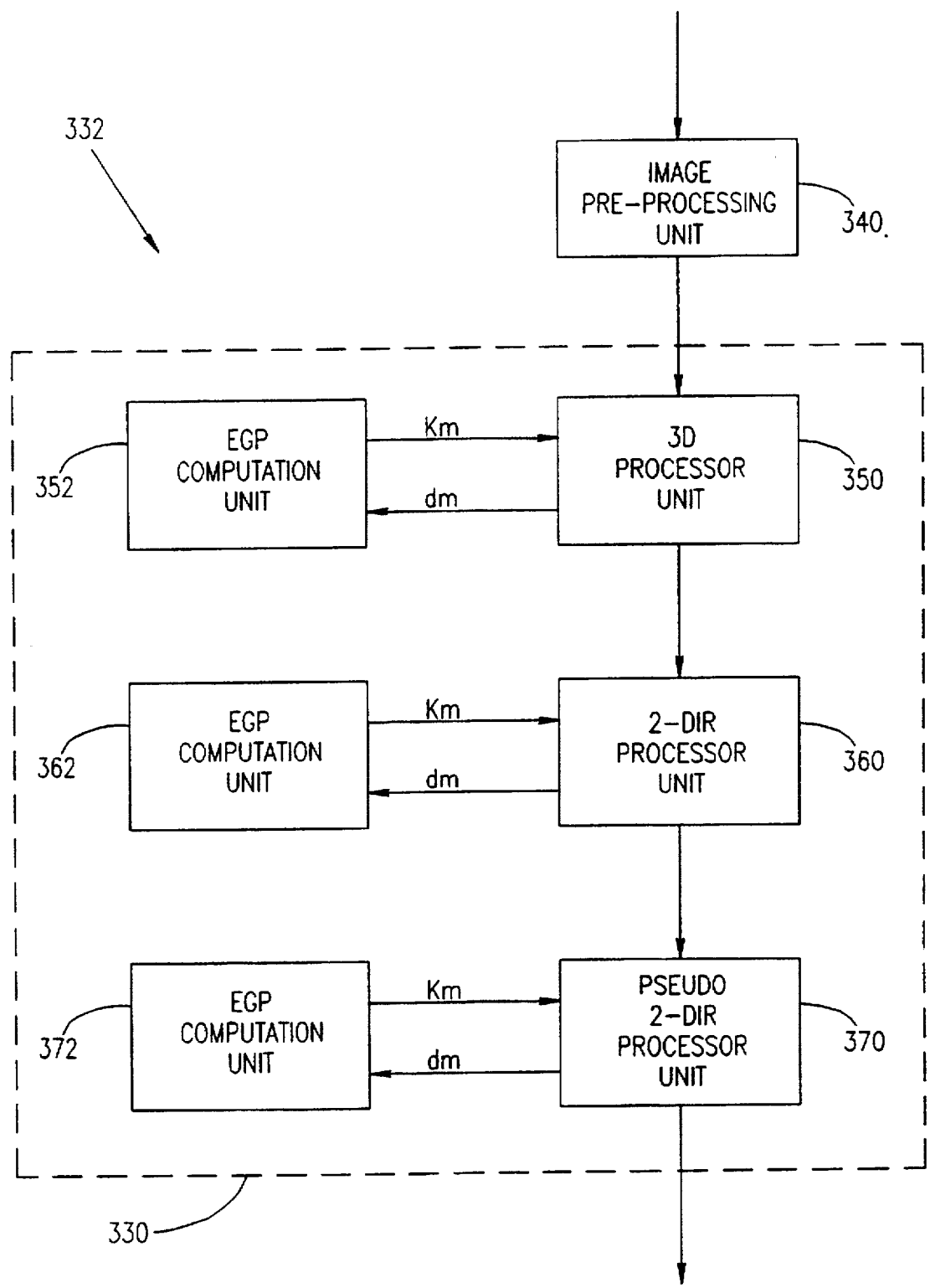
FIG. 15 is a simplified block diagram of spatial noise reducing apparatus which combines the features of FIGS. 8, 10 and 14.

FIG. 15 illustrates spatial noise reducing apparatus, referenced generally 332, which combines the features of FIGS. 8–11. The spatial noise reduction apparatus 332 of FIG. 15 includes an image preprocessing unit 340 which may be similar to image preprocessing unit 12 of FIG. 1 and a spatial noise reduction unit 330 which combines the features of the spatial noise reduction systems of FIGS. 8–11.

Specifically, spatial noise reduction unit 330 of FIG. 15 typically includes the following units:

a. a 3-dimensional processor 350 which is substantially similar to 3-dimensional processor 110 of FIG. 10 except that EGP computation is preferably external so that processor 350 provides a multiplexed difference value $d_m$ to, and receives a multiplexed EGP value $K_m$ from, an EGP computation unit 352. EGP computation unit 352 may be similar to EGP computation unit 300 of FIG. 14. However, unit 320 of FIG. 14 may be replaced by unit 500 of FIG. 18.

b. a 2-directional processor 360 which is substantially similar to 2-directional processor 40 of FIG. 8 except that EGP computation is preferably external so that 2-directional processor 360 provides a multiplexed difference value dm to, and receives a multiplexed EGP value $K_m$ from, an EGP computation unit 362. EGP computation unit 362 may be similar to EGP computation unit 300 of FIG. 14.

c. a "pseudo 2-directional" processor 370 which is substantially similar to pseudo 2-directional processor 80 of FIG. 8 except that EGP computation is preferably external so that processor 370 provides a multiplexed difference value $d_m$ to, and receives a multiplexed EGP value $K_m$ from, an EGP computation unit 372. EGP computation unit 372 may be similar to EGP computation unit 300 of FIG. 14.

It is appreciated that the three EGP computation units 352, 362 and 372 may be replaced by a single EGP computation unit serving all three processors 350, 360 and 370, in parallel or multiplexed mode.

The combined operation of the various components of noise reducer 330 in FIG. 15 is now described. 3-dimensional processor 350 uses previously smoothed estimates of adjacent image lines to compute an improved estimate of pixels in a current line. Subsequently, 2-directional processing is applied by 2-directional processor 360 which applies strong smoothing in a first dimension to narrow noise spikes in a first dimension whose width is a single pixel.

If unit 360 operates independently, independently computed two-directional computations of adjacent image lines (rows or columns) may develop phase offsets which are seen by human viewers as noise stripe effects. However, these effects are reduced by the operation of 3-dimensional processor 350 which correlates the estimates of adjacent lines.

Finally, pseudo 2-directional unit 370 applies strong smoothing to narrow noise spikes of single pixel width, along a second dimension.

Optionally, spatial noise reduction unit 330 of FIG. 15 may also include a high frequency preserving unit similar to high frequency preserving unit 120 of FIG. 11.

It is appreciated that each of the embodiments of FIGS. 1–14 may each be modified by replacing any of the two-directional units therein, such as any of units 28, 40, 42, 50, 52 and 228 with spatial noise reduction unit 330. Alternatively, any of the same units may be replaced by units 350 and 352 or by units 360 and 362 or by units 370 and 372, or by any suitable combination of the above pairs of units.

Figure 16:
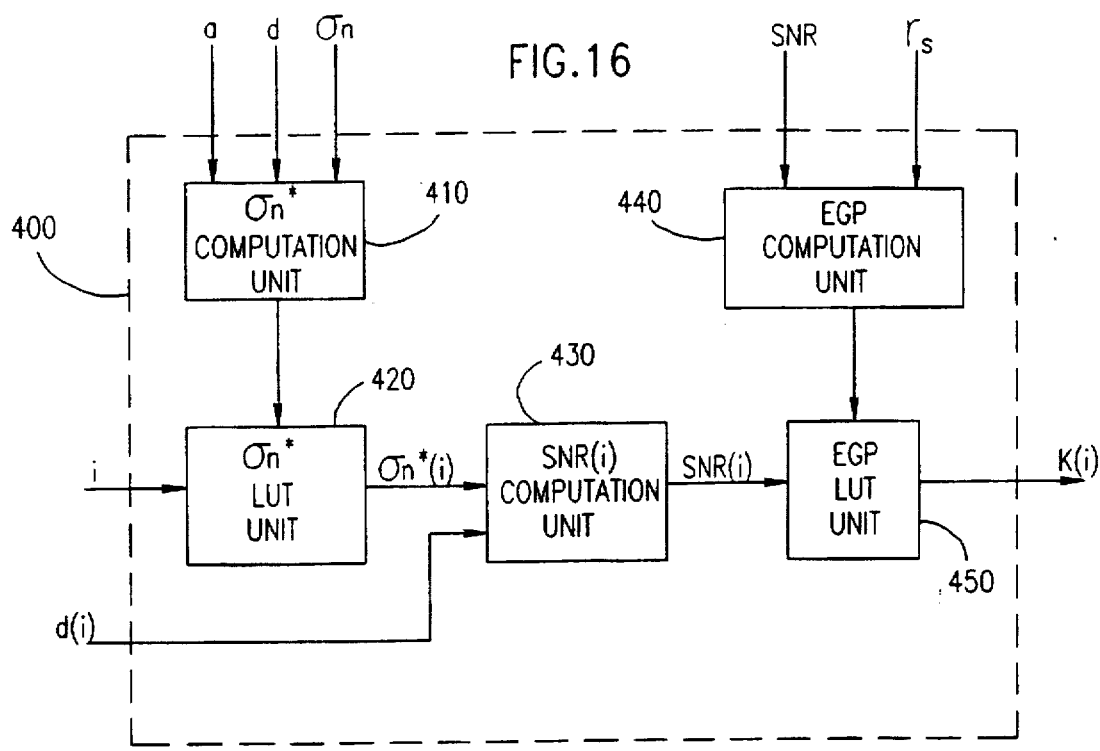
FIG. 16 is a simplified block diagram of estimation gain parameter determining apparatus which may replace units 310 and 318 of FIG. 14.

FIG. 16 illustrates estimation gain parameter computation apparatus, referenced generally 400, which is a variation on unit 300 of FIG. 14. Although the apparatus of FIG. 16 is useful in FIG. 14, more generally, the apparatus of FIG. 16 may be used to provide EGP's to any of the image processors in any of the figures shown and described herein. In unit 400, rather than directly modifying K* values as in unit 300, $sigma_n$ values are modified as a function of pixel location coordinates.

The EGP computation apparatus 400 receives image point coordinates i and difference data d(i), using notation developed above with reference to previous figures. A modified value for standard deviation of noise, $sigma*_n(i)$ is computed by $sigma*_n(i)$ computation unit 410 in accordance with Equation 32, set forth at the end of the Detailed Description section.

The $sigma_n*$ output of computation unit 410 is received by a $sigma*_n(i)$ LUT 420 which provides per-pixel adjustment of $sigma*_n(i)$ in accordance with the coordinate i of the current image pixel X(i). For example, the LUT 420 may be arranged so as to decrease $sigma*_n(i)$ for pixels which lie far from a user-designated point of interest and to increase $sigma*_n(i)$ for pixels which lie close to the user-designated point of interest, as in Equation 32.

A signal-to-noise (snr) computation unit 430 is operative to compute a pixel-specific snr value, by using received pixel-specific $sigma*_n(i)$ values to normalize corresponding pixel-specific d values in accordance with Equation 34, set forth at the end of the Detailed Description section.

EGP values K, for a variety of snr values and a selected correlation value $r_s$, are computed by a K computation unit 440, using Equation 4, set forth at the end of the Detailed Description section, with steady state values for K as a function of snr, from Equation 34. The EGP values K are stored in a LUT 450. Retrieval from LUT 450 is controlled by snr values arriving from snr computation unit 430. The output of EGP computation apparatus 400 is a pixel-specific EGP value K(i).

Figure 17:
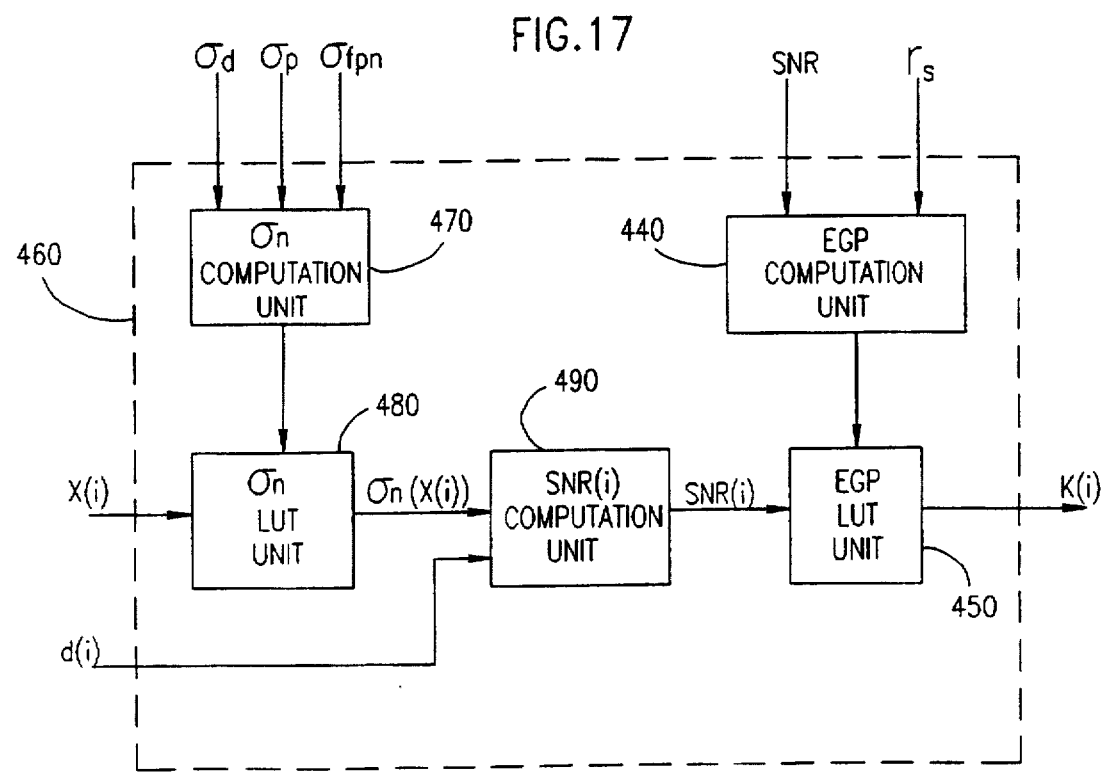
FIG. 17 is a simplified block diagram of estimation gain parameter determining apparatus which is a modification to the apparatus of FIG. 16.

FIG. 17 illustrates estimation gain parameter computation apparatus, referenced generally 460, which is a variation on unit 400 in FIG. 16.

The EGP computation apparatus 460 receives raw image data values X(i) and difference data d(i), using notation developed above with reference to previous figures. A modified value for standard deviation of noise, $sigma_n(X(i))$, is computed by $sigma_n(X(i))$ computation unit 470 in accordance with Equation 33, set forth at the end of the Detailed Description section. Alternatively, a user-determined $sigma_n(X(i))$ value may be employed.

The $sigma_n(X(i))$ output of computation unit 470 is received by a $sigma_n(X(i))$ LUT 480 which provides per-pixel adjustment of $sigma_n(X(i))$ in accordance with the current pixel X(i) of the raw image. For example, the LUT 480 may be arranged so as to increase $sigma_n(X(i))$ for bright pixels and to decrease $sigma_n$ for dark pixels, as in Equation 33, set forth at the end of the Detailed Description section.

A signal-to-noise (snr) computation unit 490 is operative to compute a pixel-specific snr value, by using received pixel-specific $sigma_n(X(i))$ values to normalize corresponding pixel-specific d values in accordance with Equation 35, set forth at the end of the Detailed Description section.

EGP values K, for a variety of snr values and correlation values $r_s$, are computed by a K computation unit 440, using Equation 4 with steady state values for K and for snr, from Equation 34. The EGP values K are stored in a LUT 450. Retrieval from LUT 450 is controlled by snr values arriving from snr computation unit 490. The output of EGP computation apparatus 460 is a pixel-specific EGP value K(i).

The apparatus of FIG. 17 is particularly suited to applications where an image has various regions of different brightnesses and different noise levels. For example, in CCD imaging, which may be carried out by a one-dimensional scanner or a two-dimensional camera, the dynamic range of the sensing process is typically divided into three signal ranges, each of which has a different dominant noise. At very low levels of signal, dark noise dominates. At midrange intensities, shot or photon noise dominates. At high intensity levels, photoresponse nonuniformities or fixed pattern noise dominates. The noise measured in this type of application is roughly a root sum of squares of the three categories of noise. Therefore, each CCD may be calibrated so as to take into account a different noise level for each level of illumination.

Alternatively, $sigma_n$ LUT 480 may be preset by a user, as in applications in which it is desired to control the degree of smoothing as a function of levels of luminance or of color.

Figure 18:
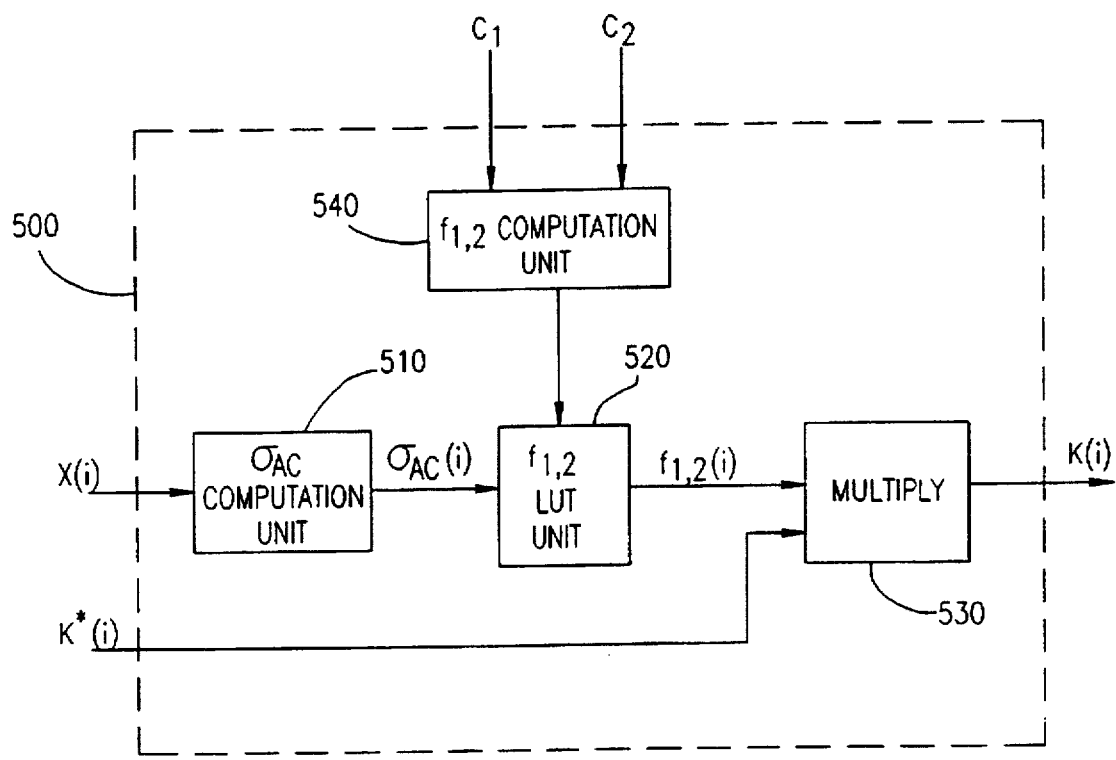
FIG. 18 is a simplified block diagram of an estimation gain parameter adjustment unit 500 constructed and operative in accordance with a first alternative embodiment of the present invention which may replace estimation gain parameter adjustment unit 320 of FIG. 14.

FIG. 18 illustrates an estimation gain parameter adjustment unit 500 constructed and operative in accordance with a first alternative embodiment of the present invention which is a variation of estimation gain parameter adjustment unit 320 of FIG. 14. The EGP adjustment unit 500 receives raw data, X(i), and an initial EGP, K*(i), from LUT 18 of FIG. 1 or from LUT 318 of FIG. 14.

Replacement of estimation gain parameter adjustment unit 320 of FIG. 14 with corresponding unit 500 renders estimation gain parameter computation unit 300 particularly useful in reducing certain types of image compression noise. Specifically, unit 300 in which unit 500 replaces unit 320 is particularly useful in reducing image compression noise which is often created by widely used block transform coding schemes such as Discrete Cosine Transform (DCT) based JPEG, MPEG and CCITT H.261. In the encoding process of such schemes, the input image pixel samples are grouped typically into 8×8 or 16×16 blocks, each block transformed by the DCT into a set of 64 values referred to as DCT coefficients. One of these values (the block average brightness) is referred to as the DC coefficient, and the remaining 63 as the AC coefficients. The compression of the image is achieved by quantizing each of these coefficients using one of 64 corresponding values from a quantization table. The best performing quantization tables, in terms of visual fidelity of the decompressed images, are generally characterized by a higher degree of quantization at the higher frequency DCT coefficients as compared to the lower frequencies in each block. The lost information due to the quantization operation is often perceived by human observers in the form of blocky artifacts in image regions having smooth brightness surfaces, and in the form of edge noise ("mosquito noise") at pixels which are located in blocks having high contrast edges.

The general problem in DCT compressed images is to remove or reduce the block noise and edge noise without impairing the quality of the image, thereby retaining both continuity of smooth surfaces and contrast of edgy and textured regions. This is done by taking advantage of the fact that block noise is known to have a well defined geometric structure, namely, the shape of the block. Therefore, given the size of the DCT block, for each image point, a geometric relationship with respect to the block boundaries' grid can be determined. This information can be used to control the estimation gain parameter K, using unit 400. For example, varying degrees of noise reduction smoothing may be desirable along boundaries of adjacent blocks as compared to the smoothing within each individual block.

In addition to using knowledge of the block geometry for improved control of K values in unit 400, additional image derived information on the decompressed image signal contents within each block can be utilized to deal with compression noise such as block noise and edge noise. The amplitudes of the noise artifacts are a function of the degree to which the DCT coefficients are quantized. Given the compression ratio for a given image, the expected noise quantization noise level can be roughly predicted and used in units 310 and 318 of the estimation gain parameter computation unit 300. Moreover, image regions in which block noise prevails may be identified by comparing the high frequency signal content to the low frequency signal content on a pixel by pixel basis (absolute amplitude ratios) or on a block by block basis (rms ratios computed separately for each block or for groups of adjoining blocks).

It is appreciated that each block of encoded pixels generally has a different amount of noise and a different distribution of noise.

Referring again to FIG. 18, computation unit 510 is operative to compute the average DC value of X within each block, $X_{DC}$, using Equation 36, set forth at the end of the Detailed Description section. The per-block average DC values are then employed by computation unit 510 to compute the AC component of the raw data in the block, $X_{AC}(i)$, by computing the difference between the input and the per-block DC value, as set forth in Equation 37A or 37B, set forth at the end of the Detailed Description section. The output of computation unit 510 is the standard deviation, $sigma_{AC}$ of the fluctuation $X_{AC}$ about the average $X_{DC}$.

The standard deviation of the AC component, $sigma_{AC}$, of each block is utilized by units 510 and 520 to compute and create a coefficient f1 using Equation 38 or alternatively f2 using Equation 39, set forth at the end of the Detailed Description section. Either of coefficients f1 and f2 may be used to adjust the estimation gain parameter K*(i) previously computed by unit 18 or 318. The adjustment in this instance is such that blocks having relatively low $sigma_{AC}$, such as zero level $sigma_{AC}$, should be smoothed to a higher degree since block noise is expected in those regions. On the other hand, for blocks having a high $sigma_{AC}$ (high contrast textured regions for example), the noise reduction operation is preferably tuned to the expected noise level for which the K*(i) was previously computed. In this case, both factors f1 and f2 approach unity.

Computation unit 540 receives values for C1 and C2 by default or by the user and computes f1 and f2, e.g. as per Equations 38 and 39.

Figure 19:
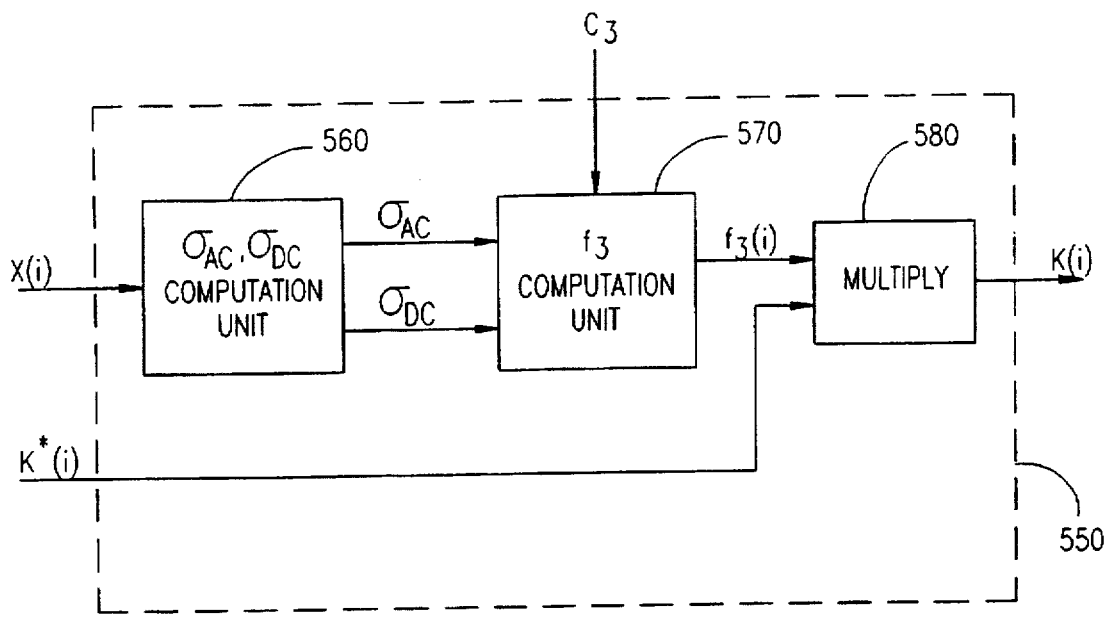
FIG. 19 is a simplified block diagram of an estimation gain parameter adjustment unit 550 constructed and operative in accordance with a second alternative embodiment of the present invention which may replace estimation gain parameter adjustment unit 320 of FIG. 14.

FIG. 19 illustrates an estimation gain parameter adjustment unit 550 which is a variation of the apparatus of FIG. 18. EGP adjustment unit 550 includes units 560, 570 and 580 which operationalize Equations 36, 37, 40 and 41, set forth at the end of the Detailed Description section. More generally, the apparatus of FIG. 19 employs locally derived image signal high and low frequency measures $sigma_{AC}$ and $sigma_{DC}$ to indicate the degree to which block noise is expected to be visible to the observer. Average DC values for each block of raw values are computed, and $sigma_{DC}$, the standard deviation of the average DC values, over blocks, is also computed. $Sigma_{AC}$ is the standard deviation of the average AC values within each block.

A particular feature of the apparatus of FIG. 19 is that, regardless of the AC standard deviation in current or adjacent blocks, the EPG remains essentially unchanged if the DC standard deviation is small compared to the the AC standard deviation and a fine tuning constant C3. If, however, $sigma_{DC} \gg sigma_{AC}$, then f3 decreases and this decreases the K smoothing parameter which increases the degree of smoothing. C3 is a fine tuning constant which varies the degree at which the $sigma_{DC}$ affects the f3 factor in the presence of given levels of $sigma_{AC}$. C3 is to be set by a user, with a default value of zero or unity. The fine tuning is achieved by observing the displayed image and modifying C3 until the best result is achieved.

Figure 20:
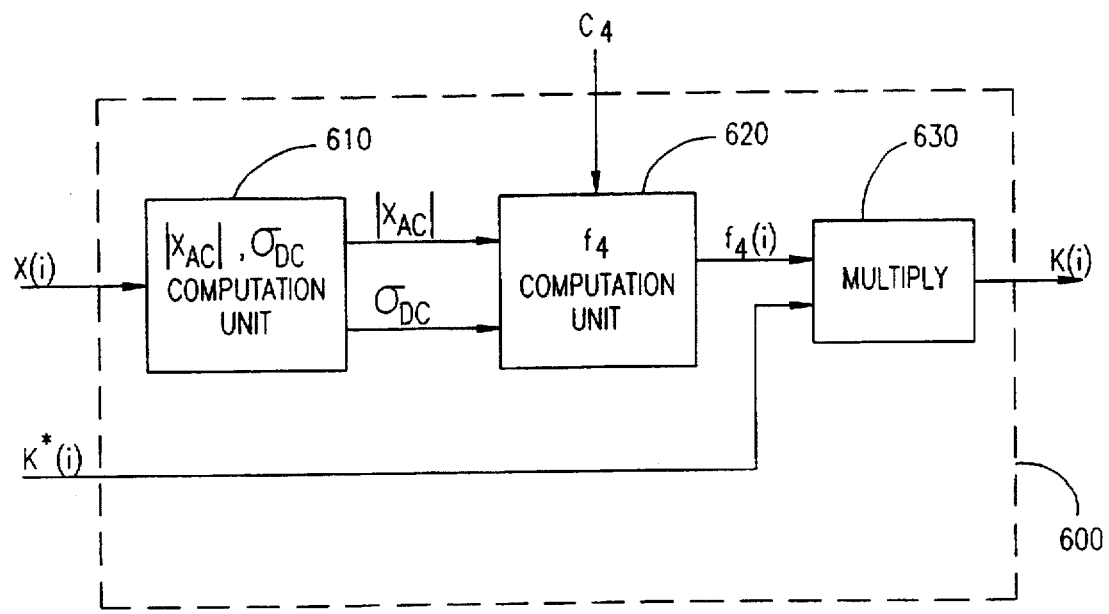
FIG. 20 is a simplified block diagram of an estimation gain parameter adjustment unit 600 constructed and operative in accordance with a third alternative embodiment of the present invention which may replace estimation gain parameter adjustment unit 320 of FIG. 14.

FIG. 20 illustrates another variation of an estimation gain parameter adjustment unit, referenced generally 600. Equations for units 610 and 620 are numbered as Equations 37, 40 and 42, respectively, and are set forth at the end of the Detailed Description section. Like the apparatus of FIG. 19, the apparatus of FIG. 20 also employs locally derived image signal high and low frequency measures to indicate the degree to which block noise is expected to be visible to the observer. However, in FIG. 20, instead of applying an f factor which is constant within each block, the f factor varies over pixels within a single block. However, if the DC standard deviation is small compared to the sum of $|X_{AC}|$ and a constant C4, then the EPG remains essentially equal to K*. The computation of the constant C4 is similar to the computation of constant C3 in unit 570.

It is appreciated that the alternative methods for fine-tuning of the EPG described above with reference to FIGS. 18–20 merely exemplify the various possibilities for implementing fine-tuning unit 320 of FIG. 14 and are not intended to be limiting. For example, more smoothing may be applied to image regions having weak AC signal components, compared to local DC variations, and less smoothing may be applied to image regions having strong AC components, compared to local DC variations. The amount of DC variations depends, inter alia, on the size of the blocks which typically is 8×8 or 16×16.

Figure 21:
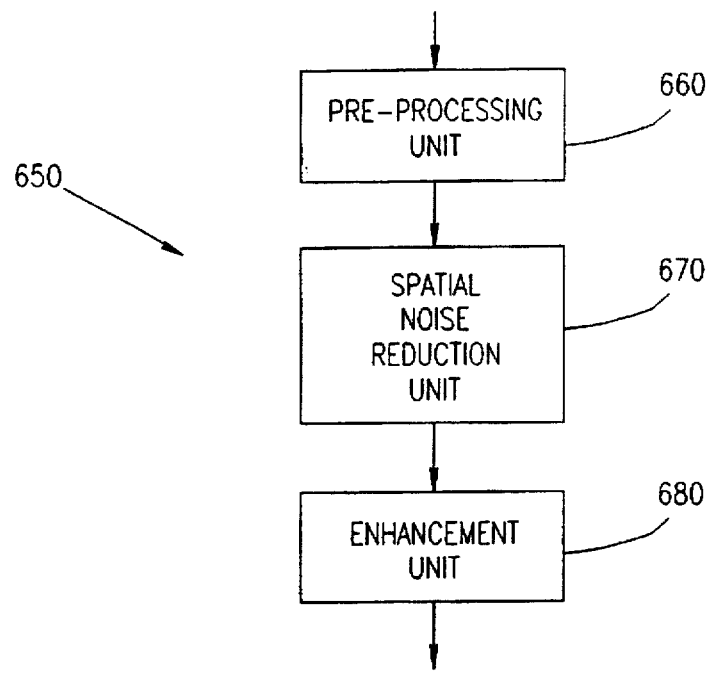
FIG. 21 is a simplified block diagram of apparatus for combined spatial noise reduction and enhancement of an image.

FIG. 21 illustrates apparatus, referenced generally 650, for combined spatial noise reduction and enhancement of an image. The apparatus 650 of FIG. 21 is operative to perform one and/or two-dimensional contrast enhancement on an image which has been pre-smoothed using any of the image smoothing techniques provided in accordance with the present invention. Synergism is provided between the smoothing and contrast enhancement functions such that:

(a) Some of the contrast lost due to the smoothing process is recovered by the enhancement process, whereas introduction of artifacts; and (b) False signal overshoots are avoided by avoiding enhancement in the vicinity of those edges whose contrast is such that enhancement is unnecessary.

The apparatus includes a preprocessing unit 660 which may be similar to preprocessing unit 12 of FIG. 1, a spatial noise reduction unit 670, and an image enhancement unit 680. Spatial noise reduction unit 670 may be similar to unit 330 of FIG. 15. Alternatively, unit 670 may comprise a spatial noise reduction unit in which individual features shown and described above in the context of any of FIGS. 1–11 and 14–20 are suitably combined. Alternatively, unit 670 may comprise a spatio-temporal noise reduction unit in which individual spatial noise reduction features shown and described above in the context of any of FIGS. 1–11 and 14–20 are suitably combined with individual temporal noise reduction features shown and described above in FIG. 12 and 13. Image enhancement unit 680 is described in detail below with reference to FIG. 22.

If spatial noise reduction unit 670 performs only one-dimensional smoothing, one-dimensional enhancement may be employed.

An alternative to the illustrated embodiment is that spatial noise reduction unit 670 may be eliminated and image enhancement may be applied directly to the raw preprocessed image. For example, when the image is a high snr image which is blurred as a result of imaging lens defocus, it is sometimes unneccessary to presmooth the image prior to enhancement.

Figure 22:
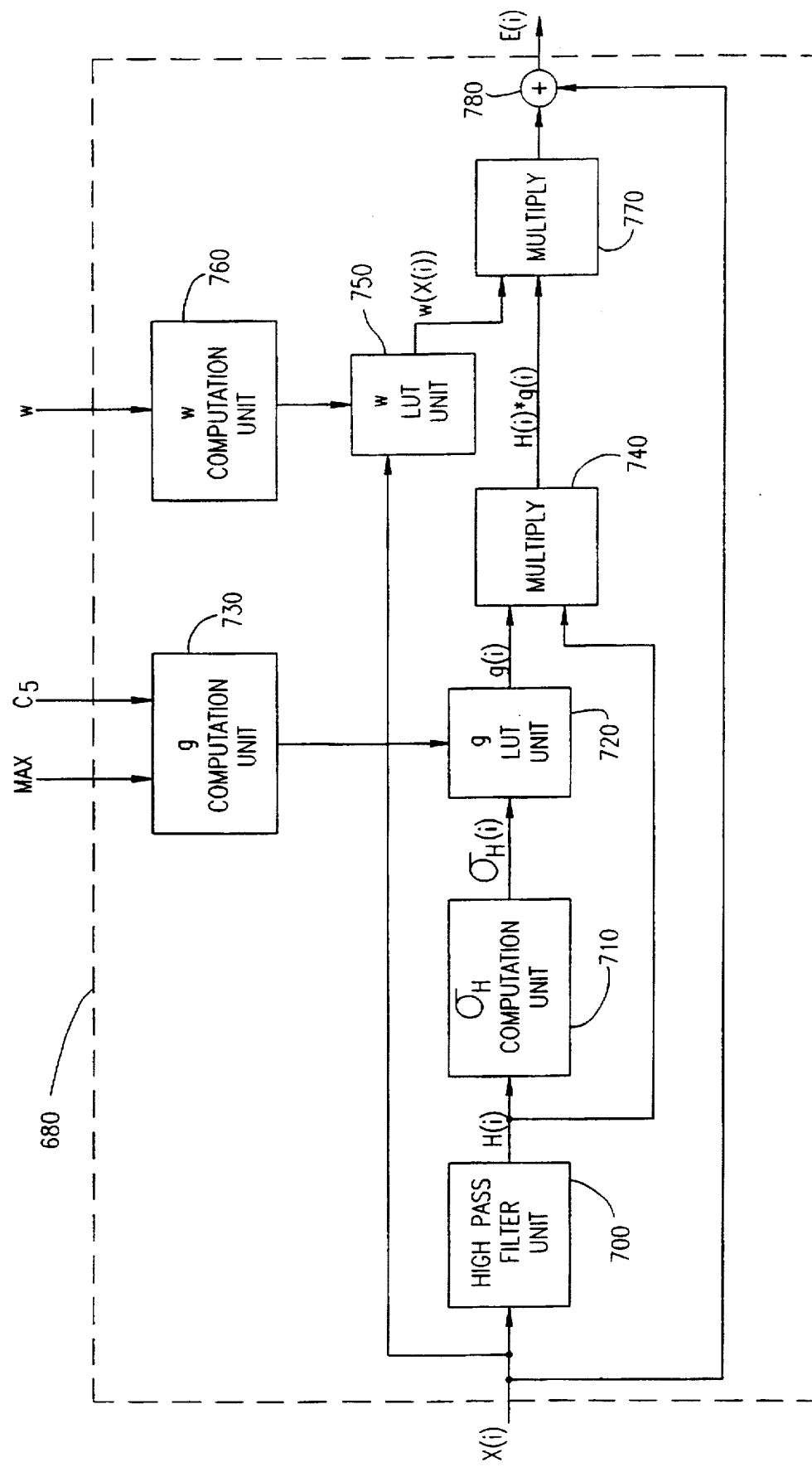
FIG. 22 is a simplified block diagram of an enhancement unit in FIG. 21.

FIG. 22 is a simplified block diagram of the enhancement unit 680 of FIG. 21. A high pass filter 700 extracts high frequency detail signals from the incoming image. Units 720 and 750 provide gain parameters which are employed by multiplier units 740 and 770 to amplify the high frequency detail. The amplified high frequency result is added to the original incoming image signal by adding unit 780.

If enhancement is one-dimensional, high pass filter 700 may be operationalized as the difference between an incoming current image pixel X(i) and a 1, 2, 1 weighted average of pixel i and its two neighbors along the single dimension. If enhancement is two-dimensional, the high pass filter may be operationalized as the difference between an incoming image pixel and a weighted average of the pixel's vicinity, using suitable weights such as the following matrix of weights:

1 2 1
2 4 2
1 2 1 where rows of weights correspond to respective lines in the image, and where the current pixel is located in the center.

The high pass signal may then be given by the weighted operator

−1 −2 −1
−2 12 −2
−1 −2 −1, normalized by 16, which is a simple bit shift. The above numerical values have been found to give good visual results, to be easily implementable, and to be easily embeddable in 3-dimensional smoothing unit 110 of FIG. 10. However, the specific numerical values are not intended to be limiting and the filter size may be larger, e.g. of size 5×5 pixels.

Still with reference to FIG. 22, the amplification gain parameter g is intended to provide visually pleasing amplification of the high frequency detail signal H, in that the gain g is limited to some preset maximum value in cases of very small amplitudes of H, thereby avoiding enhancement of low snr edges. Also, the gain g is nearly inversely proportional to the amplitude of H(i) for increasing values of |H(i)|, thereby avoiding overenhancing artifacts of already contrasty edges.

A gain function g which is often used in the literature is given in Equation 43, which is set forth at the end of the Detailed Description section, as a function of locally computed standard deviation of the detail signal H, $sigma_H$. Large computation windows for $sigma_H$ often introduce artifacts into the enhanced image. Alternatively, as the window size diminishes, the accuracy of the $sigma_H$ estimation is reduced, but the parameter relates more directly to the pixel in question, that is pixel in the center of the window. At the limit, with window size being that of a single pixel, $sigma_H(i)=|H(i)|$, and g is given in Equation 44, set forth at the end of the Detailed Description section. The reduced accuracy in using small windows for computing $sigma_H$ is improved by pre-smoothing the incoming image as illustrated in FIG. 21. Spatial noise reduction unit 670 is applied prior to enhancement unit 680, such that presmoothed values |H(i)| comprise better estimates which can then be used directly in computing g. In this case unit 710 simply computes the absolute value of the detail signal H, a considerable simplification over $sigma_H$ computations.

From Equation 44, for small values of |H(i)|, the value of g approaches MAX, a parameter defined by default or user, and typically ranges between 1 to 2. For |H(i)|>>(C5/MAX), the amplitude of the amplified signal |H(i)|*g(i) is maximum and approaches C5. Typical settings for the parameter C5 range between 8 to 32 gray levels (in 256 gray level display systems).

An improved gain function g which further trims the amplified response at large contrast edges is computed using Equation 45, set forth at the end of the Detailed Description section. In this case, as the edge contrast increases, the amplified response diminishes and approaches zero. |Hmax| is the maximum expected edge contrast in a given image, and can in certain cases be assumed to be the entire image signal range. Further tuning of the gain g function can be achieved using Equation 46, which is set forth at the end of the Detailed Description section, where the parameter p has the effect of altering the |H| amplitude at which the maximum amplification amplitude of |H(i)|*g(i) occurs.

Referring again to enhancement unit 680 in FIG. 22, the amplified signal H(i)*g(i) is further amplified by a second gain factor w(i), which is determined by w LUT unit 750. The w gain values are determined by w computation unit 760 using Equation 47, which is set forth at the end of the Detailed Description section, with W a tuning scaling constant which can be user defined according to the particular image, and the wp parameter determining the degree of nonlinearity in the w(i) function as a function of brightness X(i). The w gain parameter is intended to compensate for the assumed logarithmic contrast response of the human visual system, whereby contrast detection threshold is known to vary linearly with image brightness levels. As the brightness in the image increases, the amplification w must also increase such that the observer can perceive similar edge gray level differences at all brightness levels of image regions. The enhanced image signal output from unit 680 is given in Equation 48, set forth at the end of the Detailed Description section.

Figure 23:
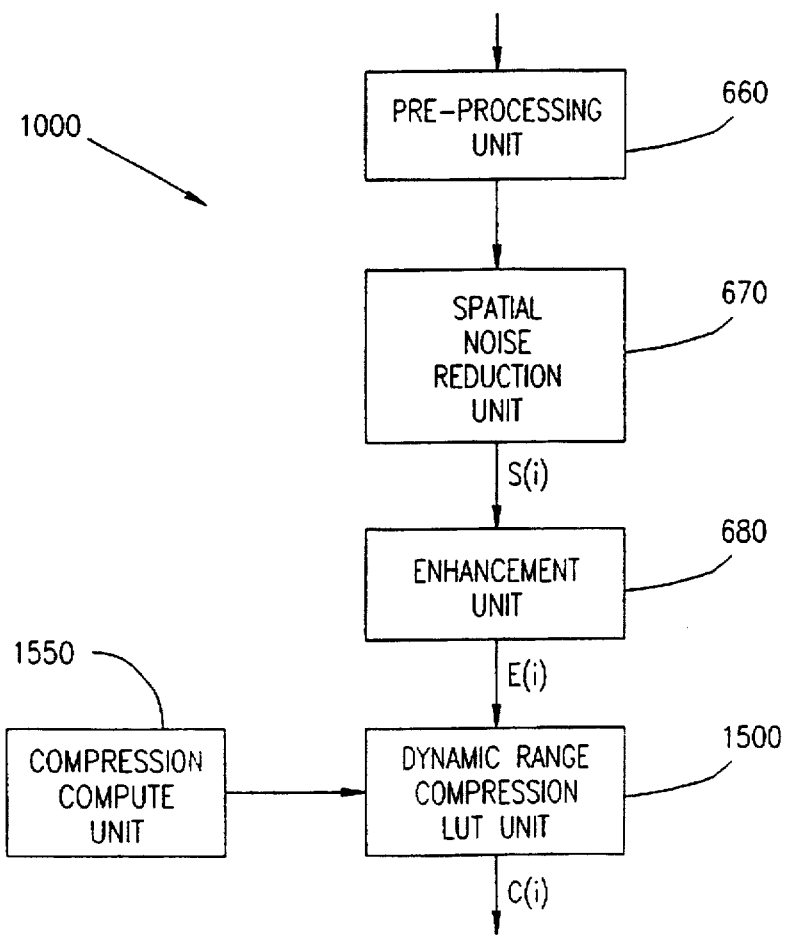
FIG. 23 is a simplified block diagram of dynamic range compression apparatus operative in the spatial domain.

FIG. 23 illustrates apparatus, referenced generally 1000, for dynamic range compression useful in instances where the image display unit may have a narrower display signal dynamic range as compared to that of the incoming image. The dynamic range of imaging sensors such as CCD devices is generally expressed in terms of the ratio of maximum edge contrast which can be imaged by the camera without it being saturated, to the minimal level of noise in the signal. This ratio indicates the extreme situation in which both sides of a maximum contrast edge (black and white) must be imaged, while retaining sufficient sensitivity to sense the minimal signal noise level which generally occurs along the low brightness part of the edge.

Display devices such as TV monitors and hard copy prints typically have display ranges of 64:1 to 256:1, while CCD imaging cameras typically have dynamic ranges of 1000:1 to 2000:1. One obvious and trivial method of reducing the acquired image dynamic range to the display range is to simply apply a linear or non-linear transformation to the incoming image signal. Such methods generally reduce the sensitivity of the imaging system, in that low contrast edges may disappear in the compressed display image. Linear compression allocates display ranges equally throughout the image dynamic range. Nonlinear compression often allocate larger display ranges to selected image signal ranges such as low brightness regions such that low contrast detail information may be visible in the displayed image. This may have the effect of amplifying this low brightness image region and its corresponding noise. Allocating larger display ranges to selected image signal ranges comes at the cost of reducing the display ranges of the remaining image signal ranges as is often the case in high brightness regions. In such regions it is expected that the detectivity of low contrast detail signals will be reduced.

In remedy of the noise amplification in low brightness regions and loss of sensitivity in high brightness regions, the dynamic range compression unit 1500 which preferably consists of a LUT which values are computed and loaded by computation unit 1550, is preceded by noise reduction unit 670 which can be tuned for example by unit 470 of FIG. 17 to reduce noise in selected image regions as a function of image brightness level. Morever unit 1500 is preceded by enhancement unit 670 which can be tuned for example by unit 750 in FIG. 22 to enhance image regions in compensation of expected reduction in sensitivity due to a given dynamic range compression transformation.

Figure 24:
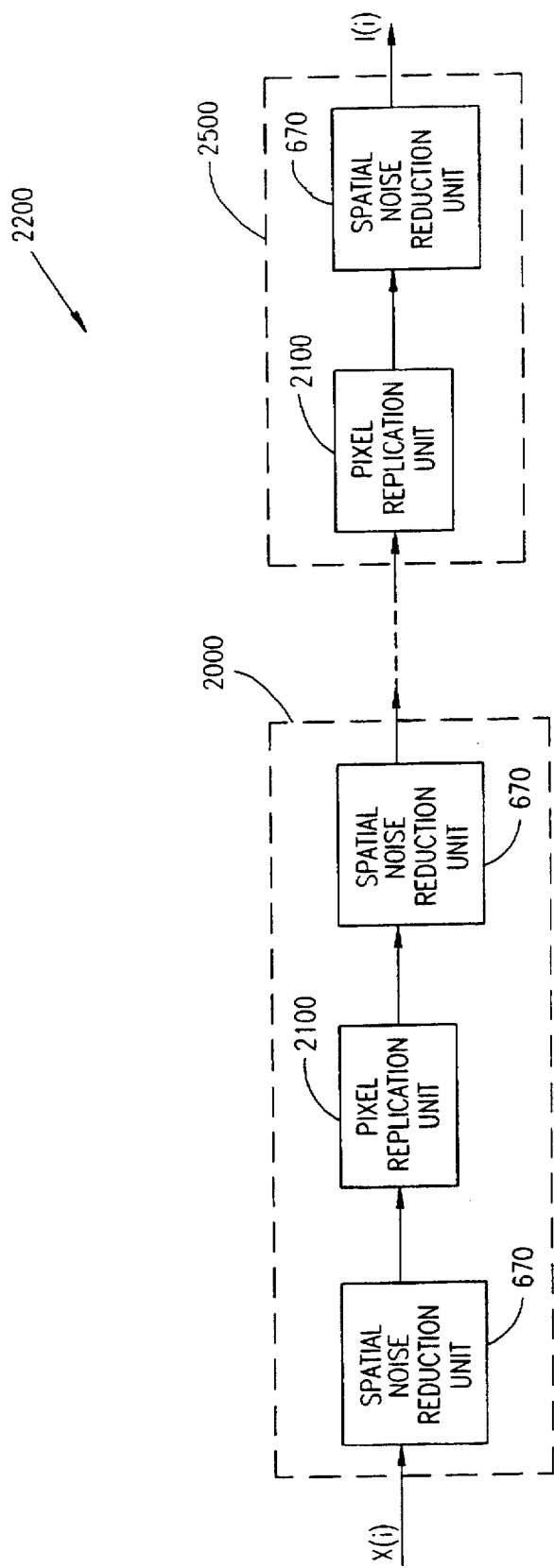
FIG. 24 is a simplified block diagram of combined spatial noise reduction and spatial interpolation apparatus constructed and operative in accordance with a preferred embodiment of the present invention.

FIG. 24 illustrates apparatus, referenced generally 2200, for electronic image magnification. Image magnification involves the interpolation of pixel values using adjoining pixel values. Image magnification often tends to increase the visiblity of image artifacts such as aliasing effects in the original magnification image as well as noise. The method illustrated in FIG. 24 incorporates repeated smoothing and pixel replication to achieve image magnification while avoiding interpolating (smoothing) high contrast edges. The pre-smoothing operation is utilized both as an anti-aliasing filter which preserves edges of width larger than one pixel along the dimension of processing, and for the reduction of noise which would otherwise be perceived, upon magnification, as blurred spots in the image.

A single magnification step involves unit 2000 which is composed of a spatial noise reduction step computed by unit 670, followed by pixel replication unit 2100 and thereof followed again by a noise smoothing unit 670 with modified noise setting parameters. Multiple magnification steps involve repeated applications of unit 2500. Optionally, the signal removed by the first application of unit 670 may, rather than being discarded, be added back to the magnified image in order to restore detail information. Instead of pixel replication, pixel interpolation may be performed along some or all of the processed dimensions, as described in Equations 49 and 50.

Figure 25:
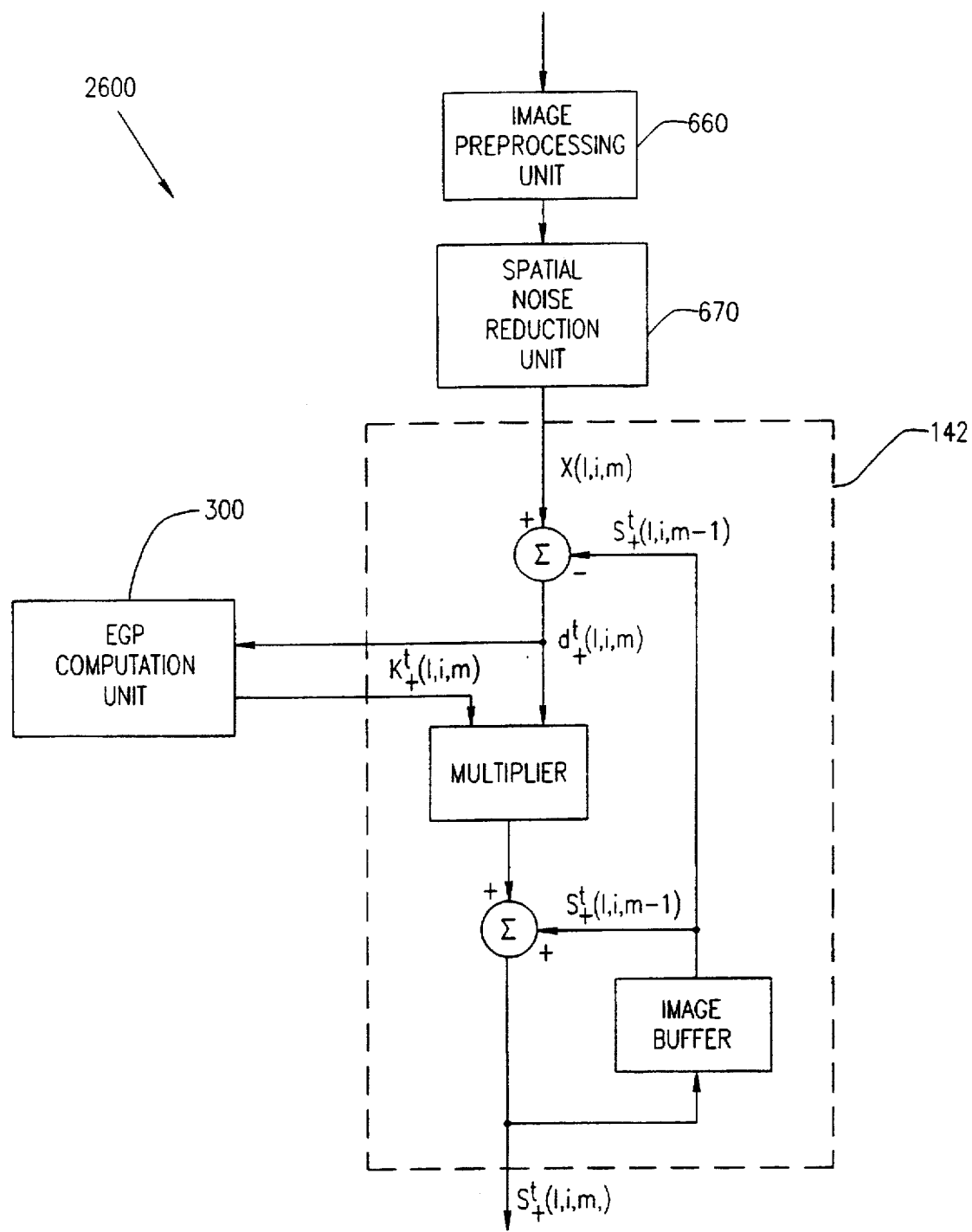
FIG. 25 is a simplified block diagram of spatio-temporal noise reduction apparatus which is operative to provide spatial noise reduction and one-directional temporal noise reduction.

FIG. 25 illustrates a method and apparatus, referenced generally 2600, for spatio-temporal image noise reduction. Apparatus 2600 comprises spatial noise reduction unit 670 followed by temporal noise reduction unit 142 which interacts with estimation gain parameter computation unit 300. It is intended here that improved spatio-temporal noise reduction may be achieved by incorporating spatial signal information such as $sigma_{AC}$ and $sigma_{DC}$ in unit 550 or |Xac(i)| and $sigma_{DC}$ in unit 600 in the control of $K_+'(l,i,m)$ of unit 142. For example in decompressed JPEG or MPEG image sequences, in-block AC signal measures can be compared to temporal difference signals $d_+'(l,i,m)$. In instances where $d_+'(l,i,m) >> |Xac(l,i,m)|$, there is indication that the $d_+'$ signal is caused by image motion rather than by quantization noise and this may increase the setting of $K_+'(l,i,m)$ such that reduced temporal smoothing occurs at that pixel.

Figure 26:
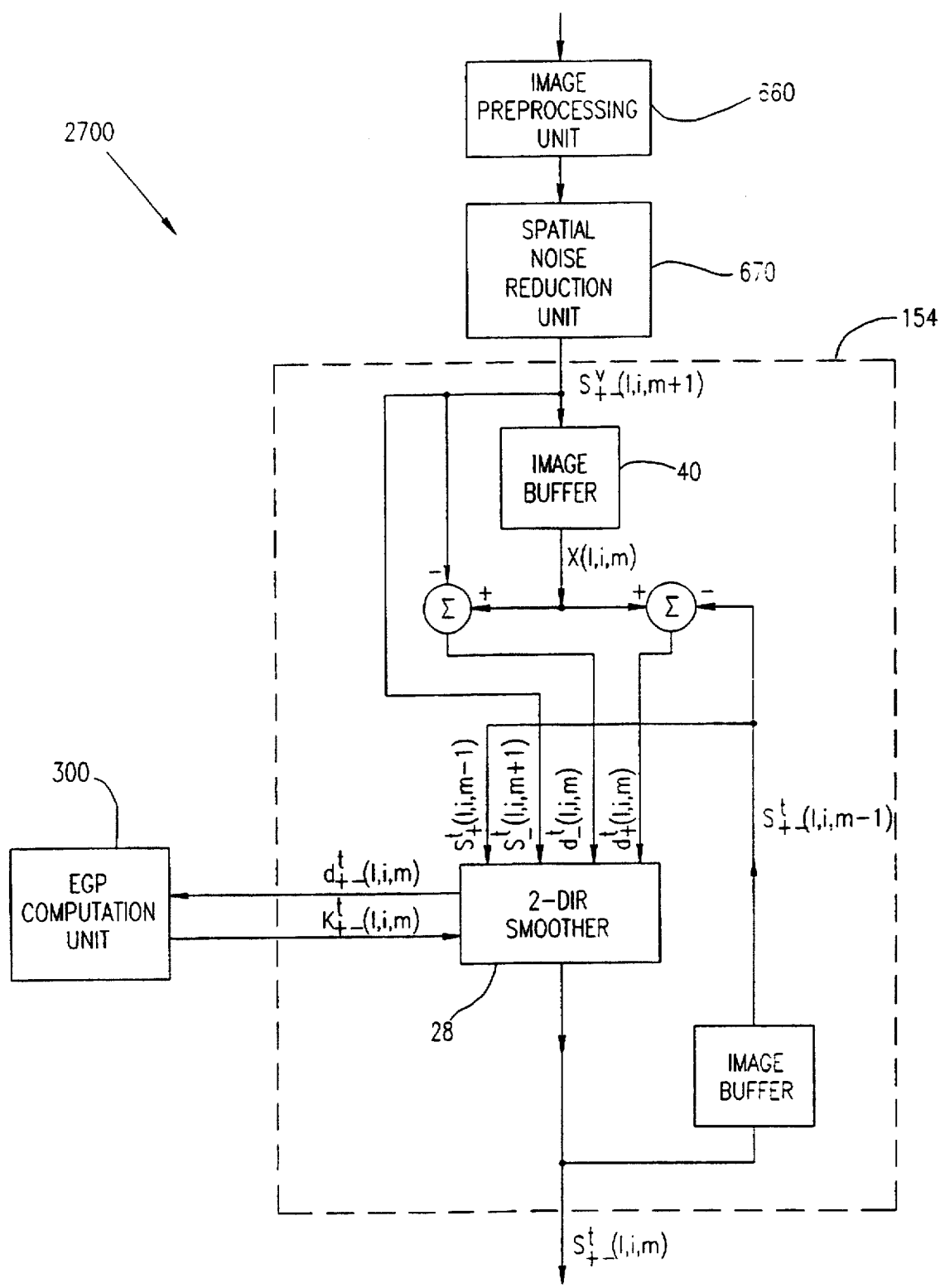
FIG. 26 is a simplified block diagram of a modification of the apparatus of FIG. 25 in which the temporal noise reduction is "pseudo 2-directional" instead of one-directional.

FIG. 26 illustrates method and apparatus, referenced generally 2700, for spatio-temporal image noise reduction. Apparatus 2700 differs from apparatus 2600 in that it uses temporal smoothing unit 154. Otherwise all considerations are similar.

Figure 27:
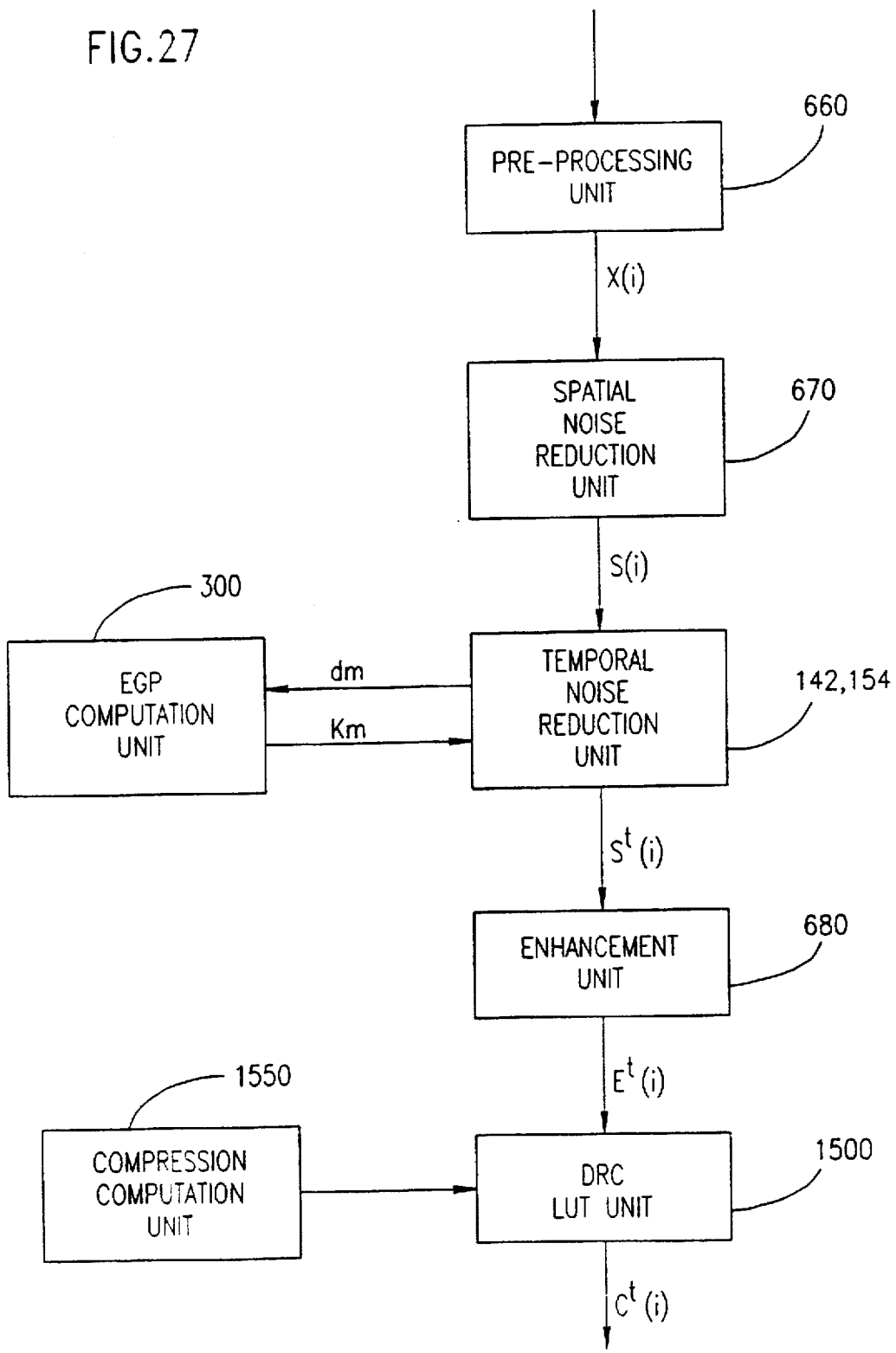
FIG. 27 is a simplified block diagram of apparatus for combined spatial noise reduction, temporal noise reduction, enhancement and dynamic range compression.

FIG. 27 illustrates general block diagram for spatio-temporal dynamic range compression whereby spatial pre-smoothing of the image precedes temporal noise reduction units 142 or 154. The output of the temporal noise reduction unit is then enhanced by enhancement unit 680. By combining spatio-temporal noise reduction with enhancement and dynamic range compression operations, spatial information may be employed to control temporal filtering and vice versa.

It is appreciated that the apparatus and methods for image smoothing, enhancing and interpolating, shown and described above with reference to FIGS. 1–27 and also below with reference to FIGS. 35–43, are useful in a very wide variety of applications. Sample applications are now described with reference to FIGS. 28–34.

Figure 28:
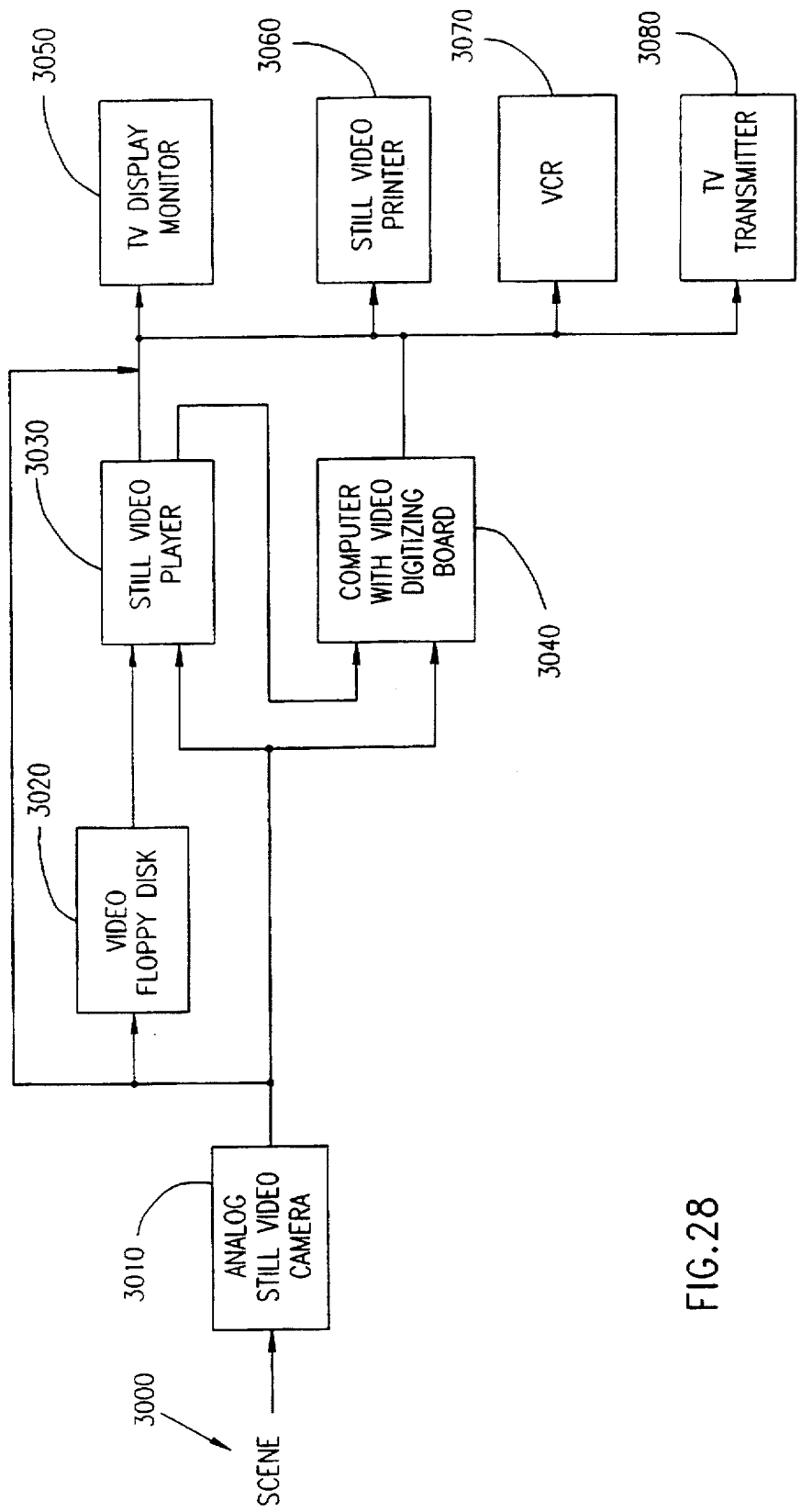
FIG. 28 is a simplified block diagram of improved analog still video equipment incorporating the apparatus for image smoothing, enhancing and interpolating shown and described hereinabove with reference to FIGS. 1-27.

Reference is made to FIG. 28 which is a simplified block diagram of improved analog still video equipment incorporating the apparatus for image smoothing, enhancing and interpolating and dynamic range compression shown and described herein.

The apparatus of FIG. 28 includes an analog still video camera 3010 which photographs a scene 3000. The analog video signal generated by camera 3010 may be stored on a suitable medium, such as a video floppy disk 3020, for subsequent replay on a suitable device such as a still video player 3030.

The analog video signal generated by analog still video camera 3010 or the signal stored on video floppy disk 3020 may be provided to a computer 3040 equipped with a digitizing video board which is operative to digitize the signal and then to further modify the digitized signal as per user instructions. For example, the computer 3040 may perform color modifications on the digitized signal.

The original signal as stored on video floppy disk 3020 or as provided on-the-fly, or the modified digital signal provided by computer 3040, is provided to an output device such as a TV display monitor 3050, a still video printer 3060 or a VCR 3070. Alternatively, the signal may be remotely transmitted, via a TV transmitter 3080, to a remote output device for immediate display or for storage on a suitable medium such as a video floppy disk.

Any of the image smoothing, enhancing and interpolating and dynamic range compression systems shown and described herein with reference to FIGS. 1–27 may be incorporated into the apparatus of FIG. 28 at any one of the following points:

a. Any of the image smoothing, enhancing, interpolating and dynamic range compression systems shown and described herein with reference to FIGS. 1–27, including variations on the systems specifically shown and described which combine features of the various systems specifically shown and described, can be incorporated as IC's and/or VLSI's and/or DSP's within any of the following components of FIG. 28: camera 3010, video player 3030, digitizing computer 3040, TV display monitor 3050, still video printer 3060, VCR 3070 and TV transmitter 3080.

b. Any of the image smoothing, enhancing, interpolating and dynamic range compression systems shown and described herein with reference to FIGS. 1–27, apart from the analog to digital conversion in preprocessing unit 12, but including variations on the systems specifically shown and described which combine features of the various systems specifically shown and described, can be implemented in software and incorporated into the software of digitizing computer 3040.

Figure 29:
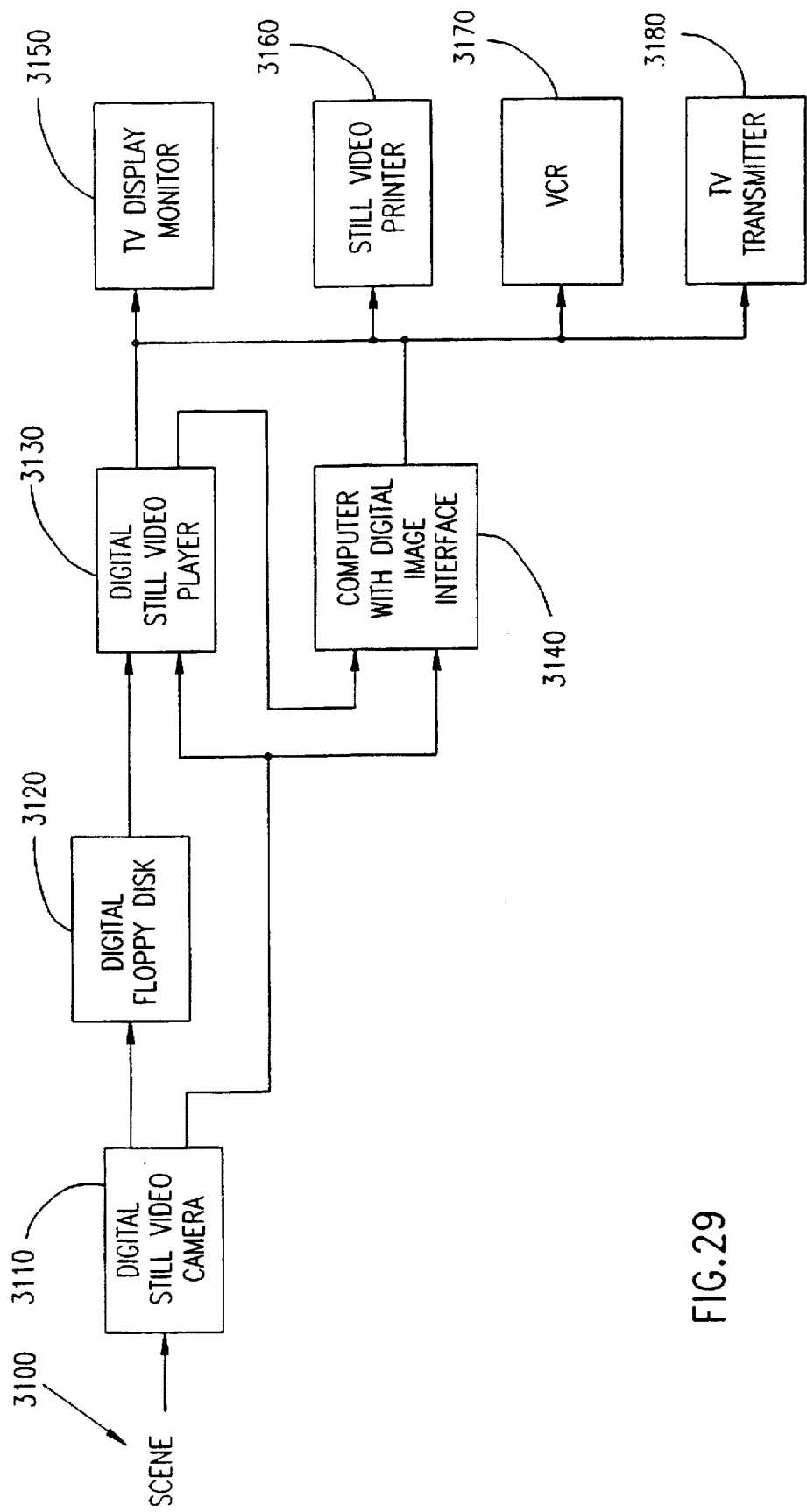
FIG. 29 is a simplified block diagram of improved digital still video equipment incorporating the apparatus for image smoothing, enhancing and interpolating shown and described hereinabove with reference to FIGS. 1-27.

Reference is made to FIG. 29 which is a simplified block diagram of improved digital still video equipment incorporating the apparatus for image smoothing, enhancing and interpolating shown and described herein.

The apparatus of FIG. 29 includes a digital still video camera 3110 which photographs a scene 3100 and digitizes and stores the acquired digital image onto digital floppy disk 3120 in uncompressed or compressed mode such as JPEG image compression standard, for subsequent decompression and replay on a suitable device such as a digital still video player 3130.

The digital compressed or uncompressed video image signal generated by digital still video camera 3110 or the signal stored on digital floppy disk 3120 may be provided to a computer 3140 equipped with an appropriate digital interface, which is operative to further decompress and modify the digital signal as per user instructions. For example, the computer 3140 may perform color modifications on the digital decompressed signal. The original signal as stored on digital floppy disk 3120 or as provided directly from digital still video camera 3110, or the modified digital signal provided by computer 3140, is provided to an output device such as a TV display monitor 3150, a still video printer 3160 or a VCR 3170. Alternatively, the signal may be remotely transmitted, via a TV transmitter in the form of standard modem equipment, to a remote output device for immediate display or for storage on a suitable medium. The image smoothing, enhancing, interpolating and dynamic range compression shown and described herein with reference to FIGS. 1–27 may be incorporated into the apparatus of FIG. 29 at any one of the following junctures:

a. Any of the image smoothing, enhancing, interpolating and dynamic range compression systems shown and described herein with reference to FIGS. 1–27, including variations on the systems specifically shown and described which combine features of the various systems specifically shown and described, can be incorporated as integrated circuits and VLSI's and/or DSP's within any of the following components of FIG. 29: camera 3110, video player 3130, computer 3140, TV display monitor 3150, still video printer 3160, VCR 3170 and TV transmitter 3180.

b. Any of the image smoothing, enhancing, interpolating and dynamic range compression systems shown and described herein with reference to FIGS. 1–27, apart from the analog to digital conversion in preprocessing unit 12, but including variations on the systems specifically shown and described which combine features of the various systems specifically shown and described, can be implemented in software and incorporated into software of computer 3140.

Figure 30:
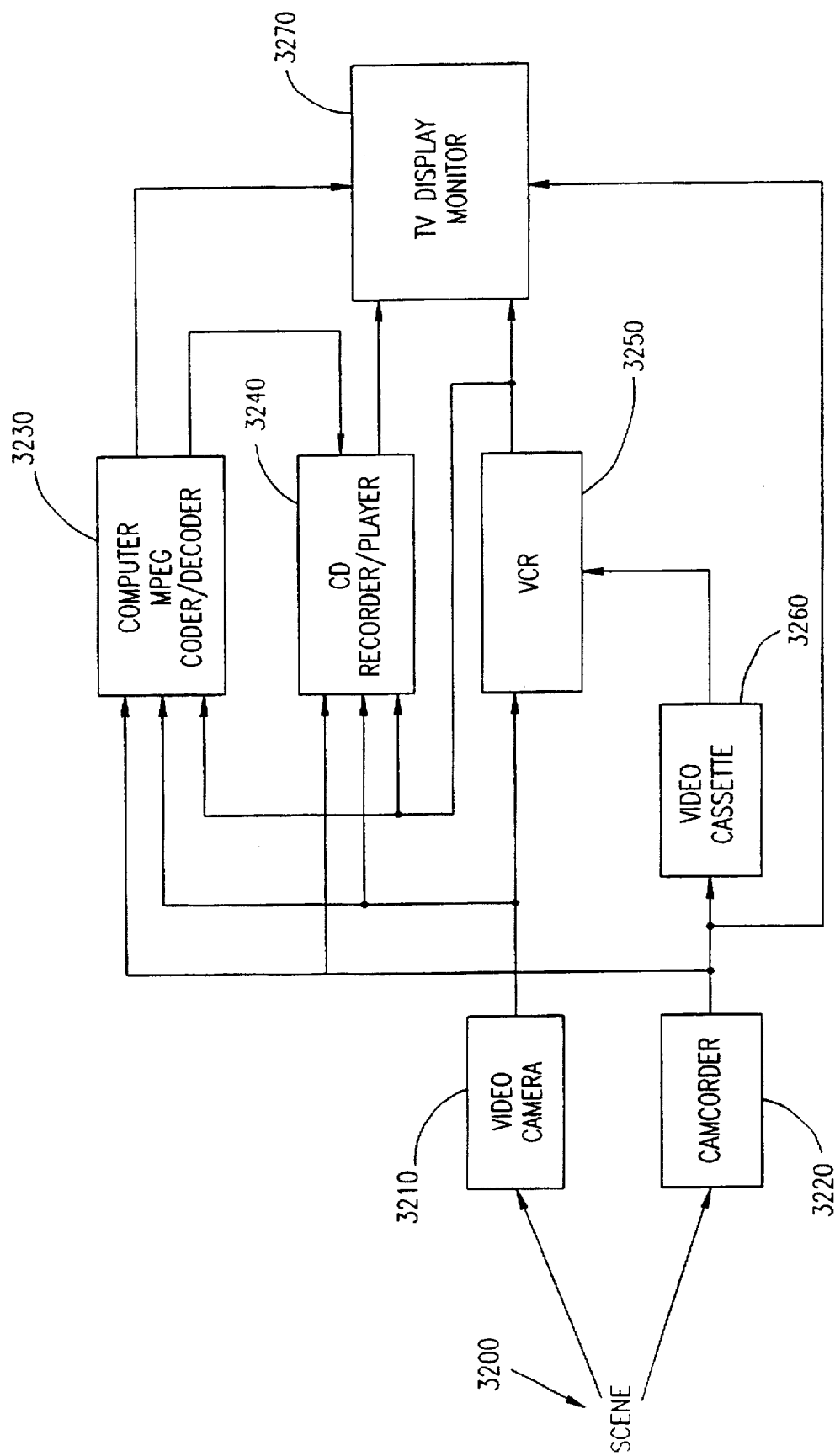
FIG. 30 is a simplified block diagram of improved analog and digital moving video equipment incorporating the apparatus for image smoothing, enhancing and interpolating shown and described hereinabove with reference to FIGS. 1-27.

Reference is now made to FIG. 30 which is a simplified block diagram of improved analog and digital moving video equipment incorporating the apparatus for image smoothing, enhancing, interpolating and dynamic range compression shown and described herein. The apparatus of FIG. 30 includes an analog or digital video camera 3210 (and camcorder 3220) which photograph a scene 3200 and record the acquired analog video onto VCR 3250 (onto built in recorder of camcorder) or digital video onto digital VCR 3250 in uncompressed or compressed mode such as JPEG or MPEG image compression standard. The analog video recording is useful for subsequent display on TV display 3270 or digitization onto computer 3230 or CD recorder 3240 and later display onto TV display 3270. The digital video recording is useful for display onto digital TV display 3270 and storage onto CD recorder 3240 and computer 3230. Computer 3230 and CD player 3240 can decompress the stored moving video and display the video onto TV display 3270. Recorded video in all formats can then be replayed and edited and improved for example by computer 3230 on MPEG compressed video sequences for authoring applications. The image smoothing, enhancing, interpolating and dynamic range compression shown and described herein with reference to FIGS. 1–27 may be incorporated into the apparatus of FIG. 30 at any one of the following junctures:

a. Any of the image smoothing, enhancing, interpolating and dynamic range compression systems shown and described herein with reference to FIGS. 1–27, including variations on the systems specifically shown and described which combine features of the various systems specifically shown and described, can be incorporated as integrated circuits and VLSI's and/or DSP's within any of the following components of FIG. 30: cameras 3210 and 3220, VCR 3250, computer 3230, CD recorder/player 3240, TV display monitor 3270.

b. Any of the image smoothing, enhancing, interpolating and dynamic range compression systems shown and described herein with reference to FIGS. 1–27, apart from the analog to digital conversion in preprocessing unit 12, but including variations on the systems specifically shown and described which combine features of the various systems specifically shown and described, can be implemented in software and incorporated into software of digitizing computer 3230.

Figure 31:
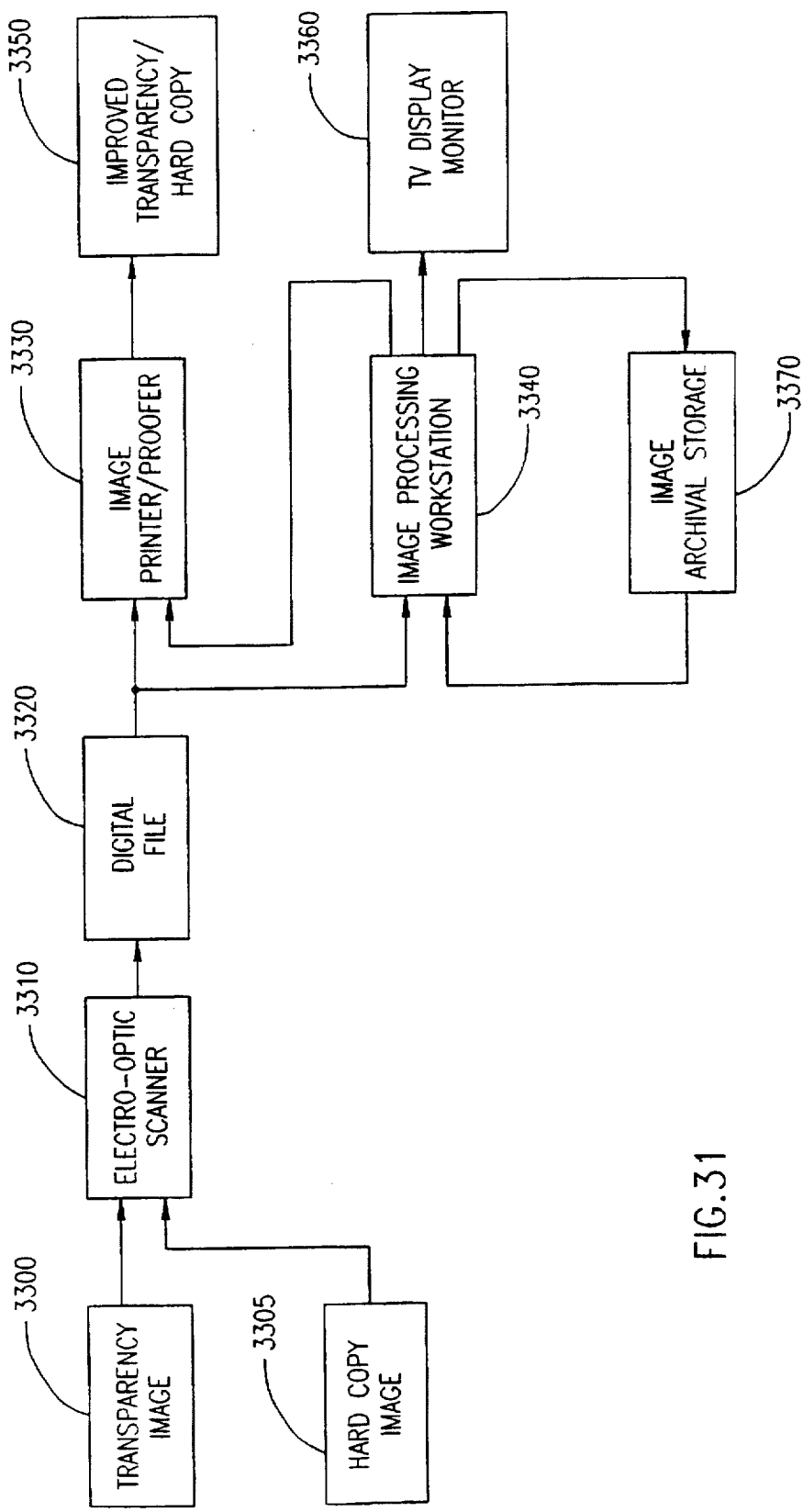
FIG. 31 is a simplified block diagram of improved image scanning equipment incorporating the apparatus for image smoothing, enhancing and interpolating shown and described hereinabove with reference to FIGS. 1-27.

Reference is now made to FIG. 31 which is a simplified block diagram of improved image scanning, display and reproducing incorporating the apparatus for image smoothing, enhancing, interpolating and dynamic range compression shown and described herein. The apparatus of FIG. 31 includes an electro-optic scanner 3310 which scans a transparency image 3300 or hard copy image 3305, and stores the scanned image in a digital file 3320. The digital image file 3320 is useful for subsequent printout on printer 3330 of improved harcopy 3350, and for further image processing on workstation 3340. Improved image can then be displayed on TV display 3360, printout on printer 3330 and image storage arcive 3370. The image smoothing, enhancing, interpolating and dynamic range compression shown and described herein with reference to FIGS. 1–27 may be incorporated into the apparatus of FIG. 31 at any one of the following junctures:

a. Any of the image smoothing, enhancing, interpolating and dynamic range compression systems shown and described herein with reference to FIGS. 1–27, including variations on the systems specifically shown and described which combine features of the various systems specifically shown and described, can be incorporated as integrated circuits and VLSI's and/or DSP's within any of the following components of FIG. 31: scanner 3310, image printer 3330, workstation 3340, TV display monitor 3270.

b. Any of the image smoothing, enhancing, interpolating and dynamic range compression systems shown and described herein with reference to FIGS. 1–27, apart from the analog to digital conversion in preprocessing unit 12, but including variations on the systems specifically shown and described which combine features of the various systems specifically shown and described, can be implemented in software and incorporated into software of workstation 3340.

Figure 32:
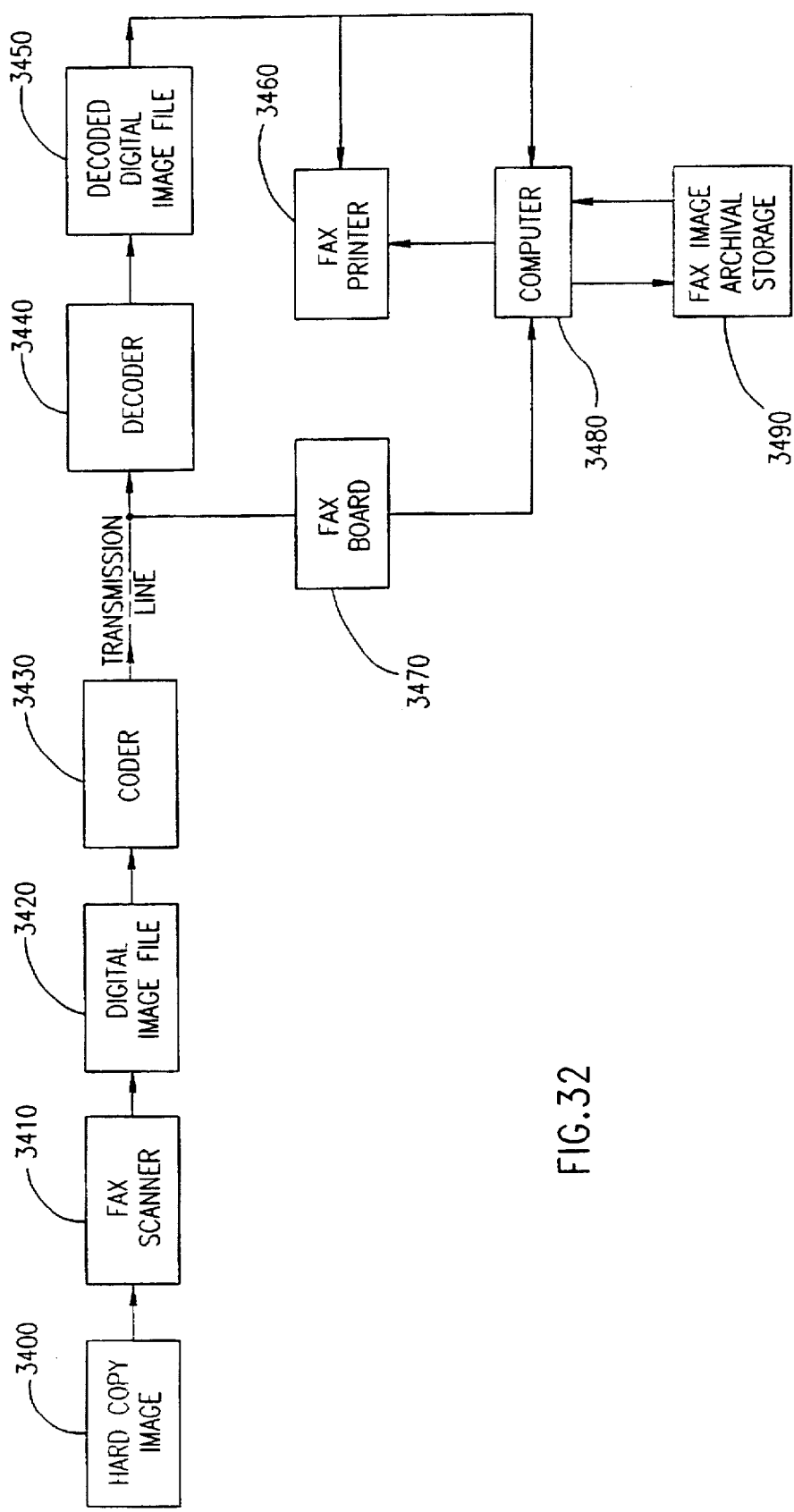
FIG. 32 is a simplified block diagram of improved facsimile equipment incorporating the apparatus for image smoothing, enhancing and interpolating shown and described hereinabove with reference to FIGS. 1-27.

Reference is made to FIG. 32 which is a simplified block diagram of improved fax image scanning, coding, transmission, decoding, processing, display and storage incorporating the apparatus for image smoothing, enhancing, interpolating and dynamic range compression shown and described herein. The apparatus of FIG. 32 includes an electro-optic fax scanner 3410 which scans a hard copy image 3400, and stores the scanned image in a digital file 3420. The digital image file 3420 is useful for subsequent coding 3430 and transmission. Upon reception, the the encoded image file is decoded by 3440 or 3470, for further improvement, processing and analysis in computer 3480, and fax printout 3460 and fax image archiving 3490. The image smoothing, enhancing, interpolating and dynamic range compression shown and described herein with reference to FIGS. 1–27 may be incorporated into the apparatus of FIG. 32 at any one of the following junctures:

a. Any of the image smoothing, enhancing, interpolating and dynamic range compression systems shown and described herein with reference to FIGS. 1–27, including variations on the systems specifically shown and described which combine features of the various systems specifically shown and described, can be incorporated as integrated circuits and VLSI's and/or DSP's within any of the following components of FIG. 32: fax scanner 3410, fax coder 3430, and units 3440, 3460, 3470 and 3480.

b. Any of the image smoothing, enhancing, interpolating and dynamic range compression systems shown and described herein with reference to FIGS. 1–27, apart from the analog to digital conversion in preprocessing unit 12, but including variations on the systems specifically shown and described which combine features of the various systems specifically shown and described, can be implemented in software and incorporated into software and DSP software of fax scanner 3410 and of coder 3430, and of units 3440, 3460, 3470 and 3480.

Figure 33:
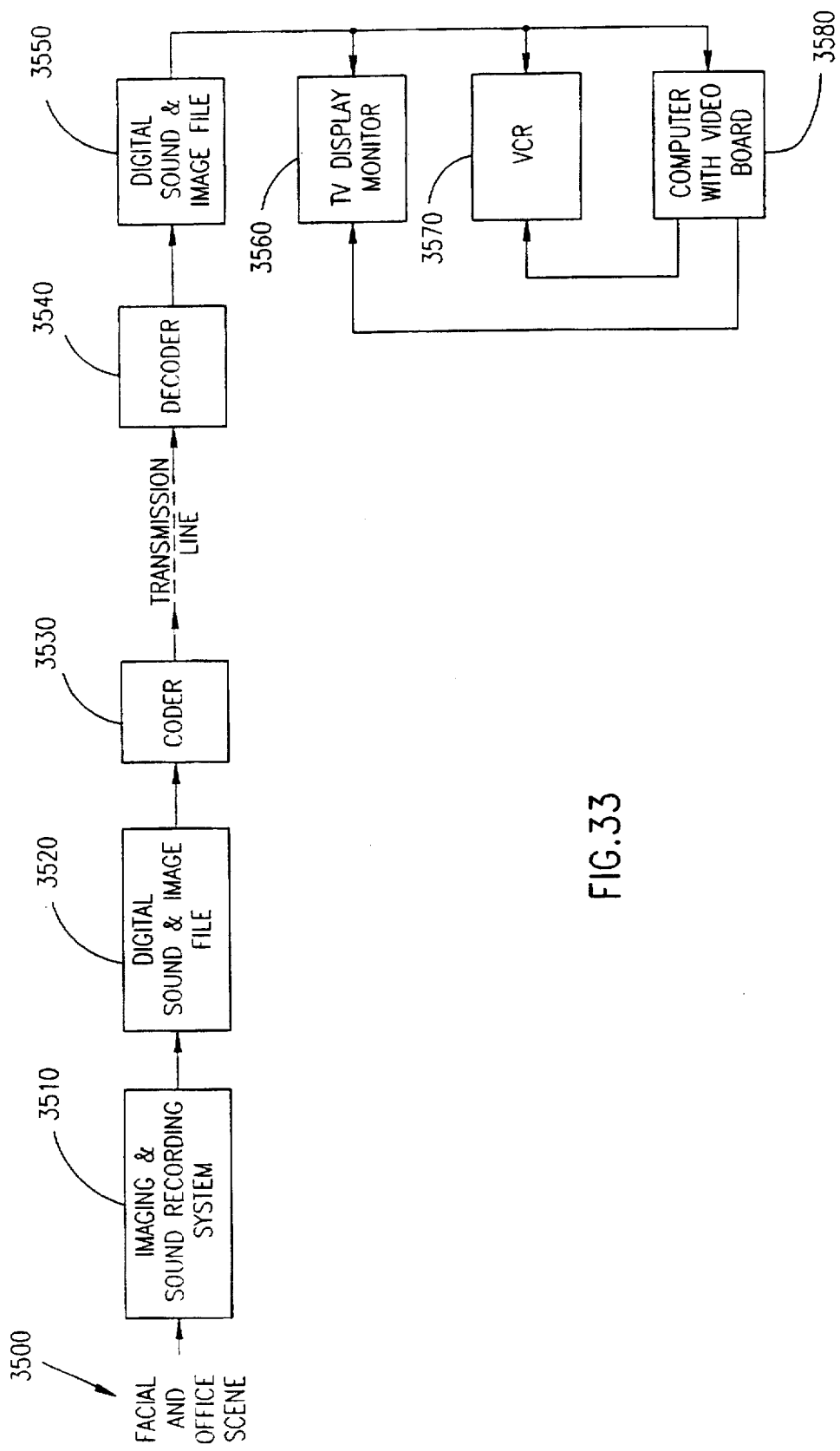
FIG. 33 is a simplified block diagram of improved teleconferencing and videophone equipment incorporating the apparatus for image smoothing, enhancing and interpolating shown and described hereinabove with reference to FIGS. 1-27.

Reference is now made to FIG. 33 which is a simplified block diagram of improved teleconferencing system of televising, coding, transmitting, receiving, decoding, analysis, display and recording incorporating the apparatus for image smoothing, enhancing, interpolating and dynamic range compression shown and described herein. The apparatus of FIG. 33 includes an imaging system 3510, which televises a typical conference scene 3500, and compresses the video information via CCITT H.261 or MPEG or JPEG coding schemes 3530. The coded data is transmitted via ISDN or satelite or telephone lines to a remote location, where it is decoded 3540, and displayed onto TV display 3560, recorded on VCR 3570 or further analyzed on computer 3580 for subsequent display and recording. The image smoothing, enhancing, interpolating and dynamic range compression shown and described herein with reference to FIGS. 1–27 may be incorporated into the apparatus of FIG. 33 at any one of the following junctures:

a. Any of the image smoothing, enhancing, interpolating and dynamic range compression systems shown and described herein with reference to FIGS. 1–27, including variations on the systems specifically shown and described which combine features of the various systems specifically shown and described, can be incorporated as integrated circuits and VLSI's and/or DSP's within any of the following components of FIG. 33: imaging system 3510, coder 3530, decoder 3540, computer 3580.

b. Any of the image smoothing, enhancing, interpolating and dynamic range compression systems shown and described herein with reference to FIGS. 1–27, apart from the analog to digital conversion in preprocessing unit 12, but including variations on the systems specifically shown and described which combine features of the various systems specifically shown and described, can be implemented in software and incorporated into software and DSP software of computer 3580.

Figure 34:
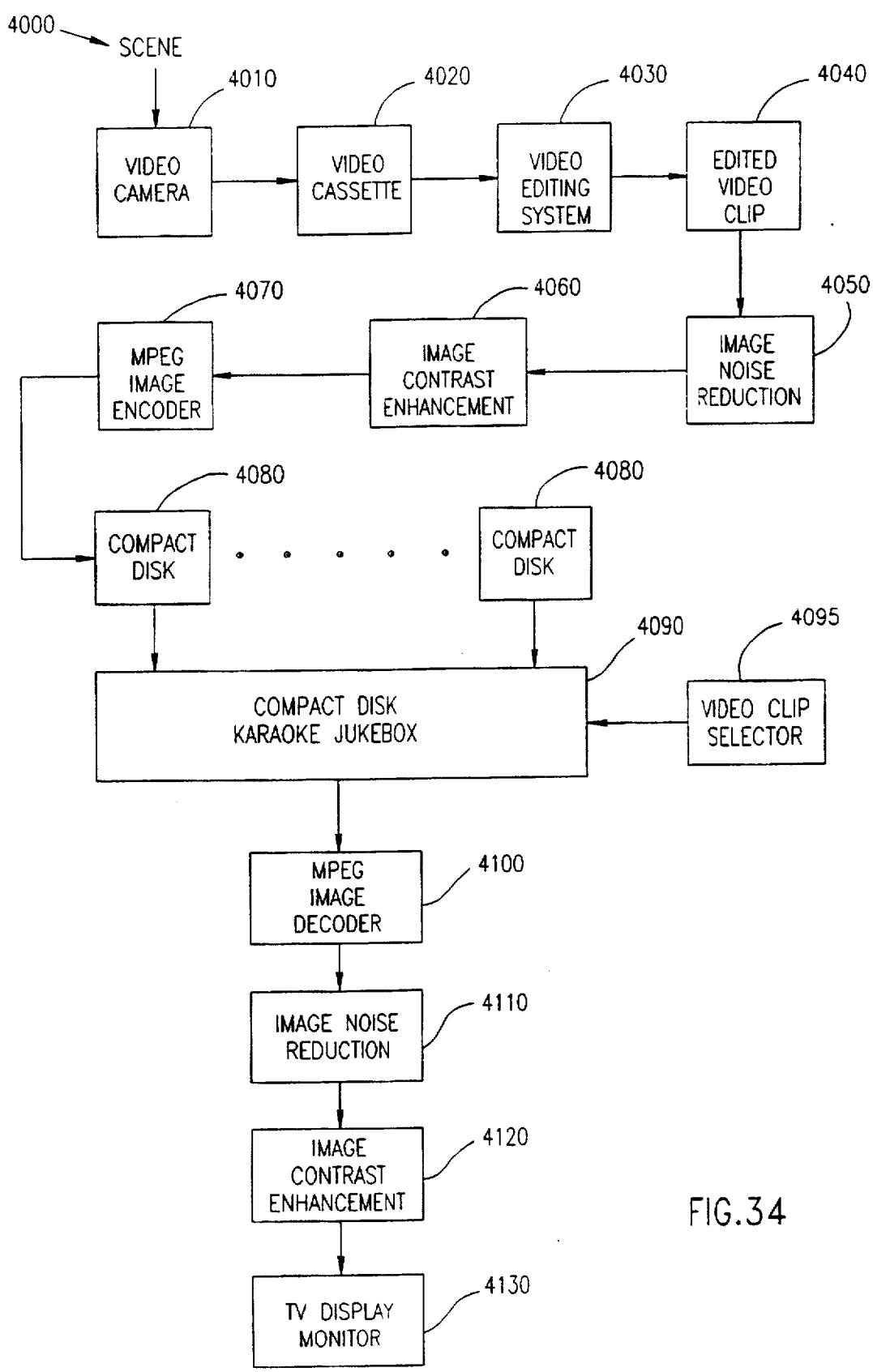
FIG. 34 is a simplified block diagram of improved equipment for providing Karaoke entertainment, incorporating the apparatus for image smoothing, enhancing and interpolating shown and described hereinabove with reference to FIGS. 1-27.

Reference is now made to FIG. 34 which is a simplified block diagram of improved Karaoke entertainment system of televising, video recording, video editing, MPEG encoding, compact disk storage, compact disk playback on jukebox, decoding, MPEG decoding and TV display incorporating the apparatus for image smoothing, enhancing, interpolating and dynamic range compression shown and described herein. The apparatus of FIG. 34 includes an imaging system 4010, which televises a typical romantic and musical scene 4000, records it on video cassette 4020, and video edited on 4030 resulting in edited video clips 4040. Selected clips are then MPEG encoded in 4070, and stored on CDs 4080. The coded data is selectively read and MPEG decoded in 4100, for display 4130.

The image smoothing, enhancing, interpolating and dynamic range compression shown and described herein with reference to FIGS. 1–27 may be incorporated into the apparatus of FIG. 34. Specifically, any of the image smoothing, enhancing, interpolating and dynamic range compression systems shown and described herein with reference to FIGS. 1–27, including variations on the systems specifically shown and described which combine features of the various systems specifically shown and described, can be implemented in DSPs and incorporated as integrated circuits and VLSI's within any of the following components of FIG. 34: image noise reduction 4050, image contrast enhancement 4060, MPEG encoder 4070, MPEG decoder 4100, image noise reduction 4110, image contrast enhancement 4120, and TV display 4130.

Figure 35:
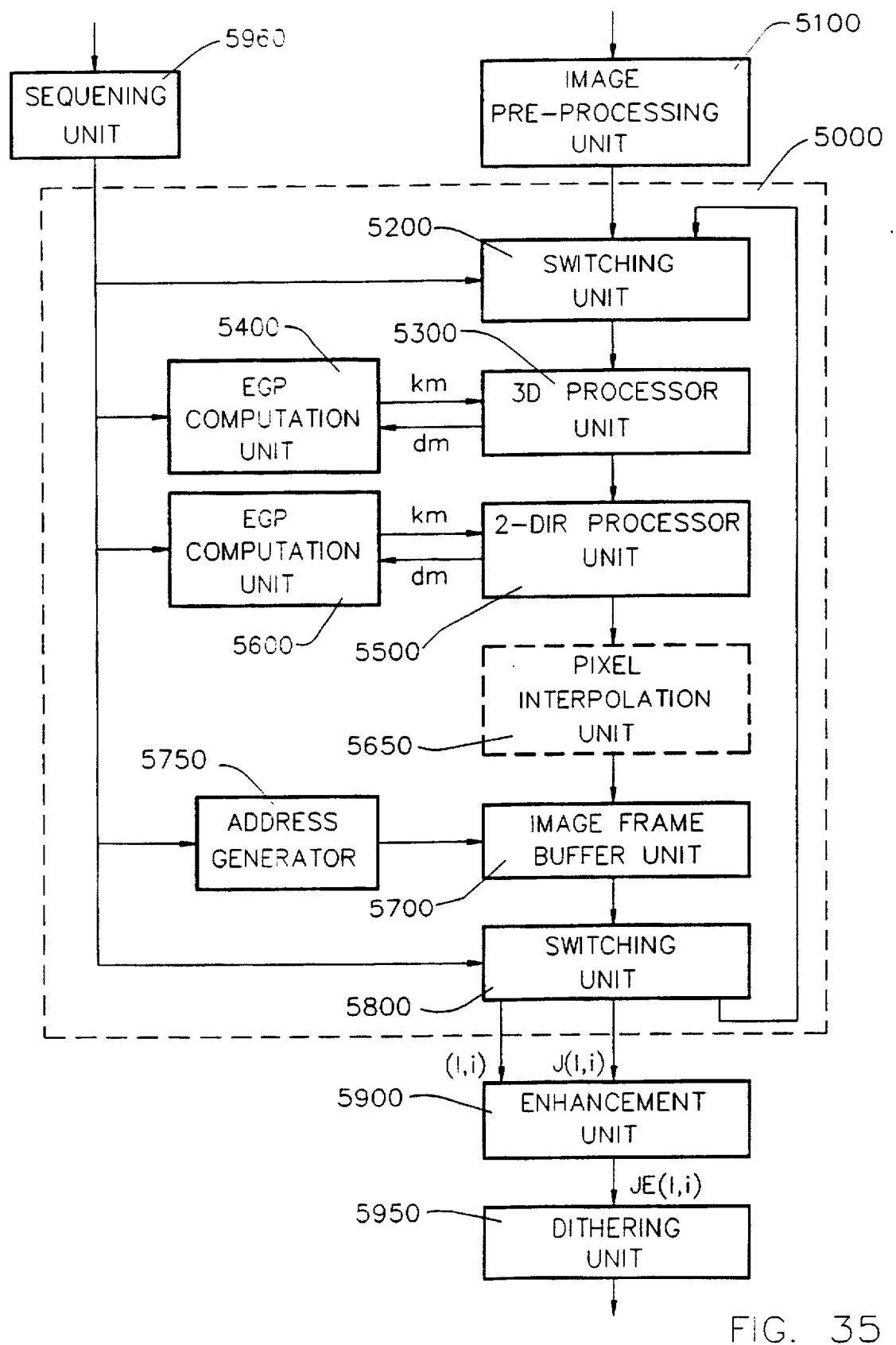
FIG. 35 is a simplified block diagram of sequenced spatial noise reduction/image enhancement apparatus particularly useful for decompressed JPEG images and raw video images.

Reference is now made to FIG. 35 which is a simplified block diagram of spatial noise reduction/image enhancement apparatus particularly useful for decompressed JPEG images and raw video images. The apparatus of FIG. 35 has an optional image magnification feature implemented by a pixel interpolation unit.

JPEG is a lossy, block encoding image compression standard intended primarily for still imagery (useful also for moving imagery). In the encoding operation of JPEG, image data is first converted into its DCT frequency components, and then quantized using user-defined "quantization tables" (see Reference 10).

Higher frequency DCT components which contain fine image details and are generally regarded as less sensitive to human vision, are quantized in JPEG more coarsely than the low frequency components, and are often discarded at high compression ratios.

Unfortunately, the lossy process of JPEG compression cannot be regarded as a simple "masking" operation of the high frequency components, whereby the resulting image would be a low-pass version of the original. The missing high frequency image data lost in the process of JPEG compression, often reduces the subjective quality of the image by introducing visually disturbing noisy artifacts which are perceived as block effects in flat image areas, and as edge ("mosquito" noise) effects along high contrast edges. The degree to which these effects become visible depends on several factors, including the nature of the input image data, the quantization tables of the DCT components and the compression ratio used.

The following elements of FIG. 35 are each similar to elements in previous figures which have been described above and therefore are not further described herein for brevity. Specifically:

| Reference numeral | Similar to unit . . . |
| --- | --- |
| 5100 | Unit 340 in FIG. 15 |
| 5300 | Unit 350 in FIG. 15 |
| 5400 | Unit 352 in FIG. 15 |
| 5500 | Unit 360 in FIG. 15 |
| 5600 | Unit 362 in FIG. 15 |

Switching unit 5200 may be a conventional switch which is operative to select the output of either image preprocessing unit 5100 or switching unit 5800, in accordance with a selection determining input arriving from a sequencing unit 5960.

An optional pixel interpolation unit 5650 is operative to magnify the noise reduced image output of 2-directional processor unit 5500 by interpolating between the pixel values of the noise reduced image. The pixel interpolation unit 5650 may, for example, be similar to the apparatus of FIG. 24, described in detail above.

Optionally, a pixel interpolation scheme, described in Equations 49 and 50, may be incorporated into unit 2100 of FIG. 24 to replace the pixel replication operation of unit 2100. The interpolations described in Equations 49 and 50 are typically applied first along one image dimension, then along the second image dimension.

An intermediate image frame buffer unit 5700 stores the intermediate results of the "n'th pass" processing of units 5300, 5500 and, optionally, 5650, so as to enable these intermediate results to be fed back into "(n+1)th pass" processing via switching units 5800 and 5200.

An address generator 5750 is controlled by sequencing unit 5960 which determines the dimension/s and direction/s in and along which the image will be processed, and the order in which the various dimension/s and direction/s will be processed.

The sequencing unit 5960 determines the number of passes which are to be performed on the image. For example, the number of passes may be determined in accordance with the amount of noise in the image and/or to suit the specific application and/or in accordance with user preference.

Switching unit 5800 may be a conventional switch which is operative to provide the output of intermediate image frame buffer unit 5700 either to switching unit 5200 for additional processing or to an enhancement unit 5900 and a dithering unit 5950 for enhancement, dithering and subsequent output.

A suitable implementation of enhancement unit 5900 for JPEG applications is described below with reference to FIG. 41. A suitable implementation of enhancement unit 5900 for raw video applications is described above with reference to FIG. 22.

Dithering unit 5950 is operative to generate and add a random noise value to each pixel, in accordance with user-selected or default noise characteristic settings, such as uniformly distributed noise or Gaussian distributed noise, having a standard deviation of approximately 1–3 gray levels.

The apparatus functionally represented in FIG. 35 can, with the exception of the image frame memory unit 5700, be implemented in a single VLSI chip designed to generally support the noise reduction units 5300 and 5500, enhancement unit 5900, interpolation unit 5650 and dithering unit 5950 as described above.

Figure 38:
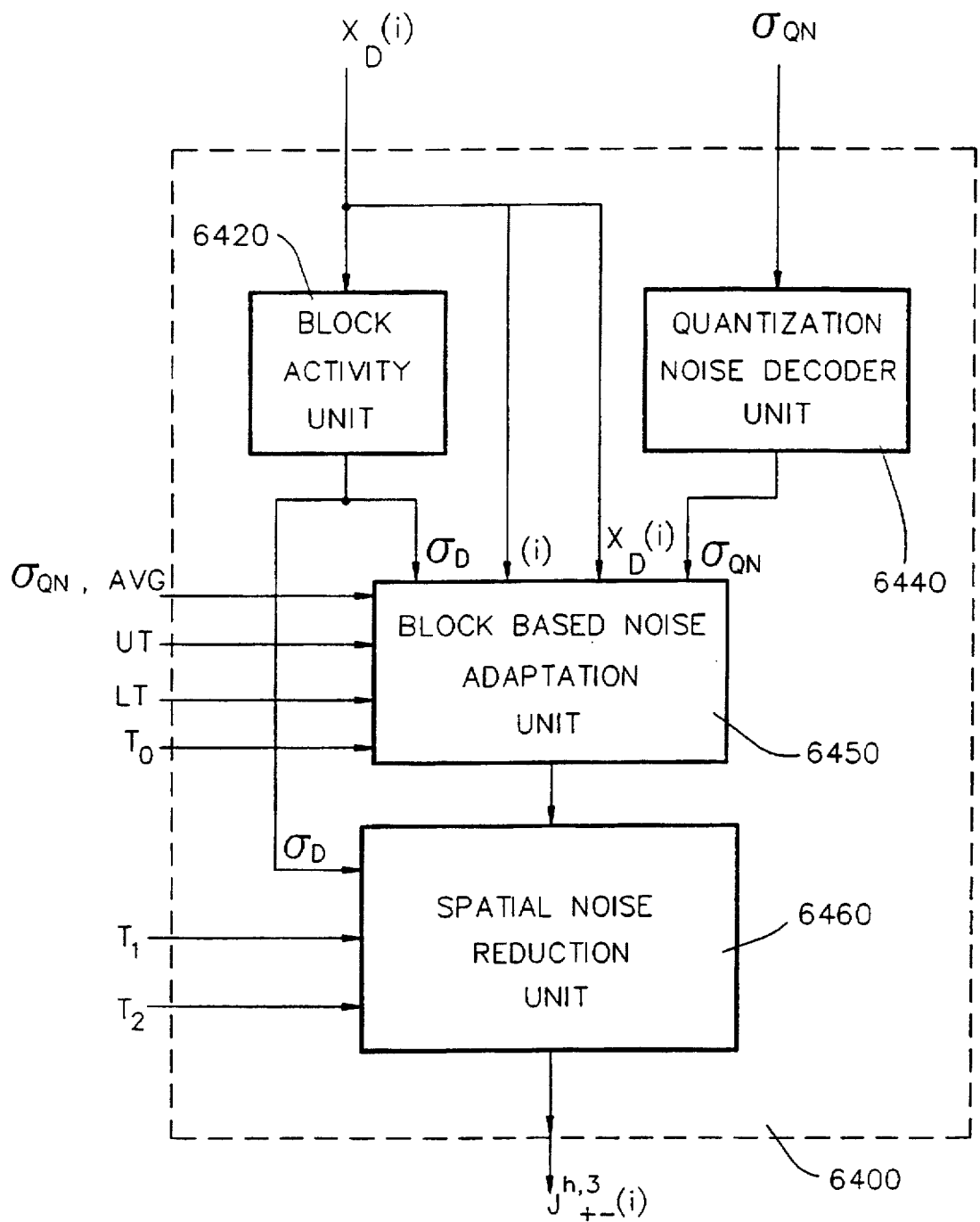
FIG. 38 is a simplified block diagram of apparatus for post-processing for reducing noise in JPEG decompressed images.

In applications where several processing passes are executed on the image data, some computed parameters, such as sigma$_n$ determined by unit 6400 of FIG. 38, may be stored in overlay planes in the external image frame buffer unit 5700 which may be implemented as a DRAM device. This enables each separate block or pixel to have a respective control parameter, hence providing increased control capabilities for the processing passes.

In addition, the VLSI device may include a sequencing unit similar to unit 5960 of FIG. 35, which is designed to control and operationalize the sequence of functions along with their respective processing parameters. The sequencing unit may be further controlled by a micro-processor which provides a convenient means of communicating with the VLSI device.

Line buffers which are used in unit 5300, unit 5500, unit 5650 and unit 5900 may be shared in cases where the processing functions are applied in sequence. After each processing, the result may first be stored in the frame buffer unit 5700, and then returned to the next processing unit in the sequence. The sequence of operations may be user selected, or may depend on the application, or may depend on the input image.

Figure 36:
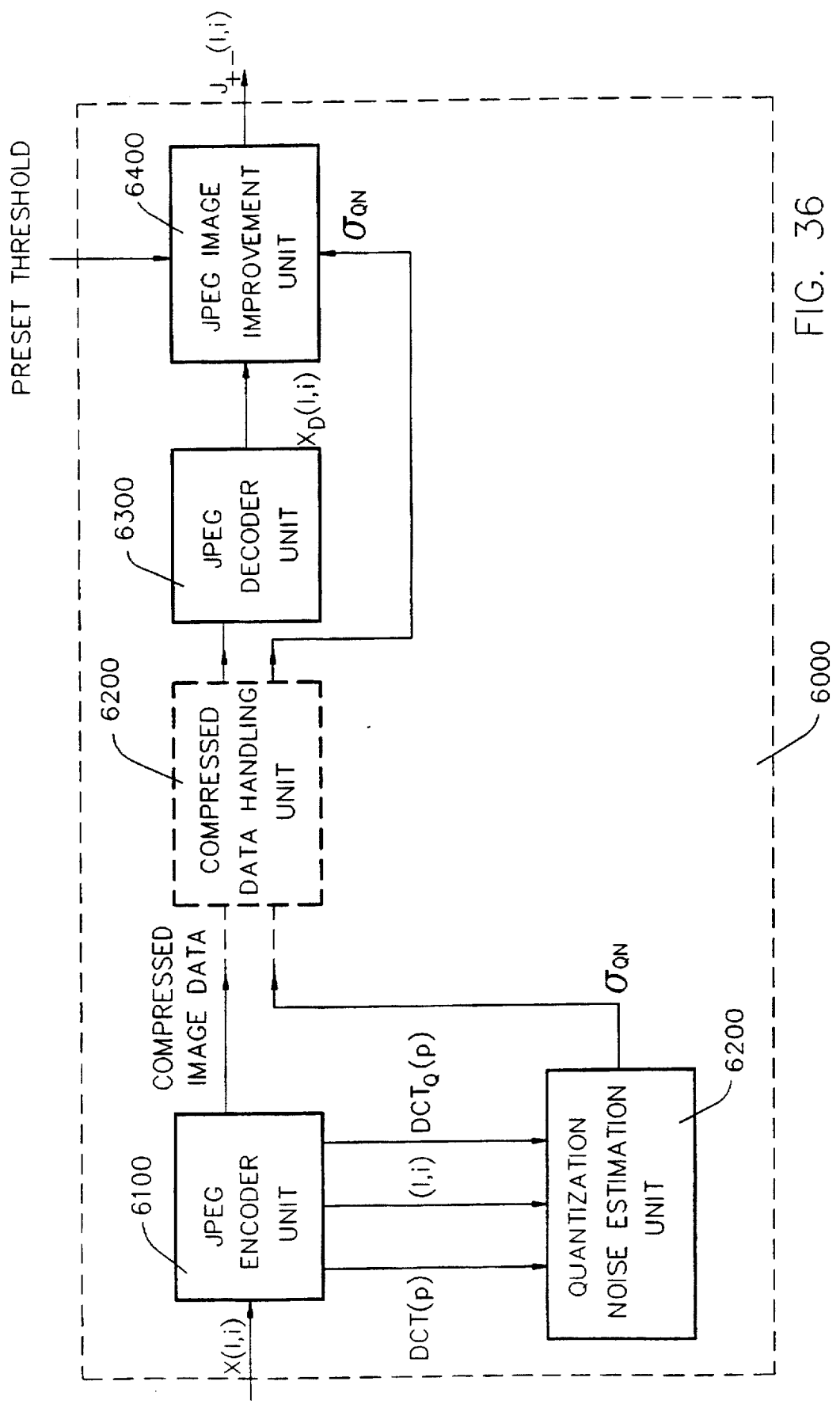
FIG. 36 is a simplified block diagram of apparatus for JPEG noise reduction.
Figure 37:
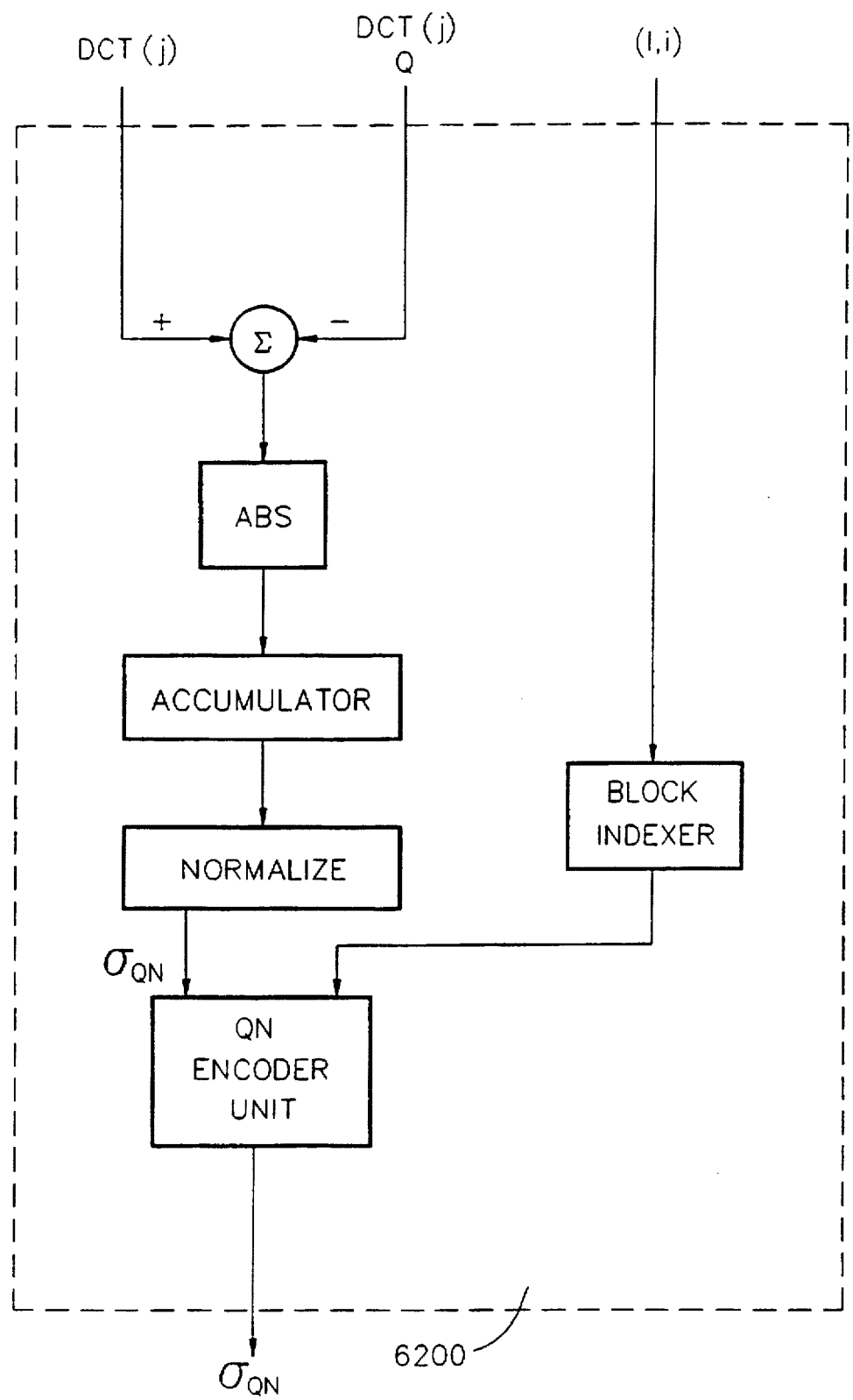
FIG. 37 is a simplified block diagram of apparatus for estimating quantization noise of a block encoding compressor such as a JPEG compressor.

Reference is now made to FIG. 36, a preferred embodiment for post-processing JPEG improvement apparatus useful in reducing block noise and edge noise in JPEG decompressed imagery. As such, the method can be regarded and designed as an add-on module to the standard JPEG process in compliance with compatibility requirements to the standard. Moreover, it can also be useful in the development of an improved non-standard JPEG scheme, for special applications requiring "visually lossless" compression such as graphic arts, DTP and pre-press applications.

DCT compression errors are regarded in this context as compression noise. This noise is non-linearly proportional to the compression ratio, and the respective quantization scheme used for the DCT component compression (quantization tables, or selective component discarding). Moreover, different images and image regions often contain different spatial power spectral distributions. Therefore, the compression noise is also dependent on the particular image and specific image region in question.

The method described with reference to FIG. 36 is a signal to noise (SNR) dependent processing scheme. Therefore, in order to apply it to DCT compression noise in decompressed imagery, the quantization noise standard deviation $sigma_{QN}$ must either be computed or estimated from the available image signals. There are several alternatives to the determination of $sigma_{QN}$, depending on the accessible image signals at the time of the computation or estimation.

It is generally assumed that each block's $sigma_{QN}$ should be estimated, and that within each block the noise is stationary; that is the $sigma_{QN}$ measure is equally representative of the noise within the entire block.

Generally, $sigma_{QN}$ can be computed estimated at the encoding stage estimated or at the decoding stage of the compression system.

At the encoding stage, the original image signal as well as the DCT compressed components are both generally accessible. The noise $sigma_{QN}$ can therefore be computed directly by Equations 51A–D, set forth at the end of the Detailed Description section, rather than estimated. Once block-based sigmaQN measures are computed, they must be encoded efficiently and associated with the JPEG file. The encoding of $sigma_{QN}$ values can be achieved by various methods, including: (a) quantization of $sigma_{QN}$ values, (b) differential coding schemes based on the spatial correlation of block-based $sigma_{QN}$, (c) a globally computed and encoded numerical or functional mapping (for example, least squares) from sigmaD to $sigma_{QN}$, where sigmaD denotes the decompressed image signal standard deviation in the corresponding block and defined in Equations 52A and 52B, set forth at the end of the Detailed Description section, and where $sigma_{QN}$ can be recovered in the decoding stage by computing sigmaD, (d) global estimates of $sigma_{QN}$ measures such as $sigma_{QN}$.avg (the average $sigma_{QN}$ in the image) and $sigma_{QN}$.max (the maximum $sigma_{QN}$ in the image), and (e) combinations of (a)–(d). As shown in FIG. 36, the encoded data stream of $sigma_{QN}$ values may be handled separately from the standard JPEG encoded image file, in which case the image file format retains compatibility with standard decoders.

At the JPEG image decoding stage, the decompressed image is post-processed for removing noise and enhancing contrasts. If pre-processed data on $sigma_{QN}$ is available in the image file or in a separately decoded corresponding file, then the image improvement post-processing can use this information to tune the processing. Otherwise, the post-processing resorts to estimating $sigma_{QN}$ per block from the available decompressed image data.

An efficient method to compute $sigma_{QN}$ per block at the encoding stage is by Equation 51A or 51B by using Parseval's relation on the difference between the input image DCT components to the corresponding quantized ones. The $sigma_{QN}$ represents the actual root mean square error between the original block data and the quantized block data. Alternatively, the root mean square error can also be computed on the difference between the input to decompressed image signals in each block, as in Equations 51C or D.

The processing methods described in this disclosure are signal to noise dependant, and use LUTs and multiplications for achieving the adaptive noise reduction processing. Generally, the LUTs given in FIG. 14 unit 318, are intended to store an adaptive multiplication operand, namely the estimation gain parameter—K factor as a function of input SNR. There are several alternatives in using LUTs and multiplications, for example (a) the use of large LUTs for one-directional processing which store the result of a multiplication rather than having to multiply, and small LUTs which store K values which are subsequently multiplied in the two-directional processing, or (b) the use of small LUTs for both one-directional and two-directional processing and subsequent multiplications. The LUTs need cover not more than the range of SNR input values 0.25<SNR<8.

The small LUTs can receive normalized input signals reflecting the SNR values, where the noise normalization factors are essentially the block-based $sigma_{QN}$ values. In the case of small LUTs, $sigma_{QN}$ values can be rounded to powers of 2 (1, 2, 4, 8, 16, 1 32 etc), such that the SNR computation (noise normalization) can be achieved by bit shifting rather than by division. A minimal number of slots in the small LUTs which provide sufficient visual quality range between 16 to 256 bytes, covering non-uniformly the SNR range of 0.25<SNR<8.

Large LUTs store the pre-computed result of the adaptive multiplication, and hence must cover the entire input and output dynamic range (typically 10 to 12 bits, or 1024 to 4096 addresses at 10 to 12 bits/address). Hence, normalization for SNR values is not necessary. However, separate LUTs are required for each noise figure $sigma_{QN}$. In typical imaging applications, the rounding of noise figures to powers of two requires not more than 4 to 5 large LUTs.

For typical JPEG applications, $sigma_{QN}$ values between 1 and 8 occur most often at compression ratios of up to 20:1. Per block and per color separation, this requires 2 (or at most 3) bits of information. This information can be further encoded efficiently due to the high correlation between the color planes of the blocks, and the spatial correlation between the $sigma_{QN}$ values of the adjoining blocks. The encoded data stream of $sigma_{QN}$ values is computed in quantization noise estimation unit 6200 in FIGS. 36 and 37, and later decoded by the JPEG image improvement unit 6400 depicted in FIG. 36. Such encoding possibilities are elaborated below.

Due to the highly correlated image regions which are often characterized by stationary statistics, spatial differential coding followed by Huffman coding is expected to perform very well on the $sigma_{QN}$ statistic. Preferably, the proposed spatial encoding scheme for $sigma_{QN}$ is similar to the DC component encoding scheme in JPEG. At the decoding stage, the $sigma_{QN}$ of each block is decoded and therefore can be incorporated in the noise reducing post-processing.

This above described scheme requires additional processing at the image encoding stage for the $sigma_{QN}$, a considerable overhead of encoded information, and a relatively simple decoding mechanism for recovering the respective $sigma_{QN}$ values at the image decoding stage.

An alternative method to encoding block-based $sigma_{QN}$ values uses a possibly monotonically increasing function or numerical relation between possibly rounded $sigma_{QN}$ and sigmaD values and is expected to be well behaved in typical imagery. By computing and encoding this function, a highly efficient coding of the $sigma_{QN}$ values can be achieved. One computational approach may be a regression analysis based on the 2D histogram of $sigma_{QN}$ outcomes vs. sigmaD values. At the decoding stage, $sigma_{QN}$ values are recovered using the decoded $sigma_{QN}$ vs. sigmaD mapping relation, and re-computed values of sigmaD for each block using either the DCT components (Parseval's relation) or the decompressed pixel values of the block, and the coded function of $sigma_{QN}$ vs. sigmaD, possibly via a LUT.

This approximate scheme is expected to perform with reduced accuracies as compared to actually computing the $sigma_{QN}$ values in the first alternative. Additionally, it is achieved by a more complicated $sigma_{QN}$ encoder, provides a significant reduction in compressed data overhead, and requires additional sigmaD processing at the image decoder stage.

Another alternative scheme for encoding the block-based $sigma_{QN}$ values is based on global $sigma_{QN}$ statistical parameters, including $sigma_{QN}$.avg, $sigma_{QN}$.max etc. Such parameters are easily computed at the image encoding stage, and their respective compression overhead is negligible since they are computed over the entire image. At the image decoding stage, these parameters are used as the default $sigma_{QN}$ parameters which are useful in better classifying blocks in terms of quantization noise estimation.

All the above described coding methods of the $sigma_{QN}$ values use some information computed at the image encoding stage. Alternative methods are required for cases where no a-priori $sigma_{QN}$ information is available from the image encoding stage or elsewhere.

In those cases where $sigma_{QN}$ information is not received by unit 6400 in FIG. 36, it is necessary to estimate $sigma_{QN}$ block-based values from the available information of the image compression system, such as known values of the dequantization tables and the block-based distribution of the quantized DCT components. For example, block-based upper bounds of the expected $sigma_{QN}$ can be estimated from the received non-zero DCT quantized components using Parseval's relation. The null components can be interpolated using a block-based image model such as a Markoff Random Field (MRF) model. Naturally, the bound estimates will be particularly sensitive to errors in the high frequency components, where the quantization error is largest, and in the null components.

Alternatively to computing an upper-bound of quantization errors from DCT components and quantization LUTs, a heuristic block classification scheme can be applied to the decompressed image, for classifying blocks in terms of their respective expected quantization noise as a function of their signal activity.

Based on the compression ratio, the average activity of a given image, and a study of sample typical imagery, several classification parameters can be manually set. For example, the average expected quantization noise $sigma_{QN}$.avg is first set by default or by a user or as a function of a global image activity measure and the compression ratio. Next, two threshold values, namely an upper threshold UT and a lower threshold LT, are set with respect to the selected value of $sigma_{QN}$.avg, and compared to the computed sigmaD of the decompressed image. For every block, the expected noise $sigma_n$ is computed in accordance with Equation 53, set forth at the end of the Detailed Description section.

This simple yet effective block classification with respect to some global activity estimates and the compression ratio, illustrates the classification of every block to one of three classes: (a) Low activity blocks, in which case less than average quantization noise is expected, (b) High activity blocks, in which case more than average quantization noise is expected, and (c) average activity blocks which is the default case. Clearly, this scheme is heuristic and rather simplistic, yet achieves good performance in typical images. The block classification computations are carried out in unit 6400 of FIG. 36. More refined block classifications typically result in improved performance.

Reference is now made to the detailed description of JPEG image improvement unit 6400 in FIG. 38. Unit 6400 is composed of four units. Block activity unit 6420 computes the decompressed block activity measure sigmaD in accordance with Equation 52, set forth at the end of the Detailed Description section. If $sigma_{QN}$ data is available, quantization noise decoder unit 6440 receives and decodes the $sigma_{QN}$ data stream. Block-based noise adaptation unit 6450 determines the respective block-based noise parameter $sigma_n$ using the available information from units 6420 and 6440. If $sigma_{QN}$ data is available, then $sigma_n$ is determined according to Equation 54, set forth at the end of the Detailed Description section. Otherwise, Equation 53, set forth at the end of the Detailed Description section, is used to determine $sigma_n$. Spatial noise reduction unit 6460, is generally similar to unit 5000 in FIG. 35 and unit 330 in FIG. 15.

In the present context of spatial compression noise reduction in unit 6460 is governed generally by two block-based parameters, namely $sigma_D$ and $sigma_n$. Moreover, JPEG post-processing for DCT compression noise reduction is preferably governed in accordance with the following guidelines:

a. Generally, in high activity blocks, $sigma_D >> sigma_{QN}$. In such cases, it is not difficult to distinguish between true signal dominated high frequency signals and noise artifacts. The former should be preserved hence smoothed conservatively, while the latter should be smoothed strongly.

b. Blocks characterized by smooth decompressed signal surfaces should be smoothed conservatively in order to retain the signal shape, such as skin tone.

c. Generally, in low activity blocks, $sigma_D < sigma_{QN}$. In such cases, there is often low contrast modulations in the block, which are distorted due to the quantization process. Typical observers prefer low contrast texture activity rather than flat surfaces. Therefore, such cases should be smoothed conservatively.

d. There are occasions of zero activity blocks where $sigma_D = 0$. This may be the outcome of one of two cases: (a) the input image block standard deviation is 0, or (b) the entire block activity has been removed by the quantization. In both cases, stronger smoothing can be applied for removing block noise effects without loss of high frequency detail signal.

e. As opposed to, for example, normally distributed noise with wide distribution tails, quantization noise is generally regarded as an amplitude-bounded process. Therefore, signals which extend "well" beyond the expected bound of the quantization noise distribution, may be regarded as legible signals and should therefore be more carefully (or conservatively) smoothed. A pixel-based signal measure is therefore called for, which can reliably classify pixels as being noise-dominated or signal-dominated.

One possible candidate for such a pixel-based reliable measure in the face of noise, is the 2nd derivative, high frequency signal measure given by $SUM1^{h,3}(i)$ in Eq. 23. When this measure exceeds some signal-dependant threshold, then the pixel may be considered as signal-dominated and should be conservatively smoothed. A possible conservative smoothing $CS^{h,3}_{+}(i)$ computation is given in Equation 55. Otherwise, if the $SUM1^{h,3}(i)$ measure does not exceed the threshold, the pixel i signal may be classified as noise-dominated, in which case the process resorts to the stronger smoothing $S^{h,3}_{+}(i)$ of Eq. 22. A preferred logical expression for this pixel-based classification is given in Equation 56, set forth at the end of the Detailed Description section, where $J^{h,3}_{+}(i)$ is the noise reduced JPEG result.

A more elaborate pixel-based classification scheme is given in Equation 57, set forth at the end of the Detailed Description section, with respect to the above mentioned guidelines a–e. In this method, if the entire block of pixels is classified as zero activity, then strong smoothing is selected for the entire block. If the block is classified as low activity, then conservative smoothing is desirable in order to preserve low contrast textures. Otherwise, pixel-based criteria are used to select strong or conservative smoothing on a pixel by pixel basis. The aim here is to perform more refined selection to avoid oversmoothing blocks in which the noise and signal are not easily distinguishable on a block basis.

Figure 39:
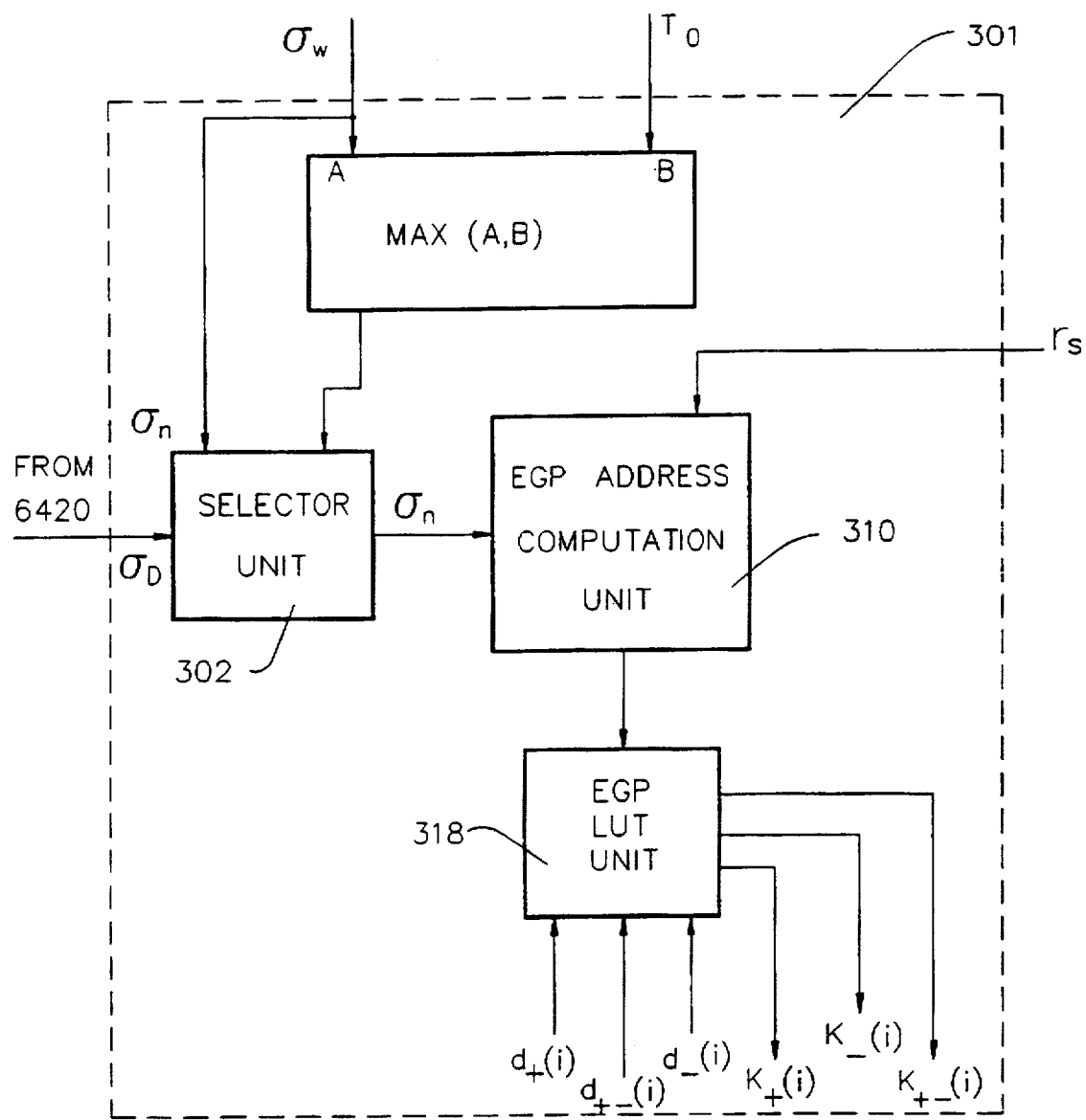
FIG. 39 is a simplified block diagram of a preferred embodiment of an EGP estimation unit operative as an alternative to unit 300 of FIG. 14.
Figure 40:
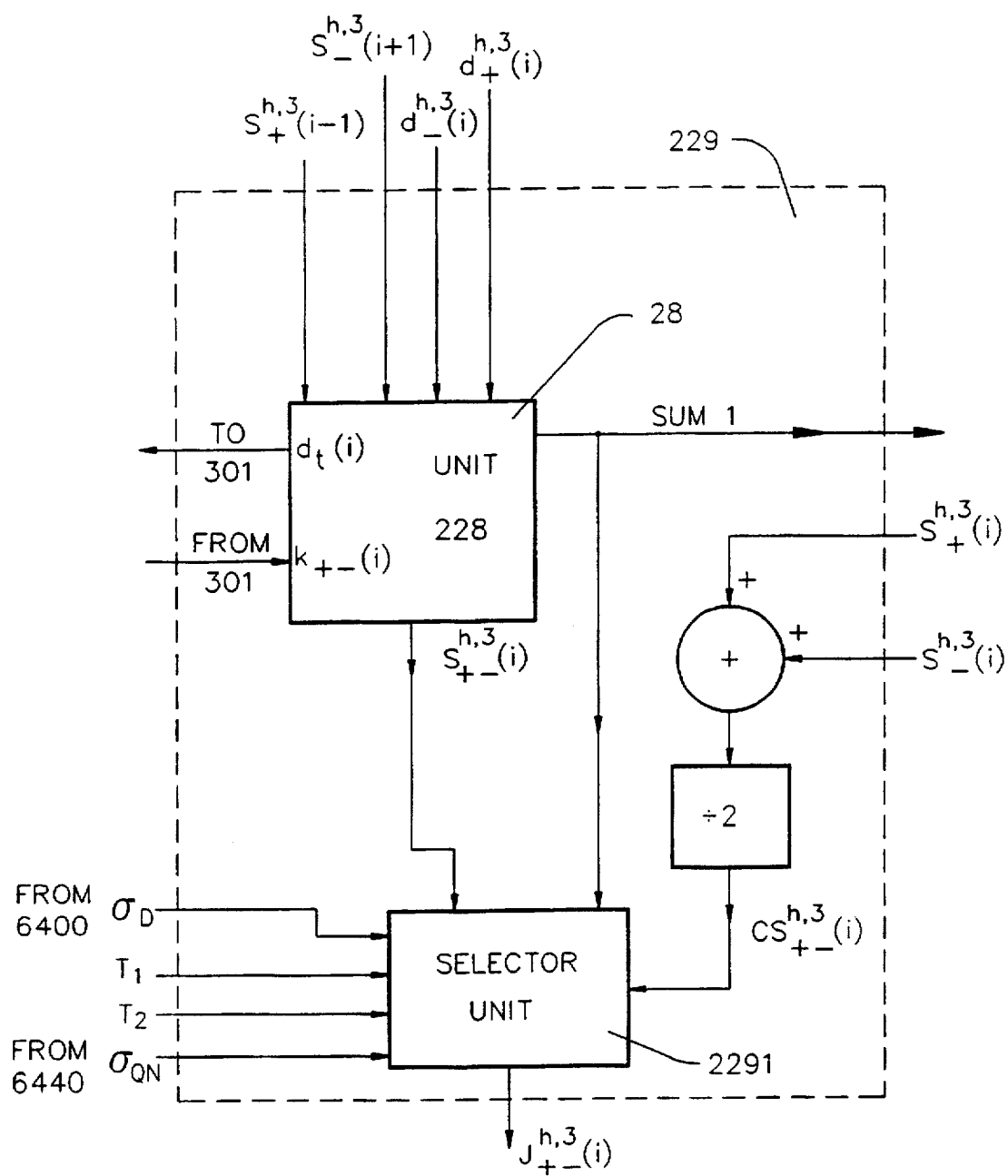
FIG. 40 is a simplified block diagram of apparatus operative to improve the noise reduction at block-encoded decompressed images in unit 6460 of FIG. 38.

As mentioned above, unit 6460 is similar to unit 5000 of FIG. 35. The operation of EGP computation unit 301 in FIG. 39 is similar to the operations of unit 5400 and of unit 5600 of FIG. 35, as described by Equation 54. Unit 229 in FIG. 40 replaces unit 228 in all relevant processing units in unit 6460 and unit 2291 may perform the operation of Equations 56 and 57.

Figure 41:
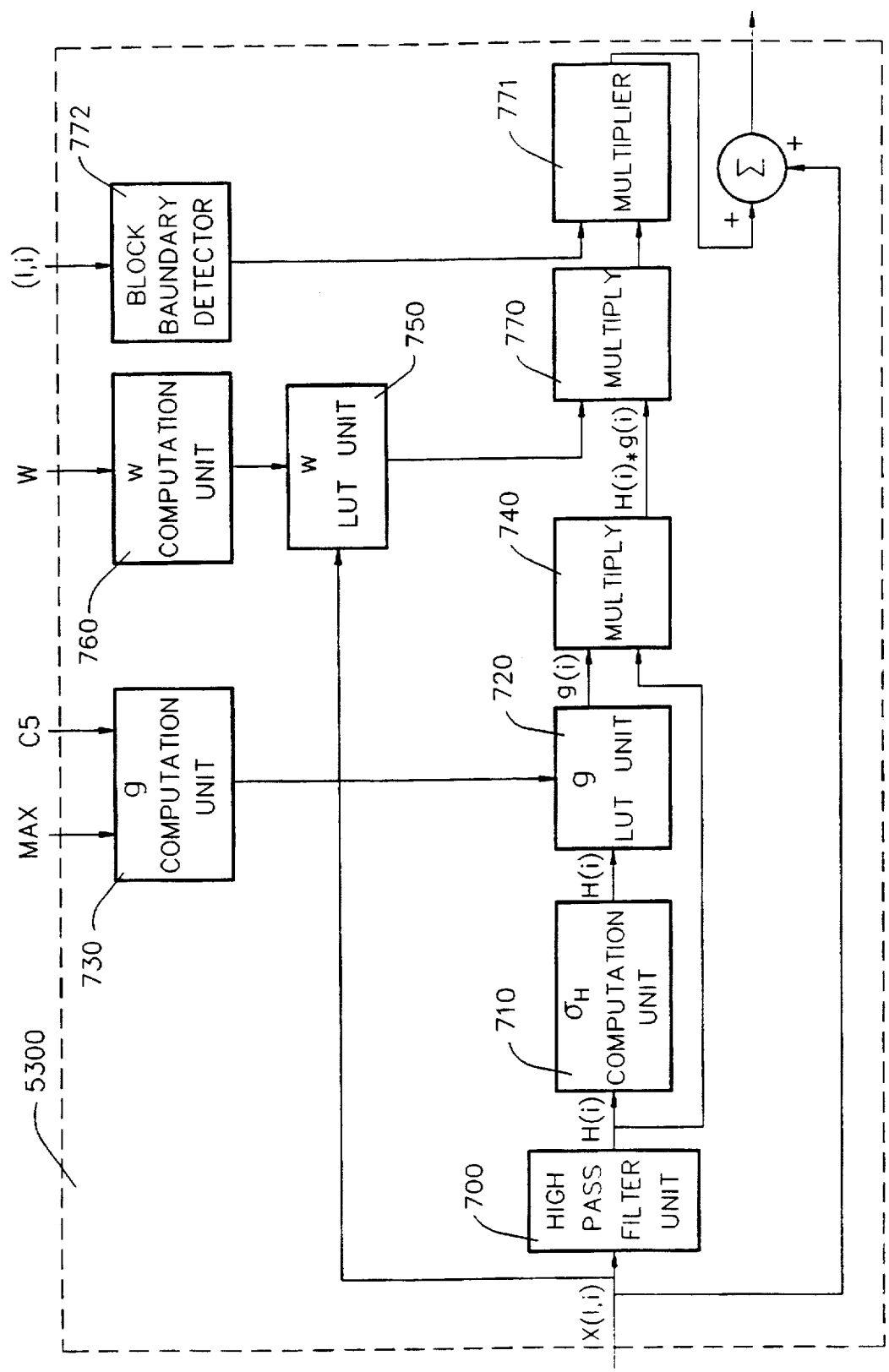
FIG. 41 is a simplified block diagram of a preferred embodiment of enhancement unit 5900 of FIG. 41 which is suitable for block-encoding applications, such as JPEG.

Unit 5900 in FIG. 41 depicts a high frequency enhancement scheme similar to unit 680 in FIG. 22, equipped with a coding block boundary detector, which scales the amount of effective enhancement as a function of pixel location with respect to block boundaries. Such scaling may be dependent not only on the location along the boundary, but also within the block, i.e. how far deep is the pixel within the block, and how contrasty and consistent is the transition along the block boundary, as compared to the signal activities in each adjoining blocks.

Figure 42:
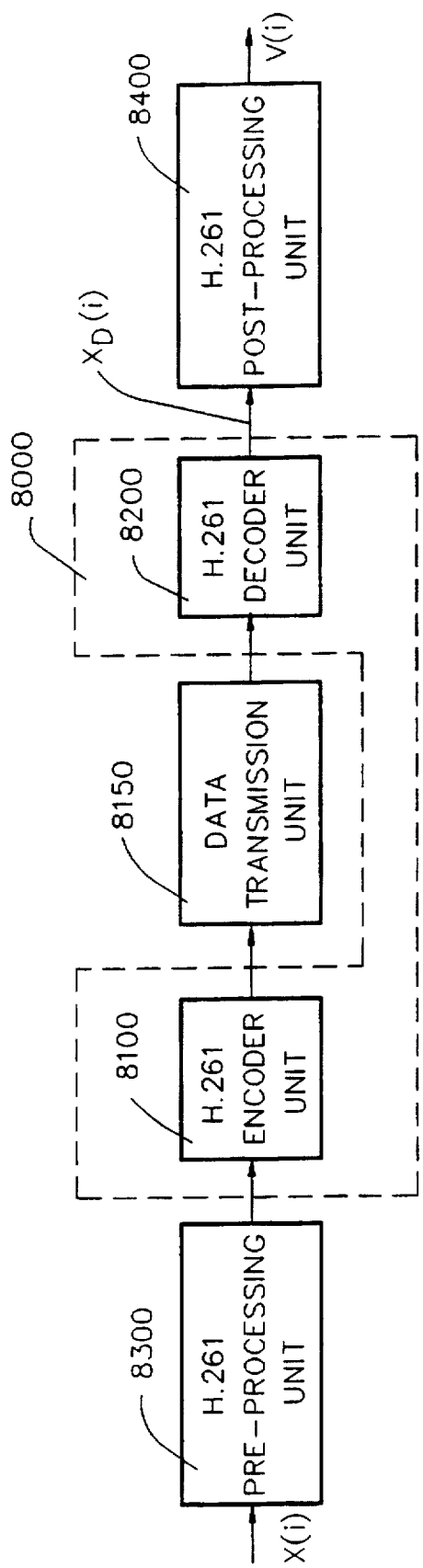
FIGS. 42-43 are simplified block diagrams of spatial noise reduction/image enhancement apparatus for H.261 applications.
Figure 43:
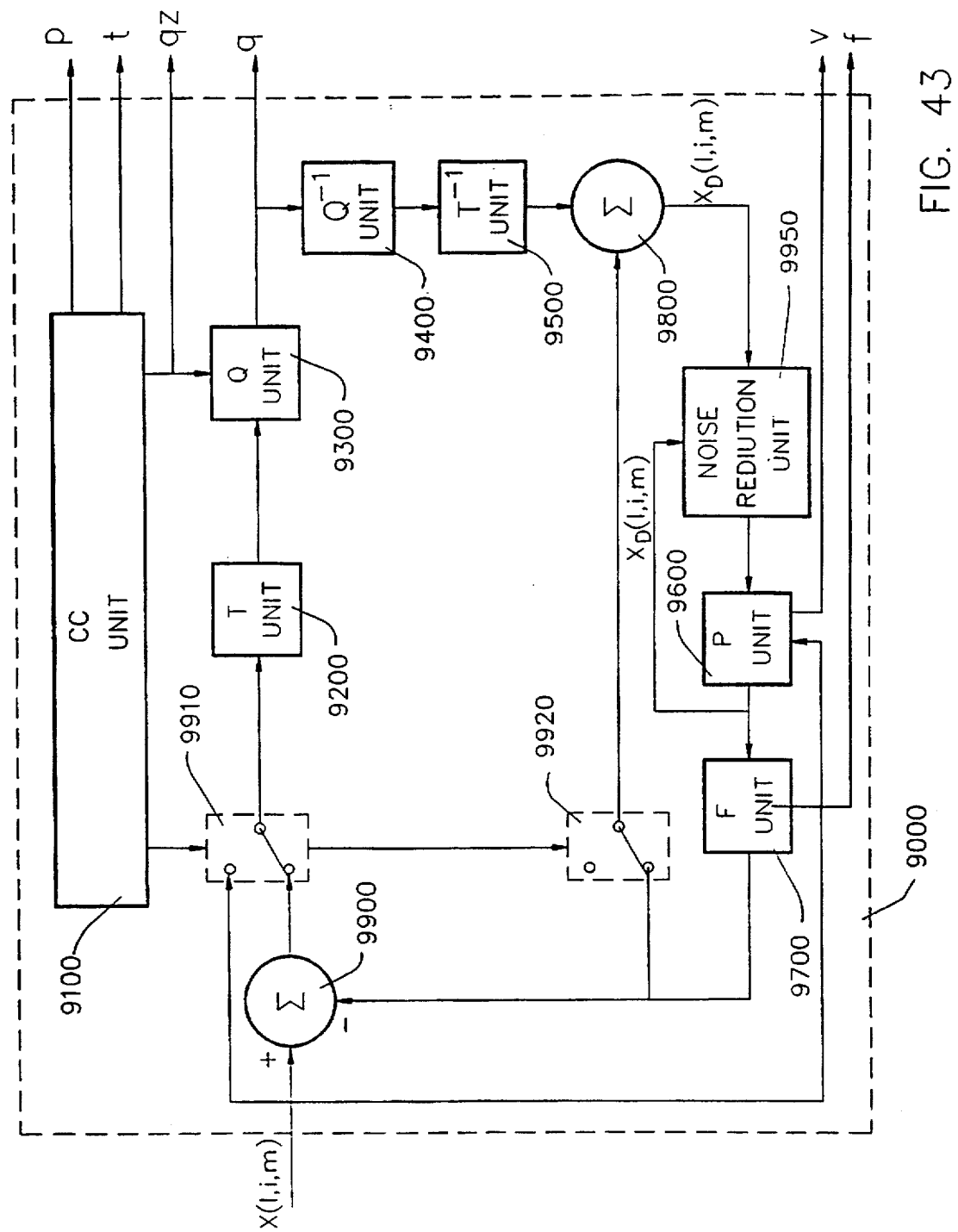

Reference is now made to FIGS. 42–43 which are simplified block diagrams of spatial noise reduction/image enhancement apparatus for H.261 applications.

For videophone, videoconference and other audiovisual services, the CCITT Recommendation H.261 specifies a method of communication for visual telephony. It is often called the p*64 standard because the data rate on ISDN communication channels is p times 64 kbits/sec, where p is a positive integer less than or equal to 32. For p=1, low quality video signals for use in picture phones can be transmitted over a 64 kbit/sec line, while at p=32 high quality video signals for teleconferencing can be transmitted over a 2-Mb/sec line. The H.261 standard also defines the format and dimensions of the digital video imagery, namely CIF and QCIF, at various alternative frame rates.

Compression ratios range from approximately 60:1 for high bandwidth 1.544 Mbps lines, to approximately 6000:1 for a videophone at 19.2 Kbps over voicegrade links. Under such high compression ratios, typically 150:1, visually disturbing compression noise is introduced both spatially and over time along moving objects in the scene.

The H.261 coding scheme is hybrid because it combines DCT-based spatial transform coding via adaptive quantization with temporally predictive coding. The temporally predictive coding is based on a feedback loop which computes the difference between the current frame and the previously reconstructed image stored in a frame memory. Moreover, the standard has an optional specification for motion compensation. This increases the predictive coder's efficiency at tracking the inter-frame motion between the current frame and previously reconstructed frame and hence its success at bit rate reduction.

The high compression ratios incurred in typical H.261 applications, introduce disturbing noise artifacts including block noise, edge ("mosquito") noise and geometric distortions of regions in motion. The acuity-preserving noise reduction and enhancement methods described above are useful in reducing these artifacts significantly without impairing image quality.

The noise reduction and enhancement can be applied as a post-processing, add-on module to the standard H.261 decoder, in compliance with compatibility requirements to the standard. This alternative provides compression noise reduction but does not necessarily attempt to improve the coding efficiency.

Alternatively, the methods herein can also be incorporated into the feedback loop of the encoder and decoder, whereby compression noise is removed from the reconstructed image. This, together with the motion compensation option, results in a less noisy difference image signal and higher coding efficiency.

Moreover, the methods described herein can also be applied as a pre-processing function prior to the video encoder, to reduce white noise in the incoming raw video signals. This, in turn, will remove much of the redundant image noise spatio-temporally without impairing the image quality, and therefore provide a more stable input to the encoder by enabling the allocation of more bandwidth to real moving objects as opposed to random noise in stationary image regions.

The H.261 encoder computes block-based information such as image signal variance, difference image variance, quantization step (adaptive per macroblock, constant within the macroblock), inter/intra decisions, motion compensation information etc., and incorporates these parameters into the encoding procedure based on a coding control strategy. The decoding procedure incorporates the quantization step, inter/intra qualifiers and motion compensation information into the reconstruction of the decompressed image, as described in "Draft Revised Recommendation H.261—Video Codec for Audio-Visual Services at p×64 kbit/s, Submitted to the Xth CCITT Plenary Assembly", COM XV-R 95-E, May 1992. These computed features can be used in control of the above-described noise reduction and enhancement.

The coding errors in H.261 systems are DCT quantization errors, which are purely spatial noise for intra blocks, and spatio-temporal noise for inter blocks of motion-compensated difference signals. The noise reduction methods described herein are dependent, inter alia, on signal to noise (SNR) processing. Therefore, and in similar fashion to the JPEG noise reduction solutions above, in order for these schemes to apply to DCT compression noise in decompressed imagery, the quantization noise standard deviation $sigma_{QN}$ must be either computed or estimated from the available image signals.

There are several alternatives to the estimation of $sigma_{QN}$, depending on the accessible image signals at the time of the computation or estimation. Preferably, each block's $sigma_{QN}$ is estimated, and within each block the noise is taken to be stationary. As such, the $sigma_{QN}$ measure is equally representative of the noise within the entire block.

A proposed noise reducing operation by postprocessing after the H.261 decoder, is carried out by unit 8400 of FIG. 42, similarly to the post-processing method suggested for the JPEG system. The main difference here is in that it is not expected, or considered necessary, to transmit the computed $sigma_{QN}$ information from the encoder, due to the high compression ratios and the relatively high overhead in the additional $sigma_{QN}$ transmitted data.

Unit 8000 in FIG. 42 is a H.261 coder/decoder which comprises an H.261 encoder 8100, a data transmission line 8150, and an H.261 decoder 8200. Unit 8400 performs the above-described postprocessing. Unit 8400 does not necessarily receive any additional input from the decoder 8200 other than the decompressed image data. Unit 8400 may be similar to the apparatus of FIG. 35, including the enhancement and dithering units thereof. Preferably, unit 8400 also includes a temporal smoothing unit such as that described above with reference to FIGS. 12, 13 and 25–27.

Given the quantization step per 16×16 macroblock, and the quantized DCT components of intra blocks at the decoder end, an upper bound for the quantization noise $sigma_{QN}$ can be estimated. In inter (temporally differentiated) blocks, the noise estimation cannot be computed in the same manner, since only a portion of the noise is represented in the difference signal. However, the difference signal and its corresponding quantized DCT components do reflect the noise currently added to the reconstructed image signal. Therefore, the difference signal can be used as a parameter which reflects in part the amount of noise in the block.

Another method of categorizing the macroblocks in terms of expected quantization noise, is similar to the JPEG post-processing method described in Equations 52 to 57, the difference being that additional information can be used to determine $sigma_n$, for example, motion information and inter/intra qualifiers.

A similar processing scheme based on block classification, shown in FIG. 43, can also be applied to the reconstructed image computed within the feedback loop of both the H.261 encoder and decoder.

Unit 9000 in FIG. 43 is a simplified block diagram of an H.261 video encoder including:

1. an H.261 video coder as defined in the H.261 standard for coders; and
2. an H.261 noise reduction unit 9950.

The major functional blocks of the video encoder in FIG. 43 are now described:

The CC unit 9100 is a coding control unit of the coder.
The T unit 9200 performs a forward DCT computation.
The Q unit 9300 performs a quantization of the DCT components. The $Q^{-1}$ unit 9400 performs the inverse quantization and the $T^{-1}$ unit 9500 performs the inverse DCT computation. The P unit 9600 is an image memory storing the previously reconstructed image and which is optionally motion compensated prior to computing the difference image by subtraction unit 9900. Summation unit 9800 is an adder, and switching units 9910 and 9920, which are controlled by coding control unit 9100, select inter/intra block encoding. The F Unit 9700 is a loop filter.

The signals notation in FIG. 43 is as follows:
p=flag for inter/intra;
t=flag for transmitted or not;
qz=quantizer indication;
q=quantizing index for transform coefficients;
v=motion vector;
f=switching on/off of the loop filter;
X(l,i,m)=input image signal at time m and pixel (l,i); and
$X_D$(l,i,m−1)=reconstructed image signal at time m−1 and pixel (l,i).

The same filtering must take place in both feedback loops in order to avoid decoder diverging due to compression and transmission errors. The noise reducing processing can also be implemented instead of or at the location of the Loop Filter unit 9700.

As a result, this implementation can only incorporate data which is available both at the encoder and decoder. The advantage of this scheme, although more complex, lies in that the compression noise is removed within the prediction loop resulting in more efficient coding. That is, the noise reduced reconstructed image is subtracted from the input image, with or without motion compensation, and the resulting difference signal includes significantly less compression errors, i.e the coding efficiency is increased.

Moreover, noise reducing post-processing may still be implemented, in this case, at the output of the decoder in applications of extreme compression ratios. In cases where either or both the encoder and decoder are not equipped with the respective noise reducing processing, the system may resort to the standard processing scheme using only the post processor unit 8400.

The H.261 encoding scheme is based on temporal prediction, and is therefore sensitive to temporal random noise in the incoming raw image. Such input noise increases the quantization noise artifacts especially in flat image regions, and is often interpreted by the encoder as viable signal. It therefore occupies a portion of the total available bandwidth, at the cost of real moving objects. The noise reduction methods described herein can be applied as pre-processors prior to the encoding stage, as described above with reference to unit 8300 of FIG. 42, and provide a robust pre-processing mechanism which deals not only with random camera ("white") noise but also with fixed pattern camera noise.

Unit 8300 may include any of the spatial, temporal and spatio-temporal noise reduction methods described above with reference to FIGS. 1–18, 25 and 26.

The ability to remove spatial and temporal image noise artifacts, which are redundant, improves the coding efficiency by enabling the allocation af additional bandwidth to real moving objects, and avoids quantization problems such as flicker.

Appendices I–II, appended hereto, are software listings of two software implementations of two respective embodiments of the present invention. The embodiment of Appendix I is suitable for processing JPEG images. The embodiment of Appendix II is suitable for processing still video and scanned images. Appendix III is a software listing of a procedure for creating large LUTs in accordance with a preferred embodiment of the present invention, which LUTs are accessed by the procedures of Appendices I and II. The listings are appended hereto merely to provide an extremely detailed disclosure of the present invention. However, it is appreciated that, as described herein, the present invention need not be implemented in software.

The software listings are written in the "C" programming language and may be compiled as QuickWin Windows applications developed under the Microsoft Visual C++ Development System for Windows.

Operational and functional descriptions of the three software listings are as follows:

The CRLUT_Q.C listing of Appendix III creates a set of LUT values stored in a file in a manner, which is then used directly by the execution programs of Appendices I and II, once compiled. It is most convenient to run this routine for the entire set of possible noise values, typically $sigma_n=1, 2, 4, 8, 16, 32$. The correlation values are typically 0.8 to 0.95. Two thresholds can also be selected, for the minimum and maximum values of the estimation gain parameter, typically 0.1 and 0.9, respectively.

The LUTs store the result of the multiplication, hence avoiding all the one-directional multiplications in the program execution. The size of the LUTs are 8192 addresses, each containing an integer value of two bytes (16 bits). The LUT values are antisymmetric w.r.t the center address of 4091. This range covers the entire dynamic range of the intermediate computed values in the programs, namely 12 bits for an 8 bit input pixel value.

The LUTs are computed such that at runtime of the programs, no additional normalizations or sign manipulations need be applied, hence a further saving in computational toll.

The LUTs are preferably created under the following names, such that they can be opened conveniently by the processing programs:

klut_n1.dat for $sigma_n=1$;
klut_n2.dat for $sigma_n=2$;
klut_n4.dat for $sigma_n=4$;
klut_n8.dat for $sigma_n=8$;
klut_n16.dat for $sigma_n=16$;
klut_n32.dat for $sigma_n=32$;

The listing of Appendix I can be compiled as a QuickWin Windows application, developed under Microsoft Visual C++ Development System for Windows, Version 3.1.

A QuickWin application is a standard I/O program with a Windows shell. QuickWin applications serve as a quick means of merging MS-DOS programming with Windows. When the application is run from Windows, a QuickWin MDI window appears with a window dedicated to all program I/O.

A suitable method for running the program of Appendix I is as follows:

1) Create a jpeg demo directory (for example 'jpegdemo') and copy the following files to it:

jpegtga.exe
klut_n1.dat
klut_n2.dat
klut_n4.dat
klut_n8.dat
klut_n16.dat
klut_n32.dat 2) The current version of Appendix I deals only with Targa image formats and expects the user to enter the input and output Targa image file names as command line arguments when running the program. For example:

"jpegtga.exe input.tga output.tga".

3) Windows' File Manager, select the 'jpegdemo' directory.

4) Select the jpegtga.exe file by clicking it in the 'jpegdemo' directory window. The file is now assigned a colored background.

5) Click the File Menu, and then the Run ... entry of the File Menu. A Run window appears on the screen, with the pre-selected jpegtga.exe file appearing colored in the command line entry box. Next, 6) Press the right arrow on the keyboard. This removes the color background of the exe file.

7) Then press space bar and enter the input image path and name. For example, if the input image is located in the same directory, type "input.tga".

8) Then press space bar again, and enter the output file path and name, for example "output.tga" if the output file is to be located in the same directory.

9) The exe file is now ready to run with its two command line parameters. Click the OK button in the Run window.

10) As the program begins, an I/O window should appear on the screen, displaying the available proceeding function selections, and requesting input parameters to be entered via the keyboard by the user. The various functions and entry parameters are described below. To EXIT from the program, type '0' followed by 'Enter'. If no proceeding function was run prior to exiting the program, the input Targe file is simply copied to the output file as a Targa file.

11) The output file should now appear in the directory window of File Manager. The output file information in the directory window of File Manager may not be updated until the File Manager window is refreshed.

The JPEG post-processing functions of Appendix I include (1) an adaptive smoothing (noise reduction) operation, (2) an adaptive (edge) enhancement operation, and (3) sequential combinations of these operations as a function of the application, image in question or compression ratio. In sequential operations, the first operation is applied to the input decompressed image, and subsequent operations are applied to the previously processed image result. The above-mentioned three JPEG post-processing functions are now described in detail.

1. Adaptive Smoother Operation—adsm(i): The parameter i stands for the direction of image scanning of the smoothing operation. This operation combines three-dimensional smoothing, such as that described above with reference to unit 350 of FIG. 15 or unit 5300 of FIG. 35, with two-directional smoothing such as unit 360 in FIG. 15 or unit 5500 in FIG. 35 or unit 216 in FIG. 14.

a. adsm(1)—Line by line scanning and processing of the image from top to bottom.

b. adsm(2)—Line by line scanning and processing of the image from bottom to top.

c. adsm(3)—Column by column scanning and processing of the image from left to right.

d. adsm(4)—Column by column scanning and processing of the image from right to left.

To select the desired adaptive smoothing operation: Type i+Enter, where i=1,2,3,4 depends on the line or column processing configuration and scanning direction desired.

Once selecting adsm(i), the user is requested to enter the expected quantization RMS noise in the image, and two (high and low) standard deviation thresholds. The quantization RMS noise denotes a predicted error between the decompressed image to the original image. The two standard deviation thresholds provide means of classifying blocks into three classes, in terms of their respective signal standard deviation activity. Typical Noise RMS in JPEG Imagery: 4 or 2 (for example: type 4+Enter). Typical High and Low block standard deviation Thresholds: 16 and 4, respectively (for example: type 16+space+type 4+Enter).

2. Adaptive Enhancement Operation—adeno ( ): This operation does not include any parameter. The enhancement operation is a line by line scanning and processing of the image from top to bottom. This enhancement operation is described above with reference to unit 5900 of FIG. 41.

To select the edge enhancement operation: Type 5+Enter. Once selecting aden( ), the user is requested to enter the high frequency gain factor, high frequency normalization parameter, and high frequency enhancement options −1 or 2 (option 3 not applicable). Typical high frequency gain factors: 1, 2, 3 etc. (for example: type 3+Enter). Typical high frequency normalization parameter: 16, 32 (for example: type 16+Enter). Typical high frequency enhancement option: 1 or 2 (for example: type 2+Enter).

3. Several batch functions are also included in the current version:

3.1 Moderate noise reduction+moderate enhancement (to select type 6+Enter):

adsm(3) with: noise=2, thresholds=16 and 4
+
adsm(1) with: noise=1, thresholds=16 and 4
+
aden( ) with: hf gain=2, hf norm=32, hf option=2.

3.2 Moderate noise reduction+high enhancement (to select type 7+Enter):

adsm(3) with: noise=2, thresholds=16 and 4
+
adsm(1) with: noise=1, thresholds=16 and 4
+
adeno ( ) with: hf gain=3, hf norm=32, hf option=2.

3.3 High noise reduction+moderate enhancement (to select type 8+Enter):

adsm(3) with: noise=4, thresholds=16 and 4
+
adsm(1) with: noise=2, thresholds=16 and 4
+
aden( ) with: hf gain=2, hf norm=32, hf option=2.

3.4 High noise reduction+high enhancement (to select type 9+Enter):

adsm(3) with: noise=4, thresholds=16 and 4
+
adsm(1) with: noise=2, thresholds=16 and 4
+
aden( ) with: hf gain=3, hf norm=32, hf option=2.

The desired operation will run, and upon completion will display again the selection list of various available APIP functions. The previously processed result will be used as input to the next selected operation. In case of selecting '0' for Exit, the last processed result will also be the output image of the program of Appendix I.

An operational and functional description of the still video and scanned image processing program of Appendix II is as follows:

The program of Appendix II can be compiled as a QuickWin Windows application, developed under Microsoft Visual C++ Development System for Windows, Version 3.1.

A suitable method for running the program of Appendix II is as follows:

1. Create a still video demo directory (for example 'stvddemo') and copy the following files to it:

phototga.exe
klut_n1.dat
klut_n2.dat
klut_n4.dat
klut_n8.dat
klut_n16.dat
klut_n32.dat 2. The current version of Appendix II deals only with Targa image formats and expects the user to enter the input and output Targa image file names as command line arguments when running the program. For example: "phototga.exe input.tga output.tga".

3. Using Windows' File Manager select the 'stvddemo' directory.

4. Select the phototga.exe file by clicking it in the 'stvddemo' directory window. The file is now assigned a colored background.

5. Click the File Menu, and then click the Run . . . entry of the File Menu. A Run window appears on the screen, with the pre-selected phototga.exe file appearing colored in the command line entry box.

Then:

6. Press the right arrow on the keyboard. This removes the color background of the exe file.

7. Then press space bar and enter the input image path and name. For example, if the input image is located in the same directory, just type "input.tga".

8. Then press space bar again, and enter the output file path and name, for example "output.tga" if the output file is to be located in the same directory.

9. The exe file is now ready to run with its two command line parameters. Click the OK button in the Run window.

10. As the program begins, an I/O window should appear on the screen, displaying the available processing function selections, and requesting input parameters to be entered via the keyboard by the user. Section 3 below describes the various functions and entry parameters of processing functions. To EXIT from the program, type '0' followed by 'Enter'. If no other processing function was run prior to exiting the program, the input Targe file is simply copied to the output file as a Targa file.

11. The output file should now appear in the directory window of File Manager. The output file information in the directory window of File Manager may not be updated until the File Manager window is refreshed.

The still image processing functions include 1) an adaptive smoothing (noise reduction) operation, 2) adaptive VCR noise reduction, 3) adaptive Fixed Pattern Noise (FPN) reduction, 4) video field interpolation operation, 5) adaptive (edge) enhancement operation, and 6) sequential combinations of these operations as a function of the application and image in question. In sequential operations, the first operation is applied to the input image, and subsequent operations are applied to the previously processed image result. Each of these functions are now described.

1. Adaptive Smoother Operation—white noise reduction. This operation is an implementation of unit 110 of FIG. 10 in combination with two-directional smoother unit 16 of FIG. 1.

a. Type 1+Enter for: Line by line scanning and processing of the image from top to bottom.
b. Type 2+Enter for: Line by line scanning and processing of the image from bottom to top.
c. Type 3+Enter for: Column by column scanning and processing of the image from left to right.
d. Type 4+Enter for: Column by column scanning and processing of the image from right to left.

Once selecting white noise reduction operation 1 thru 4, the user is requested to enter the expected RMS noise in the image.

Possible Noise RMS in image: 1, 2, 4, 8, 16, 32 (for example: type 4+Enter).

2. Adaptive VCR & FPN Noise Reduction Operation—combines adaptive smoothing along two dimensions to reduce elongated "streak" noise artifacts in VCR still video images and, FPN effects in scanned imagery. This operation implements unit 16 of FIG. 1 in combination with some or all of unit 80 of FIG. 8, unit 100 or all of FIG. 9, and the entire apparatus of FIG. 10.

Type 5+Enter for: Line by line scanning and processing of the image from top to bottom.

Type 6+Enter for: Column by column scanning and processing of the image from left to right.

Once selecting operation 5 or 6, the user is requested to enter the expected in-line signal RMS and cross-line noise RMS figures in the image. Possible in-line signal RMS figures: 8, 4. Possible cross-line noise RMS figures: 4, 2. (for example: type 8+space+type 4+Enter).

3. Video Field Interpolation Operation—current program version includes a linear interpolation filter only. Future version will include adaptive interpolation. Program expects to receive a full frame format image and interpolated either odd or even lines.

Type 7+Enter for: Odd line interpolation.
Type 8+Enter for: Even line interpolation.

4. Adaptive Enhancement Operation—supports 3×3 and 5×5 processing. Use 3×3 for sharp images, and 5×5 for degraded (blurred) images. The enhancement operation is a line by line scanning and processing of the image from top to bottom. This operation is an implementation of unit 680 of FIG. 22.

Type 9+Enter for: 3×3 enhancement filtering.
Type 10+Enter for: 5×5 enhancement filtering.

Next, the user is requested to enter the high frequency gain factor, high frequency normalization parameter, and high frequency enhancement options −1 or 2 (option 3 not applicable).

Typical high frequency gain factors: 1, 2, 3 etc. (for example: type 3+Enter).

Typical high frequency normalization parameter: 16, 32 (for example: type 16+Enter).

Typical high frequency enhancement option: 1 or 2 (for example: type 2+Enter).

5. Several batch functions are also included in the current version:

5.1 Moderate noise reduction+moderate enhancement (to select type 11+Enter):

white noise reduction–option 3, with: noise=2, thresholds=16 and 4
+
white noise reduction–option 1, with: noise=1, thresholds=16 and 4
+
adaptive enhancement 3×3, with: hf gain=2, hf norm=32, hf option=2.

5.2 Moderate noise reduction+high enhancement (to select type 12+Enter):

white noise reduction–option 3, with: noise=2, thresholds=16 and 4
+
white noise reduction–option 1, with: noise=1, thresholds=16 and 4
+
adaptive enhancement 3×3, with: hf gain=3, hf norm=32, hf option=2.

5.3 High noise reduction+moderate enhancement (to select type 13+Enter):

white noise reduction–option 3, with: noise=4, thresholds=16 and 4
+
white noise reduction–option 1, with: noise=2, thresholds=16 and 4
+
adaptive enhancement 3×3, with: hf gain=3, hf norm=32, hf option=2.

5.4 High noise reduction+high enhancement (to select type 14+Enter):

white noise reduction–option 3, with: noise=4, thresholds=16 and 4
+
white noise reduction–option 1, with: noise=2, thresholds=16 and 4
+
adaptive enhancement 3×3, with: hf gain 4, hf norm=32, hf option=2.

5.5 Very high noise reduction+high enhancement (to select type 15+Enter):

white noise reduction–option 3, with: noise=8, thresholds=16 and 4
+
white noise reduction–option 1, with: noise=4, thresholds=16 and 4
+
white noise reduction–option 2, with: noise=2, thresholds=16 and 4
+
adaptive enhancement 3×3, with: hf gain=4, hf norm=32, hf option=2.

5.6 Very high noise reduction+very high enhancement (to select type 16+Enter):

white noise reduction–option 3, with: noise=8, thresholds=16 and 4
+
white noise reduction–option 1, with: noise=4, thresholds=16 and 4
+
white noise reduction–option 2, with: noise=2, thresholds=16 and 4
+
adaptive enhancement 3×3, with: hf gain=8, hf norm=32, hf option=2.

The desired operation will run, and upon completion will display again the selection list of various available APIP functions. The previously processed result will be used as input to the next selected operation. In case of selecting '0' for Exit, the last processed result will also be the output image of the program of Appendix II.

Applications in which the apparatus and methods described herein are useful include:

1. Still video marketplace 1.1 Still video cameras—near real-time, special purpose VLSI/ASIC (and S/W driven DSP) image processing devices for noise reduction and JPEG noise reduction. Devices to be incorporated in the camera electronics.

1.2 Still video players and printers—near real-time, special purpose VLSI/ASIC (and S/W driven DSP) image processing devices for noise reduction and JPEG noise reduction. Image processing devices to be incorporated in the players/printer electronics.

Potential uses include: Commercial: advertisement, marketting, journalism, insurance, police, pre-press, entertainment; Consumer: home-use alternative to film based optical equipment, education, entertainment; Industrial: preventive maintenance and diagnostic imaging; Medical: diagnostic imaging.

2. Analog and digital video marketplace 2.1 Current and Future Analog and Digital TV Receivers—real-time (video-rate) VLSI/ASIC image processing devices and digital circuitry for noise reduction and image improvement.

2.2 Current and Future Analog and Digital Video Equipment—real-time (video-rate) VLSI/ASIC image processing devices and digital circuitry for noise reduction and image improvement, with applications in camcorders, VCR's, industrial cameras, security CCTV systems, and professional video systems.

2.3 HDTV Receivers and Recorders real-time (video-rate) VLSI/ASIC image processing devices and digital circuitry for noise reduction and image improvement.

Potential uses include: Consumer: video applications; Commercial: professional video; Industrial: automatic gauging and machine vision; Medical: diagnostic imaging.

3. Image Scanners, Digital Copy Machines and Image Fax Machines 3.1 Image Scanners and Digital Copy Machines—near real-time, interactive, software driven image processing circuitry, including optional VLSI/ASIC devices and DSP's.

3.2 Document and Image fax machines—near real-time, interactive, software driven image processing circuitry, including optional VLSI/ASIC devices and DSP's, for the purpose of improving scanned document imagery and document binarization.

Potential uses: Commercial and Industrial: office automation, telecommunications.

4. Image Filing Systems and Multi-Media Machines 4.1 Image Filing and Multi-Media Machines interactively driven, combined S/W and H/W image processing (with DSP options), to be used as pre- and post processors for still compressed imagery (for example JPEG), and moving image sequences (for example MPEG), video teleconferencing (H.n1), and video telephone.

Potential uses include: Commercial: training, advertisement, image information retrieval systems, computer and telecommunications; Consumer: education, entertainment; Industrial: process analysis, training.

Custom VLSI application areas of the present invention include: television receivers, consumer video players/recorders, consumer camcorders, professional video cameras, professional video recorders, document and film scanners, digital still cameras, analog still cameras, digital still video printers, still video players, multimedia image processing appratus, image compression/decompression apparatus, medical imaging systems, teleconferencing systems, videophone systems, video authoring systems, CD-I systems, CCTV security systems, Karaoke systems, HDTV receivers, HDTV broadcasting apparatus and cable television apparatus.

It is appreciated, however, that the apparatus and methods shown and described herein are useful in any situation which involves image processing, so that the applications set forth above are not intended to be limiting.

The apparatus and methods shown and described herein are suitable, inter alia, for processing color images represented in any suitable format, such as RGB, CMYK, YUV or other conventional color coordinate spaces.

Instead of processing each component separately, such as each of the R, G, and B components of an RGB-represented color image, it is sometimes preferable to employ the Y component of a corresponding YUV image to generate EGP's and other parameters and to employ these parameters, pixel by pixel, to process each of the R, G and B separations.

In the above description, pixels are sometimes indexed using a double index (l,i) and sometimes using a single index i, depending on whether the double index or the single index is easier to understand in each particular case.

It is appreciated that the various features of the various embodiments shown and described herein may be combined in any suitable manner so as to provide variations on the embodiments particularly shown and described herein.

The equations referred to above are as follows:

Equation 1A $$X(i)=S*(i)+n(i)$$

where:

$S*(i)$=the desired signal as defined in Equation 1B for pixel i, and $n~N(0, sigma_n)$=zero mean, non-correlated, normally distributed (Gaussian) statistical process with standard deviation $sigma_n$.

Equation 1B $$S*(i)=r_s S*(i)+Phi(i-1)$$

where:

$S*(i)$=the desired signal for pixel i given by a Markov random process, with standard deviation $sigma_s$, and $Phi~N(0,sigma^2_s(1-r^2_s))$=zero mean, non-correlated, normally distributed (Gaussian) statistical process with standard deviaton $sigma_s(1-r^2_s)^{1/2}$, and $r_s$=correlation coefficient of $S*(i)$.

Equaton 2

$$S(i)=r_s S*(i-1)+(1-r_s)u_s$$

where:

$S(i)$=Minimum mean square error recursive estimate of $S*(i)$, $S*(i-1)$=Previous Markov process outcome defined in Equation 1B, $r_s$=Correlation coefficient of the process $S*(i)$, and $u_s$=Mean value of process $S*(i)$.

Equation 3A $$S_+(i)=S_+(i-1)+K_+(i)d_+(i)$$

where:

$d_+(i)=X(i)-S_+(i-1)$=local directional measure of $sigma_s$ (and edge signal strength) as defined in Equation 1B, and $K_+(i)$=steady state estimation gain parameter as defined in Equation 1B, for given $r_s$ and snr with:

$snr=(d_+(i)/sigma_n)^2$

Equation 3B $$S_-(i)=S_-(i+1)+K_-(i)d_-(i)$$

where:
  $d_-(i)=X(i)-S_-(i+1)=$local directional measure of $sigma_s$ (and edge signal strength) as defined in Equation 1B. and
  $K_-(i)=$steady state estmaton gain parameter as defined in Equation 1B. for given $r_s$ and snr with:
  $snr=(d_-(i)/sigma_n)^2$ Equation 4

$$K(j)=(r^2_s K(j-1)+snr(1-r^2_s))/(r^2_s K(j-1)+snr(1-r^2_s)+1)$$

where:
  $K(j)=$denotes the Kalman estimation gain parameter at iteration 'j', and
  $snr=(sigma_s/sigma_n)^2$ with:
  $sigma_s=$as defined in Equation 1B.
  $sigma_n=$as defined in Equation 1A. and
  $r_s=$as defined in Equation 2.

Equation 5

$$K(0)=snr/(snr+1)$$

where:
  snr=as defined in equation 4.

Equation 6

$$d_+(i)=S_+(i-1)-S_-(i+1)$$

Equation 7

$$S_+(i)=0.5\ [S_+(i-1)+S_-(i+1)+K_+(i)(d_+(i)+d_-(i))]$$

where:
  $K_+(i)=$denotes the steady state Kalman estimation gain parameter as defined in Equation 4, for given $r_s$ and snr. with:

$snr=(d_+(i)/sigma_n)^2$ where
  $d_+(i)=$as defined in Equation 6.

Equation 8

$$Sum1(i)=d_+(i)+d_-(i)=2X(i)-S_+(i-1)-S_-(i+1)$$

Equation 9

$$d^m_+(i)=\text{MINIMUM}\ (|Sum1(i)|, |d_+(i)|)$$

where:
  Sum1(i)=as defined in Equation 8. and
  $d_+(i)=$as defined in Equation 6.

Equation 10

$$S^v_+(l-1,i)=S^v_+(l-2,i)+K^v_+(l-1,i)d^v_+(l-1,i)$$

Equation 11

$$d^v_+(l,i)=S^h_+(l,i)-S^v_+(l-1,i)$$

Equation 12

$$S^v_-(l+1,i)=S^h_+(l+1,i)$$

Equation 13

$$d^v_-(l,i)=S^h_+(l,i)-S^h_+(l+1,i)$$

Equation 14

$$d^v_+(l,i)=S^v_-(l-1,i)-S^v_-(l+1,i)$$

Equation 15

$$S^v_+(l,i)=0.5\ [S^v_-(l-1,i)+S^v_-(l+1,i)+K^v_+(l,i)(d^v_+(l,i)+d^v_-(l,i))]$$

where:
  $K^v_+(l,i)=$denotes the steady state Kalman estimation gain parameter as defined in Equation 4 for given $r_s$ and snr. with:

$snr=(d^v_+(l,i)/sigma_n)^2$ where
  $d^v_+(l,i)=$as defined in Equation 14.

Equation 16

$$d^h_+(l,i)=X(l,i)-S^h_+(l,i)$$

Equation 17

$$S^-_+(l,i)=S^v_+(l,i)+g(l,i)d^h_+(l,i)$$

Equation 18

$$S^3(l,i)=(\tfrac{1}{3})\ [S^{h,3}_+(l-1,l-1)+S^{h,3}_+(l-1,i)+S^{h,3}_+(l-1,i+1)+K^{v1}_+(l,i)d^{v1}_+(l,i)+K^{v2}_+(l,i)d^{v2}_+(l,i)+K^{v3}_+(l,i)d^{v3}_+(l,i)]$$

where:
  $K^{v1}_+(l,i)=$denotes the steady state Kalman estimaton gain parameter as defined in Equation 4 for given $r_s$ and snr. with:

$snr=(d^{v1}_+(l,i)/sigma_n)^2$, $d^{v1}_+(l,i)=X(l,i)-S^{h,3}_+(l-1,i-1)$, and
  $K^{v2}_+(l,i)=$denotes the steady state Kalman estimaton gain parameter as defined in Equation 4 for given $r_s$ and snr. with:

$snr=(d^{v2}_+(l,i)/sigma_n)^2$, $d^{v2}_+(l,i)=X(l,i)-S^{h,3}_+(l-1,i)$, and
  $K^{v3}_+(l,i)=$denotes the steady state Kalman estimaton gain parameter as defined in Equation 4 for given $r_s$ and snr. with:

$snr=(d^{v3}_+(l,i)/sigma_n)^2$, $d^{v3}_+(l,i)=X(l,i)-S^{h,3}_+(l-1,i+1)$.

Equation 19

$$S^{h,3}_+(l,i)=S^{h,3}_+(l,i-1)+K^{h,3}_+(l,i)d^{h,3}_+(l,i)$$

where:
  $K^{h,3}_+(l,i)=$denotes the steady state Kalman estimation gain parameter as defined in Equation 4 for given $r_s$ and snr. with:

$snr=(d^{h,3}_+(l,i)/sigma_n)^2$ where $$d^{h,3}_+(l,i) = S^3(l,i) - S^{h,3}_+(l,i-1)$$

Equation 20

$$S^{h,3}_-(l,i) = S^{h,3}_-(l,i+1) + K^{h,3}_-(l,i) d^{h,3}_-(l,i)$$

where:

$K^{h,3}_-(l,i)$=denotes the steady state Kalman estimation gain parameter as defined in Equation 4, for given $r_s$ and snr, with:

$$snr = (d^{h,3}_-(l,i)/sigma_n)^2$$

where $$d^{h,3}_-(l,i) = S^3(l,i) - S^{h,3}_-(l,i+1)$$

Equaton 21

$$d^{h,3}_{+-}(l,i) = S^{h,3}_+(l,i-1) - S^{h,3}_-(l,i+1)$$

where $S^{h,3}_+(l,i-1)$=as defined in Equation 19, and $S^{h,3}_-(l,i+1)$=as defined in Equation 20.
Equation 22

$$S^{h,3}_{+-}(l,i) = 0.5\,[S^{h,3}_+(l,i-1) + S^{h,3}_-(l,i+1) + K^{h,3}_{+-}(l,i)(d^{h,3}_+(l,i) + d^{h,3}_-(l,i))]$$

where:

$K^{h,3}_{+-}(l,i)$=denotes the steady state Kalman estimation gain parameter as defined in Equation 4, for given $r_s$ and snr, with:

$$snr = (d^{h,3}_{+-}(l,i)/sigma_n)^2$$

where $d^{h,3}_{+-}(l,i)$=as defined in Equation 21.
Equation 23

IF $$(|Sum1^{h,3}(l-1,i) + Sum1^{h,3}(l-2,i-1)| > Threshold1$$

OR $$|Sum1^{h,3}(l-1,i) + Sum1^{h,3}(l-2,i)| > Threshold2$$

OR $$|Sum1^{h,3}(l-1,i) + Sum1^{h,3}(l-2,i+1)| > Threshold3)$$

THEN $$d^{oh,3}_{+-}(l-1,i) = d^{h,3}_{+-}(l-1,i) + OFFSET$$

ELSE $$d^{oh,3}_{+-}(l-1,i) = d^{h,3}_{+-}(l-1,i)$$

where:

$Sum1^{h,3}(l,i) = d^{h,3}_+(l,i) + d^{h,3}_-(l,i)$.

$d^{h,3}_+(l,i)$ and $d^{h,3}_-(l,i)$ are as defined in Equations 19 and 20 respectively.

$d^{h,3}_{+-}(l,i)$=as defined in Equation 21, and

OFFSET, Threshold1, Threshold2, and Threshold3 are preset constants or signal dependart parameters.
Equation 24

$$S^t_+(l,i,m) = S^t_+(l,i,m-1) + K^t_+(l,i,m) d^t_+(l,i,m)$$

where:

$K^t_+(l,i,m)$=denotes the steady state Kalman estimation gain parameter as defined in Equation 4, for given $r_s$ and snr, with:

$$snr = (d^t_+(l,i,m)/sigma_n)^2$$

where $$d^t_+(l,i,m) = X(l,i,m) - S^t_+(l,i,m-1)$$

Equation 25

$$S^t_+(l,i,m-1) = S^t_+(l,i,m-1)$$

Equation 26

$$d^t_+(l,i,m) = X(l,i,m) - S^t_+(l,i,m-1)$$

Equation 27

$$S^t_-(l,i,m+1) = X(l,i,m+1)$$

Equation 28

$$d^t_-(l,i,m) = X(l,i,m) - X(l,i,m+1)$$

Equation 29

$$d^t_{+-}(l,i,m) = S^t_+(l,i,m-1) - S^t_-(l,i,m+1)$$

Equation 30

$$S^t_{+-}(l,i,m) = 0.5\,[S^t_+(l,i,m-1) + S^t_-(l,i,m+1) + K^t_{+-}(l,i,m)(d^t_+(l,i,m) + d^t_-(l,i,m))]$$

where:

$K^t_{+-}(l,i,m)$=denotes the steady state Kalman estimation gain parameter as defined in Equation 4, for given $r_s$ and snr, with:

$$snr = (d^t_{+-}(l,i,m)/sigma_n)^2$$

where $d^t_{+-}(l,i,m)$=as defined in Equation 29.
Equation 31A $$K_+(i) = K^*_+(i) + g(a,d,i)*(1 - K^*_+(i))$$

where:

$K^*_+(i)$=estimation gain parameter, equivalent to steady state estimation gain parameter $K_+(i)$ as defined in Equation 4, and computed in equation 3A, and $K_+(i)$ adjusted estmaton gain parameter, and g(a,d,i)=a spatial weighing functon of estimation gain parameter as a function of distance between a designated pixel coordinate a and the currently processed pixel coordinate i, and a distance parameter d>0, whereby g(a,d,i) is computed according to at least one of the following expressions:

$$g(a,d,i) = MINIMUM((|i-a|/d), 1)$$

OR $$g(a,d,i) = 1 - \exp(-|i-a|/d)$$

OR $$g(a,d,i) = 1 - \exp(-(i-a)^2/2d^2)$$

Equation 31B $$K_-(i) = K^*_-(i) + g(a,d,i)*(1 - K^*_-(i))$$

where:

- $K^*_-(i)$ = estimation gain parameter, equivalent to steady state estimation gain parameter $K_-(i)$ as defined in Equation 4, and computed in equation 3B, and
- $K_-(i)$ = adjusted estimation gain parameter, and
- $g(a,d,i)$ = a spatial weighting function of estimation gain parameter as a function of distance between a designated pixel coordinate a and the currently processed pixel coordinate i, and a distance parameter $d>0$, whereby $g(a,d,i)$ is computed according to at least one of the following expressions:

$$g(a,d,i) = \text{MINIMUM}((|i-a|/d), 1)$$

OR $$g(a,d,i) = 1 - \exp(-|i-a|/d)$$

OR $$g(a,d,i) = 1 - \exp(-(i-a)^2/2d^2)$$

Equation 31C $$K_+(i) = K^*_+(i) + g(a,d,i) * (1 - K^*_+(i))$$

where:

- $K^*_+(i)$ = estimation gain parameter, equivalent to steady state estimation gain parameter $K_+(i)$ as defined in Equation 4, and computed in equation 7, and
- $K_+(i)$ = adjusted estimation gain parameter, and
- $g(a,d,i)$ = a spatial weighting function of estimation gain parameter as a function of distance between a designated pixel coordinate a and the currently processed pixel coordinate i, and a distance parameter $d>0$, whereby $g(a,d,i)$ is computed according to at least one of the following expressions:

$$g(a,d,i) = \text{MINIMUM}((|i-a|/d), 1)$$

OR $$g(a,d,i) = 1 - \exp(-|i-a|/d)$$

OR $$g(a,d,i) = 1 - \exp(-(i-a)^2/2d^2)$$

Equation 32

$$\text{sigma}^*_n(i) = \text{sigma}_n(i) * (1 - g(a,d,i))$$

where

- $g(a,d,i)$ is defined in Equations 31A-C,
- $\text{sigma}_n(i)$ = location-dependant noise standard deviation, as defined in Equation 1A.

Equation 33

$$\text{sigma}_n(X(i)) = (\text{sigma}^2_d + \text{sigma}^2_p(X(i)) + \text{sigma}^2_{fpn}(X(i)))^{1/2}$$

where

- $\text{sigma}_d$ = CCD dark noise rms
- $\text{sigma}_p$ = Photon noise rms (proportional to the square root of the amount of photons generating image brightness level X(i))
- $\text{sigma}_{fpn}$ = CCD fixed pattern noise rms (given as some proportion of X(i), and may be different along different dimensions).

Equation 34A $$snr(i) = d_+(i)/\text{sigma}^*_n(i)$$

where:

- $d_+(i)$ = as defined and computed in equation 3A and
- $\text{sigma}^*_n(i)$ = as defined in equation 32.

Equation 34B $$snr(i) = d_-(i)/\text{sigma}^*_n(i)$$

where:

- $d_-(i)$ = as defined and computed in equation 3B and
- $\text{sigma}^*_n(i)$ = as defined in equation 32.

Equaton 34C $$snr(i) = d_{+-}(i)/\text{sigma}^*_n(i)$$

where:

- $d_{+-}(i)$ = as defined and computed in equation 6 and
- $\text{sigma}^*_n(i)$ = as defined in equation 32.

Equation 35A $$snr(i) = d_+(i)/\text{sigma}_n(X(i))$$

where:

- $d_+(i)$ = as defined and computed in equation 3A and
- $\text{sigma}_n(X(i))$ = as defined in equation 33.

Equaton 35B $$snr(i) = d_-(i)/\text{sigma}_n(X(i))$$

where:

- $d_-(i)$ = as defined and computed in equation 3B and
- $\text{sigma}_n(X(i))$ = as defined in equation 33.

Equation 35C $$snr(i) = d_{+-}(i)/\text{sigma}_n(X(i))$$

where:

- $d_{+-}(i)$ = as defined and computed in equation 6 and
- $\text{sigma}_n(X(i))$ = as defined in equation 33.

Equation 36

$$X_{DC} = \Sigma X(i)/B$$

where:

- $X_{DC}$ = the average brightness, also defined as the DC value of each processed block, where summation is done separately for each block, and
- B = the total number of pixels in the block.

Equation 37A $$\text{sigma}_{AC} = (\Sigma X_{AC}^2(i)/B)^{1/2}$$

where:

- $X_{AC}(i) = X(i) - X_{DC}$ = the difference between the raw image brightness to the block average DC value as computed in equation 36, and
- B = the total amount of pixels in the block.

Equation 37B $$\text{sigma}_{AC} = \Sigma |X_{AC}(i)|/B$$

where:

- $X_{AC}(i) = X(i) - X_{DC}$ = the difference between the raw image brightness to the block average DC value as computed in equation 36, and B=the total amount of pixels in the block.

Equation 38

$$f1 = \text{sigma}_{AC}/(\text{sigma}_{AC} + C1)$$

where:

C1 a preset constant and $\text{sigma}_{AC}$=standard deviation of the AC signal as given in equation 37A or B.

Equation 39

$$f2 = (\text{sigma}_{AC} + C2)/(\text{sigma}_{AC} + C1)$$

where:

C1 and C2=preset constants, and $\text{sigma}_{AC}$=standard deviation of the AC signal as given in equation 37A or B.

Equation 40

$$\text{sigma}_{DC} = \Sigma |X_{DC}(b) - X_{DC,av}|/9$$

where $\text{sigma}_{DC}$=The standard deviation of adjacent block $X_{DC}$ values in a given block neighborhood of for example 3×3 blocks, and each computed according to equation 36.

$X_{DC}(b)$=The DC value of a given block with index b, where b ranges, for example, between 0 to 9 in a 3×3 neighborhood of blocks surrounding and including the present block.

and $$X_{DC,av} = \Sigma X_{DC}(b)/9$$

Equation 41

$$f3 = (\text{sigma}_{AC} + C3)/(\text{sigma}_{AC} + \text{sigma}_{DC} + C3)$$

where

C3=preset constant, and $\text{sigma}_{AC}$=as given in equation 37, $\text{sigma}_{DC}$=as given in equation 40.

Equation 42

$$f4(i) = (|X_{AC}(i)| + C4)/(\text{sigma}_{DC} + |X_{AC}(i)| + C4)$$

where:

C4=a preset constant, $X_{AC}(i)$=the AC signal at pixel i as given in equation 37, $\text{sigma}_{DC}$=the DC standrad deviation as given in equation 40.

Equation 43

$$g(i) = C5/((C5/\max) + \text{sigma}_H(i)),$$

where:

g(i)=a gain parameter applied to the high frequency signal H(i),

C5 and max=preset constants, $\text{sigma}_H(i)$=standard deviation of the high frequency detail signal H computed within a window of size WI surrounding pixel i with:

$$\text{sigma}_H(i) = \Sigma |H(i)|/WI$$

Equation 44

$$g(i) = C5/((C5/\max) + |H(i)|),$$

where:

g(i)=a gain parameter applied to the high frequency signal H(i),

C5 and max=preset constants.

Equation 45

$$g(i) = C6(i)/(C6(i) + |H(i)|),$$

where:

g(i)=a gain parameter applied to the high frequency signal H(i), $C6(i) = C5(|Hmax| - |H(i)|)/|Hmax|$, and H(i)=the high frequency detail signal, Hmax=the maximum expected high frequency detail signal, equivalent to the highest edge contrast in the image, and C5=a preset constant.

Equation 46

$$g(i) = C6^p(i)/(C6^p(i) + |H(i)|)$$

where:

g(i)=a gain parameter applied to the high frequency signal H(i), $C6(i) = C5(|Hmax| - |H(i)|)/|Hmax|$, and H(i)=the high frequency detail signal, Hmax=the maximum expected high frequency detail signal, equivalent to the highest edge contrast in the image, and C5=a preset constant, p=a parameter which controls the nonlinear dependance of g on H; typically 1 to 3.

Equation 47

$$w(X(i)) = W * X^{wp}(i)$$

where:

wp=a parameter which controls the nonlinear dependance of w on X.

and

W=a scaling preset parameter.

Equation 48

$$E(i) = X(i) + H(i) * g(i) * w(X(i))$$

where:

E(i)=the enhanced image signal,

X(i)=the input raw or presmoothed image,

H(i)=the high frequency detail signal, g(i)=the gain factor computed in equations 43–46, w(X(i))=the gain parameter computed in equation 47.

Equation 49

$$I(i) = w1_{int}(S^{h,3}{}_+(i) + S^{h,3}{}_+(i+1)) + w2_{int}(S^{h,3}{}_+(i+2) + S^{h,3}{}_+(i-1))$$

where $w1_{int}$=a preset constant, typically 5/8, $w2_{int}$=a preset constant, typically −1/8, and $S^{h,3}{}_+(i)$=as defined in Equation 22.

Equation 50

$$Z = \{S^{h,3}{}_+(1), I(1), S^{h,3}{}_+(2), I(2), \ldots, S^{h,3}{}_+(m), I(m), \ldots\}$$

where

Z=the interleaved string of pixels, composed of l(i)=as defined in Equation 49, and $S^{h,3}_{+-}(i)$=as defined in Equation 22.

Equation 51A $$sigma_{QN}=P^{-1}(\Sigma E^2(p))^{1/2}$$

where sigma$_{QN}$=the quantizaton error standard deviaton, computed using Parseval's Relation (see Reference 6), E(p)=DCT(p)−DCT$_Q$(p), DCT(p)=denoting the DCT p$^{th}$ component (see References 9, 10)

DCT$_Q$(p)=denoting the corresponding quantized DCT p$^{th}$ component (see References 9, 10), P=denoting the number of pixels in the block, typically 64 (8×8) for JPEG and 256 (16×16) for H.261 compression systems.

Equation 51B $$sigma_{QN}=P^{-1}\Sigma|E(p)|$$

where sigma$_{QN}$=an approximate quantization error standard deviation, computed using Parseval's Relation (see Reference 6), E(p)=DCT(p)−DCT$_Q$(p), DCT(p)=denoting the DCT p$^{th}$ component (see References 9, 10)

DCT$_Q$(p)=denoting the corresponding quanfized DCT p$^{th}$ component (see References 9, 10), P=denotng the number of pixels in the block, typically 64 (8×8) for JPEG and 256 (16×16) for H.261 compression systems.

Equation 51C $$sigma_{QN}=P^{-1}(\Sigma(X(i)-X_D(i))^2)^{1/2}$$

where sigma$_{QN}$=the quantization error standard deviation, computed directly from the original image signal X(i), X$_D$(i)=the corresponding decompressed image signal (see Reference 10), and P=denoting the number of pixels in the block, typically 64 (8×8) for JPEG and 256 (16×16) for H.261 compression systems.

Equation 51D $$sigma_{QN}=P^{-1}(\Sigma|X(i)-X_D(i)|)$$

where sigma$_{QN}$=the approximated quantization error standard deviation, computed directly from the original image signal X(i), and X$_D$(i)=the corresponding decompressed image signal (see Reference 10), P=denoting the number of pixels in the block, typically 64 (8×8) for JPEG and 256 (16×16) for H.261 compression systems.

Equation 52A $$sigma_D=P^{-1}(\Sigma(X_D(i)-X_{DAV}(i))^2)^{1/2}$$

where sigma$_D$=the decompressed block standard deviation reflecting signal activity, X$_{DAV}$(i)=the decompressed block signal average value= $P^{-1}\Sigma X_D(i)$ X$_D$(i)=the corresponding decompressed image signal (see Reference 10), P=denoting the number of pixels in the block, typically 64 (8×8) for JPEG and 256 (16×16) for H.261 compression systems.

Equation 52B $$sigma_D=P^{-1}(\Sigma|X_D(i)-X_{DAV}(i)|)$$

where sigma$_D$=the approximated block standard deviation reflecting signal activity, X$_D$(i)=the corresponding decompressed image signal (see reference 10), X$_{DAV}$(i)=the corresponding decompressed block signal average value, as defined in Equation 52A, P=denoting the number of pixels in the block, typically 64 (8×8) for JPEG and 256 (16*16) for H.261 compression systems.

Equation 53

IF (sigma$_D$>UT) OR (sigma$_D$=0)

THEN sigma$_n$=2 sigma$_{QN,avg}$

ELSE IF (sigma$_D$<LT)

THEN sigma$_n$=MAXIMUM (0.5 sigma$_{QN,avg}$, 1)

ELSE sigma$_n$=sigma$_{QN,avg}$ where sigma$_{QN}$=is defined in Equation 51, sigma$_n$=corresponds to the noise standard deviation within a given coding block of pixels, sigma$_{QN,avg}$=corresponds to the global average of sigma$_{QN}$ values over the entire image or selected parts of the image, sigma$_D$=is defined in Equation 52, UT=upper classifying threshold and LT=lower classifying threshold.

Equation 54 if(sigma$_D$=0)

sigma$_n$=MAXIMUM (sigma$_{QN}$, T0)

else sigma$_n$=sigma$_{QN}$ where sigma$_{QN}$=is defined in Equation 51, sigma$_n$=corresponds to the noise standard deviation within a given coding block of pixels, and T0=preset constant, typical value=4.

Equation 55

$$CS^{h,3}_{+-}(i)=(S^{h,3}_{+}(i)+S^{h,3}_{-}(i))/2$$

where $CS^{h,3}_{+-}(i)$ = conservative smoothing operation,
$S^{h,3}_{+}(i)$ = as defined in equation 19, and
$S^{h,3}_{-}(i)$ = as defined in equation 20.

Equation 56

IF $(SUM1^{h,3}(i)/2 > sigma_D)$

THEN $J^{h,3}_{+-}(i) = CS^{h,3}_{+-}(i)$

ELSE $J^{h,3}_{+-}(i) = S^{h,3}_{+-}(i)$ where $sigma_D$ = as defined in Equation 52,
$SUM1^{h,3}(i)$ = as defined in Equaton 23,
$J^{h,3}_{+-}(i)$ = denotes the noise-reduced result of the JPEG decompressed image,
$S^{h,3}_{+-}(i)$ = as defined in Equation 22,
$CS^{h,3}_{+-}(i)$ = as defined in Equation 55.

Equation 57

IF $sigma_D = 0$

THEN $J^{h,3}_{+-}(i) = S^{h,3}_{+-}(i)$

ELSE-IF $sigma_D < T1 * sigma_n$

THEN $J^{h,3}_{+-}(i) = CS^{h,3}_{+-}(i)$

ELSE IF $(SUM1(i)/2 > T2*sigma_n)$ OR $(SUM1(i)/2 > sigma_D)$

THEN $J^{h,3}_{+-}(i) = CS^{h,3}_{+-}(i)$

ELSE $J^{h,3}_{+-}(i) = S^{h,3}_{+-}(i)$ where $sigma_n$ = as defined in Equations 53 and 54,
$sigma_D$ = as defined in Equation 52.
$SUM1^{h,3}(i)$ = as defined in Equation 23,
$J^{h,3}_{+-}(i)$ = denotes the noise-educed result of the JPEG decompressed image,
$S^{h,3}_{+-}(i)$ = as defined in Equation 22,
$CS^{h,3}_{+-}(i)$ = as defined in Equation 55.
and T0, T1, T2 = preset constants, with typical values T0=4, T1=2, T2=2.

APPENDIX I

```c
/* jpegtga.c - Similar to jpegtga2.c but uses
a JPEG controller which is block energy dependant********/ include <stdio.h>
include <math.h>
#include <stdlib.h>
include <malloc.h> define IM_W 512
define WHITE 255
#define BLACK 0

/*TGA image read and write parameters*/
int     rect_wsize, rect_hsize, rect_wstart, rect_hstart,
        input_img_wsize, input_img_hsize,
        input_img_header_size;
int     RGB_rect_wsize, *jpegblock_ave_ptr, *jpegblock_stdv_ptr;
int *klut_ptr, *klut_ptr_mid, *klut_h_ptr, *klut_h_ptr_mid, *klut_l_ptr,
    *klut_l_ptr_mid;
int            klutsize=8191*2;
unsigned char _huge *rect_ptr, *ac_rect_ptr;
long    rect_size;

/*intermediate image buffers*/
int buffin[IM_W]={0}, buffout[IM_W]={0}, buffnext[IM_W]={0},
bufflp[IM_W]={0};
int buffprev[IM_W]={0}, buffcurr[IM_W]={0}, buffnorm[IM_W]={0},
buffzoom[IM_W]={0};
int buffac[IM_W]={0};
int diffnext[IM_W]={0}, difflp[IM_W]={0};
int diffprev[IM_W]={0}, diffcurr[IM_W]={0};
int buffrl[IM_W]={0}, deltrl[IM_W]={0}, enhancer_lut[256]={0};
int lut[32]   ={ 0,   1,   2,   3,   4,   5,   5,   6,
                 6,   6,   7,   7,   7,   7,   8,   8,
                 8,   8,   9,   9,   9,   9,  10,  10,
                10,  10,  11,  11,  11,  11,  11,  11};
int multlut[32]={32,  40,  48,  64,  96, 135, 135, 167,
                167, 167, 199, 199, 199, 199, 223, 223,
                223, 223, 232, 232, 232, 232, 239, 239,
                239, 239, 256, 256, 256, 256, 256, 256};
int block_stdv_h_thr, block_stdv_l_thr, lblock, processing_pass;
/****************************************************************/ void get_img_dimensions(FILE *);
void read_rect(FILE *, unsigned char _huge *);
void write_rect(unsigned char _huge *, FILE *);
void jpegblock_feature(void);
void jpegblock_compute(unsigned char _huge *);
void adsm(int, int, int, int);
void adsm2D(void);
void aden(int, int, int);
int rms_shift(int);
void linein(int *, unsigned char _huge *, int);
void lineout(int *, unsigned char _huge *, int);
```

```
void columnin(int *, unsigned char _huge *, int);
void columnout(int *, unsigned char _huge *, int);
void ps_pred_thr_dim_sm(int *, int *, int *, int *, int, int);
void pred_thr_dim_sm(int *, int *, int *, int *, int, int, int);
void horiz_lp(int *, int*, int);
void vertic_lp(int *, int *, int *, int *, int);
void line_diff(int *, int *, int *, int);
void line_add(int *, int *, int *, int);
void hf_enhancer(int *, int, int);
void enhancer_lut_load(int, int, int);
void line_copy (int *, int *, int);
int onedir_multshift(int, int);
int twodir_multshift(int, int, int);
void get_klut_file(int);
/**********************************************************/
void main (argc, argv)
int argc;
char *argv[];
{
        FILE    *input_img_ptr, *output_img_ptr;
        int     select;

if(argc < 3){
        printf("  Format: C>jpegtga source.xxx dest.xxx ");
        exit(0);
        }
        if( (input_img_ptr=fopen(argv[1], "rb")) == NULL){
        printf("\n Can't open file %s.", argv[1]);
        exit(0);
        }
        if( (output_img_ptr=fopen(argv[2], "wb")) == NULL){
        printf("\n Can't open file %s.", argv[2]);
        exit(0);
        }
        /*get image dimensions and coordinates of rectangle ROI*/
        get_img_dimensions(input_img_ptr);
        rect_size=(long)rect_wsize*(long)rect_hsize*3/2;
        rect_ptr = (unsigned char _huge *)
        _halloc(rect_size, sizeof(int));
        read_rect(input_img_ptr, rect_ptr);
        ac_rect_ptr = (unsigned char _huge *)
        _halloc(rect_size, sizeof(int));
        read_rect(input_img_ptr, ac_rect_ptr);
        fclose (input_img_ptr);
        /*finished reading image data into read_rect buffer*/
        klut_ptr=(int *) calloc(8191, sizeof(int));
        klut_ptr_mid=klut_ptr+4096;
        klut_h_ptr=(int *) calloc(8191, sizeof(int));
        klut_h_ptr_mid=klut_h_ptr+4096;
        klut_l_ptr=(int *) calloc(8191, sizeof(int));
        klut_l_ptr_mid=klut_l_ptr+4096;
        jpegblock_feature();
START:  ;
        /* manual selection of image filtering */
        printf("\n Enter desired JPEG IMAGE PROCESSING
```

```
            operation: \n\n");
    printf("#0  : EXIT \n");
    printf("#1  : adsm(1)            ; #3 : adsm(3)              \n");
    printf("#2  : adsm(2)            ; #4 : adsm(4)              \n");
    printf("#5  : aden()                                          \n");
    printf("#6  : MODERATE NR... + MODERATE EN...      \n");
    printf("#7  : MODERATE NR... + HIGH       EN...      \n");
    printf("#8  : HIGH     NR... + MODERATE EN...      \n");
    printf("#9  : HIGH     NR... + HIGH       EN...      \n");

SELECT: ;
    scanf("%d", &select);
    switch (select)
        {
            case 0:  goto END;
            case 1:  adsm(1, 0, 0, 0); break;
            case 2:  adsm(2, 0, 0, 0); break;
            case 3:  adsm(3, 0, 0, 0); break;
            case 4:  adsm(4, 0, 0, 0); break;
            case 5:  aden(0, 0, 0) ; break;
            case 6:  adsm(3, 2, 16, 4) ;
                                    adsm(1, 1, 16, 4) ;
                                    aden(2, 32, 2);
                                    break;
            case 7:  adsm(3, 2, 16, 4) ;
                                    adsm(1, 1, 16, 4) ;
                                    aden(3, 32, 2);
                                    break;
            case 8:  adsm(3, 4, 16, 4) ;
                                    adsm(1, 2, 16, 4) ;
                                    aden(2, 32, 2);
                                    break;
        case 9:  adsm(3, 4, 16, 4) ;
                                    adsm(1, 2, 16, 4) ;
                                    aden(3, 32, 2);
                                    break;
            default:        printf("\n Wrong function selection;
                            Try again! \n");
                                    goto SELECT;
        }
    goto START;
END:write_rect(rect_ptr, output_img_ptr);
    fclose (output_img_ptr);
    _hfree(rect_ptr); _hfree(ac_rect_ptr);
    free(klut_ptr);free(klut_h_ptr);free(klut_l_ptr);
}
/******** Modular three dimensional adsm1 routine ********/
void adsm(direction_option, noiserms_b,
        block_stdv_h_thr_b, block_stdv_l_thr_b)
int direction_option, noiserms_b, block_stdv_h_thr_b,
        block_stdv_l_thr_b;
{
  int noiserms=1, irms, width=rect_wsize, height=rect_hsize;
  int RGB_pass, line_index, pixel_index, lmod;
  unsigned char _huge *read_rect_ptr, *read_ac_rect_ptr;
```

127

```
if(noiserms_b != 0){
        block_stdv_h_thr = block_stdv_h_thr_b * 16;
        block_stdv_l_thr = block_stdv_l_thr_b * 16;
        noiserms = noiserms_b;
        }
else{
        printf("\n Enter noise rms (1,2,4,8,16,32) \n");
        scanf("%d", &noiserms);
        printf("\n Enter block stdev high & low thresholds\n");
        scanf("%d %d", &block_stdv_h_thr, &block_stdv_l_thr);
    block_stdv_h_thr *= 16; block_stdv_l_thr *= 16;
        }
irms = rms_shift(noiserms)+4;
get_klut_file(noiserms);

DIRECTION: ;
switch(direction_option)
        {
        case 1: break;   case 2: break;
        case 3: break;   case 4: break;
        default: printf("\n Enter direction option again (1-4)\n");
                scanf("%d", &direction_option);
                goto DIRECTION;
        }
if(direction_option==1 || direction_option==2){
        for(RGB_pass=0;RGB_pass<3;RGB_pass++){
                if(direction_option==1){
                        read_rect_ptr=rect_ptr+RGB_pass;
                        read_ac_rect_ptr=ac_rect_ptr+RGB_pass;}
                else{
                        read_rect_ptr=rect_ptr
                                        +(long)RGB_rect_wsize*
                                                (long)(rect_hsize-1)
                                        +RGB_pass;
                        read_ac_rect_ptr=ac_rect_ptr
                                        +(long)RGB_rect_wsize*
                                                (long)(rect_hsize-1)
                                        +RGB_pass;
                }
            linein(buffprev, read_rect_ptr, width);
            lineout(buffprev, read_rect_ptr, width);
            for(line_index=1; line_index<rect_hsize; line_index++){
                        if(direction_option==1){
                                read_rect_ptr+=RGB_rect_wsize;
                                read_ac_rect_ptr+=RGB_rect_wsize;}
                        else {
                                read_ac_rect_ptr=
                                ac_rect_ptr+
                                (long)RGB_rect_wsize*
                                (long)(rect_hsize-1-line_index);
                                read_ac_rect_ptr=
                                ac_rect_ptr+
                                (long)RGB_rect_wsize*
                                (long)(rect_hsize-1-line_index);
```

```
                    }
                lmod = line_index % 8;
                linein(buffin, read_rect_ptr, width);
                linein(buffac, read_ac_rect_ptr, width);
                pred_thr_dim_sm(buffin, buffprev, buffcurr,
                        buffac, irms, lmod, width);
                lineout(buffprev, read_rect_ptr, width);
                }
            }
    }
    else
        if(direction_option==3 || direction_option==4){
                for(RGB_pass=0;RGB_pass<3;RGB_pass++){
                    if(direction_option==3){
                            read_rect_ptr=rect_ptr+RGB_pass;
                            read_ac_rect_ptr=ac_rect_ptr+RGB_pass;}
                    else {
                            read_rect_ptr=rect_ptr+RGB_rect_wsize-3
                                +RGB_pass;
                            read_ac_rect_ptr=ac_rect_ptr
                                +RGB_rect_wsize-3+RGB_pass;
                            }
                    linein(buffprev, read_rect_ptr, width);
                    lineout(buffprev, read_rect_ptr, width);
                    for(pixel_index=1; pixel_index<rect_wsize;
                                    pixel_index++){
                            if(direction_option==3){
                                    read_rect_ptr+=3;
                                    read_ac_rect_ptr+=3;}
                            else {
                                    read_rect_ptr=rect_ptr
                                    +3*(rect_wsize-1-pixel_index)
                                    +RGB_pass;
                                    read_ac_rect_ptr=ac_rect_ptr
                                    +3*(rect_wsize-1-pixel_index)
                                    +RGB_pass;
                                    }
                            lmod = pixel_index % 8;
                            columnin(buffin, read_rect_ptr, height);
                            columnin
                            (buffac, read_ac_rect_ptr, height);
                            pred_thr_dim_sm(buffin, buffprev,
                            buffcurr, buffac, irms, lmod, height);
                            columnout
                            (buffprev, read_rect_ptr, height);
                            }
                    }
            }
}

/******** Modular 2D adsm routine ********/
void adsm2D(void)
{
   int noiserms=1, irms, width=rect_wsize,
```

129

```
                                    height=rect_hsize;
    int RGB_pass, line_index, direction_option, lmod;
    unsigned char _huge *read_rect_ptr;

printf("\n Enter noise rms (1,2,4,8,16,32) \n");
scanf("%d", &noiserms);

irms = rms_shift(noiserms)+4;
direction_option=1;
for(RGB_pass=0;RGB_pass<3;RGB_pass++){
        if(direction_option==1)
                read_rect_ptr=rect_ptr+RGB_pass;
    else
            read_rect_ptr=rect_ptr
                                    +(long)RGB_rect_wsize*
                                    (long)(rect_hsize-1)
                                    +RGB_pass;
    linein(buffprev, read_rect_ptr, width);
    lineout(buffprev, read_rect_ptr, width);
    for(line_index=1; line_index<rect_hsize; line_index++){
            if(direction_option==1)
                    read_rect_ptr+=RGB_rect_wsize;
                else
                    read_rect_ptr=
                            rect_ptr+(long)RGB_rect_wsize*
                            (long)(rect_hsize-1-line_index);
            /*lblock = (line_index>>3)*180 + RGB_pass;*/
            lmod = line_index % 8;
            linein(buffin, read_rect_ptr, width);
            pred_thr_dim_sm(buffin, buffprev, buffcurr,
                    buffac, irms, lmod, width);
            lineout(buffprev, read_rect_ptr, width);
            }
        } printf("\n Enter noise rms (1,2,4,8,16,32) \n");
scanf("%d", &noiserms);

irms = rms_shift(noiserms)+4;
direction_option=2;
for(RGB_pass=0;RGB_pass<3;RGB_pass++){
        if(direction_option==1)
                read_rect_ptr=rect_ptr+RGB_pass;
    else
            read_rect_ptr=rect_ptr
                                    +(long)RGB_rect_wsize*
                                    (long)(rect_hsize-1)
                                    +RGB_pass;
    linein(buffprev, read_rect_ptr, width);
    lineout(buffprev, read_rect_ptr, width);
    for(line_index=1; line_index<rect_hsize-1;
                    line_index++){
            if(direction_option==1)
                    read_rect_ptr+=RGB_rect_wsize;
                else
```

130

```
                        read_rect_ptr=
                              rect_ptr+(long)RGB_rect_wsize*
                              (long)(rect_hsize-1-line_index);
            /*lblock = (line_index>>3)*180 + RGB_pass;*/
            lmod = line_index % 8;
            linein(buffin, read_rect_ptr, width);
            linein(buffnext, read_rect_ptr-RGB_rect_wsize,
                              width);
            ps_pred_thr_dim_sm(buffin, buffprev, buffcurr,
                              buffnext, irms, width);
            lineout(buffprev, read_rect_ptr, width);
            }
      }
}

/******** Modular contrast enhancement of laplacian
high frequency signal component adaptively by combining
horizontal and vertical Laplacian FIR filters and selected
enhancement parameters. ********/
void aden(hf_gain_b, hf_norml_b, hf_option_b)
int           hf_gain_b, hf_norml_b, hf_option_b;
{
   int *tempbptr, *nextbptr=buffnext, *currbptr=buffcurr,
        *prevbptr=buffprev;
   int *lpbptr=bufflp, *lpdptr=difflp;
   int width=rect_wsize, height=rect_hsize, RGB_pass,
        line_index, lmod;
   unsigned char _huge *read_rect_ptr, *write_rect_ptr;
   enhancer_lut_load(hf_gain_b, hf_norml_b, hf_option_b);
   for(RGB_pass=0;RGB_pass<3;RGB_pass++){
      read_rect_ptr=rect_ptr+RGB_pass;
      write_rect_ptr=rect_ptr+RGB_pass;
      linein(buffin, read_rect_ptr, width);
      horiz_lp(buffin, prevbptr, width);
      lineout(prevbptr, write_rect_ptr, width);
      write_rect_ptr+=RGB_rect_wsize;
      read_rect_ptr+=RGB_rect_wsize;
      linein(buffin, read_rect_ptr, width);
      linein(buffnorm, read_rect_ptr, width);
      horiz_lp(buffin, currbptr, width);
      for(line_index=2; line_index<rect_hsize;line_index++){
              read_rect_ptr+=RGB_rect_wsize;
              lmod = line_index % 8;
              linein(buffin, read_rect_ptr, width);
              horiz_lp(buffin, nextbptr, width);
              vertic_lp(nextbptr, currbptr, prevbptr, lpbptr, width);
              line_diff(buffnorm, lpbptr, lpdptr, width);
              lblock = (line_index>>3)*180 + RGB_pass;
              hf_enhancer(lpdptr, width, lmod);
              line_add(buffnorm, lpdptr, buffout, width);
              line_copy(buffin, buffnorm, width);
              lineout(buffout, write_rect_ptr, width);
              write_rect_ptr+=RGB_rect_wsize;
              tempbptr = nextbptr;
```

131

```
                    nextbptr = prevbptr;
                    prevbptr = currbptr;
                    currbptr = tempbptr;
                    }
        }
}
/*********** contrast enhancement lut loader ***********/
void enhancer_lut_load(hf_gain_b, hf_norm1_b, hf_option_b)
int             hf_gain_b, hf_norm1_b, hf_option_b;
{
  register int i;
  int hf_option/*, hf_power*/;
  float hf_gain, hf_norm1, hf_norm2/*, hf_norm3*/;

if(hf_gain_b != 0){
        hf_gain=(float)hf_gain_b;
        hf_norm1=(float)hf_norm1_b;
        hf_option=hf_option_b;
        }
else{
        printf("\n Enter high frequency gain parameter:
                (integer 1,2...) \n");
        scanf("%f", &hf_gain);
        printf("\n Enter high frequency normalization parameter:
                (integer 8,16,32..) \n");
        scanf("%f", &hf_norm1);
        printf("\n Enter high frequency enhancement option: \n");
        printf("   #1. Weiner ; #2. Trimmed Weiner ;
                     #3. Power Trimmed Weiner \n");
        scanf("%d", &hf_option);
        }
/*if(hf_option==3){
   printf("\n Enter trimming power: (integer 1, 2, 3...)\n");
   scanf("%d", &hf_power);
   }*/ if(hf_option == 1){
   for(i=0;i<256;i++)
      *(enhancer_lut+i) =
         (int)( 16.0*(float)i*hf_gain*hf_norm1/(hf_norm1+(float)i) );
   }
else
   if(hf_option == 2){
      for(i=0;i<256;i++){
            hf_norm2=(float)i;
               hf_norm2= hf_norm1*((float)255-hf_norm2)/(float)255;
                 *(enhancer_lut+i) =
                   (int)( 16.0*hf_gain*hf_norm2/(hf_norm2+(float)i) );
            }
        }
   /*else{
      for(i=0;i<256;i++){
         hf_norm3= hf_norm1*(float)pow(
(255.0-(double)i)/255.0, (double)hf_power);
         *(enhancer_lut+i) =
```

```
                    (int)( 16.0*(float)i*hf_gain*hf_norm3/(hf_norm3+(float)i)
        }
    }*/
}

/******* horizontal low pass filter 1 2 1 ************/ void horiz_lp(inptr, outptr, length)
int *inptr, *outptr;
int length;
{
    register int i=length-2;
    int *inlptr, *inrptr;
    *outptr=*inptr;*(outptr+length-1)=*(inptr+length-1);
    inlptr=inptr;inptr++;
    inptr++;inrptr=inptr;inptr--;
    outptr++;
    while(i--){
        *outptr = (*inlptr + ((*inptr)<<1) + *inrptr) >> 2;
        inlptr++;inrptr++;outptr++;inptr++;
        }
}

/******* vertical low pass filter 1 2 1 ************/ void vertic_lp(nextptr, currptr, prevptr, outptr, length)
int *nextptr, *currptr, *prevptr, *outptr;
int length;
{
    register int i=length;
    while(i--){
        *outptr = (*nextptr + ((*currptr)<<1) + *prevptr) >> 2;
        outptr++;nextptr++;currptr++;prevptr++;
        }
}

/********** high frequency enhance routine based on
         pre-computed LUT***/ void hf_enhancer(inoutptr, length, lmod)
int *inoutptr, length, lmod;
{
register int i, inoutabs, imod;
for(i=0;i<length;i++){
    imod=i%8;
    inoutabs = abs((*inoutptr)>>4);
    if(inoutabs>255)inoutabs=255;
    /*if(*(jpegblock_stdv_ptr+lblock+(i>>3)*3)==0)
         *inoutptr=0;
    else{*/
    if(inoutabs<3)*inoutptr=0;
    else{
                *inoutptr =(*inoutptr>0)?enhancer_lut[inoutabs]:
```

```
            -enhancer_lut[inoutabs];
                        if((imod==0 || imod==7) && (lmod==0 || lmod==7))
                                *inoutptr>>2;
                        else
                        if( (imod==1 || imod==6) && (lmod==0 || lmod==7))
                                *inoutptr>>2;
                        else
                        if( (imod==0 || imod==7) && (lmod==1 || lmod==6))
                                *inoutptr>>2;
                        else
                        if( (imod==1 || imod==6) && (lmod==1 || lmod==6))
                                *inoutptr>>1;
                        else
                        if( ((imod==2 || imod==5) && (lmod==0 || lmod==7))
                        ||
                        ((imod==0 || imod==7) && (lmod==2 || lmod==5))
                        )*inoutptr>>1;
                        }
                inoutptr++;
                }
}
/******** read in a line to input line buffer **********/
void linein(buffinptr, imreadxptr, length)
unsigned char _huge *imreadxptr;
int     *buffinptr, length;
{
    register int i=length;
    while(i--){
            *buffinptr= ((int)(*imreadxptr))<<4;
            buffinptr++;imreadxptr+=3;
            }
}
/******** read in a column to input column buffer **********/
void columnin(buffinptr, imreadyptr, length)
unsigned char _huge *imreadyptr;
int *buffinptr, length;
{
    register int i=length;
    while(i--){
            *buffinptr= ((int)(*imreadyptr))<<4;
            buffinptr++;imreadyptr+=RGB_rect_wsize;
            }
}
/********** write out a line from a line buffer ************/
void lineout(buffoutptr, imwriteptr, length)
unsigned char _huge *imwriteptr;
int     *buffoutptr, length;
{
    register int i=length;
    while(i--){
            *imwriteptr= (unsigned char)((*buffoutptr+8)>>4);
            buffoutptr++;imwriteptr+=3;
            }
}
/********** write out a column from a column buffer ************/
```

134

```
void columnout(buffoutptr, imwriteptr, length)
unsigned char _huge *imwriteptr;
int *buffoutptr, length;
{
    register int i=length;
    while(i--){
            *imwriteptr= (unsigned char)((*buffoutptr+8)>>4);
            buffoutptr++;imwriteptr+=RGB_rect_wsize;
            }
}
/************* keep output pixel in display range ***********/
int display_range(pixel)
int pixel;
{
    if(pixel<BLACK) pixel=BLACK;
    else if (pixel > WHITE) pixel = WHITE;
    return (pixel);
}
/************ line copying computation *****************/
void line_copy(in1ptr, outptr, length)
int *in1ptr, *outptr, length;
{
    register int i=length;
    while(i--)*outptr++=*in1ptr++;
}
/************ line addition computation *****************/
void line_add(in1ptr, in2ptr, outptr, length)
int *in1ptr, *in2ptr, *outptr;
int length;
{
    register int i=length;
    long sum;
    while(i--){
            sum = (long)*in1ptr + (long)*in2ptr;
            if(sum>4080) *outptr = 4080;
            else if(sum<0) *outptr = 0;
                else *outptr = (int)sum;
            in1ptr++;in2ptr++;outptr++;
            }
}
/************ column addition computation *****************/
void column_add(in1ptr, in2ptr, outptr, length)
int *in1ptr, *in2ptr, *outptr;
int length;
{
    register int i=length;
    while(i--){
            *outptr = *in1ptr + *in2ptr;
            in1ptr++;in2ptr++;outptr++;
            }
}
/************ line difference computation *****************/
void line_diff(in1ptr, in2ptr, diffptr, length)
int *in1ptr, *in2ptr, *diffptr;
int length;
```

```
{
    register int i=length;
    while(i--)*diffptr++ = *in1ptr++ - *in2ptr++;
}
/******** 3 dimensional predictive estimate ***************/
void pred_thr_dim_sm(bufinptr, bufprevptr, bufcurrptr,
         buffacptr, irms, lmod, length)
int *bufinptr, *bufprevptr, *bufcurrptr, *buffacptr, irms, length, lmod;
{
        int length1=length-1, length2=length-2, lrprev, delta_two_dir;
        register int i, dlrcurr,/* block_border, lmod,*/
                 irms1=irms+1, irms_1=irms-1;
        int *buffprevl, *buffprevc, *buffprevr, *buffinptr, *buffcurrptr;
        int *rlprevptr=buffrl+length1, *rlcurrptr=buffrl+length2,
*drlcurrptr=deltrl+length2;
        int *pxlacptr;
        /***************** do right to left *************/
        buffprevr  = bufprevptr+length1;
        buffprevc  = bufprevptr+length2;
        buffprevl  = bufprevptr+length2-1;
        buffinptr  = bufinptr+length2;
        buffcurrptr= bufcurrptr+length2;
        *rlprevptr = *(bufinptr+length1);
        for (i=length2;i>0;i--) {
                pxlacptr = buffacptr+i;
                if(*(pxlacptr)>=block_stdv_h_thr || *(pxlacptr)==0){
                *buffcurrptr =
                         (
                         ((*buffprevc +*(klut_h_ptr_mid+
                                 *buffinptr-*buffprevc)) << 1)
                         + *buffprevl +*(klut_h_ptr_mid+
                                 *buffinptr-*buffprevl)
                         + *buffprevr +*(klut_h_ptr_mid+
                                 *buffinptr-*buffprevr)
                         + 2
                         ) >> 2;/*div 4*/
                *drlcurrptr = *buffcurrptr - *rlprevptr;
                *rlcurrptr = *rlprevptr + *(klut_h_ptr_mid+
                         *drlcurrptr);
                }
                else
                 if(*(pxlacptr)<block_stdv_l_thr)
                 {
                         *buffcurrptr =
                         (
                         ((*buffprevc +*(klut_l_ptr_mid+
                                 *buffinptr-*buffprevc)) << 1)
                         + *buffprevl +*(klut_l_ptr_mid+
                                 *buffinptr-*buffprevl)
                         + *buffprevr +*(klut_l_ptr_mid+
                                 *buffinptr-*buffprevr)
                         + 2
                         ) >> 2;/*div 4*/
                         *drlcurrptr = *buffcurrptr - *rlprevptr;
                         *rlcurrptr = *rlprevptr + *(klut_l_ptr_mid+
```

136

```
                                        *drlcurrptr);
                }
                else
                {
                        *buffcurrptr =
                        (
                        ((*buffprevc  +*(klut_ptr_mid+
                                *buffinptr-*buffprevc)) << 1)
                        + *buffprevl  +*(klut_ptr_mid+
                                *buffinptr-*buffprevl)
                        + *buffprevr  +*(klut_ptr_mid+
                                *buffinptr-*buffprevr)
                        + 2
                        ) >> 2;/*div 4*/
                        *drlcurrptr = *buffcurrptr - *rlprevptr;
                        *rlcurrptr = *rlprevptr + *(klut_ptr_mid+
                                *drlcurrptr);
                } buffinptr--;buffcurrptr--;buffprevl--;buffprevc--;
                        buffprevr--; drlcurrptr--;rlcurrptr--;rlprevptr--;
        }
        *drlcurrptr = *buffinptr - *rlprevptr;
        *rlcurrptr = *rlprevptr + *(klut_ptr_mid+*drlcurrptr);
        *buffcurrptr = *(buffcurrptr+1);
        *(buffcurrptr+length1) = *(buffcurrptr+length2);
        /***************do now left to right *************/
        buffcurrptr= bufcurrptr+1;
        rlprevptr = buffrl+2; drlcurrptr=deltrl+1;
        lrprev = *bufcurrptr;bufprevptr++;
        for(i=1;i<length2;i++){
                /*imod = i % 8;
                if(imod==0 || imod==7)block_border=1;
                else block_border=0;*/
                pxlacptr = buffacptr+i;
                dlrcurr = *buffcurrptr-lrprev;
                delta_two_dir = *drlcurrptr+dlrcurr;
                if(*(pxlacptr)>=block_stdv_h_thr || *(pxlacptr)==0){
                        if(((abs(delta_two_dir))>>1)<*(pxlacptr))
                        {
                                *bufprevptr =(((*buffcurrptr)<<2)+
                                        (( lrprev + *rlprevptr
                                        +
twodir_multshift(delta_two_dir,(*rlprevptr-lrprev),irms1)
                                        )<< 1)+ 4 ) >> 3;
                        lrprev = lrprev + *(klut_h_ptr_mid+dlrcurr);
                        }
                        else{
                        lrprev = lrprev + *(klut_h_ptr_mid+dlrcurr);
                                *bufprevptr =   (
                                        (((*buffcurrptr)<<2)+
                                        ((lrprev + *(rlprevptr-1))<< 1)+ 4
                                                ) >> 3;
                                }
                }
```

```
                                          137 else
                          if(*(pxlacptr)<block_stdv_1_thr)
                          {
                                  if(((abs(delta_two_dir))>>1)<*(pxlacptr))
                                          {
                                          *bufprevptr =    (((*buffcurrptr)<<2)+
(( lrprev + *rlprevptr
+ twodir_multshift(delta_two_dir,(*rlprevptr-lrprev),irms_1)
                                                          )<< 1)+ 4 ) >> 3;
                                          lrprev = lrprev + *(klut_1_ptr_mid+dlrcurr);
                                          }
                                  else{
                                          lrprev = lrprev + *(klut_1_ptr_mid+dlrcurr
                                          *bufprevptr =   (
                                                  ((*buffcurrptr)<<2)+
                                                  ((lrprev + *(rlprevptr-1))<< 1)+ 4
                                                          ) >> 3;
                                          }
                          }
                          else
                          {
                                  if(((abs(delta_two_dir))>>1)<*(pxlacptr))
                                          {
                                          *bufprevptr =    (((*buffcurrptr)<<2)+
                                                          (( lrprev + *rlprevptr
+ twodir_multshift(delta_two_dir,(*rlprevptr-lrprev),irms)
                                                          )<< 1)+ 4 ) >> 3;
                                          lrprev = lrprev + *(klut_ptr_mid+dlrcurr);
                                          }
                                  else{
                                          lrprev = lrprev + *(klut_ptr_mid+dlrcurr);
                                          *bufprevptr =   (
                                                  ((*buffcurrptr)<<2)+
                                                  ((lrprev + *(rlprevptr-1))<< 1)+ 4
                                                          ) >> 3;
                                          }
                          } bufprevptr++;rlprevptr++;drlcurrptr++;buffcurrptr++;
                  }
        *bufprevptr = *(--bufprevptr);
}

/******** 3 dimensional predictive estimate **************/
void ps_pred_thr_dim_sm(bufinptr, bufprevptr, bufcurrptr,
          bufnextptr, irms, length)
int *bufinptr, *bufprevptr, *bufcurrptr, irms, length, *bufnextptr;
{
        int    length1=length-1, length2=length-2, lrprev;
        register int i, dlrcurr;
        int *buffprevl, *buffprevc, *buffprevr, *buffinptr, *buffcurrptr;
        int *rlprevptr=buffrl+length1,
*rlcurrptr=buffrl+length2, *drlcurrptr=deltrl+length2;
```

138

```
/*************** do right to left *************/
buffprevr  = bufprevptr+length1;
buffprevc  = bufprevptr+length2;
buffprevl  = bufprevptr+length2-1;
buffinptr  = bufinptr+length2;
buffcurrptr= bufcurrptr+length2;
*rlprevptr = *(bufinptr+length1);
for (i=length2;i>0;i--) {
        *buffcurrptr =
                ( (*buffprevc +
            onedir_multshift(*buffinptr-*buffprevc,irms) << 1)
                  + *buffprevl +
            onedir_multshift(*buffinptr-*buffprevl,irms)
                  + *buffprevr +
            onedir_multshift(*buffinptr-*buffprevr,irms)
                  + 2
                ) >> 2;/*div 4*/
        *drlcurrptr = *buffcurrptr - *rlprevptr;
        *rlcurrptr  = *rlprevptr +
                onedir_multshift(*drlcurrptr,irms);
buffinptr--;buffcurrptr--;buffprevl--;buffprevc--;buffprevr--;
drlcurrptr--;rlcurrptr--;rlprevptr--;
        }
*drlcurrptr = *buffinptr - *rlprevptr;
*rlcurrptr  = *rlprevptr + onedir_multshift(*drlcurrptr,irms);
*buffcurrptr = *(buffcurrptr+1);
*(buffcurrptr+length1) = *(buffcurrptr+length2);
/*************do now left to right *************/
 buffcurrptr= bufcurrptr+1;
rlprevptr = buffrl+2; drlcurrptr=deltrl+1;
    lrprev = *bufcurrptr;bufprevptr++;bufnextptr++;
    for(i=1;i<length2;i++){
            dlrcurr = *buffcurrptr-lrprev;
            *buffcurrptr =
                    (((*buffcurrptr)<<2)+
                    (( lrprev + *rlprevptr
                     + twodir_multshift((*drlcurrptr+dlrcurr),
            (*rlprevptr-lrprev),irms)
                     )<< 1)+ 4 ) >> 3;
            lrprev = lrprev + onedir_multshift(dlrcurr,irms);
            /*compute vertical pseudo 2D *****/
            *bufprevptr =
                    (*bufprevptr + *bufnextptr +
                            twodir_multshift(((*buffcurrptr<<1)-
                    *bufprevptr-*bufnextptr),
                    (*bufprevptr-*bufnextptr), irms))>>1;
            bufprevptr++;rlprevptr++;drlcurrptr++;
            buffcurrptr++;bufnextptr++;
            }
   *bufprevptr = *(--bufprevptr);
}

/*********************************************************/
int rms_shift(noiserms)
int noiserms;
```

139

```
{
  int irms;
NOISE1: ;
  switch(noiserms)
        {
        case 1: irms = -2; break;   case 2: irms = -1; break;
        case 4: irms = 0; break;    case 8: irms = 1; break;
        case 16: irms = 2; break;   case 32:irms = 3; break;
        default: printf("\n Select noise again of values
                1,2,4,8,16,32 \n");
                scanf("%d", &noiserms); goto NOISE1;
        }
  return(irms);
}
/**********************************************************/
int onedir_multshift(diff, irms)
int diff, irms;
{
  int diffs/*, jpegblock_index*/;
  /*if(buffac[i]==0 || imod==0 || imod==7 || lmod==0 || lmod==7)
        diffs=abs(diff>>(4+irms));
  else
  {
  buffacnorm=abs(buffac[i])/acnorm;
  diffs=abs(diff>>(4+irms))+buffacnorm;
  }
  */
  /*
  {
  if ( imod>1 && imod<6 && lmod>1 && lmod<6)
        diffs = abs(diff>>(4+irms));
  else if ( imod==1 || imod==6 || lmod==1 || lmod==6)
                diffs = abs(diff>>(5+irms));
        else
                diffs = abs(diff>>(6+irms));
  } */
  /*jpegblock_index=lblock+(i>>3)*3;
  diffs=(abs(input-*(jpegblock_ave_ptr+jpegblock_index))
                        -*(jpegblock_stdv_ptr+
                jpegblock_index)>0)
                        ?abs(diff>>irms)+2
                        :abs(diff>>irms)-2;*/
  diffs=abs(diff>>irms);
  if(diffs>31)return(diff);
  else return((int)(((long)multlut[diffs]*(long)diff)>>8));

/*if(diffs<0)diffs=0;
  switch(lut[diffs])
  {
    case 0: diffs=diff>>3;break;
    case 1: diffs=(diff>>3)+(diff>>5);break;
    case 2: diffs=(diff>>3)+(diff>>4);break;
    case 3: diffs=diff>>2;break;
    case 4: diffs=(diff>>2)+(diff>>3);break;
    case 5: diffs=(diff>>1)+(diff>>5);break;
```

```
    case 6: diffs=(diff>>1)+(diff>>3)+(diff>>5);break;
    case 7: diffs=(diff>>1)+(diff>>2)+(diff>>5);break;
    case 8: diffs=(diff>>1)+(diff>>2)+(diff>>3);break;
    case 9: diffs=(diff>>1)+(diff>>2)+(diff>>3)+(diff>>5);break;
    case 10: diffs=(diff>>1)+(diff>>2)+(diff>>3)+(diff>>4);break;
    default:  diffs=diff;
  }
  return(diffs);*/
}
/*****************************************************/
int twodir_multshift(diff, diffs, irms)
int diff, diffs, irms;
{
  /*int jpegblock_index;*/
  /*
  if(buffac[i]==0 || imod==0 || imod==7 || lmod==0 || lmod==7)
        diffs=abs(diffs>>(4+irms));
  else
  {
  buffacnorm=abs(buffac[i])/acnorm;
  diffs=abs(diffs>>(4+irms))+buffacnorm;
  }
  */
  /*
  if((buffac[i]>0 && buffac[i-1]<0 && buffac[i+1]<0)
            ||
            (buffac[i]<0 && buffac[i-1]>0 && buffac[i+1]>0)
            ) return(diff);
        else    if(buffac[i]==0)diffs = abs(diffs>>(6+irms));
                else
  {
  if ( imod>1 && imod<6 && lmod>1 && lmod<6)
        diffs = abs(diffs>>(4+irms));
  else  if ( imod==1 || imod==6 || lmod==1 || lmod==6)
                diffs = abs(diffs>>(5+irms));
        else
                diffs = abs(diffs>>(6+irms));
  }*/
  /*jpegblock_index=lblock+(i>>3)*3;
  diffs=(abs(input-*(jpegblock_ave_ptr+jpegblock_index))
                        -*(jpegblock_stdv_ptr+
                  jpegblock_index)>0)
                        ?abs(diffs>>irms)+2
                        :abs(diffs>>irms)-2;*/
  diffs=abs(diffs>>irms);
  if(diffs>31)return(diff);
  else return((int)(((long)multlut[diffs]*(long)diff)>>8));

/*
  if(diffs>31)return(diff);
  else if(diffs<0)diffs=0;
  switch(lut[diffs])
  {
```

```
    case 0: diffs=diff>>3;break;
    case 1: diffs=(diff>>3)+(diff>>5);break;
    case 2: diffs=(diff>>3)+(diff>>4);break;
    case 3: diffs=diff>>2;break;
    case 4: diffs=(diff>>2)+(diff>>3);break;
    case 5: diffs=(diff>>1)+(diff>>5);break;
    case 6: diffs=(diff>>1)+(diff>>3)+(diff>>5);break;
    case 7: diffs=(diff>>1)+(diff>>2)+(diff>>5);break;
    case 8: diffs=(diff>>1)+(diff>>2)+(diff>>3);break;
    case 9: diffs=(diff>>1)+(diff>>2)+(diff>>3)+(diff>>5);break;
    case 10: diffs=(diff>>1)+(diff>>2)+(diff>>3)+(diff>>4);break;
    default: diffs=diff;
  }
  return(diffs);*/
}

/Compute AC feature in a prescan mode****************/
void jpegblock_feature(void)
{
int RGB_pass, block_line_index, block_pixel_index,
block_index=0;
unsigned char _huge *block_ptr;
long    offset;

for(block_line_index=0; block_line_index<rect_hsize;
        block_line_index+=8){
        for(block_pixel_index=0;block_pixel_index<RGB_rect_wsize;
        block_pixel_index+=24){
                for(RGB_pass=0;RGB_pass<3;RGB_pass++){
                        offset= (long)RGB_pass+
                                        (long)block_line_index*
                                (long)RGB_rect_wsize+
                                        (long)block_pixel_index;
                        block_ptr=ac_rect_ptr+offset;
                        jpegblock_compute(block_ptr);
                        }
                }
        }
}

/******** read in a jpeg block  ***********/
void jpegblock_compute(block_ptr)
unsigned char _huge *block_ptr;
{
register int line, pixel;
unsigned char _huge *rdwrtptr;
long    average=0, stdv=0;
/*****read in block ******/
for(line=0;line<8;line++){
        rdwrtptr=block_ptr+(long)line*(long)RGB_rect_wsize;
    for(pixel=0;pixel<8;pixel++){
                average += (int)(*rdwrtptr);
                rdwrtptr+=3;
                }
    }
```

```
average=(average/64);
for(line=0;line<8;line++){
        rdwrtptr=block_ptr+(long)line*(long)RGB_rect_wsize;
        for(pixel=0;pixel<8;pixel++){
                stdv += labs((long)(*rdwrtptr)-average);
                rdwrtptr+=3;
                }
        }
stdv=stdv/64;
/*****write out a block ******/
for(line=0;line<8;line++){
      rdwrtptr=block_ptr+(long)line*(long)RGB_rect_wsize;
   for(pixel=0;pixel<8;pixel++){
                *rdwrtptr = (unsigned char)((int)stdv);
                rdwrtptr+=3;
                }
    }
}

/******** get input image dimensions and processed
        rectangle dimensions****/
void get_img_dimensions(input_img_ptr)
FILE    *input_img_ptr;
{
unsigned char h256, h1;
long    offset=12;
int             single_byte=1;
input_img_header_size=18;
if(fseek(input_img_ptr, offset, 0)!=0)
        {printf("Can't move read pointer there");
        exit(0);}
fread(&h1, single_byte, 1, input_img_ptr);
fread(&h256, single_byte, 1, input_img_ptr);
input_img_wsize=(int)h1+256*(int)h256;
fread(&h1, single_byte, 1, input_img_ptr);
fread(&h256, single_byte, 1, input_img_ptr);
input_img_hsize=(int)h1+256*(int)h256;
offset=0;
if(fseek(input_img_ptr, offset, 0)!=0)
        {printf("Can't move read pointer there");
        exit(0);}
printf("\n input image dimensions: Width=%d, Height=%d \n",
        input_img_wsize, input_img_hsize);
rect_wsize=(input_img_wsize>=480)?480:input_img_wsize;
rect_wsize -= (rect_wsize%8);
RGB_rect_wsize = rect_wsize*3;
rect_hsize=(input_img_hsize>=480)?480:input_img_hsize;
rect_hsize -= (rect_hsize%8);
printf("\n Enter desired ROI starting coordinates (x, y):\n");
scanf("%d %d", &rect_wstart, &rect_hstart);
rect_wstart=(rect_wstart/24)*24;
rect_hstart=(rect_hstart/24)*24;
/*rect_wstart=0; rect_hstart=0;*/ if((rect_wstart+rect_wsize) > input_img_wsize)
```

143

```
                rect_wstart=(input_img_wsize-rect_wsize);
        if((rect_hstart+rect_hsize) > input_img_hsize)
                rect_hstart=(input_img_hsize-rect_hsize);

}

/********** read image data from input file into malloc
        rectangle *****/ void read_rect(input_img_ptr, input_rect_ptr)
        FILE    *input_img_ptr;
        unsigned char _huge *input_rect_ptr;
        {
        long    offset;
        int     sizeofline=input_img_wsize*3, line, pixel;
        int     rect_wstart3=rect_wstart*3,
                rect_wend3=rect_wstart3+rect_wsize*3;
        unsigned char _huge *readrect_ptr=input_rect_ptr;
        unsigned char *linebuffer_ptr;
        linebuffer_ptr = (unsigned char *) malloc(sizeofline);
        offset = input_img_header_size +
                (long)rect_hstart*(long)sizeofline;
        if(fseek(input_img_ptr, offset, 0)!=0)
                {printf("Can't move read pointer there");
                printf("%d", line);exit(0);}
        for (line=rect_hstart; line<(rect_hstart+rect_hsize); line++){
                fread(linebuffer_ptr, sizeofline, 1, input_img_ptr);
                for(pixel=rect_wstart3;pixel<rect_wend3;pixel++)
                        *readrect_ptr++ = *(linebuffer_ptr+pixel);
                }
        free(linebuffer_ptr);
        }
        /********** write image data from malloc rectangle
                into output file*****/ void write_rect(output_rect_ptr, output_img_ptr)
        FILE    *output_img_ptr;
        unsigned char _huge *output_rect_ptr;
        { int     i, sizeofline=RGB_rect_wsize, line;
        unsigned char _huge *writerect_ptr=output_rect_ptr;
        unsigned char *output_img_header_ptr;
        output_img_header_ptr = (unsigned char *)
                        malloc(input_img_header_size);
        for(i=0;i<18;i++)*(output_img_header_ptr+i)=0;
        *(output_img_header_ptr+2)=2;
        *(output_img_header_ptr+12)=rect_wsize%256;/*224;*/
        *(output_img_header_ptr+13)=rect_wsize/256;/*1*/
        *(output_img_header_ptr+14)=rect_hsize%256;/*224;*/
        *(output_img_header_ptr+15)=rect_hsize/256;/*1;*/
        *(output_img_header_ptr+16)=24;

for(i=0;i<18;i++)fwrite((output_img_header_ptr+i), 1, 1,
                output_img_ptr);
```

```
for(line=0;line<rect_hsize;line++){
        fwrite(writerect_ptr, sizeofline, 1, output_img_ptr);
        writerect_ptr += sizeofline;
        }
free(output_img_header_ptr);
}
/*********************************read in KLUT file **********/
void get_klut_file(noiserms)
int     noiserms;
{
FILE *klut_file_ptr, *klut_h_file_ptr, *klut_l_file_ptr;
int     *klut_read_ptr=klut_ptr, *klut_h_read_ptr=klut_h_ptr;
int *klut_l_read_ptr=klut_l_ptr;
switch (noiserms)
{
case 1:   if((klut_l_file_ptr=fopen("klut_n1.dat", "rb"))
                        == NULL){
                        printf("\n Can't open klut file \n");
                        exit(0);}
                        if((klut_file_ptr=fopen("klut_n1.dat",
"rb"))
                        == NULL){
                        printf("\n Can't open klut file \n");
                        exit(0);}
                        if((klut_h_file_ptr=fopen("klut_n2.dat",
"rb"))
                        == NULL){
                        printf("\n Can't open klut file \n");
                        exit(0);}
                        break;
case 2:   if((klut_l_file_ptr=fopen("klut_n1.dat", "rb"))
                        == NULL){
                        printf("\n Can't open klut file \n");
                        exit(0);}
                        if((klut_file_ptr=fopen("klut_n2.dat",
"rb"))
                        == NULL){
                        printf("\n Can't open klut file \n");
                        exit(0);}
                        if((klut_h_file_ptr=fopen("klut_n4.dat",
"rb"))
                        == NULL){
                        printf("\n Can't open klut file \n");
                        exit(0);}
                        break;
case 4:   if((klut_l_file_ptr=fopen("klut_n2.dat", "rb"))
                        == NULL){
                        printf("\n Can't open klut file \n");
                        exit(0);}
                        if((klut_file_ptr=fopen("klut_n4.dat",
"rb"))
                        == NULL){
                        printf("\n Can't open klut file \n");
                        exit(0);}
                        if((klut_h_file_ptr=fopen("klut_n8.dat",
```

145

```
"rb"))
                              == NULL){
                              printf("\n Can't open klut file \n");
                              exit(0);}
                              break;
case 8:    if((klut_l_file_ptr=fopen("klut_n4.dat", "rb"))
                              == NULL){
                              printf("\n Can't open klut file \n");
                              exit(0);}
                              if((klut_file_ptr=fopen("klut_n8.dat",
"rb"))
                              == NULL){
                              printf("\n Can't open klut file \n");
                              exit(0);}
                              if((klut_h_file_ptr=fopen("klut_n16.dat",
"rb"))
                              == NULL){
                              printf("\n Can't open klut file \n");
                              exit(0);}
                              break;
case 16:         if((klut_l_file_ptr=fopen("klut_n8.dat", "rb"))
                              == NULL){
                              printf("\n Can't open klut file \n");
                              exit(0);}
                              if((klut_file_ptr=fopen("klut_n16.dat",
"rb"))
                              == NULL){
                              printf("\n Can't open klut file \n");
                              exit(0);}
                              if((klut_h_file_ptr=fopen("klut_n32.dat",
"rb"))
                              == NULL){
                              printf("\n Can't open klut file \n");
                              exit(0);}
                              break;
case 32:         if((klut_l_file_ptr=fopen("klut_n16.dat", "rb"))
                              == NULL){
                              printf("\n Can't open klut file \n");
                              exit(0);}
                              if((klut_file_ptr=fopen("klut_n32.dat",
"rb"))
                              == NULL){
                              printf("\n Can't open klut file \n");
                              exit(0);}
                              if((klut_h_file_ptr=fopen("klut_n32.dat",
"rb"))
                              == NULL){
                              printf("\n Can't open klut file \n");
                              exit(0);}
                              break;
}
fread(klut_read_ptr, klutsize, 1, klut_file_ptr);
fclose(klut_file_ptr);
fread(klut_l_read_ptr, klutsize, 1, klut_l_file_ptr);
fclose(klut_l_file_ptr);
```

146

```
fread(klut_h_read_ptr, klutsize, 1, klut_h_file_ptr);
fclose(klut_h_file_ptr);
}

}
```

APPENDIX II

```c
/* phototga.c - Photo and Still Video TGA format
Image Improvement******/ include <stdio.h>
include <math.h>
#include <stdlib.h>
include <malloc.h> define IM_W 512
define WHITE 255
#define BLACK 0

/*TGA image read and write parameters*/
int     rect_wsize, rect_hsize, rect_wstart, rect_hstart,
input_img_wsize, input_img_hsize, input_img_header_size;
int     RGB_rect_wsize, *jpegblock_ave_ptr, *jpegblock_stdv_ptr;
int *klut_ptr, *klut_ptr_mid/*, *klut_h_ptr,
*klut_h_ptr_mid, *klut_l_ptr, *klut_l_ptr_mid*/;
int           klutsize=8191*2;
unsigned char _huge *rect_ptr/*, *ac_rect_ptr*/;
long    rect_size;

/*intermediate image buffers*/
int buffin[IM_W]={0}, buffout[IM_W]={0}, buffnext[IM_W]={0},
bufflp[IM_W]={0};
int buffprev[IM_W]={0}, buffcurr[IM_W]={0},
buffnorm[IM_W]={0}, buffzoom[IM_W]={0};
int buffac[IM_W]={0};
int diffnext[IM_W]={0}, difflp[IM_W]={0};
int diffprev[IM_W]={0}, diffcurr[IM_W]={0};
int buffrl[IM_W]={0}, deltrl[IM_W]={0}, enhancer_lut[256]={0};
int lut[32]   ={ 0,   1,   2,   3,   4,   5,   5,   6,
                             6,   6,   7,   7,   7,   7,   8,   8,
                             8,   8,   9,   9,   9,   9,  10,  10,
                            10,  10,  11,  11,  11,  11,  11,  11}
int multlut[32]={32,  40,  48,  64,  96, 135, 135, 167,
                            167, 167, 199, 199, 199, 199, 223, 223,
                            223, 223, 232, 232, 232, 232, 239, 239,
                            239, 239, 256, 256, 256, 256, 256, 256}
int block_stdv_h_thr, block_stdv_l_thr, lblock, processing_pass;
/****************************************************************/ void get_img_dimensions(FILE *);
void read_rect(FILE *, unsigned char _huge *);
void write_rect(unsigned char _huge *, FILE *);
/*void jpegblock_feature(void);
void jpegblock_compute(unsigned char _huge *);*/
void adsm(int, int, int, int);
void adsm2D(void);
void aden(int, int, int);
void aden5(int, int, int);
void adfmsm(int, int, int, int);
int rms_shift(int);
void linein(int *, unsigned char _huge *, int);
```

```
void lineout(int *, unsigned char _huge *, int);
void columnin(int *, unsigned char _huge *, int);
void columnout(int *, unsigned char _huge *, int);
void ps_pred_thr_dim_sm(int *, int *, int *, int *, int, int);
void two_dir_sm(int *, int *, int *, int, int);
void ps_two_dir_sm(int *, int *, int *, int *, int, int);
void pred_thr_dim_sm(int *, int *, int *, int *, int, int, int);
void horiz_lp(int *, int*, int);
void vertic_lp(int *, int *, int *, int *, int);
void vertic_avg(int *, int *, int *, int);
void vertic_5lp(int *, int *, int *, int *, int *, int *, int);
void line_diff(int *, int *, int *, int);
void line_add(int *, int *, int *, int);
void hf_enhancer(int *, int, int);
void enhancer_lut_load(int, int, int);
void line_copy (int *, int *, int);
int onedir_multshift(int, int);
int twodir_multshift(int, int, int);
void get_klut_file(int);
void field_interp(int, int);
/****************************************************/
void main (argc, argv)
int argc;
char *argv[];
{
        FILE    *input_img_ptr, *output_img_ptr;
        int     select;

if(argc < 3){
        printf("  Format: C>phototga source.xxx dest.xxx ");
        exit(0);
        }
        if( (input_img_ptr=fopen(argv[1], "rb")) == NULL){
        printf("\n Can't open file %s.", argv[1]);
        exit(0);
        }
        if( (output_img_ptr=fopen(argv[2], "wb")) == NULL){
        printf("\n Can't open file %s.", argv[2]);
        exit(0);
        }
        /*get image dimensions and coordinates of rectangle
ROI*/
        get_img_dimensions(input_img_ptr);
        rect_size=(long)rect_wsize*(long)rect_hsize*3/2;
        rect_ptr = (unsigned char _huge *) _halloc(rect_size,
sizeof(int));
        read_rect(input_img_ptr, rect_ptr);
        /*ac_rect_ptr = (unsigned char _huge *) _halloc(rect_size,
sizeof(int));
        read_rect(input_img_ptr, ac_rect_ptr);*/
        fclose (input_img_ptr);
        /*finished reading image data into read_rect buffer*/
        klut_ptr=(int *) calloc(8191, sizeof(int));
        klut_ptr_mid=klut_ptr+4096;
        /*klut_h_ptr=(int *) calloc(8191, sizeof(int));
```

```
            klut_h_ptr_mid=klut_h_ptr+4096;
            klut_l_ptr=(int *) calloc(8191, sizeof(int));
            klut_l_ptr_mid=klut_l_ptr+4096;*/
            /*jpegblock_feature();*/
START:      ;
            /* manual selection of image filtering */
            printf("\n Enter desired PHOTO/STILL VIDEO
IMAGE PROCESSING operation: \n\n");
            printf("#0    : EXIT \n");
            printf("#1-4  : White    Noise Reduction >1-4 \n");
            printf("#5,6  : VCR/FPN Noise Reduction >1,3 \n");
            printf("#7,8  : Video FIELD INTERPOLATE   odd,even
lines \n");
            printf("#9,10: CONTRAST ENHANCEMENT    3,5 \n");
            printf("#11   : MODERATE NR... + MODERATE EN...     \n");
            printf("#12   : MODERATE NR... + HIGH      EN...    \n");
            printf("#13   : HIGH     NR... + MODERATE EN...     \n");
            printf("#14   : HIGH     NR... + HIGH      EN...    \n");
            printf("#15   : VERY HIGH  NR..+ HIGH      EN...    \n");
            printf("#16   : VERY HIGH  NR..+ VERY HIGH EN..     \n");

SELECT:     ;
            scanf("%d", &select);
            switch (select)
                    {
                    case 0:  goto END;
                    case 1:  adsm(1, 0, 0, 0); break;
                    case 2:  adsm(2, 0, 0, 0); break;
                    case 3:  adsm(3, 0, 0, 0); break;
                    case 4:  adsm(4, 0, 0, 0); break;
                    case 5:          adfmsm(1, 0, 0, 0);  break;
                    case 6:          adfmsm(3, 0, 0, 0);  break;
                    case 7:          field_interp(1, 0);  break;
                    case 8:          field_interp(2, 0);  break;
                    case 9:  aden(0, 0, 0) ;         break;
                    case 10:         aden5(0, 0, 0) ;           break;
                    case 11:         adsm(3, 2, 16, 4) ;
                                     adsm(1, 1, 16, 4) ;
                                     aden(2, 32, 2);
                                     break;
                    case 12:         adsm(3, 2, 16, 4) ;
                                     adsm(1, 1, 16, 4) ;
                                     aden(3, 32, 2);
                                     break;
                    case 13:         adsm(3, 4, 16, 4) ;
                                     adsm(1, 2, 16, 4) ;
                                     aden(3, 32, 2);
                                     break;
            case 14:         adsm(3, 4, 16, 4) ;
                                     adsm(1, 2, 16, 4) ;
                                     aden(4, 32, 2);
                                     break;
                    case 15:         adsm(3, 8, 16, 4) ;
                                     adsm(1, 4, 16, 4) ;
                                     adsm(2, 2, 16, 4) ;
```

150

```
                                                aden(4, 32, 2);
                                                break;
        case 16:        adsm(3, 8, 16, 4) ;
                                                adsm(1, 4, 16, 4) ;
                                                adsm(2, 2, 16, 4) ;
                                                aden(8, 32, 2);
                                                break;
                default:        printf("\n Wrong function selection;
Try again! \n");
                                                goto SELECT;
                }
        goto START;
END:write_rect(rect_ptr, output_img_ptr);
        fclose (output_img_ptr);
        _hfree(rect_ptr);/* _hfree(ac_rect_ptr);*/
        free(klut_ptr);/*free(klut_h_ptr);free(klut_l_ptr);*/

}
/******** Modular three dimensional adsm routine ********/
void adsm(direction_option, noiserms_b, block_stdv_h_thr_b,
block_stdv_l_thr_b)
int direction_option, noiserms_b, block_stdv_h_thr_b,
block_stdv_l_thr_b;
{
    int noiserms=1, irms, width=rect_wsize, height=rect_hsize;
    int RGB_pass, line_index, pixel_index, lmod;
    unsigned char _huge *read_rect_ptr /**read_ac_rect_ptr*/;

if(noiserms_b != 0){
        noiserms = noiserms_b;
        }
else{
        printf("\n Enter noise rms (1,2,4,8,16,32) \n");
        scanf("%d", &noiserms);
        }
irms = rms_shift(noiserms)+4;
get_klut_file(noiserms);

DIRECTION: ;
switch(direction_option)
        {
        case 1: break;   case 2: break;
        case 3: break;   case 4: break;
        default: printf("\n Enter direction option again (1-4)\n");
                scanf("%d", &direction_option);
                goto DIRECTION;
        }
if(direction_option==1 || direction_option==2){
        for(RGB_pass=0;RGB_pass<3;RGB_pass++){
                if(direction_option==1){
                        read_rect_ptr=rect_ptr+RGB_pass;
                        /*read_ac_rect_ptr=ac_rect_ptr+
RGB_pass;*/
                        }
                else{
                        read_rect_ptr=rect_ptr
```

151

```
                                                +(long)RGB_rect_wsize*
(long)(rect_hsize-1)
                                                +RGB_pass;
                              /*read_ac_rect_ptr=ac_rect_ptr
                                                +(long)RGB_rect_wsize*
(long)(rect_hsize-1)
                                                +RGB_pass;*/
                              }
              linein(buffprev, read_rect_ptr, width);
              lineout(buffprev, read_rect_ptr, width);
              for(line_index=1; line_index<rect_hsize; line_index++){
                              if(direction_option==1){
                                        read_rect_ptr+=RGB_rect_wsize;
                                        /*read_ac_rect_ptr+=
RGB_rect_wsize;*/}
                              else {
                                        read_rect_ptr=
                                                  rect_ptr+
(long)RGB_rect_wsize*(long)(rect_hsize-1-line_index);
                                        /*read_ac_rect_ptr=
ac_rect_ptr+(long)RGB_rect_wsize*
(long)(rect_hsize-1-line_index);*/
                                        }
                              lmod = line_index % 8;
                              linein(buffin, read_rect_ptr, width);
                              /*linein(buffac, read_ac_rect_ptr, width);*/
                              pred_thr_dim_sm(buffin, buffprev,
buffcurr, buffac, irms, lmod, width);
                              lineout(buffprev, read_rect_ptr, width);
                              }
              }
    else
              if(direction_option==3 || direction_option==4){
                        for(RGB_pass=0;RGB_pass<3;RGB_pass++){
                              if(direction_option==3){
                                        read_rect_ptr=rect_ptr+RGB_pass;
                                        /*read_ac_rect_ptr=ac_rect_ptr+
RGB_pass;*/}
                              else {
                                        read_rect_ptr=rect_ptr+RGB_rect_wsize-3+
RGB_pass;
                                        /*read_ac_rect_ptr=ac_rect_ptr+
RGB_rect_wsize-3+RGB_pass;*/
                                        }
                              linein(buffprev, read_rect_ptr, width);
                              lineout(buffprev, read_rect_ptr, width);
                              for(pixel_index=1; pixel_index<rect_wsize;
pixel_index++){
                                        if(direction_option==3){
                                                  read_rect_ptr+=3;
/*read_ac_rect_ptr+=3;*/}
                                        else {
                                                  read_rect_ptr=rect_ptr+
3*(rect_wsize-1-pixel_index)+RGB_pass;
```

152

```
                                        /*read_ac_rect_ptr=
ac_rect_ptr+3*(rect_wsize-1-pixel_index)+RGB_pass;*/
                                        }
                                        lmod = pixel_index % 8;
                                        columnin(buffin, read_rect_ptr,
height);
                                        /*columnin(buffac, read_ac_rect_ptr,
height);*/
                                        pred_thr_dim_sm(buffin, buffprev,
buffcurr, buffac, irms, lmod, height);
                                        columnout(buffprev, read_rect_ptr,
height);
                                        }
                        }
                }
}

/******** Modular three dimensional adsm routine ********/
void adfmsm(direction_option, inoiserms_b, noiserms_b,
odd_even_fld)
int direction_option, inoiserms_b, noiserms_b, odd_even_fld;
{
    int inoiserms=1, noiserms=1, irms, rms, width=rect_wsize,
height=rect_hsize;
    int RGB_pass, line_index;
    unsigned char _huge *read_rect_ptr, *write_rect_ptr;
    int *prevbptr=buffprev, *currbptr=buffcurr, *nextbptr=buffnext;
    int *prevdptr=diffprev, *currdptr=diffcurr, *nextdptr=diffnext;
    int *normbptr=buffnorm, *tempbptr, *tempdptr;
if(inoiserms_b != 0){
        noiserms = noiserms_b;
        inoiserms = inoiserms_b;
        }
else{
        printf("\n Enter inline and cross line noise rms
(1,2,4,8,16,32) \n");
        scanf("%d %d", &inoiserms, &noiserms);
        }
irms = rms_shift(inoiserms)+4;
rms = rms_shift(noiserms)+4;
get_klut_file(inoiserms);

DIRECTION: ;
switch(direction_option)
        {
        case 1: break;   case 3: break;
        default: printf("\n Enter direction option again (1-4)\n");
                scanf("%d", &direction_option);
                goto DIRECTION;
        }
if(direction_option==1){
        for(RGB_pass=0;RGB_pass<3;RGB_pass++){
                read_rect_ptr=rect_ptr+RGB_pass;
                write_rect_ptr=rect_ptr+RGB_pass;
```

153

```
                linein(buffin, read_rect_ptr, width);
                two_dir_sm(buffin, prevbptr, irms, width);
                line_diff(buffin, prevbptr, prevdptr, width);
                lineout(prevbptr, write_rect_ptr, width);
                write_rect_ptr+=RGB_rect_wsize;
                read_rect_ptr+=RGB_rect_wsize;
                linein(buffin, read_rect_ptr, width);
                two_dir_sm(buffin, currbptr, irms, width);
                line_diff(buffin, currbptr, currdptr, width);
                        for(line_index=2; line_index<rect_hsize;
line_index++){
                                read_rect_ptr+=RGB_rect_wsize;
                                linein(buffin, read_rect_ptr, width);
                        two_dir_sm(buffin, nextbptr, irms, width);
                                line_diff(buffin, nextbptr, nextdptr, width);
                ps_two_dir_sm(prevbptr, currbptr, nextbptr, normbptr, rms,
width);
                                line_add(normbptr, currdptr, buffout, width);
                                lineout(buffout, write_rect_ptr, width);
                                write_rect_ptr+=RGB_rect_wsize;
                                tempbptr = nextbptr;  tempdptr = nextdptr;
                                nextbptr = prevbptr;  nextdptr = prevdptr;
                                prevbptr = currbptr;  prevdptr = currdptr;
                                currbptr = tempbptr;  currdptr = tempdptr;
                                }
                        }
        }
        else{
                for(RGB_pass=0;RGB_pass<3;RGB_pass++){
                        read_rect_ptr=rect_ptr+RGB_pass;
                write_rect_ptr=rect_ptr+RGB_pass;
                columnin(buffin, read_rect_ptr, height);
                two_dir_sm(buffin, prevbptr, irms, height);
                line_diff(buffin, prevbptr, prevdptr, height);
                columnout(prevbptr, write_rect_ptr, height);
                write_rect_ptr+=3;
                read_rect_ptr+=3;
                columnin(buffin, read_rect_ptr, height);
                two_dir_sm(buffin, currbptr, irms, height);
                line_diff(buffin, currbptr, currdptr, height);
                        for(line_index=2; line_index<rect_wsize;
line_index++){
                                read_rect_ptr+=3;
                                columnin(buffin, read_rect_ptr, height);
                        two_dir_sm(buffin, nextbptr, irms, height);
                                line_diff(buffin, nextbptr, nextdptr, height);
                ps_two_dir_sm(prevbptr, currbptr, nextbptr, normbptr, rms,
height);
                                line_add(normbptr, currdptr, buffout, height)
                                columnout(buffout, write_rect_ptr, height);
                                write_rect_ptr+=3;
                                tempbptr = nextbptr;  tempdptr = nextdptr;
                                nextbptr = prevbptr;  nextdptr = prevdptr;
                                prevbptr = currbptr;  prevdptr = currdptr;
                                currbptr = tempbptr;  currdptr = tempdptr;
```

```c
            }
        }
    }

/******** Video Field Interpolation*******/
void field_interp(odd_even_lines, interp_option)
int odd_even_lines, interp_option;
{
    int width=rect_wsize, height=rect_hsize;
    int RGB_pass, line_index;
    unsigned char _huge *read_rect_ptr, *write_rect_ptr;
    int *prevbptr=buffprev, *nextbptr=buffnext, *tempbptr;

if(odd_even_lines == 0){
        printf("\n Enter Odd-1 or Even-2 lines to be interpolated \n");
        scanf("%d", &odd_even_lines);
        printf("\n Enter Interpolation Method: 0-Replicate, 1-Bilinear \n");
        scanf("%d", &interp_option);
    } if(odd_even_lines==1){
        for(RGB_pass=0;RGB_pass<3;RGB_pass++){
            read_rect_ptr=rect_ptr+RGB_pass;
            linein(prevbptr, read_rect_ptr, width);
            write_rect_ptr=read_rect_ptr+RGB_rect_wsize;
            read_rect_ptr=read_rect_ptr+(RGB_rect_wsize<<1);
            linein(nextbptr, read_rect_ptr, width);
            vertic_avg(prevbptr, nextbptr, buffout, width);
            lineout(buffout, write_rect_ptr, width);
            tempbptr=prevbptr;
            prevbptr=nextbptr;
            nextbptr=tempbptr;
            for(line_index=4;line_index<rect_hsize;line_index+=2){
                write_rect_ptr=write_rect_ptr+(RGB_rect_wsize<<1);
                read_rect_ptr=read_rect_ptr+(RGB_rect_wsize<<1);
                linein(nextbptr, read_rect_ptr, width);
                vertic_avg(prevbptr, nextbptr, buffout, width);
                lineout(buffout, write_rect_ptr, width);
                tempbptr=prevbptr;
                prevbptr=nextbptr;
                nextbptr=tempbptr;
            }
        }
    }
    else{
        for(RGB_pass=0;RGB_pass<3;RGB_pass++){
```

155

```
                        read_rect_ptr=rect_ptr+RGB_rect_wsize+
RGB_pass;
                    linein(prevbptr, read_rect_ptr, width);
                write_rect_ptr=read_rect_ptr+RGB_rect_wsize;
                    read_rect_ptr=read_rect_ptr+(RGB_rect_wsize<<1);
                    linein(nextbptr, read_rect_ptr, width);
                    vertic_avg(prevbptr, nextbptr, buffout, width);
                    lineout(buffout, write_rect_ptr, width);
                    tempbptr=prevbptr;
                    prevbptr=nextbptr;
                    nextbptr=tempbptr;
                    for(line_index=4;line_index<rect_hsize;
line_index+=2){
                        write_rect_ptr=write_rect_ptr+
(RGB_rect_wsize<<1);
                        read_rect_ptr=read_rect_ptr+
(RGB_rect_wsize<<1);
                        linein(nextbptr, read_rect_ptr, width);
                        vertic_avg(prevbptr, nextbptr, buffout, width);
                        lineout(buffout, write_rect_ptr, width);
                        prevbptr=nextbptr;
                    }
                }
        }
}

/******** Modular contrast enhancement of laplacian
high frequency
signal component adaptively by combining horizontal
and vertical
Laplacian FIR filters and selected enhancement parameters.
********/
void aden(hf_gain_b, hf_norml_b, hf_option_b)
int             hf_gain_b, hf_norml_b, hf_option_b;
{
  int *tempbptr, *nextbptr=buffnext, *currbptr=buffcurr,
*prevbptr=buffprev;
  int *lpbptr=bufflp, *lpdptr=difflp;
  int width=rect_wsize, height=rect_hsize, RGB_pass,
line_index, lmod=0;
  unsigned char _huge *read_rect_ptr, *write_rect_ptr;
  enhancer_lut_load(hf_gain_b, hf_norml_b, hf_option_b);
  for(RGB_pass=0;RGB_pass<3;RGB_pass++){
      read_rect_ptr=rect_ptr+RGB_pass;
      write_rect_ptr=rect_ptr+RGB_pass;
      linein(buffin, read_rect_ptr, width);
      horiz_lp(buffin, prevbptr, width);
```

```
        lineout(prevbptr, write_rect_ptr, width);
        write_rect_ptr+=RGB_rect_wsize;
        read_rect_ptr+=RGB_rect_wsize;
        linein(buffin, read_rect_ptr, width);
        linein(buffnorm, read_rect_ptr, width);
        horiz_lp(buffin, currbptr, width);
        for(line_index=2; line_index<rect_hsize;line_index++){
                read_rect_ptr+=RGB_rect_wsize;
                linein(buffin, read_rect_ptr, width);
                horiz_lp(buffin, nextbptr, width);
                vertic_lp(nextbptr, currbptr, prevbptr, lpbptr, width);
                line_diff(buffnorm, lpbptr, lpdptr, width);
                hf_enhancer(lpdptr, width, lmod);
                line_add(buffnorm, lpdptr, buffout, width);
                line_copy(buffin, buffnorm, width);
                lineout(buffout, write_rect_ptr, width);
                write_rect_ptr+=RGB_rect_wsize;
                tempbptr = nextbptr;
                nextbptr = prevbptr;
                prevbptr = currbptr;
                currbptr = tempbptr;
                }
        }
} void aden5(hf_gain_b, hf_norml_b, hf_option_b)
int          hf_gain_b, hf_norml_b, hf_option_b;
{
   int *tempbptr, *nextbptr=buffnext, *currbptr=buffcurr,
*prevbptr=buffprev;
   int *lpbptr=bufflp, *lpdptr=difflp, *next1bptr=buffrl,
*next2bptr=deltrl;
   int width=rect_wsize, height=rect_hsize, RGB_pass,
line_index, lmod=0;
   unsigned char _huge *read_rect_ptr, *write_rect_ptr;
   enhancer_lut_load(hf_gain_b, hf_norml_b, hf_option_b);
   for(RGB_pass=0;RGB_pass<3;RGB_pass++){
        read_rect_ptr=rect_ptr+RGB_pass;
        write_rect_ptr=rect_ptr+RGB_pass;
        linein(buffin, read_rect_ptr, width);
        horiz_lp(buffin, buffac, width);
        horiz_lp(buffac, prevbptr, width);
        write_rect_ptr+=RGB_rect_wsize;
        read_rect_ptr+=RGB_rect_wsize;
        linein(buffin, read_rect_ptr, width);
        horiz_lp(buffin, buffac, width);
        horiz_lp(buffac, currbptr, width);
        write_rect_ptr+=RGB_rect_wsize;
        read_rect_ptr+=RGB_rect_wsize;
        linein(buffin, read_rect_ptr, width);
        horiz_lp(buffin, buffac, width);
        horiz_lp(buffac, nextbptr, width);
        linein(buffnorm, read_rect_ptr, width);
        read_rect_ptr+=RGB_rect_wsize;
```

```
        linein(buffin, read_rect_ptr, width);
        horiz_lp(buffin, buffac, width);
        horiz_lp(buffac, next1bptr, width);
        linein(buffzoom, read_rect_ptr, width);
        for(line_index=4; line_index<rect_hsize;line_index++){
                read_rect_ptr+=RGB_rect_wsize;
                linein(buffin, read_rect_ptr, width);
                horiz_lp(buffin, buffac, width);
                horiz_lp(buffac, next2bptr, width);
            vertic_5lp(prevbptr, currbptr, nextbptr,
                             next1bptr, next2bptr, lpbptr, width);
            line_diff(buffnorm, lpbptr, lpdptr, width);
                hf_enhancer(lpdptr, width, lmod);
                line_add(buffnorm, lpdptr, buffout, width);
                line_copy(buffzoom, buffnorm, width);
                line_copy(buffin, buffzoom, width);
                lineout(buffout, write_rect_ptr, width);
                write_rect_ptr+=RGB_rect_wsize;
                tempbptr = prevbptr;
                prevbptr = currbptr;
                currbptr = nextbptr;
                nextbptr = next1bptr;
                next1bptr = next2bptr;
                next2bptr = tempbptr;
                }
        }
}

/*********** contrast enha
ncement lut loader **********/
void enhancer_lut_load(hf_gain_b, hf_norm1_b, hf_option_b)
int             hf_gain_b, hf_norm1_b, hf_option_b;
{
  register int i;
  int hf_option/*, hf_power*/;
  float hf_gain, hf_norm1, hf_norm2/*, hf_norm3*/;

if(hf_gain_b != 0){
        hf_gain=(float)hf_gain_b;
        hf_norm1=(float)hf_norm1_b;
        hf_option=hf_option_b;
        }
else{
        printf("\n Enter high frequency gain parameter:
 (integer 1,2...) \n");
        scanf("%f", &hf_gain);
        printf("\n Enter high frequency normalization parameter:
 (integer 8,16,32..) \n");
        scanf("%f", &hf_norm1);
        printf("\n Enter high frequency enhancement option: \n");
        printf("    #1. Weiner ; #2. Trimmed Weiner ;
#3. Power Trimmed Weiner \n");
        scanf("%d", &hf_option);
        }
/*if(hf_option==3){
```

158

```c
    printf("\n Enter trimming power: (integer 1, 2, 3...)\n");
    scanf("%d", &hf_power);
    }*/ if(hf_option == 1){
   for(i=0;i<256;i++)
      *(enhancer_lut+i) =
         (int)( 16.0*(float)i*hf_gain*hf_norm1/(hf_norm1+(float)i) );
   }
else
   if(hf_option == 2){
      for(i=0;i<256;i++){
             hf_norm2=(float)i;
                hf_norm2= hf_norm1*
((float)255-hf_norm2)/(float)255;
                  *(enhancer_lut+i) =
                     (int)( 16.0*hf_gain*hf_norm2/(hf_norm2+(float)i) );
         }
      }
   /*else{
      for(i=0;i<256;i++){
          hf_norm3= hf_norm1*(float)pow(
(255.0-(double)i)/255.0, (double)hf_power);
         *(enhancer_lut+i) =
            (int)( 16.0*(float)i*hf_gain*hf_norm3/(hf_norm3+(float)i) )
         }
      }*/
}

/******* horizontal low pass filter 1 2 1 ************/ void horiz_lp(inptr, outptr, length)
int *inptr, *outptr;
int length;
{
   register int i=length-2;
   int *inlptr, *inrptr;
   *outptr=*inptr;*(outptr+length-1)=*(inptr+length-1);
   inlptr=inptr;inptr++;
   inptr++;inrptr=inptr;inptr--;
   outptr++;
   while(i--){
         *outptr = (*inlptr + ((*inptr)<<1) + *inrptr) >> 2;
         inlptr++;inrptr++;outptr++;inptr++;
         }
}

/******* vertical low pass filter 1 2 1 ************/ void vertic_lp(nextptr, currptr, prevptr, outptr, length)
int *nextptr, *currptr, *prevptr, *outptr;
int length;
{
```

```c
    register int i=length;
    while(i--){
        *outptr = (*nextptr + ((*currptr)<<1) + *prevptr) >> 2;
        outptr++;nextptr++;currptr++;prevptr++;
        }
}

/******* vertical avg************/ void vertic_avg(prevptr, nextptr, outptr, length)
int *nextptr, *prevptr, *outptr;
int length;
{
    int *outptr1=buffac;
    register int i=length;
    while(i--){
        *outptr1 = (*nextptr + *prevptr + 1)>>1;
        outptr1++;nextptr++;prevptr++;
        }
    i=length-2;outptr++;outptr1=buffac+1;
    while(i--){
        *outptr = (((*outptr1)<<1) + *(outptr1-1) + *(outptr1+1) ) >> 2;
        outptr1++;outptr++;
        }
}

/******* vertical low pass filter 1 4 6 4 1************/ void vertic_5lp(prevptr, currptr, nextptr,
                               next1ptr, next2ptr, outptr, length)
int *nextptr, *currptr, *prevptr, *next1ptr, *next2ptr, *outptr;
int length;
{
    register int i=length;
    while(i--){
        *outptr =(int) ((long)*prevptr +
                        (long)((*currptr)<<2) +
                        (long)((*nextptr)<<2) +
                        (long)((*nextptr)<<1) +
                        (long)((*next1ptr)<<2)+
                        (long)*next2ptr +
                        8 ) >> 4;
        outptr++;nextptr++;currptr++;prevptr++;next1ptr++;
next2ptr++;
        }
}

/********** high frequency enhance routine based on
pre-computed LUT***/ void hf_enhancer(inoutptr, length, lmod)
int *inoutptr, length, lmod;
```

160

```
{
register int i, inoutabs/*, imod*/;
for(i=0;i<length;i++){
   /*imod=i%8;*/
   inoutabs = abs((*inoutptr)>>4);
   if(inoutabs>255)inoutabs=255;
   if(inoutabs<3)
           *inoutptr=0;
   else{
                 *inoutptr =(*inoutptr>0)?
enhancer_lut[inoutabs]:-enhancer_lut[inoutabs];
                 /*if((imod==0 || imod==7) && (lmod==0 || lmod==7))
*inoutptr>>2;
                 else
                 if( (imod==1 || imod==6) && (lmod==0 || lmod==7))
*inoutptr>>2;
                 else
                 if( (imod==0 || imod==7) && (lmod==1 || lmod==6))
*inoutptr>>2;
                 else
                 if( (imod==1 || imod==6) && (lmod==1 || lmod==6))
*inoutptr>>1;
                 else
                 if( ((imod==2 || imod==5) && (lmod==0 || lmod==7))
                 ||
                 ((imod==0 || imod==7) && (lmod==2 || lmod==5))
                 )*inoutptr>>1;*/
                 }
         inoutptr++;
             }
}
/******** read in a line to input line buffer ***********/
void linein(buffinptr, imreadxptr, length)
unsigned char _huge *imreadxptr;
int     *buffinptr, length;
{
    register int i=length;
    while(i--){
           *buffinptr= ((int)(*imreadxptr))<<4;
           buffinptr++;imreadxptr+=3;
           }
}
/******** read in a column to input column buffer ***********/
void columnin(buffinptr, imreadyptr, length)
unsigned char _huge *imreadyptr;
int *buffinptr, length;
{
    register int i=length;
    while(i--){
           *buffinptr= ((int)(*imreadyptr))<<4;
           buffinptr++;imreadyptr+=RGB_rect_wsize;
           }
}
/*********** write out a line from a line buffer ************/
void lineout(buffoutptr, imwriteptr, length)
```

```
unsigned char _huge *imwriteptr;
int      *buffoutptr, length;
{
   register int i=length;
   while(i--){
          *imwriteptr= (unsigned char)((*buffoutptr+8)>>4);
          buffoutptr++;imwriteptr+=3;
          }
}
/*********** write out a column from a column buffer *************/
void columnout(buffoutptr, imwriteptr, length)
unsigned char _huge *imwriteptr;
int *buffoutptr, length;
{
   register int i=length;
   while(i--){
          *imwriteptr= (unsigned char)((*buffoutptr+8)>>4);
          buffoutptr++;imwriteptr+=RGB_rect_wsize;
          }
}
/************* keep output pixel in display range ***********/
int display_range(pixel)
int pixel;
{
   if(pixel<BLACK) pixel=BLACK;
   else if (pixel > WHITE) pixel = WHITE;
   return (pixel);
}
/************ line copying computation *****************/
void line_copy(in1ptr, outptr, length)
int *in1ptr, *outptr, length;
{
   register int i=length;
   while(i--)*outptr++=*in1ptr++;
}
/************ line addition computation *****************/
void line_add(in1ptr, in2ptr, outptr, length)
int *in1ptr, *in2ptr, *outptr;
int length;
{
   register int i=length;
   long sum;
   while(i--){
          sum = (long)*in1ptr + (long)*in2ptr;
          if(sum>4080) *outptr = 4080;
          else if(sum<0) *outptr = 0;
                else *outptr = (int)sum;
          in1ptr++;in2ptr++;outptr++;
          }
}
/************* column addition computation *****************/
void column_add(in1ptr, in2ptr, outptr, length)
int *in1ptr, *in2ptr, *outptr;
int length;
{
```

```
        register int i=length;
        while(i--){
                *outptr = *in1ptr + *in2ptr;
                in1ptr++;in2ptr++;outptr++;
                }
}
/************* line difference computation *****************/
void line_diff(in1ptr, in2ptr, diffptr, length)
int *in1ptr, *in2ptr, *diffptr;
int length;
{
    register int i=length;
    while(i--)*diffptr++ = *in1ptr++ - *in2ptr++;
}
/******** 3 dimensional predictive estimate ***************/
void pred_thr_dim_sm(bufinptr, bufprevptr, bufcurrptr, buffacptr,
irms, lmod, length)
int *bufinptr, *bufprevptr, *bufcurrptr, *buffacptr, irms, length, lmod;
{
        int    length1=length-1, length2=length-2, lrprev, delta_two_dir;
        register int i, dlrcurr,/* block_border, imod,*/ irms1=irms+1,
irms_1=irms-1;
        int *buffprevl, *buffprevc, *buffprevr, *buffinptr, *buffcurrptr
        int
*rlprevptr=buffrl+length1, *rlcurrptr=buffrl+length2,
*drlcurrptr=deltrl+length2;
        /*int *pxlacptr;*/
        /***************** do right to left *************/
        buffprevr  = bufprevptr+length1;
        buffprevc  = bufprevptr+length2;
        buffprevl  = bufprevptr+length2-1;
        buffinptr  = bufinptr+length2;
        buffcurrptr= bufcurrptr+length2;
        *rlprevptr = *(bufinptr+length1);
        for (i=length2;i>0;i--) {
                *buffcurrptr =
                         (
((*buffprevc   +*(klut_ptr_mid+*buffinptr-*buffprevc)) << 1)
        + *buffprevl  +*(klut_ptr_mid+*buffinptr-*buffprevl)
        + *buffprevr  +*(klut_ptr_mid+*buffinptr-*buffprevr)
        + 2
        ) >> 2;/*div 4*/
*drlcurrptr = *buffcurrptr - *rlprevptr;
*rlcurrptr = *rlprevptr + *(klut_ptr_mid+*drlcurrptr);
buffinptr--;buffcurrptr--;buffprevl--;buffprevc--;buffprevr--;
        drlcurrptr--;rlcurrptr--;rlprevptr--;
        }
        *drlcurrptr = *buffinptr - *rlprevptr;
        *rlcurrptr = *rlprevptr + *(klut_ptr_mid+*drlcurrptr);
        *buffcurrptr = *(buffcurrptr+1);
        *(buffcurrptr+length1) = *(buffcurrptr+length2);
/*************do now left to right *************/
        buffcurrptr= bufcurrptr+1;
        rlprevptr = buffrl+2; drlcurrptr=deltrl+1;
```

```
                lrprev = *bufcurrptr;bufprevptr++;
                for(i=1;i<length2;i++){
                        dlrcurr = *buffcurrptr-lrprev;
                        delta_two_dir = *drlcurrptr+dlrcurr;
                        *bufprevptr =    (((*buffcurrptr)<<2)+
                                  (( lrprev + *rlprevptr
                                  + twodir_multshift(delta_two_dir,
(*rlprevptr-lrprev),irms)
                                   )<< 1)+ 4 ) >> 3;
                        lrprev = lrprev + *(klut_ptr_mid+dlrcurr);
                        bufprevptr++;rlprevptr++;drlcurrptr++;buffcurrptr++;
                }
                *bufprevptr = *(--bufprevptr);
}

/*************** Two Dir Smoother ******************/
void two_dir_sm(bufinptr, bufoutptr, irms, length)
int *bufinptr, *bufoutptr, irms, length;
{
        int  length1=length-1, length2=length-2, lrprev;
        register int i, dlrcurr;
        int *buffinptr;
        int
*rlprevptr=buffrl+length1, *rlcurrptr=buffrl+length2,
*drlcurrptr=deltrl+length2;
        /*************** do right to left ************/
        buffinptr = bufinptr+length2;
        *rlprevptr = *(bufinptr+length1);
        for (i=length2;i>0;i--) {
                *drlcurrptr = *buffinptr - *rlprevptr;
                *rlcurrptr = *rlprevptr + *(klut_ptr_mid+*drlcurrptr);
                buffinptr--;drlcurrptr--;rlcurrptr--;rlprevptr--;
        }
        /***************do now left to right ************/
        buffinptr= bufinptr+1;
        rlprevptr = buffrl+2; drlcurrptr=deltrl+1;
        lrprev = *buffinptr;*bufoutptr=*buffinptr;bufoutptr++;
        for(i=1;i<length1;i++){
                dlrcurr = *buffinptr-lrprev;
                *bufoutptr =     ( lrprev + *rlprevptr
        + twodir_multshift(*drlcurrptr+dlrcurr,(*rlprevptr-lrprev),irms
                                                        + 2
                                            ) >> 1;
                lrprev = lrprev + *(klut_ptr_mid+dlrcurr);
                bufoutptr++;rlprevptr++;drlcurrptr++;buffinptr++;
        }
        *bufoutptr = *(--bufoutptr);
}

/***************Pseudo-Two Dir Smoother ******************/
void ps_two_dir_sm(bufprevptr, bufcurrptr, bufnextptr, bufoutptr,
rms, length)
int *bufprevptr, *bufcurrptr, *bufnextptr, *bufoutptr, rms, length;
{
int     i;
```

```
for(i=0;i<length;i++){
        *bufoutptr =
                (*bufprevptr + *bufnextptr
                + twodir_multshift(
(((*bufcurrptr)<<1)-*bufprevptr-*bufnextptr),
                                (*bufprevptr-*bufnextptr),
                                                        rms
                                                        )
                + 2
                ) >> 1;
        bufprevptr++; bufcurrptr++; bufnextptr++; bufoutptr++;
        }
}

/******** 3 dimensional predictive estimate **************/
void ps_pred_thr_dim_sm(bufinptr, bufprevptr, bufcurrptr,
bufnextptr, irms, length)
int *bufinptr, *bufprevptr, *bufcurrptr, irms, length, *bufnextptr;
{
        int  length1=length-1, length2=length-2, lrprev;
        register int i, dlrcurr;
        int *buffprevl, *buffprevc, *buffprevr, *buffinptr, *buffcurrptr
        int *rlprevptr=buffrl+length1,
*rlcurrptr=buffrl+length2, *drlcurrptr=deltrl+length2;
        /**************** do right to left *************/
        buffprevr  = bufprevptr+length1;
        buffprevc  = bufprevptr+length2;
        buffprevl  = bufprevptr+length2-1;
        buffinptr  = bufinptr+length2;
        buffcurrptr= bufcurrptr+length2;
        *rlprevptr = *(bufinptr+length1);
        for (i=length2;i>0;i--) {
                *buffcurrptr =
                        ( (*buffprevc +
onedir_multshift(*buffinptr-*buffprevc,irms) << 1)
+ *buffprevl  + onedir_multshift(*buffinptr-*buffprevl,irms)
+ *buffprevr  + onedir_multshift(*buffinptr-*buffprevr,irms)
+ 2
                        ) >> 2;/*div 4*/
                *drlcurrptr = *buffcurrptr - *rlprevptr;
        *rlcurrptr = *rlprevptr + onedir_multshift(*drlcurrptr,irms);
        buffinptr--;buffcurrptr--;buffprevl--;buffprevc--;buffprevr--;
        drlcurrptr--;rlcurrptr--;rlprevptr--;
                }
        *drlcurrptr = *buffinptr - *rlprevptr;
        *rlcurrptr = *rlprevptr + onedir_multshift(*drlcurrptr,irms);
        *buffcurrptr = *(buffcurrptr+1);
        *(buffcurrptr+length1) = *(buffcurrptr+length2);
        /***************do now left to right *************/
         buffcurrptr= bufcurrptr+1;
         rlprevptr = buffrl+2; drlcurrptr=deltrl+1;
             lrprev = *bufcurrptr;bufprevptr++;bufnextptr++;
             for(i=1;i<length2;i++){
                      dlrcurr = *buffcurrptr-lrprev;
```

```
                *buffcurrptr =
                        (((*buffcurrptr)<<2)+
                        (( lrprev + *rlprevptr
                         + twodir_multshift
((*drlcurrptr+dlrcurr),(*rlprevptr-lrprev),irms)
                        )<< 1)+ 4 ) >> 3;
                lrprev = lrprev + onedir_multshift(dlrcurr,irms);
                /*compute vertical pseudo 2D *****/
                *bufprevptr =
                        (*bufprevptr + *bufnextptr +
                         twodir_multshift
(((*buffcurrptr<<1)-*bufprevptr-*bufnextptr),
(*bufprevptr-*bufnextptr), irms))>>1;
bufprevptr++;rlprevptr++;drlcurrptr++;buffcurrptr++;bufnextptr++;
            }
    *bufprevptr = *(--bufprevptr);
}

/*************************************************************/
int rms_shift(noiserms)
int noiserms;
{
  int irms;
NOISE1: ;
  switch(noiserms)
        {
        case 1: irms = -2; break;    case 2: irms = -1; break;
        case 4: irms = 0; break;     case 8: irms = 1; break;
        case 16: irms = 2; break;    case 32:irms = 3; break;
        default: printf("\n Select noise again of values
1,2,4,8,16,32 \n");
                scanf("%d", &noiserms); goto NOISE1;
        }
  return(irms);
}
/*************************************************************/
int onedir_multshift(diff, irms)
int diff, irms;
{
  int diffs/*, jpegblock_index*/;
  /*if(buffac[i]==0 || imod==0 || imod==7 || lmod==0 || lmod==7)
        diffs=abs(diff>>(4+irms));
  else
  {
  buffacnorm=abs(buffac[i])/acnorm;
  diffs=abs(diff>>(4+irms))+buffacnorm;
  }
  */
  /*
  {
  if ( imod>1 && imod<6 && lmod>1 && lmod<6)
        diffs = abs(diff>>(4+irms));
  else if ( imod==1 || imod==6 || lmod==1 || lmod==6)
                diffs = abs(diff>>(5+irms));
        else
```

```
                    diffs = abs(diff>>(6+irms));
} */
/*jpegblock_index=lblock+(i>>3)*3;
diffs=(abs(input-*(jpegblock_ave_ptr+jpegblock_index))
                -*(jpegblock_stdv_ptr+jpegblock_index)>0)
                        ?abs(diff>>irms)+2
                        :abs(diff>>irms)-2;*/
diffs=abs(diff>>irms);
if(diffs>31)return(diff);
else return((int)(((long)multlut[diffs]*(long)diff)>>8));

/*if(diffs<0)diffs=0;
switch(lut[diffs])
{
  case 0: diffs=diff>>3;break;
  case 1: diffs=(diff>>3)+(diff>>5);break;
  case 2: diffs=(diff>>3)+(diff>>4);break;
  case 3: diffs=diff>>2;break;
  case 4: diffs=(diff>>2)+(diff>>3);break;
  case 5: diffs=(diff>>1)+(diff>>5);break;
  case 6: diffs=(diff>>1)+(diff>>3)+(diff>>5);break;
  case 7: diffs=(diff>>1)+(diff>>2)+(diff>>5);break;
  case 8: diffs=(diff>>1)+(diff>>2)+(diff>>3);break;
  case 9: diffs=(diff>>1)+(diff>>2)+(diff>>3)+(diff>>5);break;
  case 10: diffs=(diff>>1)+(diff>>2)+(diff>>3)+(diff>>4);break;
  default: diffs=diff;
}
return(diffs);*/
}
/****************************************************/
int twodir_multshift(diff, diffs, irms)
int diff, diffs, irms;
{
  /*int jpegblock_index;*/
  /*
  if(buffac[i]==0 || imod==0 || imod==7 || lmod==0 || lmod==7)
        diffs=abs(diffs>>(4+irms));
  else
  {
  buffacnorm=abs(buffac[i])/acnorm;
  diffs=abs(diffs>>(4+irms))+buffacnorm;
  }
  */
  /*
  if((buffac[i]>0 && buffac[i-1]<0 && buffac[i+1]<0)
        ||
        (buffac[i]<0 && buffac[i-1]>0 && buffac[i+1]>0)
        ) return(diff);
        else   if(buffac[i]==0)diffs = abs(diffs>>(6+irms));
                else
  {
  if ( imod>1 && imod<6 && lmod>1 && lmod<6)
        diffs = abs(diffs>>(4+irms));
  else  if ( imod==1 || imod==6 || lmod==1 || lmod==6)
                diffs = abs(diffs>>(5+irms));
```

```
            else
                        diffs = abs(diffs>>(6+irms));
 }*/
 /*jpegblock_index=lblock+(i>>3)*3;
 diffs=(abs(input-*(jpegblock_ave_ptr+jpegblock_index))
                 -*(jpegblock_stdv_ptr+jpegblock_index)>0)
                                 ?abs(diffs>>irms)+2
                                 :abs(diffs>>irms)-2;*/
 diffs=abs(diffs>>irms);
 if(diffs>31)return(diff);
 else return((int)(((long)multlut[diffs]*(long)diff)>>8));

/*
 if(diffs>31)return(diff);
 else if(diffs<0)diffs=0;
 switch(lut[diffs])
 {
   case 0: diffs=diff>>3;break;
   case 1: diffs=(diff>>3)+(diff>>5);break;
   case 2: diffs=(diff>>3)+(diff>>4);break;
   case 3: diffs=diff>>2;break;
   case 4: diffs=(diff>>2)+(diff>>3);break;
   case 5: diffs=(diff>>1)+(diff>>5);break;
   case 6: diffs=(diff>>1)+(diff>>3)+(diff>>5);break;
   case 7: diffs=(diff>>1)+(diff>>2)+(diff>>5);break;
   case 8: diffs=(diff>>1)+(diff>>2)+(diff>>3);break;
   case 9: diffs=(diff>>1)+(diff>>2)+(diff>>3)+(diff>>5);break;
   case 10: diffs=(diff>>1)+(diff>>2)+(diff>>3)+(diff>>4);break;
   default:  diffs=diff;
 }
 return(diffs);*/
 }

/Compute AC feature in a prescan mode****************
 void jpegblock_feature(void)
 {
 int RGB_pass, block_line_index, block_pixel_index,
 block_index=0;
 unsigned char _huge *block_ptr;
 long      offset;

for(block_line_index=0; block_line_index<rect_hsize;
 block_line_index+=8){
         for(block_pixel_index=0;block_pixel_index<
 RGB_rect_wsize;block_pixel_index+=24){
                 for(RGB_pass=0;RGB_pass<3;RGB_pass++){
                         offset=(long)RGB_pass+
                 (long)block_line_index*(long)RGB_rect_wsize+
                                 (long)block_pixel_index;
                         block_ptr=ac_rect_ptr+offset;
                         jpegblock_compute(block_ptr);
                         }
                 }
```

```
            }
}*/
/******** read in a jpeg block ***********
void jpegblock_compute(block_ptr)
unsigned char _huge *block_ptr;
{
register int line, pixel;
unsigned char _huge *rdwrtptr;
long     average=0, stdv=0;
for(line=0;line<8;line++){
        rdwrtptr=block_ptr+(long)line*(long)RGB_rect_wsize;
    for(pixel=0;pixel<8;pixel++){
                average += (int)(*rdwrtptr);
                rdwrtptr+=3;
                }
    }
average=(average/64);
for(line=0;line<8;line++){
        rdwrtptr=block_ptr+(long)line*(long)RGB_rect_wsize;
        for(pixel=0;pixel<8;pixel++){
                stdv += labs((long)(*rdwrtptr)-average);
                rdwrtptr+=3;
                }
        }
stdv=stdv/64;
for(line=0;line<8;line++){
        rdwrtptr=block_ptr+(long)line*(long)RGB_rect_wsize;
    for(pixel=0;pixel<8;pixel++){
                *rdwrtptr = (unsigned char)((int)stdv);
                rdwrtptr+=3;
                }
    }
}*/

/******** get input image dimensions and
processed rectangle dimensions****/
void get_img_dimensions(input_img_ptr)
FILE    *input_img_ptr;
{
unsigned char h256, h1;
long    offset=12;
int              single_byte=1;
input_img_header_size=18;
if(fseek(input_img_ptr, offset, 0)!=0)
        {printf("Can't move read pointer there");
        exit(0);}
fread(&h1, single_byte, 1, input_img_ptr);
fread(&h256, single_byte, 1, input_img_ptr);
input_img_wsize=(int)h1+256*(int)h256;
fread(&h1, single_byte, 1, input_img_ptr);
fread(&h256, single_byte, 1, input_img_ptr);
input_img_hsize=(int)h1+256*(int)h256;
offset=0;
if(fseek(input_img_ptr, offset, 0)!=0)
```

```
              {printf("Can't move read pointer there");
          exit(0);}
printf("\n input image dimensions: Width=%d,
Height=%d \n", input_img_wsize, input_img_hsize);
rect_wsize=(input_img_wsize>=480)?480:input_img_wsize;
rect_wsize -= (rect_wsize%8);
RGB_rect_wsize = rect_wsize*3;
rect_hsize=(input_img_hsize>=480)?480:input_img_hsize;
rect_hsize -= (rect_hsize%8);
printf("\n Enter desired ROI starting coordinates (x, y):\n");
scanf("%d %d", &rect_wstart, &rect_hstart);
rect_wstart=(rect_wstart/24)*24;
rect_hstart=(rect_hstart/24)*24;
/*rect_wstart=0; rect_hstart=0;*/ if((rect_wstart+rect_wsize) > input_img_wsize)
        rect_wstart=(input_img_wsize-rect_wsize);
if((rect_hstart+rect_hsize) > input_img_hsize)
        rect_hstart=(input_img_hsize-rect_hsize);

}

/********** read image data from input file into
malloc rectangle *****/ void read_rect(input_img_ptr, input_rect_ptr)
FILE    *input_img_ptr;
unsigned char _huge *input_rect_ptr;
{
long    offset;
int     sizeofline=input_img_wsize*3, line, pixel;
int     rect_wstart3=rect_wstart*3,
rect_wend3=rect_wstart3+rect_wsize*3;
unsigned char _huge *readrect_ptr=input_rect_ptr;
unsigned char *linebuffer_ptr;
linebuffer_ptr = (unsigned char *) malloc(sizeofline);
offset = input_img_header_size +
        (long)rect_hstart*(long)sizeofline;
if(fseek(input_img_ptr, offset, 0)!=0)
        {printf("Can't move read pointer there");
        printf("%d", line);exit(0);}
for (line=rect_hstart; line<(rect_hstart+rect_hsize); line++){
        fread(linebuffer_ptr, sizeofline, 1, input_img_ptr);
        for(pixel=rect_wstart3;pixel<rect_wend3;pixel++)
                *readrect_ptr++ = *(linebuffer_ptr+pixel);
        }
free(linebuffer_ptr);
}
/********** write image data from malloc rectangle
into output file*****/ void write_rect(output_rect_ptr, output_img_ptr)
FILE    *output_img_ptr;
unsigned char _huge *output_rect_ptr;
{
```

```
int     i, sizeofline=RGB_rect_wsize, line;
unsigned char _huge *writerect_ptr=output_rect_ptr;
unsigned char *output_img_header_ptr;
output_img_header_ptr = (unsigned char *)
malloc(input_img_header_size);
for(i=0;i<18;i++)*(output_img_header_ptr+i)=0;
*(output_img_header_ptr+2)=2;
*(output_img_header_ptr+12)=rect_wsize%256;/*224;*/
*(output_img_header_ptr+13)=rect_wsize/256;/*1*/
*(output_img_header_ptr+14)=rect_hsize%256;/*224;*/
*(output_img_header_ptr+15)=rect_hsize/256;/*1;*/
*(output_img_header_ptr+16)=24;

for(i=0;i<18;i++)fwrite((output_img_header_ptr+i), 1, 1,
output_img_ptr);
for(line=0;line<rect_hsize;line++){
        fwrite(writerect_ptr, sizeofline, 1, output_img_ptr);
        writerect_ptr += sizeofline;
        }
free(output_img_header_ptr);
}
/*******************************read in KLUT file **********/
void get_klut_file(noiserms)
int     noiserms;
{
FILE *klut_file_ptr/*, *klut_h_file_ptr, *klut_l_file_ptr*/;
int    *klut_read_ptr=klut_ptr/*, *klut_h_read_ptr=klut_h_ptr*/;
/*int *klut_l_read_ptr=klut_l_ptr;*/
switch (noiserms)
{
case 1:  /*if((klut_l_file_ptr=fopen("klut_n1.dat", "rb"))
== NULL){
                        printf("\n Can't open klut file \n");
                        exit(0);}*/
                        if((klut_file_ptr=fopen("klut_n1.dat", "rb"))
== NULL){
                        printf("\n Can't open klut file \n");
                        exit(0);}
                        /*if((klut_h_file_ptr=fopen("klut_n2.dat", "rb")
== NULL){
                        printf("\n Can't open klut file \n");
                        exit(0);}*/
                        break;
case 2:  /*if((klut_l_file_ptr=fopen("klut_n1.dat", "rb"))
== NULL){
                        printf("\n Can't open klut file \n");
                        exit(0);}*/
                        if((klut_file_ptr=fopen("klut_n2.dat", "rb"))
== NULL){
                        printf("\n Can't open klut file \n");
                        exit(0);}
                        /*if((klut_h_file_ptr=fopen("klut_n4.dat", "rb")
== NULL){
                        printf("\n Can't open klut file \n");
```

171

```
                                exit(0);}*/
                                break;
case 4:  /*if((klut_l_file_ptr=fopen("klut_n2.dat", "rb"))
 == NULL){
                                printf("\n Can't open klut file \n");
                                exit(0);}*/
                                if((klut_file_ptr=fopen("klut_n4.dat", "rb"))
 == NULL){
                                printf("\n Can't open klut file \n");
                                exit(0);}
                                /*if((klut_h_file_ptr=fopen("klut_n8.dat", "rb"))
 == NULL){
                                printf("\n Can't open klut file \n");
                                exit(0);}*/
                                break;
case 8:  /*if((klut_l_file_ptr=fopen("klut_n4.dat", "rb"))
 == NULL){
                                printf("\n Can't open klut file \n");
                                exit(0);}*/
                                if((klut_file_ptr=fopen("klut_n8.dat", "rb"))
 == NULL){
                                printf("\n Can't open klut file \n");
                                exit(0);}
                                /*if((klut_h_file_ptr=fopen("klut_n16.dat",
 "rb")) == NULL){
                                printf("\n Can't open klut file \n");
                                exit(0);}*/
                                break;
case 16:         /*if((klut_l_file_ptr=fopen("klut_n8.dat", "rb"))
 == NULL){
                                printf("\n Can't open klut file \n");
                                exit(0);}*/
                                if((klut_file_ptr=fopen("klut_n16.dat", "rb"))
 == NULL){
                                printf("\n Can't open klut file \n");
                                exit(0);}
                                /*if((klut_h_file_ptr=fopen("klut_n32.dat", "rb"))
 == NULL){
                                printf("\n Can't open klut file \n");
                                exit(0);}*/
                                break;
case 32:         /*if((klut_l_file_ptr=fopen("klut_n16.dat", "rb"))
 == NULL){
                                printf("\n Can't open klut file \n");
                                exit(0);}*/
                                if((klut_file_ptr=fopen("klut_n32.dat", "rb"))
 == NULL){
                                printf("\n Can't open klut file \n");
                                exit(0);}
                                /*if((klut_h_file_ptr=fopen("klut_n32.dat", "rb"))
 == NULL){
                                printf("\n Can't open klut file \n");
                                exit(0);}*/
                                break;
}
```

172

```
fread(klut_read_ptr, klutsize, 1, klut_file_ptr);
fclose(klut_file_ptr);
/*fread(klut_l_read_ptr, klutsize, 1, klut_l_file_ptr);
fclose(klut_l_file_ptr);
fread(klut_h_read_ptr, klutsize, 1, klut_h_file_ptr);
fclose(klut_h_file_ptr);*/
}
```

APPENDIX III

```c
/* ****************************************
    crlut_q.c - routine creating single beta lut for
    photoqfg.c ---> a real lUT operation..
    ***************************************** */ include <stdio.h>
include <stdlib.h>
include <math.h> define SIZE 8191
/* ************************************************************ */ void main (argc, argv)
int argc;
char *argv[];
{

/* Variable declarations */

FILE *fileptr;
        static int lutq[SIZE]={0};
        float   corr, rms, betathreshmin, betathreshmax;
        double  snr, ss, sss, var;
        int     i,ii, size2;
/* Pointr declarations */
/* Note: In parts of this program, pointers were reset before each
   subroutine call for purposes of clarity and understanding only. */ printf("Enter choice of noise rms:\n");
        scanf("%f", &rms);
        printf("Enter IMAGE CORRELATION:\n");
        scanf("%f", &corr);
        printf("Enter choice of beta thresholds:minimum and maximum\n");
        scanf("%f %f", &betathreshmin, &betathreshmax);

var = rms*rms*256.0;

if(argc>1)fileptr = fopen(argv[1], "wb");
/* initialize the beta lut */
size2=SIZE/2;
for(i=0; i < (size2+1); i++){
        snr = (double)i * (double)i / var;
        ss = snr / (snr + 1.0);
        for(ii=0; ii < 50; ii++){
                sss = corr * corr * ( ss - snr ) + snr;
                ss = sss / (sss + 1.0);
                }
        if(ss < betathreshmin) ss = betathreshmin;
        else if(ss>betathreshmax)ss=1.0;
        lutq[size2+i] = (int)(ss * (double)i);
        lutq[size2-i] = -lutq[size2+i];
        }
/*if(argc==1){
```

```
        i=SIZE-1;
        while(i--)printf("address=%d lut=%d \n", i, lutq[i]);
        }*/ if(argc>1){
        for(i=0; i < SIZE; i++)fwrite(&lutq[i], sizeof(lutq[i]), 1, fileptr);
        fclose(fileptr);
        }
}
```

I claim:

1. A method for acuity-preserving image smoothing comprising:

proceeding along at least a portion of a first dimension of received image pixels in a first direction and computing a first sequence of estimated pixel values from the received image pixels defined along the first direction;

proceeding along at least a portion of the first dimension of received image pixels in a second direction and computing a second sequence of estimated pixel values from the received image pixels defined along the second direction; and for each individual pixel along the first dimension, computing an improved estimated pixel value for the individual pixel based on a data dependent combination of at least estimated pixel values in the first and second sequences, wherein at least one of the computing steps takes into account image derived information other than the pixel value of the pixel to be estimated.

2. A method according to claim 1 wherein at least one of the computing steps takes into account image derived information other than the signal to noise ratio.

3. A method according to claim 1 wherein said image derived information pertains to the image as a whole.

4. A method according to claim 1 wherein said image derived information comprises the location within the image of the pixel whose value is to be estimated.

5. A method according to claim 1 wherein said image derived information comprises the location of the pixel whose value is to be estimated relative to at least one user-designated location within the image.

6. A method according to claim 1 for enhancement of contrast in an image further comprising:

extracting the high frequency detail from the image signal;

amplifying the extracted high frequency detail signal to an extent at least partly determined as a nonlinear function of at least one of the following image features:

the amplitude of the high frequency detail signal; and local image brightness; and combining at least a portion of the amplified high frequency detail with at least a portion of the image signal.

7. A method according to claim 6 wherein said amplifying comprises amplifying the extracted high frequency detail signal to an extent which is partly determined by the user.

8. A method according to claim 6 also comprising reducing noise in the image so as to prevent enhancement of noise artifacts.

9. A method according to claim 8 wherein said noise reduction comprises the following:

proceeding along at least a portion of a first dimension of received image pixels in a first direction and computing a first sequence of estimated pixel values from the received image pixels defined along the first direction;

proceeding along at least a portion of the first dimension of received image pixels in a second direction and computing a second sequence of estimated pixel values from the received image pixels defined along the second direction; and for each individual pixel along the first dimension, computing an improved estimated pixel value for the individual pixel based on a data dependent combination of at least estimated pixel values in the first and second sequences.

10. A method according to claim 1 for dynamic range compression of an image, the method further comprising:

reducing noise in the image to different extents in different portions of the image, such that noise is substantially reduced in a first portion of the image which is expected to become noisy as a result of dynamic range compression and noise is only mildly reduced in a second portion of the image which is expected to be less noisy than the first portion of the image as a result of dynamic range compression; and compressing the dynamic range of the image.

11. A method according to claim 10 wherein said noise reduction comprises the following:

proceeding along at least a portion of a first dimension of received image pixels in a first direction and computing a first sequence of estimated pixel values from the received image pixels defined along the first direction;

proceeding along at least a portion of the first dimension of received image pixels in a second direction and computing a second sequence of estimated pixel values from the received image pixel defined along the second direction: and for each individual pixel along the first dimension, computing an improved estimated pixel value for the individual pixel based on a data dependent combination of at least estimated pixel values in the first and second sequences.

12. A method according to claim 1 for enlarging an image further comprising:

reducing noise in the image; and subsequently interpolating between pixels so as to enlarge the image, wherein the noise reduction step comprises:

proceeding along at least a portion of a first dimension of received image pixels in a first direction and computing a first sequence of estimated pixel values from the received image pixels defined along the first direction;

proceeding along at least a portion of the first dimension of received image pixels in a second direction and computing a second sequence of estimated pixel values from the received image pixels defined along the second direction; and for each individual pixel along the first dimension, computing an improved estimated pixel value for the individual pixel based on a data dependent combination of at least estimated pixel values in the first and second sequences.

13. A method according to claim 12 and also comprising, following the last of said noise reducing and interpolating steps, restoring to the enlarged image, high frequency detail which was removed from the image during the noise reducing, at location in the enlarged image which correspond to the locations of the high frequency detail in the original image.

14. A video telephone system comprising:

a video telephone codec for coding and decoding a video image; and noise reduction apparatus for reducing noise in the video image comprising:

a first-direction pixel estimator proceeding along at least a portion of a first dimension of received image pixels in a first direction and computing a first sequence of estimated pixel values from the received image pixels defined along the first direction;

a second-direction pixel estimator proceeding along at least a portion of the first dimension of received image pixels in a second direction and computing a second sequence of estimated pixel values from the received image pixels defined along the second direction; and a data-dependent pixel estimator operative, for each individual pixel along the first dimension, to compute an improved estimated pixel value for the individual pixel based on a data dependent combination of at least estimated pixel values in the first and second sequences.

15. Apparatus according to claim 14 further comprising:

an image processor operative to perform a plurality of image improvement operations; and a sequencer receiving an external input and operative to control the image processor such that, for each value of the external input, the image processor performs at least some of the plurality of image improvement operations in a predetermined sequence.

16. Apparatus according to claim 15 wherein the plurality of image improvement operations includes at least some of VCR noise reduction, white noise reduction, fixed pattern noise reduction, interpolation, enhancement and dithering, and wherein, upon receipt of an external input indicating that an image to be improved is arriving from a VCR, the image processor performs said image improvement operations in the above sequence.

17. Apparatus according to claim 14 for enhancement of contrast in an image further comprising:

a detail extractor operative to extract high frequency detail from the image signal;

a nonlinear detail amplifier operative to amplify the extracted high frequency detail signal to an extent at least partly determined as a nonlinear function of at least one of the following image features:

the amplitude of the high frequency detail signal; and local image brightness; and a detail-image combiner operative to combine the amplified high frequency detail with at least a portion of the image signal.

18. Apparatus according to claim 14 for dynamic range compression of an image, further comprising:

a differential noise reducer operative to reduce noise in the image to different extents in different portions of the image, such that noise is substantially reduced in a first portion of the image which is expected to become noisy as a result of dynamic range compression and noise is only mildly reduced in a second portion of the image which is expected to be less noisy than the first portion of the image as a result of dynamic range compression; and a dynamic range compression unit operative to compress the dynamic range of the image.

19. Apparatus according to claim 14 for dynamic range compression of an image, the apparatus further comprising:

a differential contrast enhancer operative to enhance contrast in the image to different extents in different portions of the image, such that contrast is substantially enhanced in a first portion of the image which is expected to lose considerable contrast as a result of dynamic range compression and contrast is only mildly enhanced in a second portion of the image which is expected to lose less contrast than the first portion of the image; and a dynamic range compression unit operative to compress the dynamic range of the image.

20. A video system according to claim 14 comprising:

a video camera for acquiring said video image.

* * * * *

UNITED STATES PATENT AND TRADEMARK OFFICE
CERTIFICATE OF CORRECTION

PATENT NO. : 5,799,111
DATED : August 25, 1998
INVENTOR(S) : Rami GUISSIN

It is certified that error appears in the above-indentified patent and that said Letters Patent is hereby corrected as shown below:

ON TITLE PAGE, ITEM 30, ADD THE FOLLOWING FOREIGN APPLICATION PRIORITY DATA:

JUNE 14, 1991 [JP] JAPAN 3-143533

JANUARY 5, 1992 [IL] ISRAEL 100589

Signed and Sealed this

Twenty-second Day of December, 1998

Attest:

BRUCE LEHMAN

Attesting Officer

Commissioner of Patents and Trademarks